United States Patent
Elenowitz et al.

(10) Patent No.: US 12,521,676 B2
(45) Date of Patent: Jan. 13, 2026

(54) HIGH THROUGHPUT MOVING PANEL DIRECT AIR CAPTURE SYSTEM

(71) Applicant: Zero Carbon Systems, Inc., New York, NY (US)

(72) Inventors: David Elenowitz, New York, NY (US); Charles S. Sanderson, Wayne, PA (US)

(73) Assignee: Zero Carbon Systems, Inc., Brighton, CO (US)

( * ) Notice: Subject to any disclaimer, the term of this patent is extended or adjusted under 35 U.S.C. 154(b) by 0 days.

(21) Appl. No.: 18/417,559

(22) Filed: Jan. 19, 2024

(65) Prior Publication Data
US 2024/0157297 A1    May 16, 2024

Related U.S. Application Data

(63) Continuation of application No. 18/558,696, filed as application No. PCT/US2023/023747 on May 26, 2023, now Pat. No. 12,109,534.
(Continued)

(51) Int. Cl.
*B01D 53/96*    (2006.01)
*B01D 53/02*    (2006.01)
(Continued)

(52) U.S. Cl.
CPC ........... *B01D 53/96* (2013.01); *B01D 53/025* (2013.01); *B01D 53/343* (2013.01); *B01D 53/62* (2013.01);
(Continued)

(58) Field of Classification Search
None
See application file for complete search history.

(56) References Cited

U.S. PATENT DOCUMENTS 3,466,138 A    9/1969   Spiegler et al.
3,491,031 A    1/1970   Stoneburner
(Continued)

FOREIGN PATENT DOCUMENTS

AU    2013200405 B2    8/2017
CA       2510235 A1    7/2004
(Continued)

OTHER PUBLICATIONS

Notification of transmittal of the international search report and the written opinion of the international searching authority, or the declaration mailed Oct. 6, 2023, International Patent Application No. PCT/US2023/023747, filed May 26, 2023, 11 pages.
(Continued)

*Primary Examiner* — Jelitza M Perez
(74) *Attorney, Agent, or Firm* — Wolf, Greenfield & Sacks, P.C.

(57) ABSTRACT

Systems and methods of direct air capture are described. Systems include a plurality of moving adsorber panels in a linear direction (or circular configuration) and one or more fans configured to move air across the adsorber panels; such adsorber panels may be oriented vertically or horizontally, relative to the ground. Systems may include an independent regeneration box that comprises a system of headers, ducts and valves configured to deliver and remove a plurality of gases to the regeneration box. The regeneration box contains multiple chambers such that steps such as oxygen removal and panel cooling may be performed independently from and simultaneously to thermal preheating and desorption of the $CO_2$ on the panels. The desorption panels may be configured to achieve counter-current flow to the hot gases used for thermal preheating and desorption. A multi-stage heat pump may facilitate reuse of waste heat and decarbonization of the process heating requirements.

23 Claims, 66 Drawing Sheets

Related U.S. Application Data

(60) Provisional application No. 63/456,600, filed on Apr. 3, 2023, provisional application No. 63/425,210, filed on Nov. 14, 2022, provisional application No. 63/346,384, filed on May 27, 2022.

(51) Int. Cl.
  *B01D 53/34* (2006.01)
  *B01D 53/62* (2006.01)
  *B01D 53/83* (2006.01)
  *B01J 20/28* (2006.01)
  *B01J 20/34* (2006.01)

(52) U.S. Cl.
  CPC ........ *B01D 53/83* (2013.01); *B01J 20/28033* (2013.01); *B01J 20/3466* (2013.01); *B01J 20/3483* (2013.01); *B01D 2253/202* (2013.01); *B01D 2253/342* (2013.01); *B01D 2257/504* (2013.01); *B01D 2258/06* (2013.01); *B01D 2259/40084* (2013.01); *B01D 2259/40086* (2013.01); *B01D 2259/4009* (2013.01)

(56) References Cited

U.S. PATENT DOCUMENTS

| | | |
|---|---|---|
| 3,725,387 A | 4/1973 | McClendon et al. |
| 3,865,924 A | 2/1975 | Gidaspow et al. |
| 3,880,981 A | 4/1975 | Garingarao et al. |
| 3,907,310 A | 9/1975 | Dufour |
| 3,948,627 A | 4/1976 | Schwarz et al. |
| 4,047,894 A | 9/1977 | Kuhl |
| 4,152,217 A | 5/1979 | Eisenberg et al. |
| 4,197,421 A | 4/1980 | Steinberg |
| 4,239,515 A | 12/1980 | Futami et al. |
| 4,243,613 A | 1/1981 | Brockhaus et al. |
| 4,285,918 A | 8/1981 | Gustafson |
| 4,455,153 A | 6/1984 | Jakahi |
| 4,472,178 A | 9/1984 | Kumar et al. |
| 4,497,641 A | 2/1985 | Brown, Jr. et al. |
| 4,528,248 A | 7/1985 | Galbraith |
| 4,579,723 A | 4/1986 | Weltmer et al. |
| 4,711,645 A | 12/1987 | Kumar |
| 4,762,528 A | 8/1988 | Reichl |
| 4,808,317 A | 2/1989 | Berry et al. |
| 4,810,266 A | 3/1989 | Zinnen et al. |
| 4,822,383 A | 4/1989 | Brose et al. |
| 5,061,455 A | 10/1991 | Brose et al. |
| 5,087,597 A | 2/1992 | Leal et al. |
| 5,169,414 A | 12/1992 | Panzica et al. |
| 5,364,887 A | 11/1994 | Peter et al. |
| 5,367,147 A | 11/1994 | Kim et al. |
| 5,376,614 A | 12/1994 | Birbara et al. |
| 5,443,804 A | 8/1995 | Parker et al. |
| 5,593,475 A | 1/1997 | Minh |
| 5,595,238 A | 1/1997 | Mark et al. |
| 5,635,142 A | 6/1997 | Ichiki et al. |
| 5,642,630 A | 7/1997 | Abdelmalek et al. |
| 5,653,785 A | 8/1997 | Horio et al. |
| 5,716,899 A | 2/1998 | Guile et al. |
| 5,871,646 A | 2/1999 | Jones et al. |
| 5,876,488 A | 3/1999 | Birbara et al. |
| 5,879,432 A | 3/1999 | Morlec et al. |
| 5,906,806 A | 5/1999 | Clark |
| 5,928,806 A | 7/1999 | Olah et al. |
| 5,958,353 A | 9/1999 | Eyal |
| 6,004,381 A | 12/1999 | Rohrbach et al. |
| 6,048,509 A | 4/2000 | Kawai et al. |
| 6,090,186 A | 7/2000 | Spencer |
| 6,106,595 A | 8/2000 | Spencer |
| 6,117,404 A | 9/2000 | Mimura et al. |
| 6,174,506 B1 | 1/2001 | Chakravarti et al. |
| 6,350,298 B1 | 2/2002 | Su et al. |
| 6,364,938 B1 | 4/2002 | Birbara et al. |
| 6,387,337 B1 | 5/2002 | Pennline et al. |
| 6,409,801 B1 | 6/2002 | Shen et al. |
| 6,527,837 B2 | 3/2003 | Kurosawa et al. |
| 6,540,936 B1 | 4/2003 | Takagi et al. |
| 6,547,854 B1 | 4/2003 | Gray et al. |
| 6,612,485 B2 | 9/2003 | Lackner et al. |
| 6,709,483 B1 | 3/2004 | Hodgson, Jr. |
| 6,790,430 B1 | 9/2004 | Lackner et al. |
| 6,797,039 B2 | 9/2004 | Spencer |
| 6,800,331 B2 | 10/2004 | Bilyk et al. |
| 6,873,267 B1 | 3/2005 | Tubel et al. |
| 6,890,497 B2 | 5/2005 | Rau et al. |
| 6,908,497 B1 | 6/2005 | Sirwardane |
| 6,929,680 B2 | 8/2005 | Krushnevych et al. |
| 6,960,242 B2 | 11/2005 | Leitch et al. |
| 7,018,447 B2 | 3/2006 | McAnespie |
| 7,128,777 B2 | 10/2006 | Spencer |
| 7,132,090 B2 | 11/2006 | Dziedzic et al. |
| 7,141,859 B2 | 11/2006 | DeBoer et al. |
| 7,198,768 B2 | 4/2007 | Carre et al. |
| 7,288,136 B1 | 10/2007 | Gray et al. |
| 7,385,012 B2 | 6/2008 | Chang et al. |
| 7,452,406 B2 | 11/2008 | Little et al. |
| 7,527,677 B2 | 5/2009 | Saito et al. |
| 7,559,993 B1 | 7/2009 | Patel et al. |
| 7,655,069 B2 | 2/2010 | Wright et al. |
| 7,658,994 B2 | 2/2010 | Lakshmi |
| 7,666,250 B1 | 2/2010 | Blencoe et al. |
| 7,699,909 B2 | 4/2010 | Lackner et al. |
| 7,708,806 B2 | 5/2010 | Wright et al. |
| 7,767,004 B2 | 8/2010 | Sayari et al. |
| 7,795,175 B2 | 9/2010 | Olah et al. |
| 7,799,310 B2 | 9/2010 | Lackner et al. |
| 7,827,778 B2 | 11/2010 | Finkenrath et al. |
| 7,833,328 B2 | 11/2010 | Lackner et al. |
| 7,909,911 B2 | 3/2011 | Lackner et al. |
| 7,947,239 B2 | 5/2011 | Lackner et al. |
| 7,976,897 B2 | 7/2011 | Bhat et al. |
| 7,988,766 B2 | 8/2011 | White et al. |
| 7,993,432 B2 | 8/2011 | Wright et al. |
| 8,043,594 B2 | 10/2011 | Lackner et al. |
| 8,052,776 B2 | 11/2011 | Jiang |
| 8,083,836 B2 | 12/2011 | Wright et al. |
| 8,088,197 B2 | 1/2012 | Wright et al. |
| 8,118,914 B2 | 2/2012 | Liu et al. |
| 8,119,091 B2 | 2/2012 | Keith et al. |
| 8,123,842 B2 | 2/2012 | Pan et al. |
| 8,133,305 B2 | 3/2012 | Lackner et al. |
| 8,163,066 B2 | 4/2012 | Eisenberger |
| 8,435,330 B2 | 5/2013 | Bade et al. |
| 8,491,705 B2 | 7/2013 | Choi et al. |
| 8,496,734 B2 | 7/2013 | Gadkaree et al. |
| 8,500,855 B2 | 8/2013 | Eisenberger |
| 8,500,857 B2 | 8/2013 | Eisenberger |
| 8,500,858 B2 | 8/2013 | Eisenberger |
| 8,500,859 B2 | 8/2013 | Eisenberger |
| 8,500,860 B2 | 8/2013 | Eisenberger |
| 8,500,861 B2 | 8/2013 | Eisenberger |
| 8,519,012 B2 | 8/2013 | O'Connor |
| 8,529,664 B2 | 9/2013 | Deckman et al. |
| 8,557,027 B2 | 10/2013 | Peiffer et al. |
| 8,598,071 B1 | 12/2013 | Baugh et al. |
| 8,690,992 B2 | 4/2014 | Dube et al. |
| 8,696,801 B2 | 4/2014 | Eisenberger |
| 8,852,328 B2 | 10/2014 | Barclay et al. |
| 8,871,008 B2 | 10/2014 | Henderson et al. |
| 8,894,747 B2 | 11/2014 | Eisenberger et al. |
| 8,901,030 B2 | 12/2014 | Knapp et al. |
| 8,974,576 B2 | 3/2015 | Gupta et al. |
| 8,974,577 B2 | 3/2015 | Jiang et al. |
| 9,011,583 B2 | 4/2015 | Halder et al. |
| 9,028,592 B2 | 5/2015 | Eisenberger |
| 9,034,787 B2 | 5/2015 | Boek et al. |
| 9,061,237 B2 | 6/2015 | Eisenberger et al. |
| 9,062,586 B2 | 6/2015 | Jiang et al. |
| 9,073,000 B2 | 7/2015 | Halder et al. |
| 9,102,530 B2 | 8/2015 | Sundaram et al. |
| 9,138,676 B2 | 9/2015 | Halder et al. |
| 9,169,369 B2 | 10/2015 | Peiffer et al. |
| 9,169,370 B2 | 10/2015 | Peiffer et al. |

(56) References Cited

U.S. PATENT DOCUMENTS

| | | |
|---|---|---|
| 9,175,591 B2 | 11/2015 | Hamad |
| 9,205,365 B2 | 12/2015 | Jiang et al. |
| 9,227,153 B2 | 1/2016 | Eisenberger |
| 9,272,242 B2 | 3/2016 | Kortunov et al. |
| 9,333,484 B2 | 5/2016 | Calabro et al. |
| 9,427,726 B2 | 8/2016 | Chaikittisilp et al. |
| 9,433,896 B2 | 9/2016 | Eisenberger |
| 9,457,340 B2 | 10/2016 | Buelow et al. |
| 9,477,788 B2 | 10/2016 | Halder et al. |
| 9,550,142 B2 | 1/2017 | Roestenberg et al. |
| 9,555,365 B2 | 1/2017 | Eisenberger et al. |
| 9,581,062 B2 | 2/2017 | Hamad et al. |
| 9,610,533 B2 | 4/2017 | Peiffer et al. |
| 9,610,561 B2 | 4/2017 | Addiego et al. |
| 9,616,378 B2 | 4/2017 | Eisenberger |
| 9,630,143 B2 | 4/2017 | Eisenberger et al. |
| 9,776,131 B2 | 10/2017 | Eisenberger |
| 9,861,910 B2 | 1/2018 | Hammad et al. |
| 9,878,286 B2 | 1/2018 | Eisenberger |
| 9,908,080 B2 | 3/2018 | Eisenberger et al. |
| 9,925,488 B2 | 3/2018 | Eisenberger |
| 9,937,461 B2 | 4/2018 | Eisenberger et al. |
| 9,969,665 B2 | 5/2018 | O'Connor et al. |
| 9,975,087 B2 | 5/2018 | Eisenberger |
| 10,010,861 B2 | 7/2018 | Choi et al. |
| 10,125,641 B2 | 11/2018 | Sundaram et al. |
| 10,179,839 B2 | 1/2019 | Falkowski et al. |
| 10,188,975 B2 | 1/2019 | Fu et al. |
| 10,232,305 B2 | 3/2019 | Gebald et al. |
| 10,239,017 B2 | 3/2019 | Eisenberger |
| 10,279,306 B2 | 5/2019 | Gebald et al. |
| 10,413,866 B2 | 9/2019 | Eisenberger |
| 10,421,913 B2 | 9/2019 | von Olshausen et al. |
| 10,449,479 B2 | 10/2019 | Sundaram et al. |
| 10,512,880 B2 | 12/2019 | Eisenberger |
| 10,654,025 B2 | 5/2020 | Choi et al. |
| 10,814,288 B2 | 10/2020 | Sundaram et al. |
| 10,858,302 B2 | 12/2020 | Chen et al. |
| 11,014,810 B1 | 5/2021 | De Wit et al. |
| 11,059,024 B2 | 7/2021 | Khunsupat et al. |
| 11,083,989 B2 | 8/2021 | Jakobsson et al. |
| 11,193,421 B2 | 12/2021 | Younes et al. |
| 11,389,761 B1 * | 7/2022 | Stark, Jr. ............ B01D 53/0462 |
| 11,420,149 B2 | 8/2022 | Gebald et al. |
| 11,420,182 B2 | 8/2022 | Bai et al. |
| 11,446,605 B2 | 9/2022 | Besarati et al. |
| 11,446,634 B2 | 9/2022 | Pang et al. |
| 11,511,992 B2 | 11/2022 | O'Neal et al. |
| 11,571,658 B2 | 2/2023 | Younes et al. |
| 11,617,981 B1 | 4/2023 | Younes et al. |
| 11,623,863 B2 | 4/2023 | McCahill et al. |
| 11,628,401 B2 | 4/2023 | Beall et al. |
| 11,654,393 B2 | 5/2023 | Besarati et al. |
| 11,685,658 B2 | 6/2023 | GilroySmith et al. |
| 11,738,301 B2 | 8/2023 | Holman et al. |
| 11,766,636 B1 | 9/2023 | Besarati et al. |
| 11,794,164 B2 | 10/2023 | Pang et al. |
| 11,850,570 B2 | 12/2023 | Khunsupat et al. |
| 11,944,932 B2 | 4/2024 | Suter et al. |
| 12,172,123 B2 | 12/2024 | Eisenberger et al. |
| 2001/0004895 A1 | 6/2001 | Preiss |
| 2001/0047995 A1 | 12/2001 | Pozgainer et al. |
| 2002/0000260 A1 | 1/2002 | Palvoelgyi et al. |
| 2002/0083833 A1 | 7/2002 | Nalette et al. |
| 2002/0187372 A1 | 12/2002 | Hall et al. |
| 2003/0006274 A1 | 1/2003 | Lackner et al. |
| 2003/0061906 A1 | 4/2003 | Knunz et al. |
| 2003/0075012 A1 | 4/2003 | Knunz et al. |
| 2004/0142888 A1 | 7/2004 | Manne et al. |
| 2004/0213705 A1 | 10/2004 | Blencoe et al. |
| 2004/0229045 A1 | 11/2004 | Hesselmans et al. |
| 2004/0253159 A1 | 12/2004 | Hakka et al. |
| 2005/0027081 A1 | 2/2005 | Okushita et al. |
| 2005/0180910 A1 | 8/2005 | Park et al. |
| 2005/0255021 A1 | 11/2005 | DiFrancesco et al. |
| 2006/0051274 A1 | 3/2006 | Wright et al. |
| 2006/0084063 A1 | 4/2006 | Costa et al. |
| 2006/0101945 A1 | 5/2006 | Lackner et al. |
| 2006/0105419 A1 | 5/2006 | Blankenberg et al. |
| 2006/0168940 A1 | 8/2006 | Offenhuber et al. |
| 2006/0178989 A1 | 8/2006 | Lackner et al. |
| 2006/0186562 A1 | 8/2006 | Wright et al. |
| 2006/0188423 A1 | 8/2006 | Cadours et al. |
| 2006/0289003 A1 | 12/2006 | Lackner et al. |
| 2007/0004023 A1 | 1/2007 | Trachtenberg |
| 2007/0033767 A1 | 2/2007 | Dodson et al. |
| 2007/0068525 A1 | 3/2007 | Offenhuber et al. |
| 2007/0086909 A1 | 4/2007 | Abenthung et al. |
| 2007/0187247 A1 | 8/2007 | Lackner et al. |
| 2007/0209349 A1 | 9/2007 | Ripper et al. |
| 2008/0031801 A1 | 2/2008 | Lackner et al. |
| 2008/0064184 A1 | 3/2008 | Lackner et al. |
| 2008/0087165 A1 | 4/2008 | Wright et al. |
| 2008/0090480 A1 | 4/2008 | Akimoto et al. |
| 2008/0112868 A1 | 5/2008 | Blencoe et al. |
| 2008/0124666 A1 | 5/2008 | Stocker et al. |
| 2008/0138265 A1 | 6/2008 | Lackner et al. |
| 2008/0190567 A1 | 8/2008 | Winsness |
| 2008/0250715 A1 | 10/2008 | Cooper et al. |
| 2008/0264029 A1 | 10/2008 | Sepaniak |
| 2008/0264254 A1 | 10/2008 | Song et al. |
| 2008/0289319 A1 | 11/2008 | Eisenberger et al. |
| 2008/0289495 A1 | 11/2008 | Eisenberger et al. |
| 2008/0289499 A1 | 11/2008 | Eisenberger et al. |
| 2008/0289500 A1 | 11/2008 | Eisenberger et al. |
| 2008/0293976 A1 | 11/2008 | Olah et al. |
| 2009/0101050 A1 | 4/2009 | Lackner et al. |
| 2009/0294366 A1 | 12/2009 | Wright et al. |
| 2010/0222489 A1 | 9/2010 | Jiang et al. |
| 2010/0254883 A1 | 10/2010 | Eisenberger et al. |
| 2010/0284877 A1 | 11/2010 | DiFrancesco et al. |
| 2010/0288704 A1 | 11/2010 | Amsden et al. |
| 2010/0319537 A1 | 12/2010 | Eisenberger et al. |
| 2011/0000371 A1 | 1/2011 | Eisenberger et al. |
| 2011/0011945 A1 | 1/2011 | Eisenberger et al. |
| 2011/0028619 A1 | 2/2011 | Hill et al. |
| 2011/0041688 A1 | 2/2011 | Eisenberger |
| 2012/0000364 A1 | 1/2012 | Eisenberger et al. |
| 2012/0060686 A1 | 3/2012 | Kortunov et al. |
| 2012/0152116 A1 | 6/2012 | Barclay et al. |
| 2012/0167764 A1 | 7/2012 | Eisenberger |
| 2012/0216676 A1 | 8/2012 | Addiego et al. |
| 2012/0252659 A1 | 10/2012 | DiFrancesco |
| 2012/0255306 A1 | 10/2012 | Iijima |
| 2012/0312020 A1 | 12/2012 | Hume et al. |
| 2013/0177481 A1 | 7/2013 | Hokari et al. |
| 2013/0207034 A1 | 8/2013 | Addiego |
| 2013/0255267 A1 | 10/2013 | ElKady et al. |
| 2014/0010719 A1 | 1/2014 | Eisenberger |
| 2014/0105800 A1 | 4/2014 | Handagama et al. |
| 2014/0123851 A1 | 5/2014 | Jamtvedt et al. |
| 2014/0130670 A1 | 5/2014 | Eisenberger et al. |
| 2014/0145110 A1 | 5/2014 | Eisenberger et al. |
| 2014/0175336 A1 | 6/2014 | Gupta et al. |
| 2015/0017706 A1 | 1/2015 | Kainth et al. |
| 2015/0079335 A1 | 3/2015 | Trefzger et al. |
| 2015/0209726 A1 | 7/2015 | Difrancesco et al. |
| 2015/0273385 A1 | 10/2015 | Eisenberger |
| 2015/0299054 A1 | 10/2015 | Ogunwumi et al. |
| 2015/0313401 A1 | 11/2015 | Chichilnisky |
| 2015/0314235 A1 | 11/2015 | Kortunov et al. |
| 2015/0329369 A1 | 11/2015 | Heidel et al. |
| 2016/0001223 A1 | 1/2016 | Okuno et al. |
| 2016/0158691 A1 | 6/2016 | Kortunov et al. |
| 2016/0199810 A1 | 7/2016 | Goeppert et al. |
| 2016/0367964 A1 | 12/2016 | Chaikittisilp et al. |
| 2017/0113182 A1 | 4/2017 | Voskian et al. |
| 2017/0271701 A1 | 9/2017 | Berlowitz et al. |
| 2017/0321656 A1 | 11/2017 | Eisenberger et al. |
| 2018/0008958 A1 | 1/2018 | Choi et al. |
| 2018/0028962 A1 | 2/2018 | Hatton et al. |
| 2018/0116252 A1 | 5/2018 | Chichilnisky |
| 2018/0296961 A1 | 10/2018 | Jiang et al. |
| 2018/0361352 A1 | 12/2018 | Gross et al. |

(56) References Cited

U.S. PATENT DOCUMENTS

| | | |
|---|---|---|
| 2019/0022573 A1 | 1/2019 | Weston |
| 2019/0099711 A1 | 4/2019 | Hatton et al. |
| 2019/0240613 A1 | 8/2019 | Raynel et al. |
| 2019/0291077 A1 | 9/2019 | Pang et al. |
| 2020/0009504 A1 | 1/2020 | Eisenberger |
| 2020/0011298 A1 | 1/2020 | Eisenberger et al. |
| 2020/0047116 A1 | 2/2020 | Eisenberger |
| 2021/0060485 A1 | 3/2021 | Voskian et al. |
| 2021/0062351 A1 | 3/2021 | Voskian et al. |
| 2021/0130242 A1 | 5/2021 | Beall et al. |
| 2021/0146303 A1 | 5/2021 | Eisenberger |
| 2021/0354074 A1 | 11/2021 | Boulet et al. |
| 2021/0380475 A1 | 12/2021 | Heidel et al. |
| 2021/0381116 A1 | 12/2021 | Kashi et al. |
| 2021/0387139 A1 | 12/2021 | Voskian et al. |
| 2022/0072470 A1 | 3/2022 | Dunn |
| 2022/0096991 A1 | 3/2022 | Jones et al. |
| 2022/0096998 A1 | 3/2022 | Heidel et al. |
| 2022/0096999 A1 | 3/2022 | Ping et al. |
| 2022/0119636 A1 | 4/2022 | Wang et al. |
| 2022/0119641 A1 | 4/2022 | Wang et al. |
| 2022/0161222 A1 | 5/2022 | Dahlgren et al. |
| 2022/0169593 A1 | 6/2022 | Jones et al. |
| 2022/0193598 A1 | 6/2022 | Suter et al. |
| 2022/0204401 A1 | 6/2022 | Sant et al. |
| 2022/0212935 A1 | 7/2022 | Sant et al. |
| 2022/0227677 A1 | 7/2022 | Mehdipour et al. |
| 2022/0228275 A1 | 7/2022 | Sheehan |
| 2022/0233996 A1 | 7/2022 | Yeganeh et al. |
| 2022/0250002 A1 | 8/2022 | Moore et al. |
| 2022/0267914 A1 | 8/2022 | McGinnis et al. |
| 2022/0290860 A1 | 9/2022 | Boulet |
| 2022/0331740 A1 | 10/2022 | Simonetti et al. |
| 2022/0339575 A1 | 10/2022 | Beaumont et al. |
| 2022/0355238 A1 | 11/2022 | Lackner et al. |
| 2022/0362707 A1 | 11/2022 | Kemp et al. |
| 2022/0362737 A1 | 11/2022 | Staufcik et al. |
| 2022/0372314 A1 | 11/2022 | Weston et al. |
| 2022/0379257 A1 | 12/2022 | Sundaram et al. |
| 2023/0019754 A1 | 1/2023 | Sant et al. |
| 2023/0023050 A1 | 1/2023 | Eisenberger et al. |
| 2023/0036635 A1 | 2/2023 | Santos-Heard et al. |
| 2023/0058065 A1 | 2/2023 | Sant et al. |
| 2023/0060945 A1 | 3/2023 | Sheehan |
| 2023/0062545 A1 | 3/2023 | Kruger |
| 2023/0070112 A1* | 3/2023 | Besarati ............. B01D 53/0462 |
| 2023/0073553 A1 | 3/2023 | Holman et al. |
| 2023/0073557 A1 | 3/2023 | Kruger |
| 2023/0111280 A1 | 4/2023 | Pimpalgaonkar et al. |
| 2023/0125242 A1 | 4/2023 | Sant et al. |
| 2023/0142046 A1 | 5/2023 | Kruger |
| 2023/0149896 A1 | 5/2023 | Eisenberger et al. |
| 2023/0175146 A1 | 6/2023 | Kashi et al. |
| 2023/0202840 A1 | 6/2023 | Flanders et al. |
| 2023/0211278 A1 | 7/2023 | Eisenberger et al. |
| 2023/0241546 A1 | 8/2023 | Brouillette et al. |
| 2023/0264137 A1 | 8/2023 | De Neve et al. |
| 2023/0415092 A1 | 12/2023 | Aldridge et al. |
| 2024/0024849 A1 | 1/2024 | Khunsupat et al. |
| 2025/0153093 A1 | 5/2025 | Feron et al. |

FOREIGN PATENT DOCUMENTS

| | | |
|---|---|---|
| CN | 104624157 B | 1/2017 |
| CN | 113398715 A | 9/2021 |
| CN | 115282732 A | 11/2022 |
| EP | 1180511 A1 | 2/2002 |
| EP | 1234947 A2 | 8/2002 |
| EP | 2457636 A1 | 5/2012 |
| EP | 2722096 B1 | 8/2016 |
| EP | 2665808 B1 | 12/2016 |
| EP | 3319998 A1 | 5/2018 |
| EP | 2952244 B1 | 8/2018 |
| EP | 2959966 B1 | 9/2018 |
| EP | 3257570 B1 | 3/2019 |
| EP | 3463626 A1 | 4/2019 |
| EP | 3310455 B1 | 3/2020 |
| EP | 3697519 A1 | 8/2020 |
| EP | 3725391 B1 | 10/2020 |
| EP | 3246083 B1 | 1/2021 |
| EP | 3311904 B1 | 7/2021 |
| EP | 3873644 A4 | 9/2022 |
| EP | 4157485 A1 | 4/2023 |
| EP | 4157487 A1 | 4/2023 |
| EP | 4171786 A1 | 5/2023 |
| FR | 2543946 A1 | 10/1984 |
| GB | 1283822 A | 8/1972 |
| JP | 59216839 A2 | 12/1984 |
| JP | 2015-529635 A | 10/2015 |
| JP | 2016-175014 A | 10/2016 |
| JP | 2017-529725 A | 10/2017 |
| JP | 2020-032341 A | 2/2020 |
| KR | 102432476 B1 | 8/2022 |
| KR | 102499516 B1 | 2/2023 |
| WO | 1998029187 A1 | 7/1998 |
| WO | 2005026694 A2 | 3/2005 |
| WO | 2005037746 A1 | 4/2005 |
| WO | 2006009600 A2 | 1/2006 |
| WO | 2006036396 A2 | 4/2006 |
| WO | 2007016271 A2 | 2/2007 |
| WO | 2007045048 A1 | 4/2007 |
| WO | 2008144708 A1 | 11/2008 |
| WO | 2009003171 A1 | 12/2008 |
| WO | 2009126607 A1 | 10/2009 |
| WO | 2009137886 A1 | 11/2009 |
| WO | 2010022339 A1 | 2/2010 |
| WO | 2010107942 A1 | 9/2010 |
| WO | 2011019477 A1 | 2/2011 |
| WO | 2011047409 A1 | 4/2011 |
| WO | 2011077106 A1 | 6/2011 |
| WO | 2011109359 A1 | 9/2011 |
| WO | 2011137398 A1 | 11/2011 |
| WO | 2012034003 A1 | 3/2012 |
| WO | 2012158194 A1 | 11/2012 |
| WO | 2013075981 A3 | 10/2013 |
| WO | 2013138437 A3 | 11/2013 |
| WO | 2013166432 A1 | 11/2013 |
| WO | 2013188641 A2 | 12/2013 |
| WO | 2014099241 A2 | 6/2014 |
| WO | 2014099268 A1 | 6/2014 |
| WO | 2014151212 A1 | 9/2014 |
| WO | 2014164738 A2 | 10/2014 |
| WO | 2014170184 A1 | 10/2014 |
| WO | 2015015157 A1 | 2/2015 |
| WO | 2015015161 A1 | 2/2015 |
| WO | 2015017240 A1 | 2/2015 |
| WO | 2015077818 A1 | 6/2015 |
| WO | 2015080998 A1 | 6/2015 |
| WO | 2015082567 A1 | 6/2015 |
| WO | 2015103401 A1 | 7/2015 |
| WO | 2016037668 A1 | 3/2016 |
| WO | 2016191150 A1 | 12/2016 |
| WO | 2017148782 A1 | 9/2017 |
| WO | 2017184652 A1 | 10/2017 |
| WO | 2018064363 A1 | 4/2018 |
| WO | 2018089968 A1 | 5/2018 |
| WO | 2018099709 A1 | 6/2018 |
| WO | 2018112654 A1 | 6/2018 |
| WO | 2018156020 A1 | 8/2018 |
| WO | 2018175371 A1 | 9/2018 |
| WO | 2018210617 A1 | 11/2018 |
| WO | 2019092127 A1 | 5/2019 |
| WO | 2019092288 A1 | 5/2019 |
| WO | 2019161420 A1 | 8/2019 |
| WO | 2019191651 A1 | 10/2019 |
| WO | 2019204320 A1 | 10/2019 |
| WO | 2019229030 A1 | 12/2019 |
| WO | 2020201720 A1 | 10/2020 |
| WO | 2020263910 A1 | 12/2020 |
| WO | 2021041732 A1 | 3/2021 |
| WO | 2021102385 A1 | 5/2021 |
| WO | 2021189042 A1 | 9/2021 |
| WO | 2021239747 A1 | 12/2021 |
| WO | 2021239749 A1 | 12/2021 |

(56) References Cited

FOREIGN PATENT DOCUMENTS

| | | |
|---|---|---|
| WO | 2021252695 A1 | 12/2021 |
| WO | 2021252713 A1 | 12/2021 |
| WO | 2021258219 A1 | 12/2021 |
| WO | 2021259760 A1 | 12/2021 |
| WO | 2022013197 A1 | 1/2022 |
| WO | 2022020634 A1 | 1/2022 |
| WO | 2022040072 A1 | 2/2022 |
| WO | 2022096614 A1 | 5/2022 |
| WO | 2022096615 A1 | 5/2022 |
| WO | 2022103474 A1 | 5/2022 |
| WO | 2022103477 A1 | 5/2022 |
| WO | 2022104000 A1 | 5/2022 |
| WO | 2022104252 A1 | 5/2022 |
| WO | 2022115897 A1 | 6/2022 |
| WO | 2022128431 A1 | 6/2022 |
| WO | 2022140489 A1 | 6/2022 |
| WO | 2022152757 A1 | 7/2022 |
| WO | 2022125574 A9 | 8/2022 |
| WO | 2022178323 A1 | 8/2022 |
| WO | 2022152759 A3 | 9/2022 |
| WO | 2022179764 A1 | 9/2022 |
| WO | 2022187336 A1 | 9/2022 |
| WO | 2022195299 A1 | 9/2022 |
| WO | 2022204233 A1 | 9/2022 |
| WO | 2022192408 A3 | 10/2022 |
| WO | 2022216355 A1 | 10/2022 |
| WO | 2022232155 A1 | 11/2022 |
| WO | 2022235664 A3 | 12/2022 |
| WO | 2022238934 A3 | 12/2022 |
| WO | 2022255590 A1 | 12/2022 |
| WO | 2022255591 A1 | 12/2022 |
| WO | 2023001810 A1 | 1/2023 |
| WO | 2023278372 A1 | 1/2023 |
| WO | 2023278423 A1 | 1/2023 |
| WO | 2023043004 A1 | 3/2023 |
| WO | 2023043005 A1 | 3/2023 |
| WO | 2023043843 A1 | 3/2023 |
| WO | 2023065735 A1 | 4/2023 |
| WO | 2023069370 A1 | 4/2023 |
| WO | 2023069947 A2 | 4/2023 |
| WO | 2023088812 A1 | 5/2023 |
| WO | 2023089177 A1 | 5/2023 |
| WO | 2023094386 A1 | 6/2023 |
| WO | 2023096955 A1 | 6/2023 |
| WO | 2023097116 A1 | 6/2023 |
| WO | 2023104656 A1 | 6/2023 |
| WO | 2023110520 A1 | 6/2023 |
| WO | 2023196799 A2 | 10/2023 |
| WO | 2023196800 A2 | 10/2023 |
| WO | 2023212547 A1 | 11/2023 |
| WO | 2023215873 A2 | 11/2023 |
| WO | 2023215875 A1 | 11/2023 |
| WO | 2024006521 A2 | 1/2024 |
| WO | 2024124194 A1 | 6/2024 |
| WO | 2024124196 A1 | 6/2024 |
| WO | 2024124198 A1 | 6/2024 |
| WO | 2024133948 A1 | 6/2024 |

OTHER PUBLICATIONS

Notification concerning transmittal of international preliminary report on patentability, International application No. PCT/US2023/023747, mailed Dec. 12, 2024, 8 pages.

Stolaroff, Joshuah et al. "A Pilot-scale prototype contractor for $CO_2$ capture from ambient air; cost and energy requirements." (2006) www.ucalgary.ca/~keith/papers/84.Stolaroff.Air.

Xu et al., "Preparations and characterization of novel $CO_2$ 'molecular basket' absorbents based on polymer-modified mesoporous molecular sieve MCM-41." Microporus and Mesoporus Materials 62: 29-45 (2003).

International Search Report and Written Opinion of the International Search Authority, dated Dec. 18, 2007, from corresponding International application No. PCT/US2007/074615.

Hicks, Jason C. et al.; "Designing Adsorbents for CO2 Capture from Flue GAs-Hyperbranched Aminosilicas Capable of Capturing CO2 Reversibly"; Feb. 2008; J. Amer. Chem. Soc., vol. 130, pp. 2902-2903.

Gold, Blanchard; "Integrated Gasification Combined Cycle IGCC"; www.globalgreenhousewarming.com, date unknown.

Leal, Orlando; "Reversible adsorption of carbon dioxide on amine surface-bonded silica gel"; 1995; Elsevier Science S. A., Inorganica Chimica Acta 240, pp. 183-189.

Dubey, "Science for sustainability: From capturing carbon dioxide from air to environmental impact of a hydrogen economy," Apr. 2, 2003.

Vaartstra, Brian A., et al., "Advances in Precursor Development for CVD of Barium-Containing Materials." Mat. Res. Soc. Symp. Proc. vol. 335, pp. 203-208, 1994 Materials Research Society.

Park, Jung Woo, et al., "Strontium B-diketonate complexes with polyamine donor ligands: the synthesis and structural characterization of [Sr(thd)2(L)]n (n=2; L=diethylenetriamine, n+1; L=triethylenetetramine, tetraethylenepentamine and tris(2-aminoethyl)amine) complex." Polyhedron 19 (2000) 2547-2555.

English abstract, CN 1 303 910 A (Jul. 18, 2001) as cited in U.S. Pat. No. 7,795,175.

English abstract, JP 2006-021989 A (Jan. 26, 2006) as cited in U.S. Pat. No. 7,795,175.

Barelli, L., et al. CO2 capture with sold sorbent: CFD model of an innovative reactor concept: Applied Energy Elsevier Science Publishers, GB, vol. 162, Nov. 11, 2015 (Nov. 11, 2015), pp. 58-67.

Search Report for PCT/US2021036696 dated Oct. 28, 2024.

Choi, Woosung, et al., "Expoxide-functionalization of polyethyleneimine for synthesis of stable carbon dioxide absorbent in temperature swing adsorption," Nature Communications, vol. 7, No. 12640 (2016) (8 pgs).

International Search Report and Written Opinion, PCT/US2023/066670, mailed Feb. 5, 2024.

International Search Report and Written Opinion, PCT/US2024/065308, mailed Aug. 28, 2023.

Zou, Bo et al. "Highly efficient conversion of CO2 at atmospheric pressure to cyclic carbonates with in situ-generated homogeneous catalysts from a copper-containing coordination polymer." Journal of Catalysis 329 (2015): 119-129.

International preliminary report on patentability and written opinion of the international searching authority issued Nov. 7, 2024, International Patent Application No. PCT/US2023/023747, filed May 26, 2023, 7 pages.

International search report and the written opinion of the international searching authority mailed Mar. 24, 2021, International Patent Application No. PCT/US2020/061690, filed Nov. 21, 2020, 13 pages.

Communication with Extended European Search report mailed Oct. 28, 2024, EP21822313.9, PCT/US2021/036696, 10 pages.

Sakwa-Nowak, Miles A. et al., "Role of Additives in Composite PEI/Ocide CO2 Adsorbents: Enhancement in the Amine Efficiency of Supported PEI by PEG in CO2 Capture from Simulated Ambient Air," ACS Applied Materials & Interfaces, Oct. 20, 2015, 17 pages.

Schellevis, Michel, et al., "CO2 Capture From Air in a Radial Flow Contractor: Batch or Continuous Operation?", Frontiers in Chemical Engineering, Nov. 20, 2020, 11 pages.

Chinese office action mailed Apr. 5, 2024, Application No. 202180058344.6, 10 pages.

T. Daniel et al., "Techno-economic Analysis of Direct Air Carbon Capture with CO 2 Utilisation", Carbon Capture Science & Technology 2 (2022) pp. 1-10, Elsevier Ltd., London, United Kingdom.

G. Holmes et al., "An air-liquid contactor for large-scale capture of CO2 from air", Philosophical Transactions of the Royal Society A, 2012, pp. 4380-4403, vol. 370, London, United Kingdom.

J. Carlos Abanades et al., "Direct capture of carbon dioxide from the atmosphere using bricks of calcium hydroxide", Cell Reports Physical Science 4, 101339, Apr. 19, 2023, 14 pages, CellPress Open Access, Cambridge, MA, USA.

Z. Zhang et al. "Zinc-based deep eutectic solvent—An efficient carbonic anhydrase mimic for CO2 hydration and conversion", 2021, Separation and Purification Technology 276, 119446, 7 pages, Elsevier Ltd., London, United Kingdom.

(56) References Cited

OTHER PUBLICATIONS

J. Stolaroff et al., Carbon dioxide capture from atmospheric air using sodium hydroxide spray: Supporting Information, In Support of the Manuscript "Carbon dioxide capture from atmospheric air using sodium hydroxide spray" published in Environmental Science and Technology, Feb. 1, 2008, 12 pages, ASC Publications, Washington, DC, US.

C. Fu et al., "Techno-Economic Analyses of the CaO/CaCO3 Post-Combustion CO2 Capture from NGCC Power Plants", Frontiers in Chemical Engineering, Jan. 2021, pp. 1-10, vol. 2, Article 596417, London, United Kingdom.

D. Keith et al., "A Process for Capturing CO2 from the Atmosphere", Joule 2, Aug. 15, 2018, pp. 1573-1594, CellPress, Elsevier Inc., Cambridge, MA, US.

C. Liu et al., "A life cycle assessment of greenhouse gas emissions from direct air capture and Fischer-Tropsch fuel production", Sustainable Energy & Fuels, Apr. 15, 2020, 14 pages, The Royal Society of Chemistry, Cambridge, United Kingdom.

S. Ghosh et al., "Mission Zero Technologies: Phase 1 Final Report" Project Drive d4.8, BEIS Greenhouse Gas Removal Competition, Jan. 2022, 38 pages, <https://assets.publishing.service.gov.uk/media/6281f1e4e90e071f61322114/mission-zero-technologies-d4.8-project-phase-1-report.pdf>.

Yuichi Miyabe, Office Action, issued by JP Patent Office, JP App. 2022-576526, 3 pages, issued Mar. 11, 2025.

Communication with Extended European Search Report from European Patent Office, EP Application No. 23812651.0 mailed Aug. 19, 2025, 10 pages.

\* cited by examiner

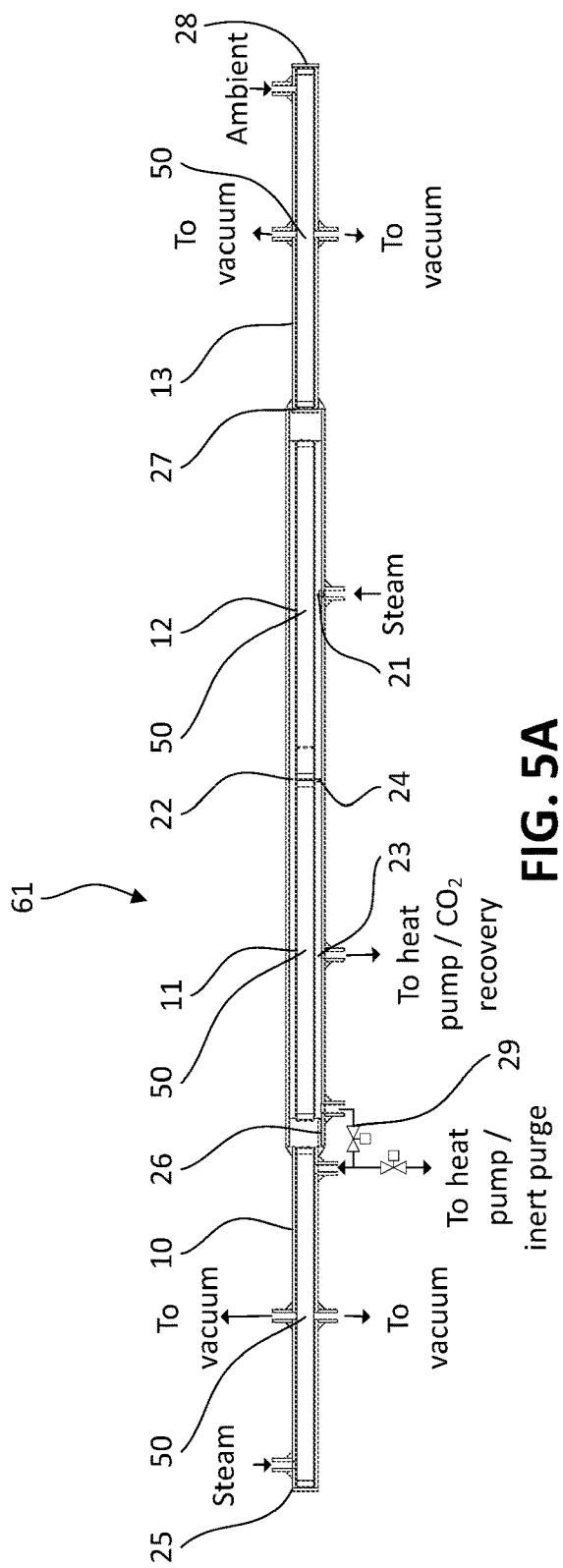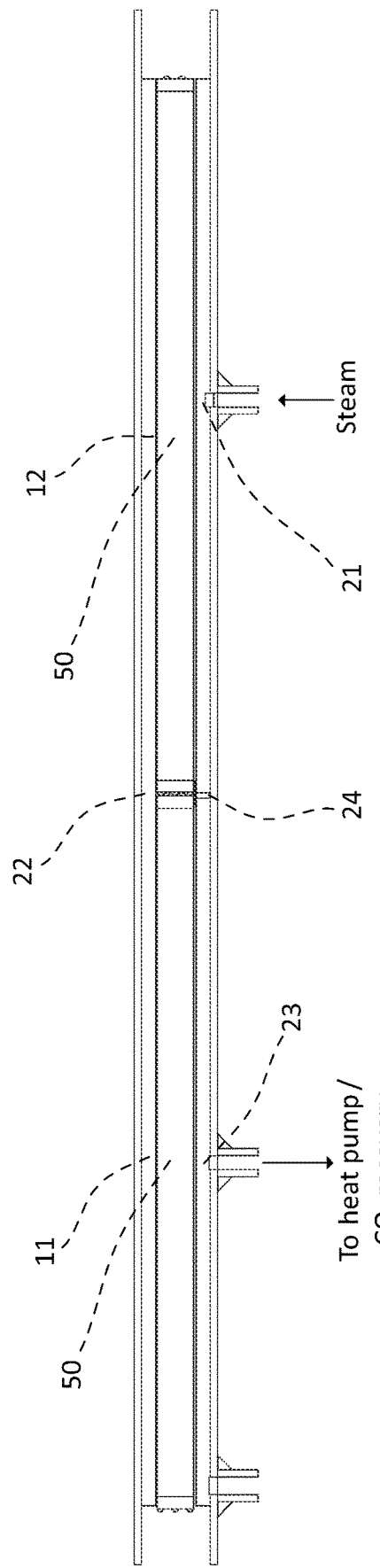
FIG. 5A
FIG. 5B

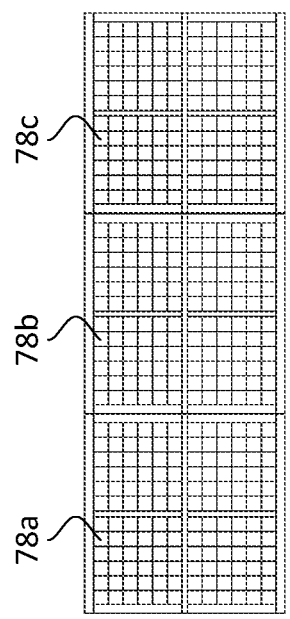
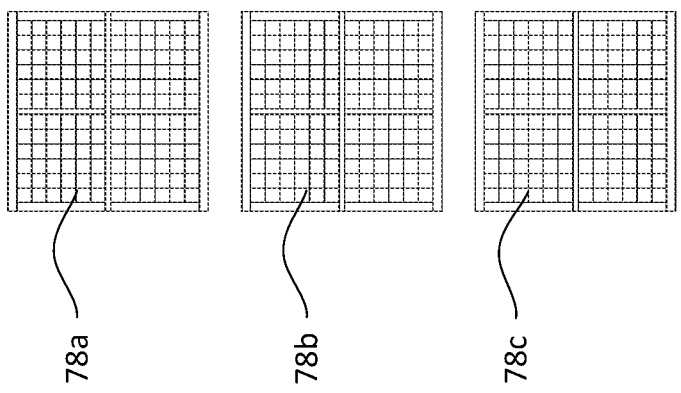
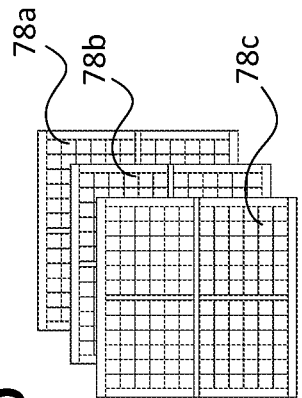
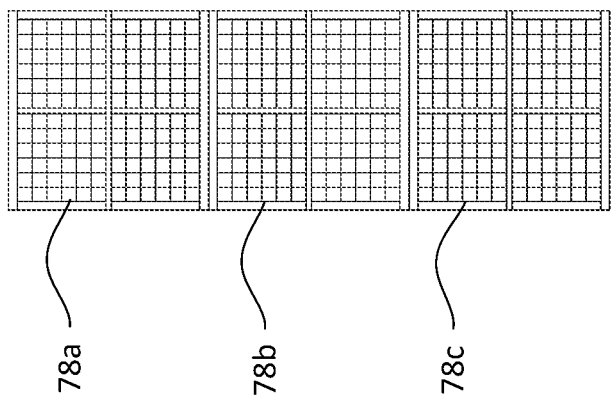

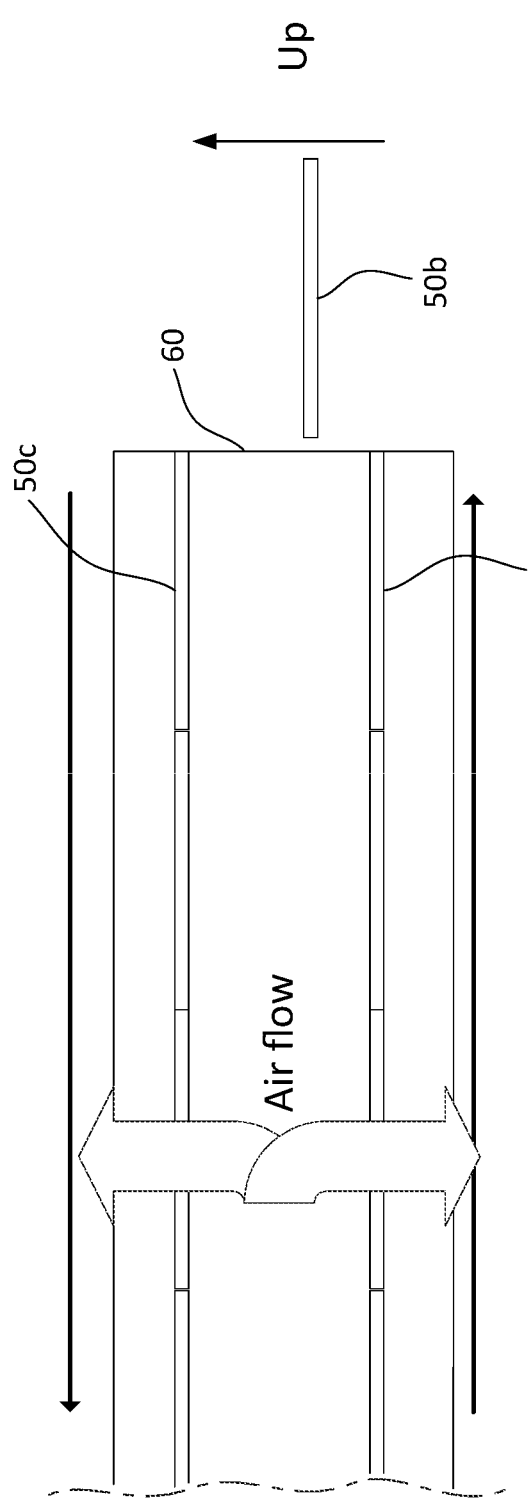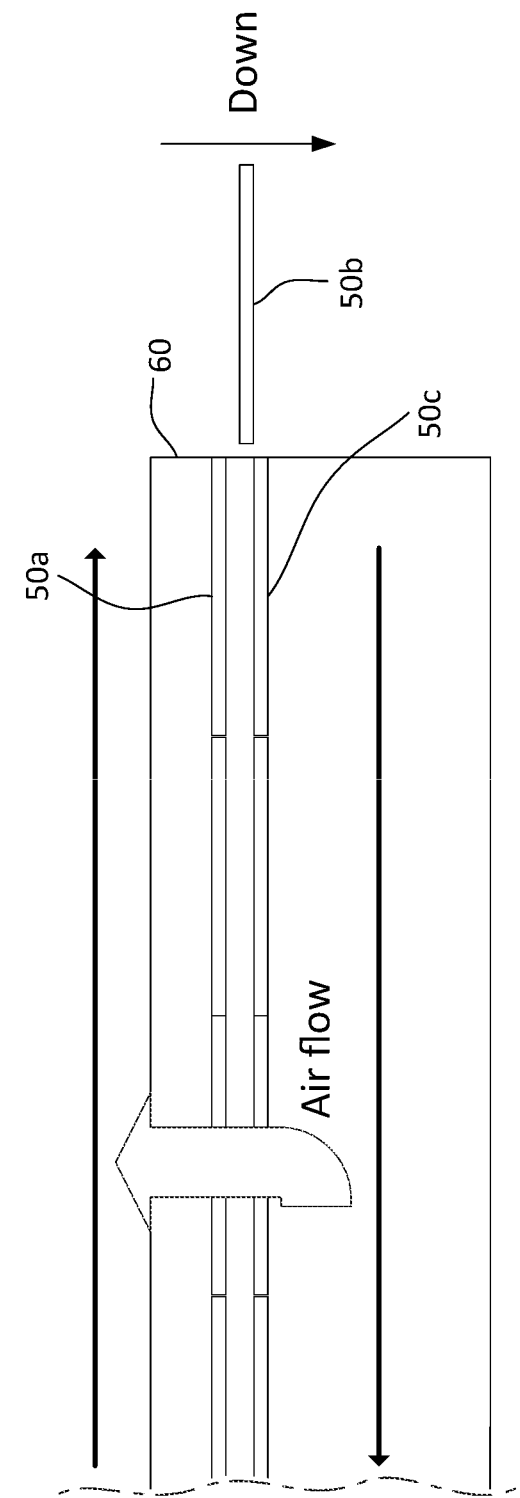

FIG. 25A

| Col 1 | Col 2 | Col 3 | Col 4 |
|---|---|---|---|
|  | ↑ then → | → then ← or → | → then ↓ |
|  | Steam ↑ (11) | Vac cool ↓ | Vac cool ↓ (13) |
|  | CO₂ pre ↑ (14) | Wait ↓ | Wait ↓ |
| ↑ then → (10) | ↓ or ↑ then ↑ | Ads ↓ | Ads ↓ |
| O₂ Purge ↑ | O₂ Purge ↑ | Ads ↓ | Ads ↓ |
| Wait ↑ | Wait ↑ | Ads ↓ | Ads ↓ |
| Ads ↑ | Ads ↑ | Ads ↓ | Ads ↓ |
| Ads ↑ (54a) | Ads ↑ | Ads ↓ | Ads ↓ (54b) |
| Ads ↑ | Ads ↑ | Ads ↓ | Ads ↓ |
| Ads ↑ | Ads ↑ | Ads ↓ | Ads ↓ |

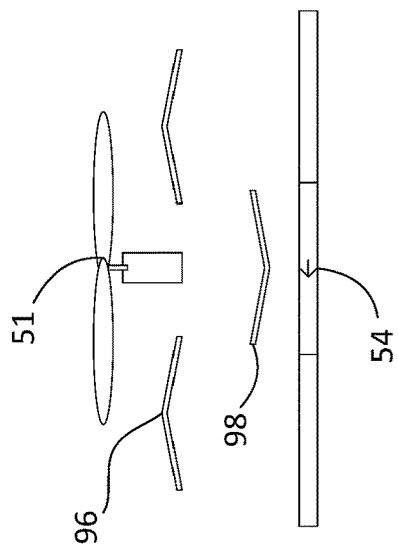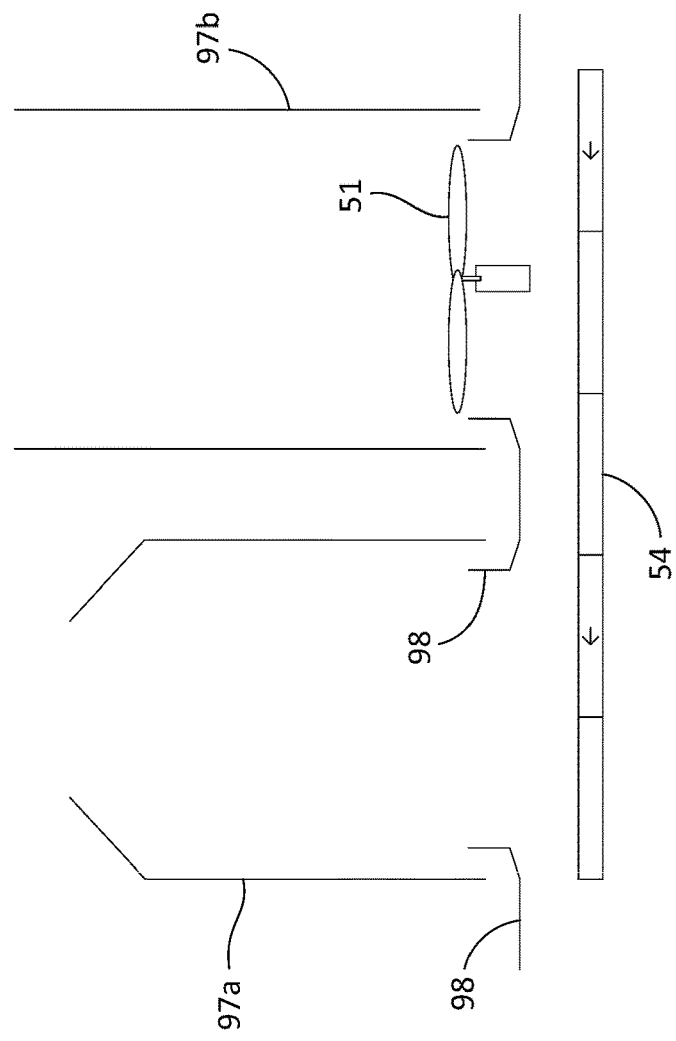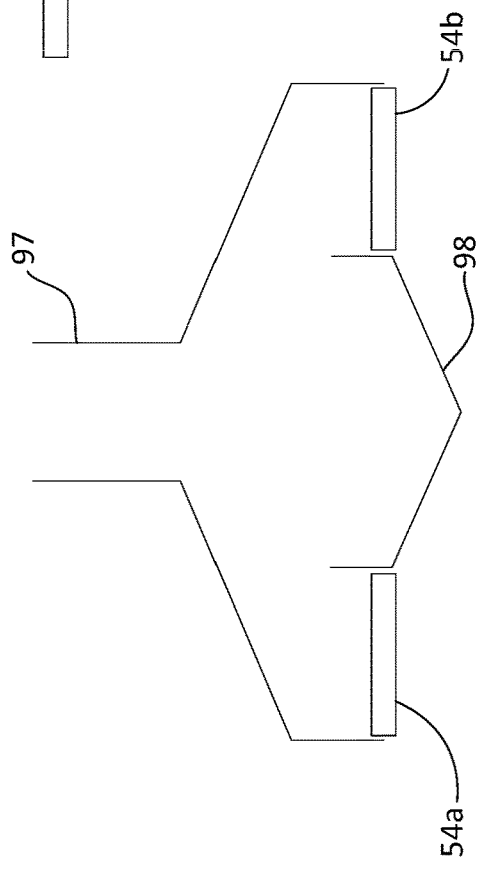

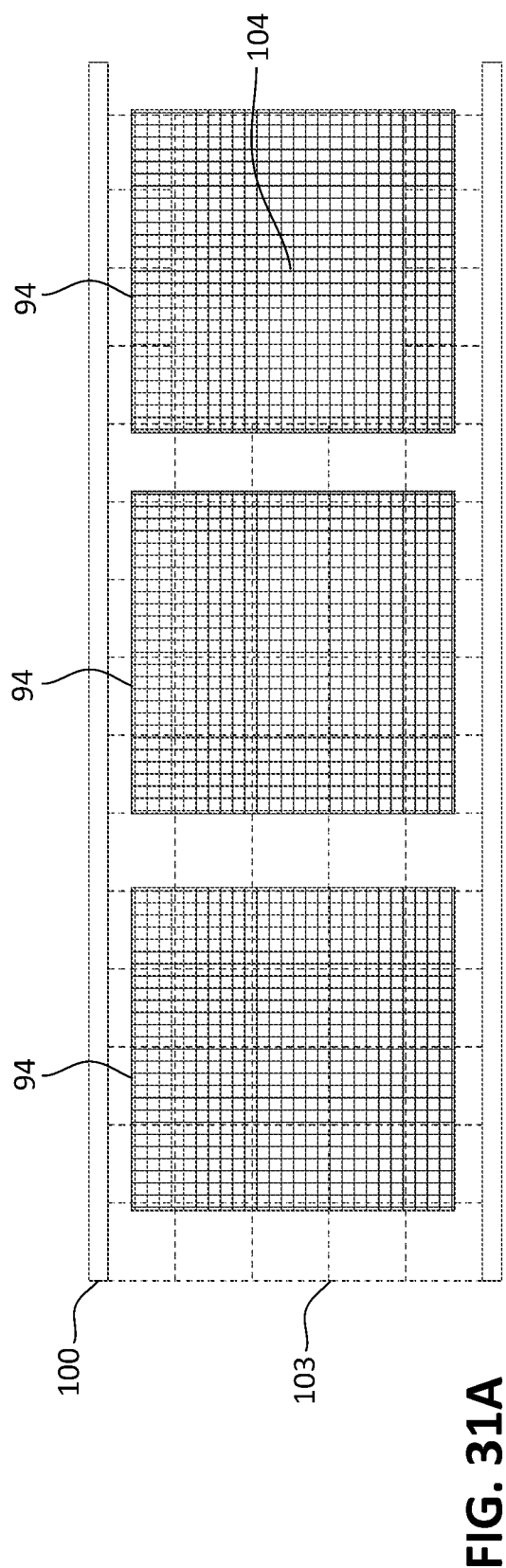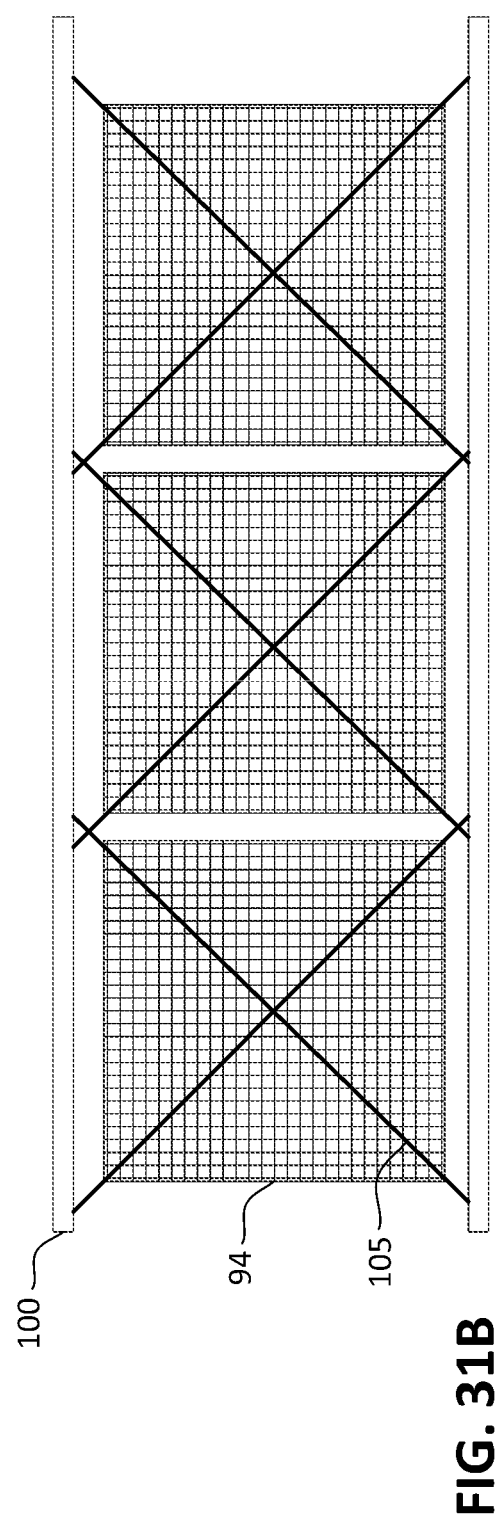
FIG. 31A
FIG. 31B

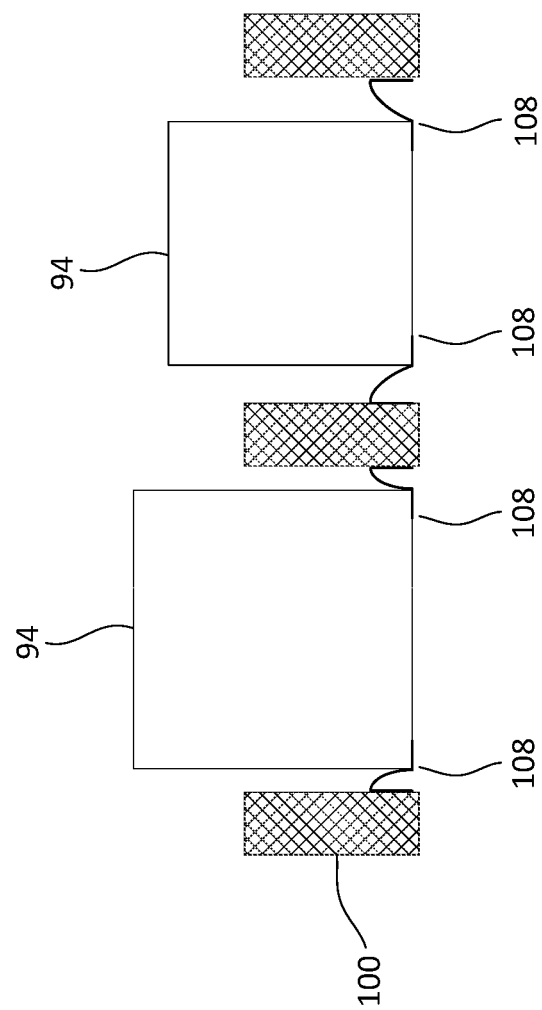

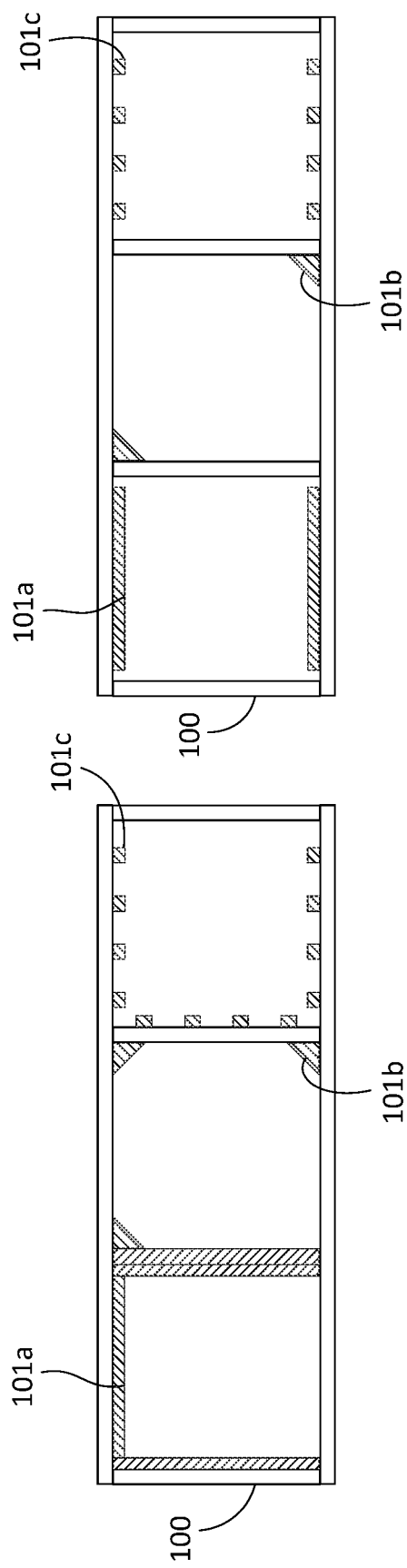
FIG. 35A
FIG. 35B
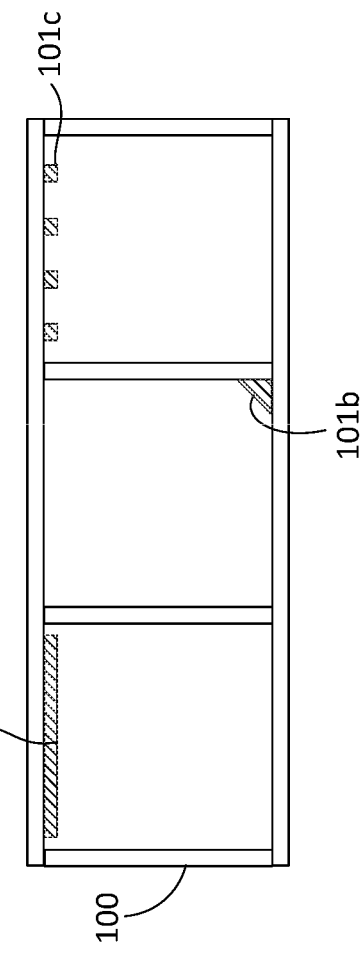
FIG. 35C

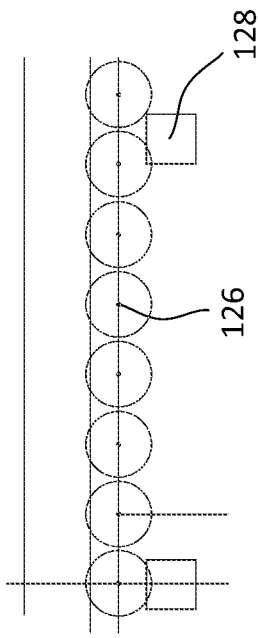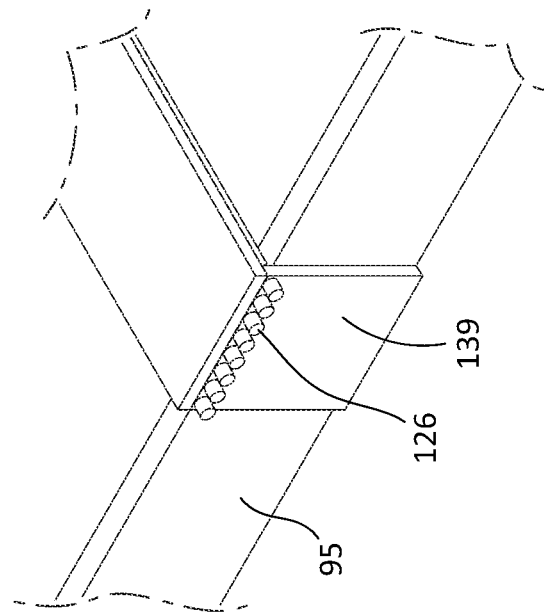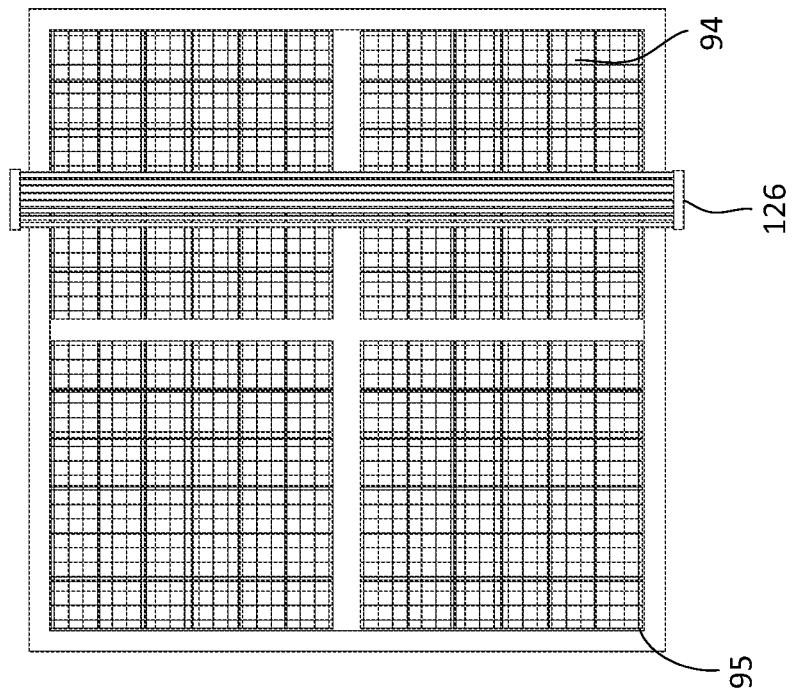

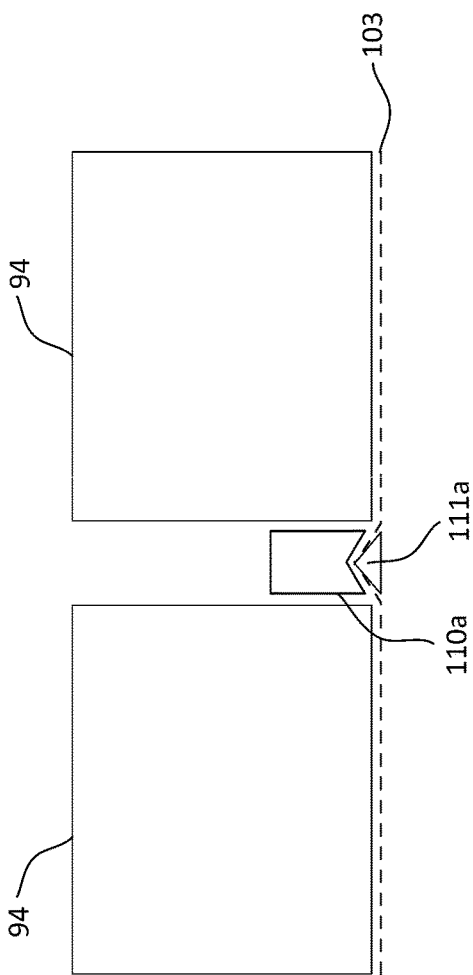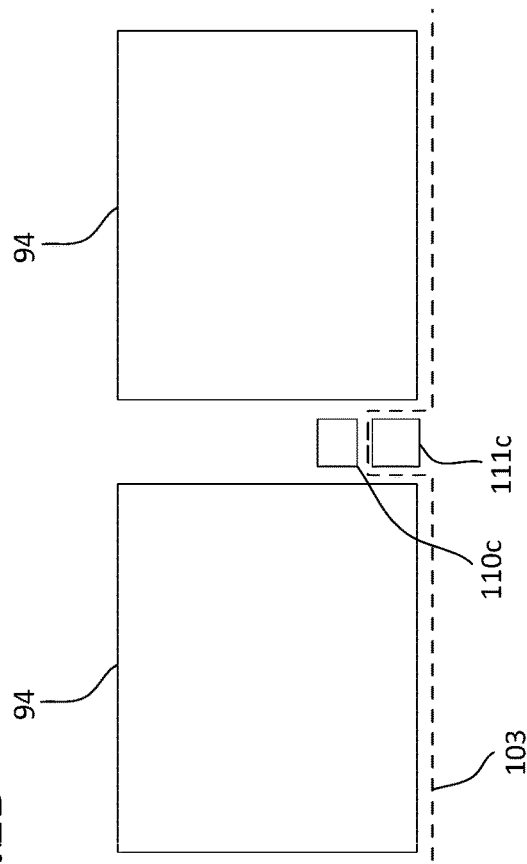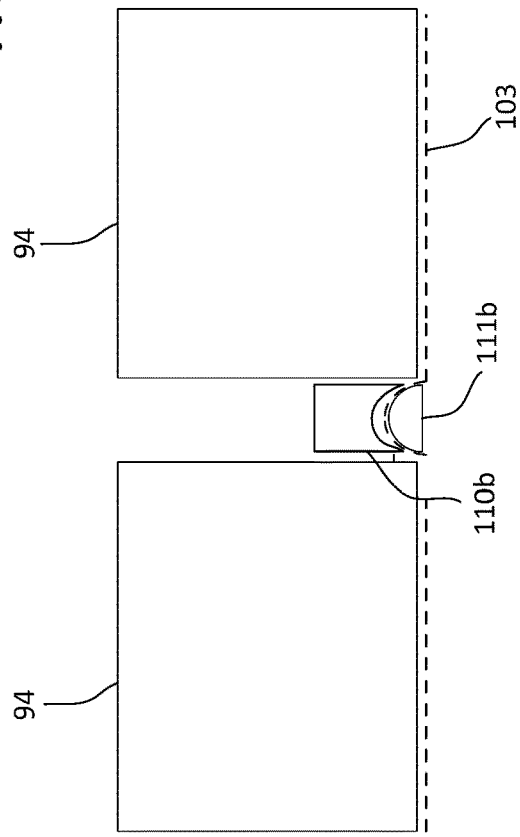

HIGH THROUGHPUT MOVING PANEL DIRECT AIR CAPTURE SYSTEM

CROSS REFERENCE TO RELATED APPLICATION

The present application is a continuation application which claims priority to U.S. patent application Ser. No. 18/558,696, filed on Nov. 2, 2023, which is a national stage application filed under 35 U.S.C. § 371 of International Application No. PCT/US2023/023747 filed on May 26, 2023, which claims priority to U.S. Patent Application No. 63/346,384 filed on May 27, 2022, U.S. Patent Application No. 63/425,210 filed on Nov. 14, 2022, and U.S. Patent Application No. 63/456,600 filed on Apr. 3, 2023, all of which are incorporated herein by reference in their entireties.

FIELD

The subject matter described herein relates to systems and methods for direct air capture.

BACKGROUND

Direct air capture (DAC), a method of capturing $CO_2$ directly from the atmosphere, is one of several means of mitigating anthropogenic greenhouse gas emissions. DAC is advantageous in that it can address the emissions of distributed sources (e.g., cars, planes), rather than being attached to a specific emission source, such as a specific plant.

A primary challenge for DAC is low cost, high efficiency air contact. Challenges with current DAC processes include providing a system having the ability to process enormous volumetric flowrates of carbon dioxide-laden air, as well a means for providing the energy for regeneration at acceptable cost.

Older DAC systems relied on the mechanical movement of connected adsorber panels (in a "train") in a discontinuous process, around an oval track, and into a single-zone regeneration chamber along that same track. This required (i) the need to move a substantial amount of mass (discontinuously), (ii) a relatively complex movement system, and (iii) a regeneration box with only a single zone within which to perform a wide range of desorption functions across an extended period. A need exists for delivering a DAC system with sufficient simplification of design to allow for the capture of carbon dioxide on a reliable and repeatable basis, as well as one that is both highly cost effective, and scalable. Furthermore, a need exists for a system that minimizes risk associated with the mechanical movement of the panels, and also improves the process continuity and efficiency of regeneration of said adsorber panels.

BRIEF DESCRIPTION OF FIGURES

FIGS. 5A-5B are exemplary diagrams of a regeneration box with multiple zones.

FIGS. 17B-17E illustrate exemplary embodiments of panels.

FIGS. 20A-20B illustrates a side view of possible configurations for a dual layer adsorption system with horizontally oriented panels.

FIGS. 25A-25C illustrate further exemplary configurations of the interaction between horizontal panels' adsorption and desorption systems.

FIGS. 29A-29C illustrate exemplary ways by which precipitation could be diverted away from panels in a horizontal orientation.

FIGS. 31A-31B illustrate exemplary ways by which adsorber arrays may be supported in a horizontally oriented frame with meshes and wires.

FIG. 34 illustrates an exemplary way by which adsorber arrays may be supported in a horizontally oriented frame with spring clips as edge supports.

FIGS. 35A-35C illustrate exemplary ways by which adsorber arrays may be supported in a horizontally oriented frame with edge supports.

FIGS. 37A, 37B-1-37B-3, and 37C-1-37C-2 illustrate exemplary seals for use between the panel frame and the chamber.

FIGS. 42A-42E illustrate side views of exemplary mesh support systems.

SUMMARY

Figure 1:
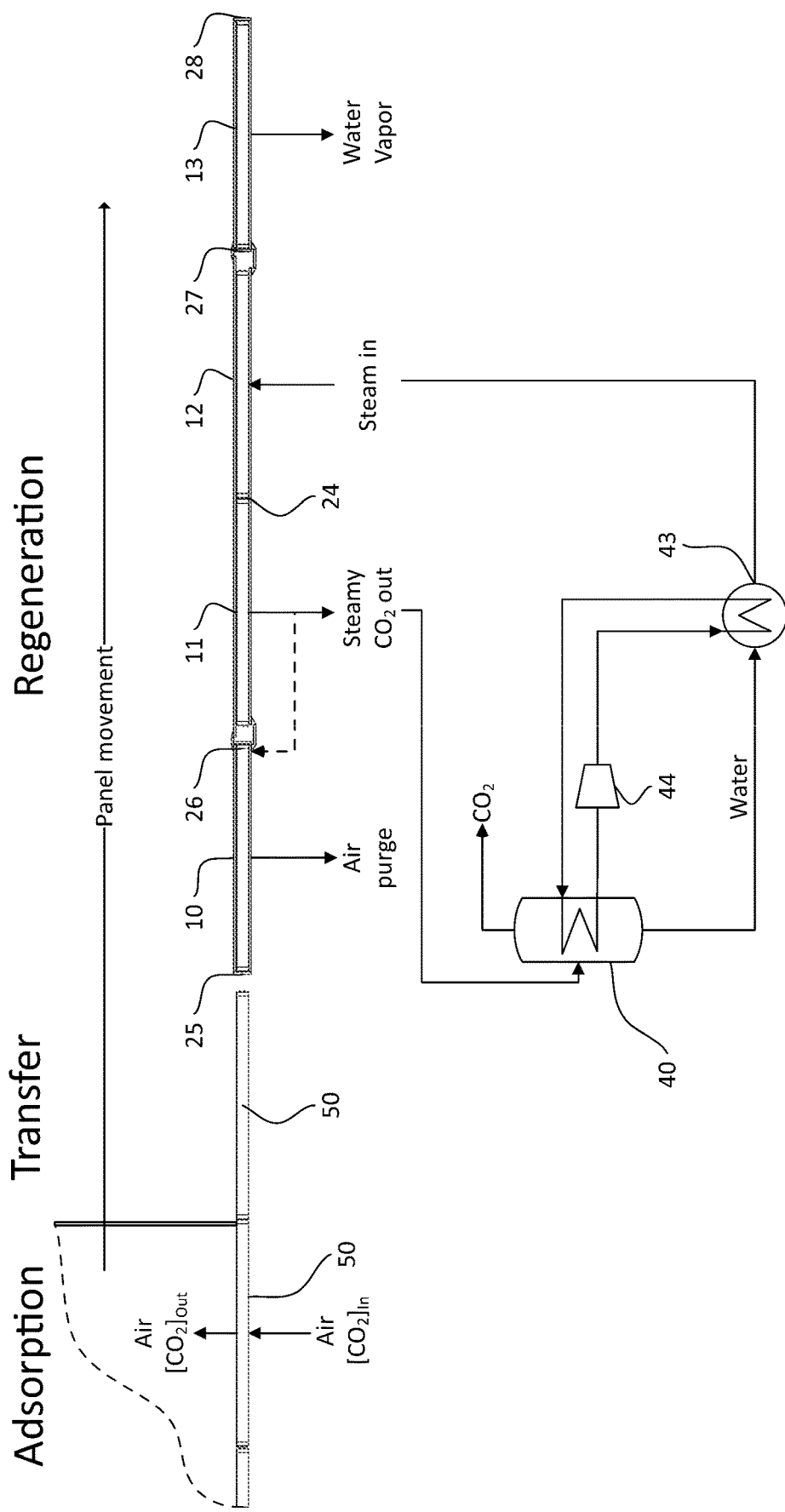
FIG. 1 is a diagram of an exemplary adsorption/desorption and heat recovery cycle.

A primary object of the present invention is to provide a simplified and scalable direct air capture (DAC) system that will capture $CO_2$ from the air or gases and will produce a >95% purity $CO_2$ product. The system of the present invention will result in decreased costs of DAC.

In many embodiments, an advanced DAC process designed to reduce the cost of captured $CO_2$ from the air and gases containing carbon dioxide, as well as the energy burden associated with the capture process, is described. This process includes the simplified, continuous movement of individual adsorber panels (each panel having multiple adsorber units, which may be monoliths, or alternative configurations) within the air flow, in a single plane, or alternatively in more than one plane, as compared to one or more earlier-generation processes that require substantial complexity of movement of connected adsorber panels, in a discontinuous manner, around an oval configuration. It is contemplated that the use, within the air flow (and, in certain embodiments, within the regeneration area as well), of continuously moving individual adsorber panels, substantially eliminates the relative complexity required for starting and stopping connected panels—thus eliminating the need for moving substantial masses with significant inertia and significantly reducing the overall mechanical and process risk of the plant. Moreover, the reduced complexity of mechanical movement of the adsorber panels allows for greater flexibility in the configuration and overall volume of the substrate and sorbent, significantly driving up throughput of the system. These advantages will lead to greater plant reliability, improved scalability, and lower capital expense per unit of throughput. In the following description, the phrases "continuously moving" or "continuous movement" may refer to one or more panels moving at a substantially constant velocity.

In many embodiments, a movement system to capture carbon dioxide is also described. Thus, practice of the process or method described herein may be carried out by one or more types of apparatus and shall be considered as coming within the scope of the present invention. The use of the term "process" in this context is meant to include or be synonymous with the term "method."

The system and process utilize a simplified movement of individual adsorber panels, whereby in place of the mechanical movement of connected adsorber panels, in a discontinuous manner, around an oval, such panels are moved within the air flow individually, on a continuous basis, across a single plane (or alternatively in more than one plane) for purposes of carrying out the process and capturing the carbon dioxide.

In addition, this process separates out the panel movement required for the carbon capture phase from the panel movement required for the regeneration phase, providing much greater flexibility to optimize the size of the regeneration box, and zones within that box (without in any way impacting the critical carbon capture step within the air flow). This allows the current design and process to utilize a regeneration box with multiple individual zones for conducting the various steps required for desorption of the carbon dioxide, as compared to one or more earlier-generation processes that used a regeneration box with only a single, multi-function zone to conduct the entire desorption process. It is contemplated that the use of multiple zones for the different steps of the regeneration process confers a number of benefits, including (i) ability to have each zone more efficiently dedicated to a specific function (removing air, preheating, desorbing the $CO_2$, cooling of the adsorber), and (ii) greater continuity of gas flows. In addition, by regenerating multiple panels at one time, this boosts capacity as compared to a single panel, single zone regeneration box system. These advantages will lead to lower energy needs, improved scalability, and lower operating and capital expense per unit of throughput.

DETAILED DESCRIPTION

Adsorption/Desorption Cycle

As seen in FIG. 1, an air stream (e.g., ambient air) containing a dilute concentration of $CO_2$ ($[CO_2]_{in}$) may be adsorbed onto a solid sorbent, such that the concentration of $CO_2$ in the air stream after adsorption ($[CO_2]_{out}$) is lower ($[CO_2]_{in}>[CO_2]_{out}$).

The $CO_2$ may then be desorbed from the sorbent contained in a solid sorbent support structure, such as a monolith or other form of adsorber unit (with several such adsorber units arrayed together in a panel), and the $CO_2$ may be extracted. Desorption of $CO_2$ may be performed by a temperature swing delivered, for example, by condensation of steam directly onto the panel; or by the reduction of $CO_2$ partial pressure in the desorption chamber, for example by flooding the desorption chamber with another gas, such as steam, or by pulling vacuum on the desorption chamber; or by a combination of these measures. Alternatively, the temperature swing may be delivered by indirect heating. Steps may be performed before and after this to maintain sorbent lifetime and achieve high $CO_2$ purity. FIG. 1 includes a flow diagram of an exemplary regeneration cycle. An arrow indicates relative movement of the panels through the system. For convenience, the system will be described as a series of steps with the panel moved from one zone to the next in a stepped manner, but it can readily be seen that the descriptions can be applied to a continuously moving system.

In regeneration, the panel moves through a number of zones, where it encounters different conditions. In the example shown in FIG. 1, a panel [50] enters a first chamber in zone [10], that can be isolated by closing doors [25] and [26] at either end of the chamber. The $O_2$ concentration of the surrounding void space may then be reduced by pulling a deep vacuum down to about 0.025-0.4 bara, or alternatively about 0.05-0.2 bara in the first chamber; or by introducing steam, nitrogen or another inert gas to displace the remaining volume of air; or by a combination of both. In an optional step, steam may be introduced into the first chamber in zone [10] while maintaining vacuum to displace any remaining air or other inert gas. One advantage of introducing atmospheric steam into the vacuum environment is that the steam will be superheated under the vacuum conditions, and so can displace a portion of the air before condensing. Even if some of the steam does condense, the temperature at which the steam can condense limits the extent to which the panel can heat up due to the vacuum environment, minimizing the unwanted release of $CO_2$ during this step.

In another embodiment, the chamber [10] may be flushed with an inert gas, such as $N_2$, to fully or partially displace the air before the application of vacuum or the use of steam.

In a subsequent step, the vacuum may be released from the first chamber in zone [10] by introducing a gas. This gas may be fresh steam, steam combined with $CO_2$ from an alternative zone [11], or an alternative gas such as $CO_2$ or nitrogen. The temperature may be raised by the condensation of steam to a temperature of between about 70 and about 115° C., alternatively between about 70° C. and about 105° C. alternatively between about 80 and about 105° C., alternatively between about 90° C. and about 103° C., alternatively between about 95 and about 100° C. When the pressure of the first chamber approaches atmospheric pressure, the door [26] to the adjacent zone can be opened and the panel [50] may be moved into a first steaming zone [11].

In zone [11], gas may be flowed through the panel [50], completing the heating phase and causing the $CO_2$ to desorb. This desorption may be by steam, a mixture of steam and $CO_2$ from an alternative zone, or with some other gas. In the example depicted in FIG. 1, a mixture of $CO_2$ and steam from zone [12] is used to heat the panel to a temperature of between about 70° C. and about 125° C., alternatively between about 80° C. and about 115° C. alternatively between about 80 and about 105° C., alternatively between about 90° C. and about 103° C., alternatively between about 95 and about 100° C. The steamy $CO_2$ may be recovered, and the water vapor condensed to boil a refrigerant in a heat pump cycle. The steamy $CO_2$ may contain between about 2 to 70 vol % $CO_2$, alternatively between about 10 to 40 vol % $CO_2$.

After a given period, the panel [50] may then move to the next zone—a second steaming zone [12] as illustrated in the example shown in FIG. 1. In the second steaming zone [12], the panel [50] is kept hot to promote $CO_2$ desorption, for example by introducing fresh steam into a plenum that promotes a uniform flow profile through the panel. As illustrated in FIG. 1, the steam and desorbed $CO_2$ leaving zone [12] may be allowed to flow upstream with respect to the panels' motion and flow back through the panel in zone [11]. The advantage of this counter-current flow profile is that the adsorber panel in zone [12] experiences a lower partial pressure of $CO_2$ than the panel in zone [11], promoting the desorption of $CO_2$ from the panel in zone [12].

The steam and desorbed $CO_2$ leaving zone [11] may be allowed to flow upstream with respect to the panels' motion and flow back into zone [10] through block valve [29] (see FIGS. 5A-5B). The advantage of applying steamy $CO_2$ from zone [11] to the chamber in zone [10] is that the majority of panel heating will be performed with steam that has already been used to desorb panels further along the train, thus reducing the overall steam use of the regeneration. In addition to this, the $CO_2$ content will allow the system to reach ambient pressure at a lower temperature (as compared to using fresh steam), allowing the transfer door to be opened sooner in the cycle. Although some additional $CO_2$ may adsorb onto the panel [50] as the $CO_2$ partial pressure increases, that $CO_2$ will be released again in zones [11] and [12].

The ratio of $CO_2$ adsorbed into a panel and the concentration of $CO_2$ in the gas phase will typically equilibrate over time to a consistent value that is influenced by factors that include the amount of adsorbent in the panel and the temperature of the system. A set of adsorption isotherms can be derived that represents a set of curves that relates the amount of $CO_2$ per mass of sorbent to the concentration of $CO_2$ in the vapor phase at a given temperature. Typically, as the temperature increases and the vapor concentration of $CO_2$ decreases, the equilibrium loading of $CO_2$ on the panel decreases.

When one moves away from equilibrium conditions, for example by heating the panel and reducing the vapor-phase $CO_2$ concentration by flowing steam through a loaded panel, a "driving force" is set up. This driving force represents how far the system is from equilibrium, and may be expressed as the difference between the current $CO_2$ concentration in the gas phase and the $CO_2$ concentration in the gas phase that would be in equilibrium with the current loading of $CO_2$ on the panel at the current system temperature. The rate at which $CO_2$ moves from one phase (e.g., adsorbed) to the other (e.g., vapor) is typically proportional to this driving force.

If a loaded panel is desorbed in a simple batch process—a single chamber where steam is supplied and a mixture of steam and desorbed $CO_2$ is removed—then at the start of the desorption process, there will be a high driving force. The adsorbed $CO_2$ concentration is high and the vapor phase is relatively low in $CO_2$. In this case, flowing the steam more quickly will increase the driving force because the additional steam dilutes the desorbing $CO_2$, and flowing the steam more slowly will reduce the driving force. As time progresses, assuming a consistent flowrate of steam into the chamber, the driving force will diminish—as $CO_2$ desorbs, the concentration of adsorbed $CO_2$ will continue to drop. Thus, to approach full desorption, the steam must continue to flow for a long enough period for the vapor phase concentration of $CO_2$ to become quite low.

Figure 6A:
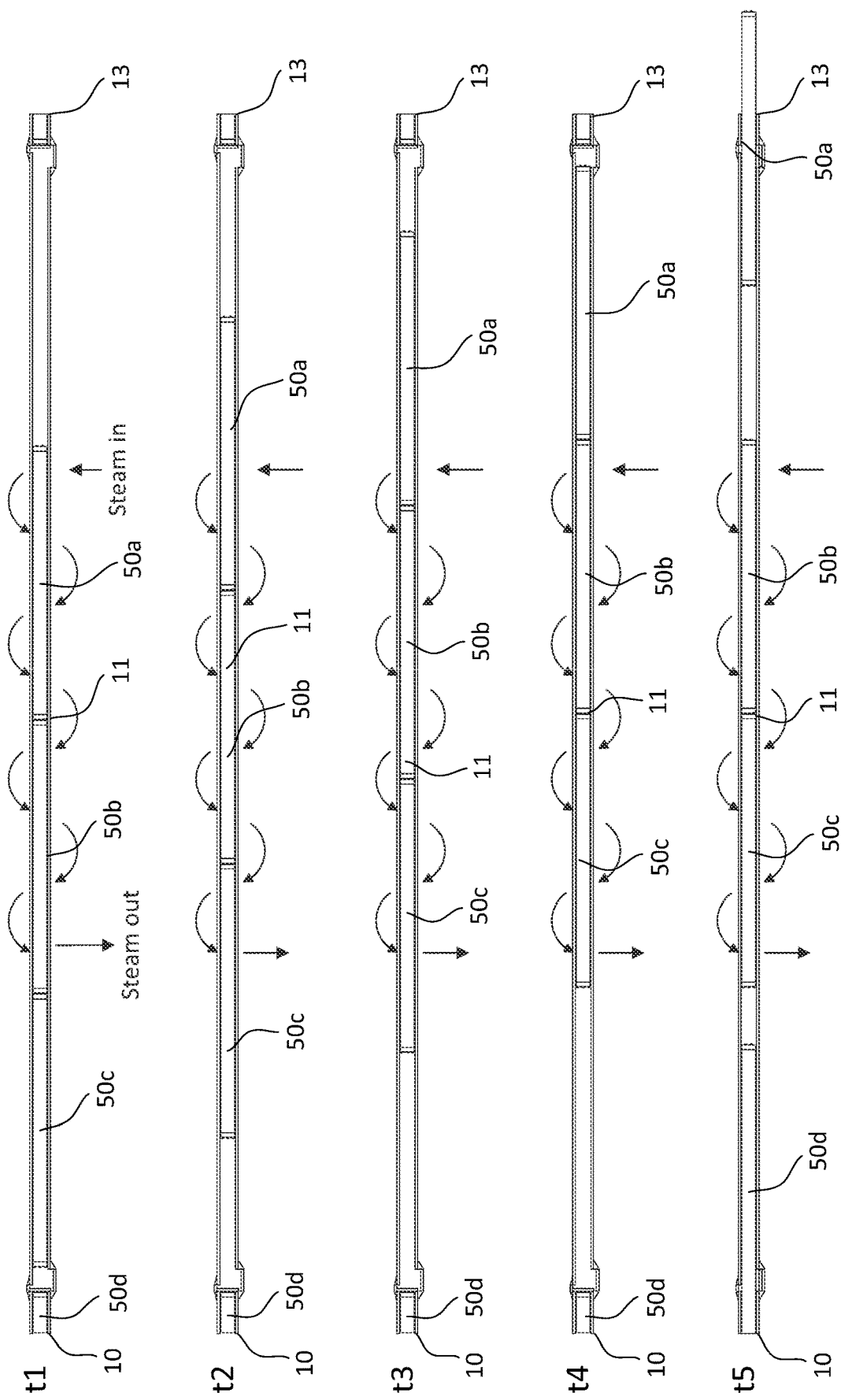
FIGS. 6A-6B are exemplary illustrations of a continuous steaming section contained within an alternative regen box design.
Figure 9:
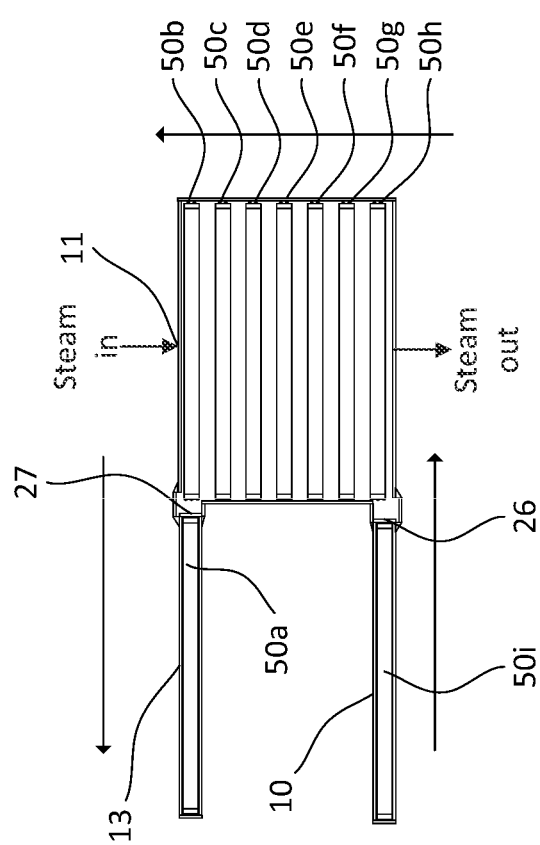
FIG. 9 illustrates an alternative continuous steaming regeneration design.

Counter-current flow of steam through a panel or plurality of panels may be characterized as a system where the freshest steam flows through the most desorbed panel/panel section (with the lower amount of adsorbed $CO_2$) before the flow of steam contacts the less desorbed parts of the panel. One key advantage of this system described here is that counter-current flow may be achieved, for example by having multiple panels stepping through steam as shown in FIG. 9 or by having the steam pass back-and-forth through the panel(s) as shown in FIG. 6A. Counter-current flow is desirable in this process because it provides a method of "reusing" steam that has already contacted the panel and desorbed some $CO_2$ while maintaining a good driving force for $CO_2$ desorption.

To consider a simple example of two panels (first and second panels) in counter-current flow. The first, fully loaded panel in a first position closest to a steam inlet is contacted with fresh steam that has not yet contacted a panel. The second panel is contacted after the first panel with steam that has already been through the first panel—that vapor coming into contact with the second panel therefore has a small concentration of $CO_2$ in it, so the driving force to desorb steam from that second panel is slightly diminished. However, if the incoming steam for the second panel is at 1% $CO_2$ and the equilibrium is at 10% $CO_2$, that loss of driving force is relatively small (10−1=9 instead of 10−0=10), and the "used" steam will still be able to desorb $CO_2$ from the second panel. When that second panel moves into the first position closest to a steam inlet, it will already be partially unloaded. In the first position, the panel will now be exposed to fresh steam—the panel in the first position will experience a similar time profile to the equivalent panel in a simple batch desorption, but because the panel is starting in a partially unloaded state, it will reach a given level of desorption sooner (and having seen less fresh steam) than the equivalent simple batch panel. Thus, overall, counter-current flow will allow the panels to reach an equivalent level of desorption while using less steam (or more fully desorb the panel with the same amount of steam).

While this simple example considers only two panels, one can readily understand how the general principles may be extended to systems with more counter-current stages. An advantage that the invention described here embodies is a series of methods by which this counter-current flow can be achieved, thus allowing for a more efficient use of steam and/or more effective desorption of $CO_2$ from the adsorber panel. In some embodiments, this counter-current flow may be applied to any other desorption steps described herein, including, but not limited to, the displacement of air with an inert gas or the cooling/drying of a desorbed panel.

Upon completion of the final steam cycle in zone [12], the door [27] to the adjacent chamber in downstream zone [13] opens, and the panel [50] moves on to the next step in the regeneration cycle. In zone [13], the panel [50] may be dried and/or cooled by evaporation of condensed water on the surface of the panels. This drying and/or cooling may be achieved by reducing the partial pressure of water in the chamber in zone [13], for example by introducing an inert gas such as nitrogen or by pulling a vacuum. The target partial pressure of water in zone [13] may be between about 0.02 and about 0.4 bara; alternatively, between about 0.05 and about 0.2 bara; alternatively, between about 0.08 and about 0.12 bara.

The phrase "cooling" the panels, as discussed at length below with reference to the "cooling section" or "cooling zone" [13], may represent drying and/or cooling of the panels. As such, the term "cooling zone" [13] may refer to a drying/cooling zone which may provide drying and/or cooling of the panels.

FIG. 1 illustrates a 4-zone regeneration box, but it is clear that additional zones could be added. For example, the preliminary purge zone [10] may include one or more chambers, to further reduce the risk of air ingress to the hot zone, to reduce the risk of $CO_2$ loss when the next panel is introduced, and/or to increase the number of panels to complete the air purge/preheating step in a given time. Further, additional zones could be added to the central steam section (between zone [11] and the final cooling zone [13]) to further expand counter-current steam flow in that section. In addition, steam flow may move through several "sub-zones" within a given panel, in series, to provide yet another level of counter-current steam flow. Lastly, the final, cooling section, zone [13], could be divided into two or more chambers to better isolate the hot panel (which is coming from the desorption section) from the ambient air (to reduce risk of sorbent deactivation), and/or to increase the number of panels cooled in a given time.

Figure 10:
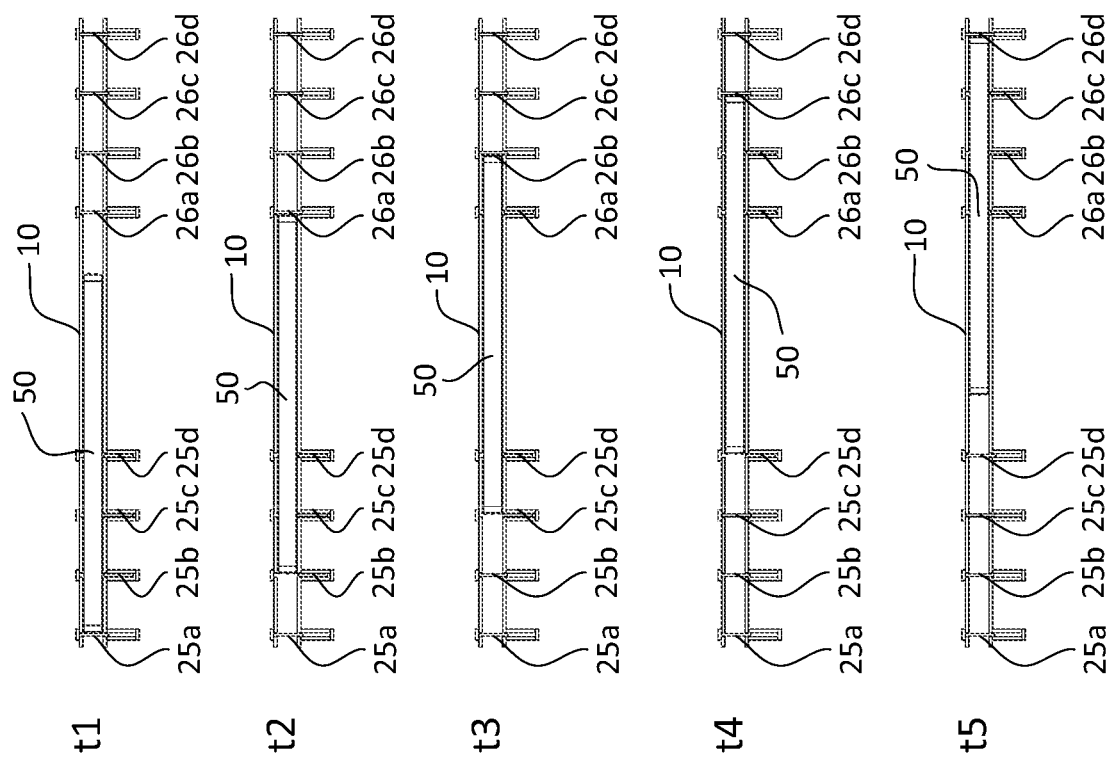
FIG. 10 illustrates a possible configuration of doors to achieve continuous panel movement within the vacuum system.

In another embodiment, the incoming [10] or outgoing [13] zones could approach continuous operation through the use of multiple doors. These doors could be placed closer together than one panel length apart to reduce the overall size of the unit. One possible embodiment of this approach is shown in FIG. 10 as it may be applied to the initial inert purging step. At time t1, a freshly loaded panel [50] may enter the purge zone [10] through open doors [25a-d]. Door [25a] may then close and the panel [50] may start to move forward slowly while a vacuum is pulled. The rate of panel movement and the rate of vacuum drawdown may be timed such that the panel [50] reaches door [26a] and clears door [25b] at the desired pressure (shown at time t2, e.g., after about 2 seconds from t1). Door [25b] may then close and door [26a] may open. In some embodiments, steam may be allowed to flow into the chamber formed between doors [25b] and [26b] while vacuum is maintained, eliminating the last of the oxygen. At time t3 (e.g., about 4 seconds after t1), the steam sweeping may be completed, and the chamber may be slightly pressurized. Door [25c] may then close and door [26b] may open, and the resultant chamber may start to be repressurized. At time t5 (e.g., about 8 seconds after t1), the panel [50] may be approaching the end of the purge zone [10] and be at the same pressure as the downstream steaming box in zone [11], ready to discharge the panel [50] through door [26d].

Other embodiments of this system could have more or fewer doors, and space them differently. FIG. 10 shows "knife" doors, but other styles of door could be employed. In yet other continuously moving embodiments, in lieu of doors, seals may be applied against the panel surface so that the panel moves continuously through the different zones and the seals contact different parts of the panel frame, creating tightly enclosed spaces, similar to the effect of opening and closing of doors in the alternative embodiment.

Figure 6B:
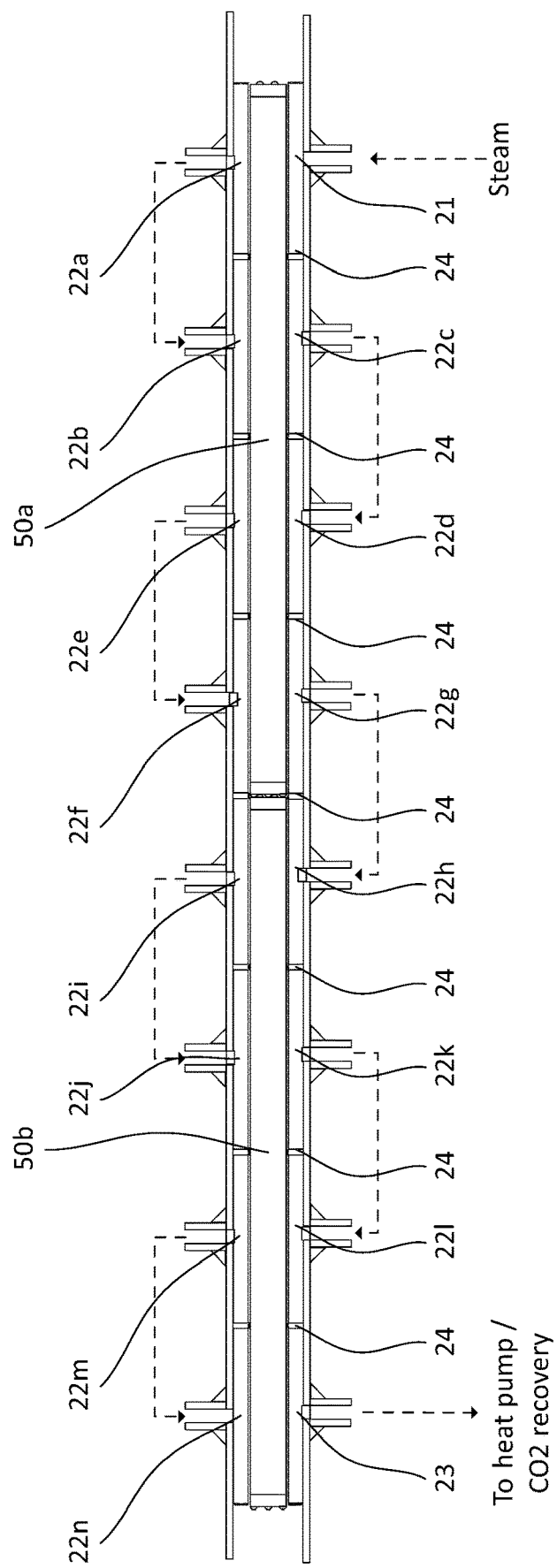

In an embodiment, as illustrated in FIG. 6A, panels in the desorption zone [11] move continuously though a steam flow that is forced to cross through the panel multiple times. FIG. 6B shows the steam flow sections at t1 in more detail. In this embodiment, as seen in FIG. 6A, at the start of the cycle, a new panel [50c] may be moved quickly out of the oxygen purge chamber (zone [10]) and into the steaming chamber (zone [11]) to align with panels already in place [50a-50b]. The three panels may then move at a constant rate through a steam flow that flows back and forth through the panels in a counter-current fashion. The pattern of steam flow may be generally serpentine or alternating to different sides of the chamber, forcing the steam and gas to circulate through each panel multiple times. For example, as seen in FIG. 6B, there may be plenums [22] set up with widths that are about ¼ the length of a panel and separated by baffles [24]. The steam may flow from back to front in the second and fourth quarters, and from front to back in the first and third quarters of the panel [50]. The three panels [50a-c] may then move smoothly through this steam flow over the course of a cycle. In this embodiment, at time t1 and with reference to FIG. 6B, the leading edge of panel [50a] may be exposed to fresh steam flowing from inlet plenum [21] to transfer plenum [22a] located on the opposite side of the chamber, the second quarter of the leading panel [50a] may be exposed to steam flowing from transfer plenum [22b] to transfer plenum [22c] located on the opposite side of the chamber and some $CO_2$ that has been collected from that leading edge and so on. Steam may then flow from transfer plenum [22c] to transfer plenum [22d] located on the same side of the chamber. Steam may then flow through the panel from transfer plenum [22d] to transfer plenum [22e] located on the opposite side of the chamber. Steam may then flow from transfer plenum [22e] to transfer plenum [22f] located on the same side of the chamber. Steam may then flow through the panel from transfer plenum [22f] to transfer plenum [22g] located on the opposite side of the chamber. Steam may then flow from transfer plenum [22g] to transfer plenum [22h] located on the same side of the chamber. Steam may then flow through the panel from transfer plenum [22h] to transfer plenum [22i] located on the opposite side of the chamber. Steam may then flow from transfer plenum [22i] to transfer plenum [22j] located on the same side of the chamber. Steam may then flow through the panel from transfer plenum [22j] to transfer plenum [22k] located on the opposite side of the chamber. Steam may then flow from transfer plenum [22k] to transfer plenum [22l] located on the same side of the chamber. Steam may then flow through the panel from transfer plenum [22l] to transfer plenum [22m] located on the opposite side of the chamber. Steam may then flow from transfer plenum [22m] to transfer plenum [22n] located on the same side of the chamber. At the end of the train of panels, the trailing quarter of panel [50b] is exposed to steam and gas flowing from transfer plenum [22n] to the exhaust plenum [23]. This steam and gas has made seven passes through the panel already (moving from [21] though [22a-m] before reaching [22n]) and has therefore collected a substantial amount of $CO_2$. At time t3 in FIG. 6A, half of the leading panel [50a] may have moved out of the steam flow, and the third quarter of the leading panel [50a] may be exposed to fresh steam. At t4, panel [50a] has moved completely out of the active steam flow and the middle panel [50b] has its leading quarter in fresh steam flow. The cycle is complete in terms of steaming the leading panel [50a], leaving the remaining time for panel [50a] to move forward into the cooling chamber and the next panel [50d] to move into place to restart the cycle. One advantage of this form of continuously moving panels is that the flow of steam and $CO_2$ are closer to continuous as compared to a batch or stepped approach, and that all sections of the panels experience very similar time/temperature/$CO_2$ concentration profiles. Another attractive feature is that multiple stages of counter-current steam flow can be achieved with a modest number of panels held in the steaming zone. Although eight passes of the steam and gas through the plurality of panels was described with respect to FIGS. 6A-6B, the system may alternatively have a plenum system in which the gas is passed through a subset of panels at least about 3 times, alternatively at least about 4 times, alternatively at least about 5 times, alternatively at least about 6 times, alternatively at least about 7 times, alternatively at least about 8 times, alternatively at least about 9 times, alternatively at least about 10 times, alternatively at least about 11 times, alternatively at least about 12 times. In some embodiments, the system may alternatively have a plenum system in which the gas is passed through a single panel at least about 2 times, alternatively at least about 3 times, alternatively at least about 4 times, alternatively at least about 5 times, alternatively at least about 6 times, alternatively at least about 7 times, alternatively at least about 8 times.

In an alternative embodiment of the serpentine flow of steam through the panel, the steam may be ducted around the panel so that the steam always approaches the same face of the panel. Rather than entering back and forth (from one face, to the other), therefore, the steam may consistently move in a "corkscrew" fashion, from the top face to the bottom face or from the bottom to the top (if the panel were in a horizontal orientation); or it could consistently move right to left (or always left to right) in a vertical orientation. Maintaining the direction of gas flow through the panel may improve the performance of the system, especially as the rate of panel movement increases and the flow of gas decreases.

In another alternative embodiment with a consistent flow direction of the gas relative to the panel, this continuous steam flow could be achieved by changing the direction of movement in the steaming zone, as shown in FIG. 9. In this embodiment, panels enter zone [10] at the bottom of the diagram from the left and move into the steaming zone [11] where they travel up before exiting right to left through vacuum cooling zone [13]. This embodiment is differentiated from other versions in that the steaming zone [12] accomplishes both lateral panel movement and counter-current flow of steam and panels. Those panels may be spaced (as shown in the diagram) or may be more densely loaded. They may move continuously or as a series of steps. The steaming chamber may be completely filled (as shown), or the panels may be concentrated in one part of the steaming zone (for example, close to the steam source or close to the steam removal point). In a typical cycle, a freshly loaded panel [50i] may be loaded into $O_2$ purge or vacuum chamber (zone [10]) and subjected to vacuum and/or gas sweeping to remove oxygen. The vacuum may then be broken, and the panel moved into the steaming chamber (zone [11]), where panels 50b-50h are in a parallel stack such that the faces of adjacent panels 50b-50h are parallel to each other, before being gradually moved in a transverse direction towards the end of the parallel stack close to the steam inlet. The panel would see progressively lower concentrations of $CO_2$ as it moves through the steam flow closer to the cooling chamber (zone [13]), facilitating the desorption of $CO_2$ from the panels. Once at the end of the steaming zone [11], the panel would move into the cooling chamber (zone [13]), where a vacuum and/or sweep gas may be used to lower the panel's temperature before equilibrating the panel with ambient pressure and unloading the panel from the cooling chamber in zone [13]. Arrows indicate relative movement of the panels through the system.

One advantage of this invention is the potential for steam to move counter-current to the panels in the steaming zones. This allows the steam with the lowest concentration of $CO_2$ to come into contact with the panels that have the lowest residual level of $CO_2$ adsorbed on them, which reduces the overall amount of steam required to desorb the panels. The degree of improvement is a function of the adsorption isotherm, the curve expressing the equilibrium concentration of $CO_2$ in the gas phase as compared to the adsorbed phase, but in most scenarios, increasing the number of counter-current stages will reduce the overall steam use. A confounding effect is that at elevated temperature, particularly in the presence of oxygen, the adsorbent may breakdown, so holding the panels at temperature for extended periods may be counter-productive. Increasing the number of panels in counter-current flow may therefore be limited. Thus, there are additional advantages to limiting the amount of time that panels spend in the steaming zone—this is achieved, for example, by spacing out the panels (as shown in FIG. 9) or by having the steam move back and forth through the panels (as shown in FIG. 6).

Figure 11:
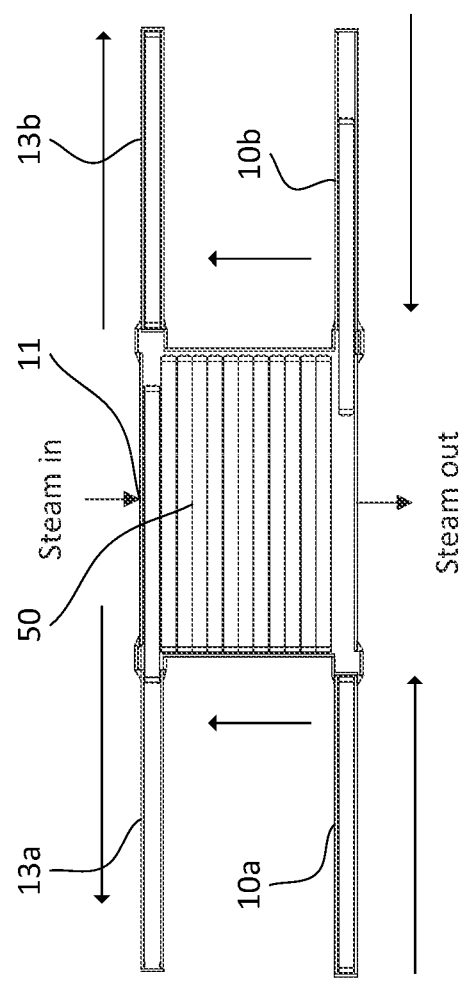
FIG. 11 illustrates a regeneration box with loading and unloading from both sides in order to facilitate faster stepping of panels through the steam section.

In some embodiments, a limitation on the rate at which panels can be stepped through the system may be the time required to open doors, to move the panels in and out of different zones, or the time required to complete the oxygen purge or the panel cooling activities. FIG. 11 illustrates one possible approach to mitigating such constraints—two inlet chambers [10a and 10b] and two outlet chambers [13a, 13b] may be connected to a single steaming chamber (zone [11]). The chambers in zones [10a] and [13a] may connect to one adsorber box while zones [10b] and [13b] may connect to a second adsorber box operating out of phase with the first adsorber box. It should be noted that the term "adsorber box" may refer to any structure (i.e., "adsorber structure") in which adsorption is taking place on the adsorber panels [50]. Panels [50] may load alternatively from zone [10a] and [10b], so that panels [50] enter the chamber of the steaming zone [11] at twice the frequency that they can be processed in either zone [10a and 10b]. Similarly, panels are unloaded to cooling chambers in zones [13a] and [13b], alternately, so that panels [50] exits the steaming zone [11] at twice the frequency that they can be processed in the cooling zones [13a and 13b]. Having a higher stepping frequency in the steaming zone [11] as compared to the loading/unloading zones [10], [13] allows more stages of counter-current steam/panel contacting in the steaming box without increasing the average time spent in the steaming zone by a given panel. Arrows indicate relative movement of the panels through the system.

While FIG. 11 considers an embodiment where both two purge or vacuum chambers in zone [10] and two cooling chambers in zone [13] are considered, alternative configurations can readily be imagined—for example one inlet and two outlets or two inlets and one outlet are also possible. Further, one could easily conceive of configurations where more than one inlet or outlet chamber could be attached to one or both sides of the streaming box.

Figure 12A:
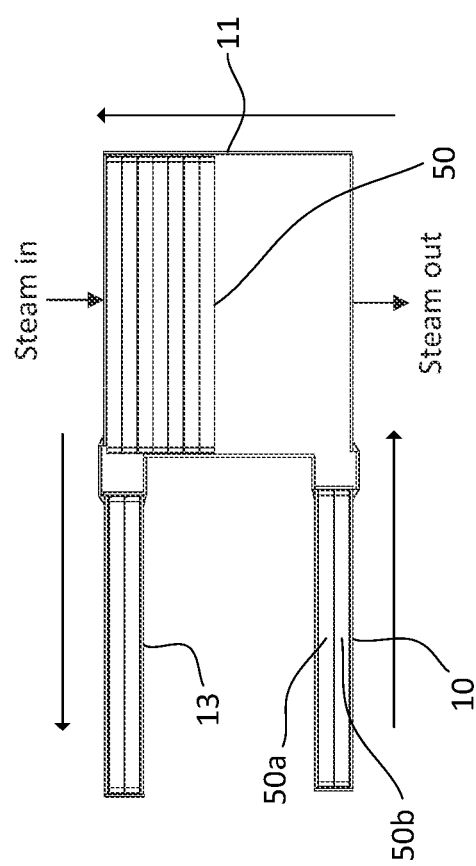
FIG. 12A-12B illustrates a system in which two panels are collected and loaded into the regeneration box at the same time, and in which an odd number of panels are held in the steaming section.

FIG. 12A illustrates another possible variation that would allow for a relatively longer oxygen purge in zone [10] or cooling step in zone [13] but allow for a larger number of panels in the steaming zone [11] while maintaining a moderate panel residence time in the steaming zone [11]. In this embodiment, two panels [50a, 50b] may be loaded into the chamber in the oxygen purge zone [10] at the same time and complete their cycle together. The two panels [50a, 50b] could then be loaded into the chamber in the steaming zone [11] together and step through the steam until being unloaded into the cooling zone [12]. Arrows indicate relative movement of the panels and steam through the system.

In an alternative embodiment, an odd number of panels may be held in the chamber in the steaming zone [11]. This would mean that the trailing panel [50b] at the inlet would have one extra step period in the steam, and that during that extra period, it would see fresh steam. In such an embodiment, the trailing panel [50b] would not consistently be exposed to steam with a higher $CO_2$ concentration than the leading panel [50a], as it may in an embodiment with an even number of panels in the chamber in zone [11].

While FIG. 12A shows an embodiment with two panels loaded at a time, one can readily envision alternative arrangements where more than two panels are loaded at a time. Similarly, while FIG. 12A shows an embodiment with an odd number of panels in the steaming zone, one can readily envision alternative arrangements where an even number of panels are held. In the case where more than two panels are loaded at a time, one can also envision adjusting the number of panels held in the steaming zone in order to achieve an unloading pattern that maximizes the uniformity of panel desorption.

Figure 12B:
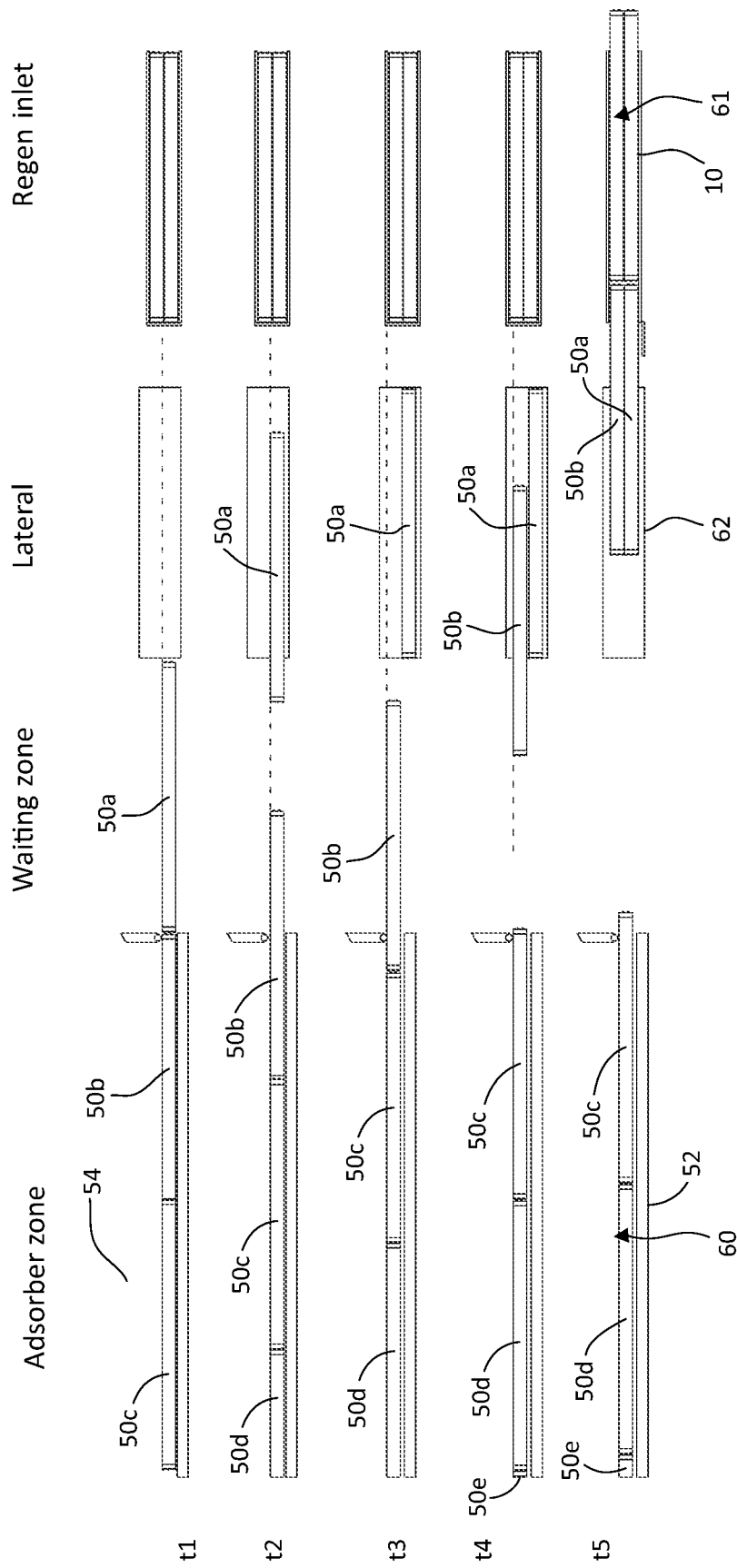

FIG. 12B illustrates a possible time series of events that would enable a single adsorber wall or row [54] of panels to supply panels [50a-e] to the double-wide panel loading system [62] shown in FIG. 12A. Panels [50] may move along the adsorber wall [54], gradually protruding beyond the end of the adsorber wall [53] into a waiting area or waiting zone (as shown, for example, in FIG. 2). Once the panel [50a] is fully disengaged from adsorption and has exited the adsorber box [60], the panel [50a] may be transferred onto a lateral transfer device [62]. The first panel [50a] loaded may then move within the lateral transfer device [62] to allow a second panel [50b] to be loaded onto the freed space. The two panels may then be loaded together into the oxygen purge zone [10] of the regeneration box. In this embodiment, the panel moves with the lateral movement device; one could easily conceive of a system where the lateral transfer device remains static while the panel is moved over its surface.

Moving panels quickly offers the potential to reduce the stepping frequency in the regeneration chamber and thus improve both the capital efficiency and number of stages of counter-current flow in the steaming zone for a given residence time. At the same time, tall, thin panels (with a high aspect ratio) can allow for a shorter adsorber wall with the same area, which may provide capital savings. Unfortunately, a tall aspect ratio may make acceleration of the panel for quick movement in and out of the regeneration system challenging as there is potential to create distorting forces on the panel frame and the risk of the panel tipping over increases.

Figure 17A:
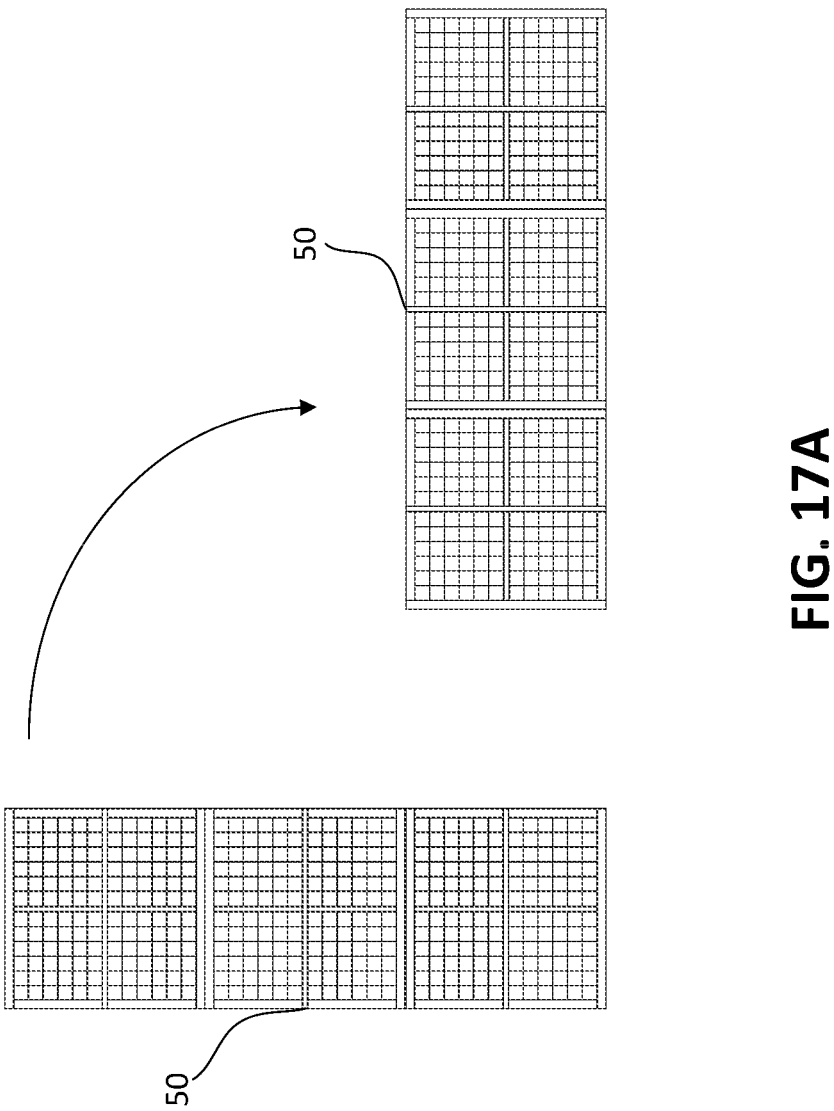
FIG. 17A illustrates an exemplary rotation of a panel.

In an alternative embodiment, as seen in FIG. 17A, the panel [50] leaving the panel track may be loaded onto a device that rotates the panel 900 so that the panel can be loaded into the regeneration chamber with a much lower aspect ratio. Advantageously, the door(s) within the regeneration chamber can be smaller and thus easier to seal with these rotated panels.

In an alternative embodiment, the adsorber panel [50] may be made from subunits [78]. Once the panel is out of the adsorption box, the panel may be segmented and rearranged to a shape that is more convenient for regeneration. In one embodiment, panel [50] in FIG. 17B may be separated into subunits [78 a-c], as seen in FIG. 17C. Those subunits may then be rearranged so that the largest surface areas aligned, to form a block that is 1 subunit high, 1 subunit long and three subunits wide (as seen in FIG. 17D). Alternatively, the subunits may be arranged with their edges touching (as seen in FIG. 17E) to form a block that is 1 subunit high, 3 subunits long and 1 subunit wide. Any of these configurations may be better suited to higher acceleration forces than the original orientation of the panel.

Although FIG. 17B shows a panel that may be segmented into three subunits, in alternative embodiments, the panel may be segmented into as few as 2 subunits or as many as 10 or even more subunits. FIG. 17B illustrates reconfiguring all the subunits to be processed at the same time, but in alternative embodiments, the subunits could be processed independently (one at a time) or in some other grouping that is convenient, for example two at a time.

In a further embodiment, one could combine the concepts of loading multiple panels into the oxygen purge chamber in zone [10] or final cooling chamber in zone [13] with the concept of uniform panel steaming by adding waiting zones between oxygen removal [10] and steaming [11] and/or between steaming [11] and cooling [13]. This would enable, for example, two panels to come out of oxygen purge at the same time. One panel would then go directly into steam flow while the other panel would wait for a half step before being moved into the steam flow. Similarly, at the other end of the steaming box [11], one panel could leave steam flow on the half step to enter a waiting zone to be joined by a second panel on the full step, allowing both panels to enter the cooling zone [13] together. It is easy to understand how this example could be extended to processing three, four, or more panels together in zones [10] and/or [13] while maintaining uniform time/temperature profiles for panels in the steam zone [11].

Figure 13A:
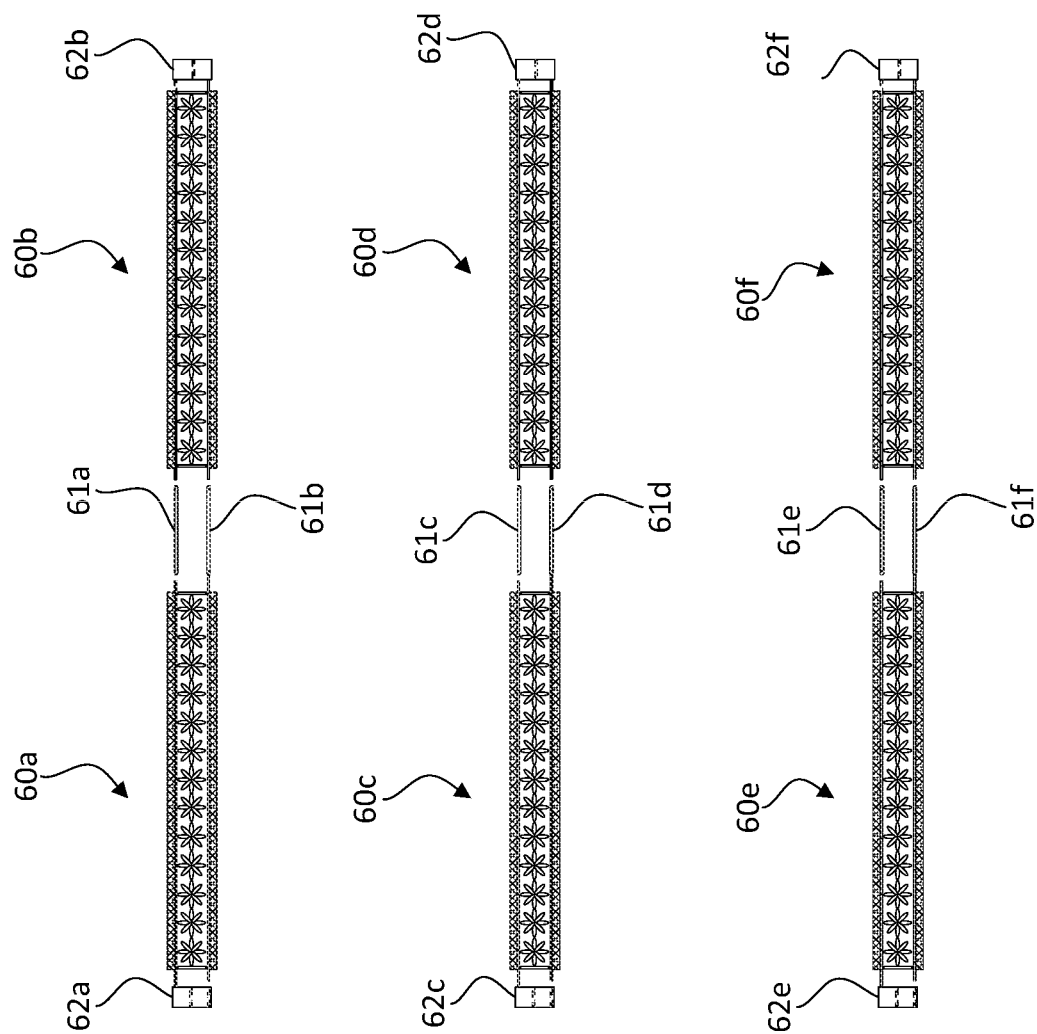
FIG. 13A-13B illustrates alternative possible layouts for a 6 adsorber box process with lateral and transverse steaming boxes.
Figure 13B:
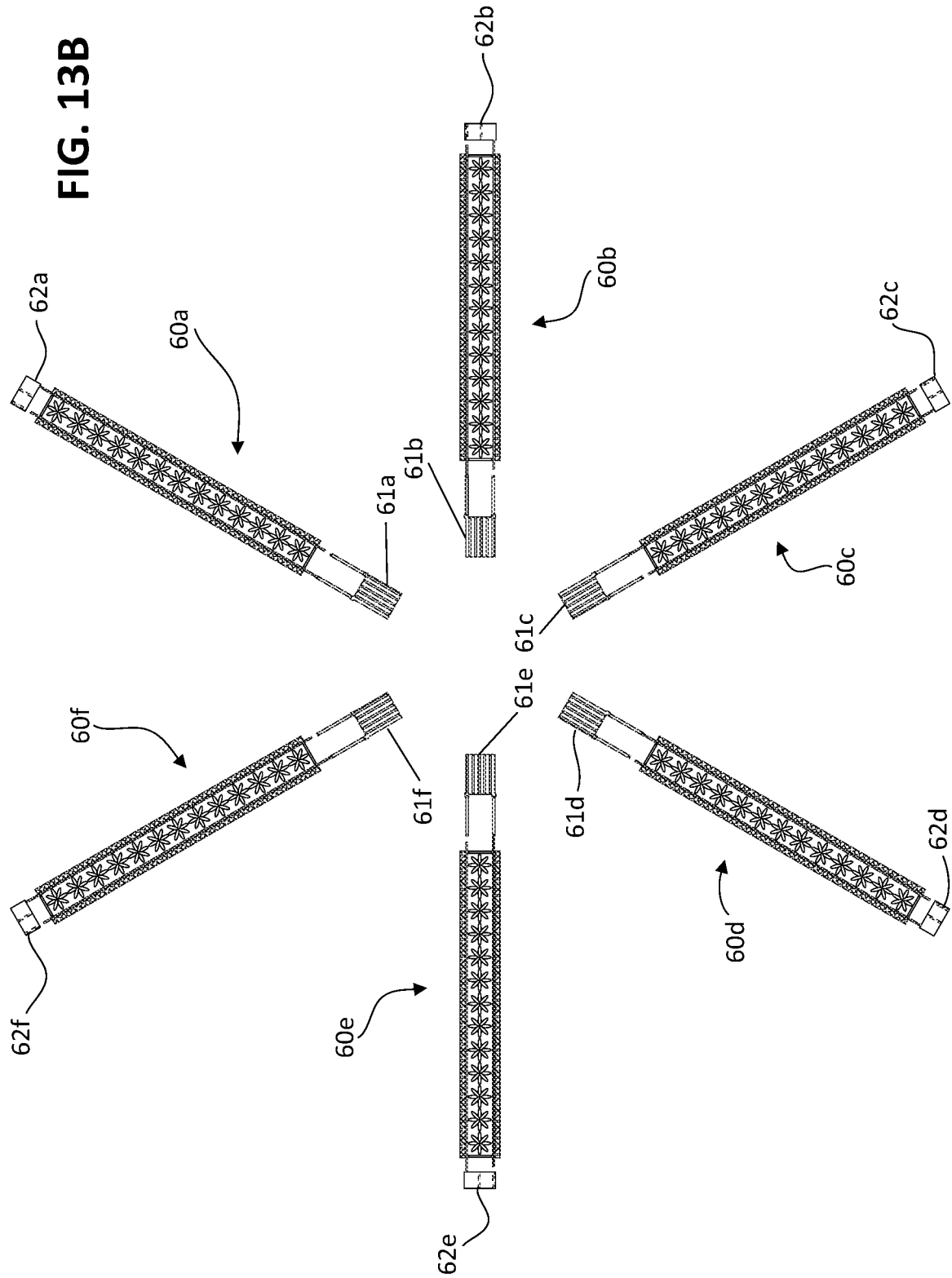

One possible advantage of the lateral steaming system illustrated in FIG. 9 is that it may allow the regeneration chambers to be kept relatively close together. FIG. 13B shows how the lateral flow regeneration chamber [61a-61f] allows the adsorber boxes [60a-60f] and lateral transfer units [62a-62f] to be arranged in a star pattern, maintaining good separation of the adsorber boxes [60a-60f] while also keeping the regeneration chambers [61a-61f] close to each other. Keeping the regeneration chambers [61a-61f] close together minimizes the lengths of low pressure gas piping required to allow multiple regeneration units to share common downstream processing equipment.

The isolation doors [26], [27] at the inlet and outlet of zones [11] and [13] are shown in FIG. 9 as swing doors, but other designs could be envisioned, including "guillotine" or knife doors that slide into place, or "rotating barrels" that would rotate on a vertical axis to move the chord of a circle into place as a seal.

Figure 14:
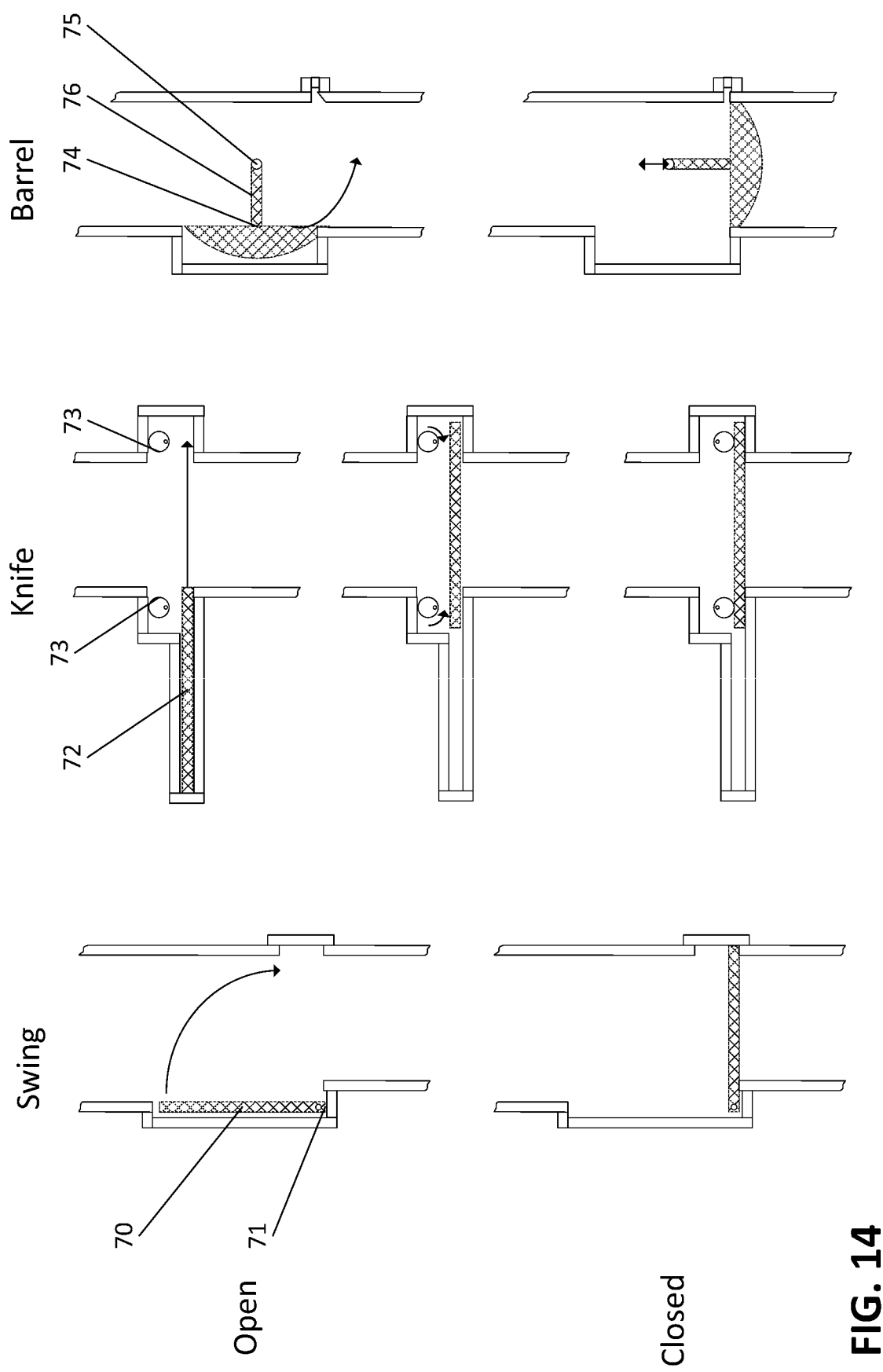
FIG. 14 illustrates possible door movements.

FIG. 14 shows some possible embodiments of the doors. The swing door [70], rotates about pivot [71] so that when open it is out of the path of panel movement but when closed it seals against the walls. In the case of a knife or guillotine door [72], the door will sit out of the path of the panel movement in its open position, but then slide into place to close the chamber in the closed position. Optionally, the door seal may be improved by rotating cams [73] that push the slide door [72] against the frame. A barrel or rotating door [74] rotates about a pivot [75]. The door [75] is connected to the pivot by one or more mounting arms [76] that sit outside the movement zone of the panels. When open, the barrel door sits outside of the movement region, and then rotates into place to create the seal. Optionally, the pivot point [75] may be mounted on a movement system, allowing the door to be swung into place and then pushed tight against the door frame to improve the seal.

Figure 36A:
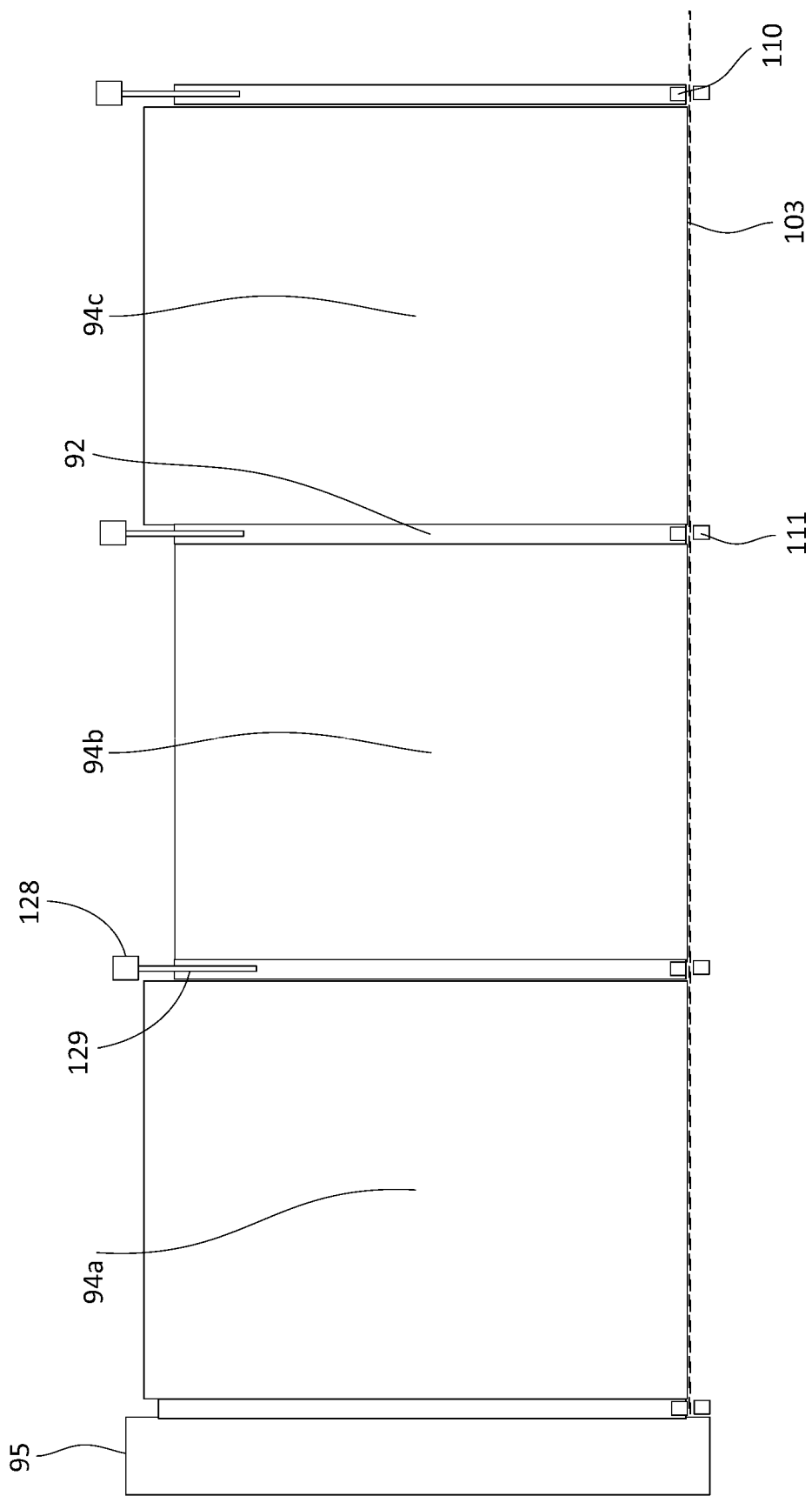
FIGS. 36A-36B illustrate an exemplary configuration of a monolith frame with sealing surfaces between each row of monolith bricks.

In other embodiments of the process, the panels may be moved in a continuous manner between different zones, and this may be achieved by forming a seal against the surface of the moving panel, as seen in FIG. 36. FIG. 36A illustrates a side view of one possible configuration. A lower support strut [111] may be designed so that it is flush (in the same plane) with the overall panel frame [95] to provide a continuous flat surface against which to form a lower seal. At the top of the panel, a sealing strut [128] may be added such that its upper surface is flush with the upper surface of the outer frame such that it may provide a continuous flat sealing surface. The sealing strut [128] may be a single element that touches a sealant [92] located between panels. In some embodiments, the sealing strut [128] may have an extension [129] that both minimizes gas flow between panel rows (e.g. [94a] and [94b] or [94b] and [94c]) and provides rigidity to the sealing surface [128].

Figure 36B:
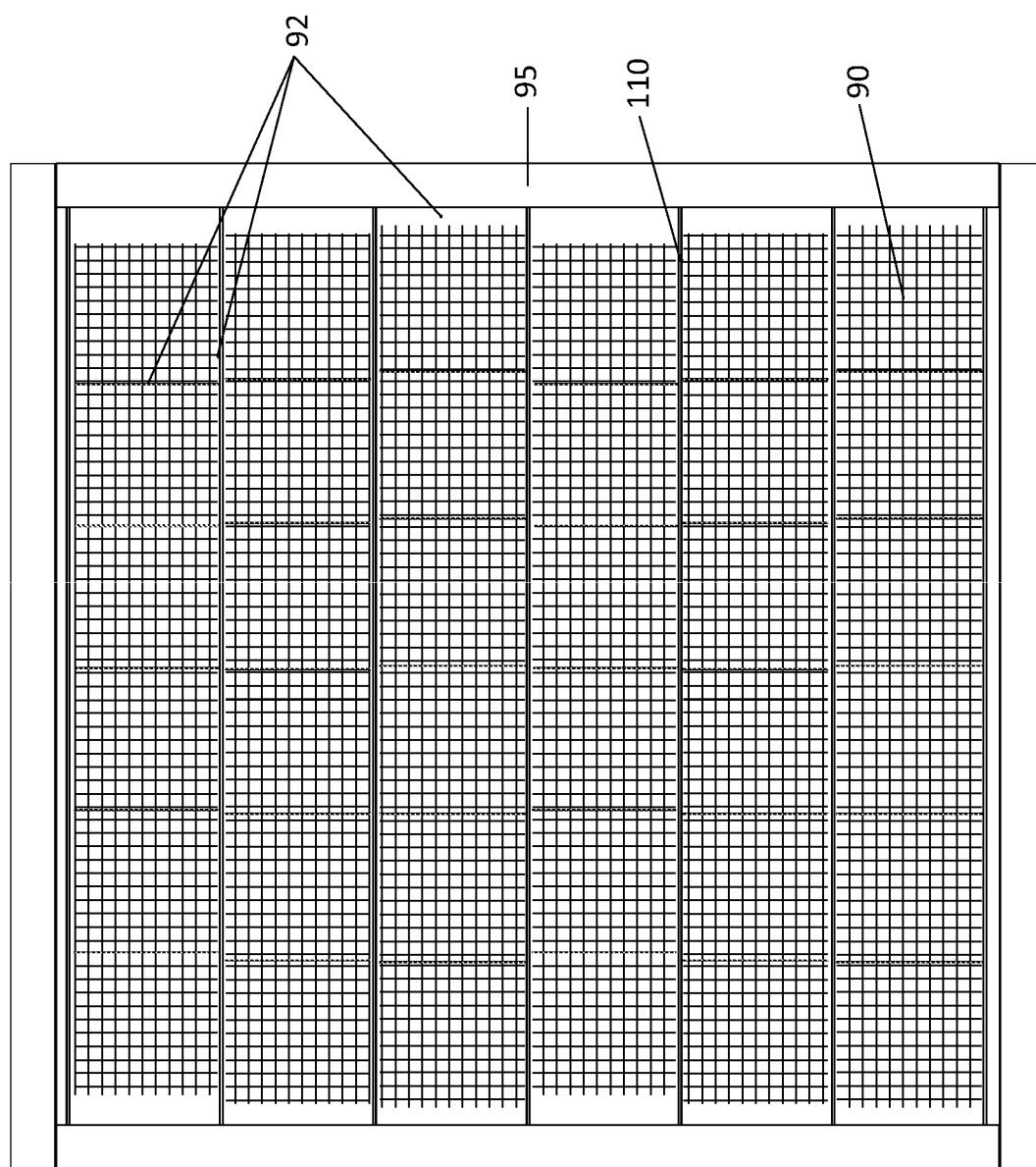

FIG. 36B illustrates a plan view of an adsorber unit support and panel configuration. The adsorber units [90] are supported by a mesh that is supported by support struts [110]. The individual adsorber units [90] may be arranged in a linear array (6×1 in FIG. 36B, though more or fewer units could be used) with a support strut [110] running between arrays. The spaces between arrays and the support struts [110] and the frame [95] may be filled with a deformable sealant [92] that both prevents air flow around the adsorber units [90], while also providing some cushioning to the brittle adsorber units from any thermal expansion or movement stresses that the panel experiences. The sealant [92] may also allow for some variation in the size of the individual adsorber units [90]. Sealant [92] may also be used between individual adsorber units [90] and between the adsorber units [90] and the support struts [110]. As shown in FIG. 36A, the support struts [110] may align with the lower sealing strut [111] and upper sealing strut [128].

Figure 37A:
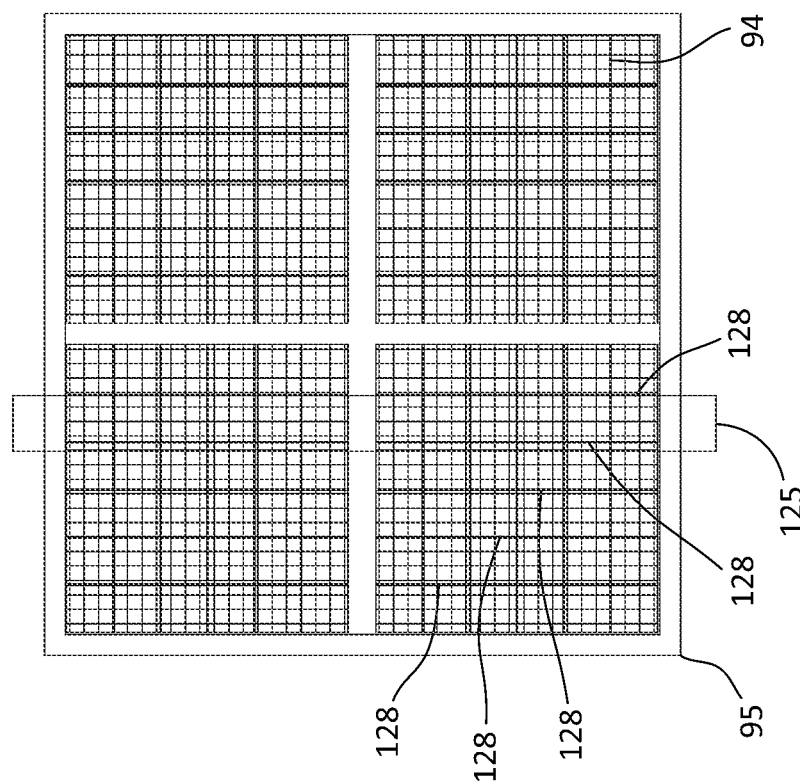
Figures 1, 2, 37C:
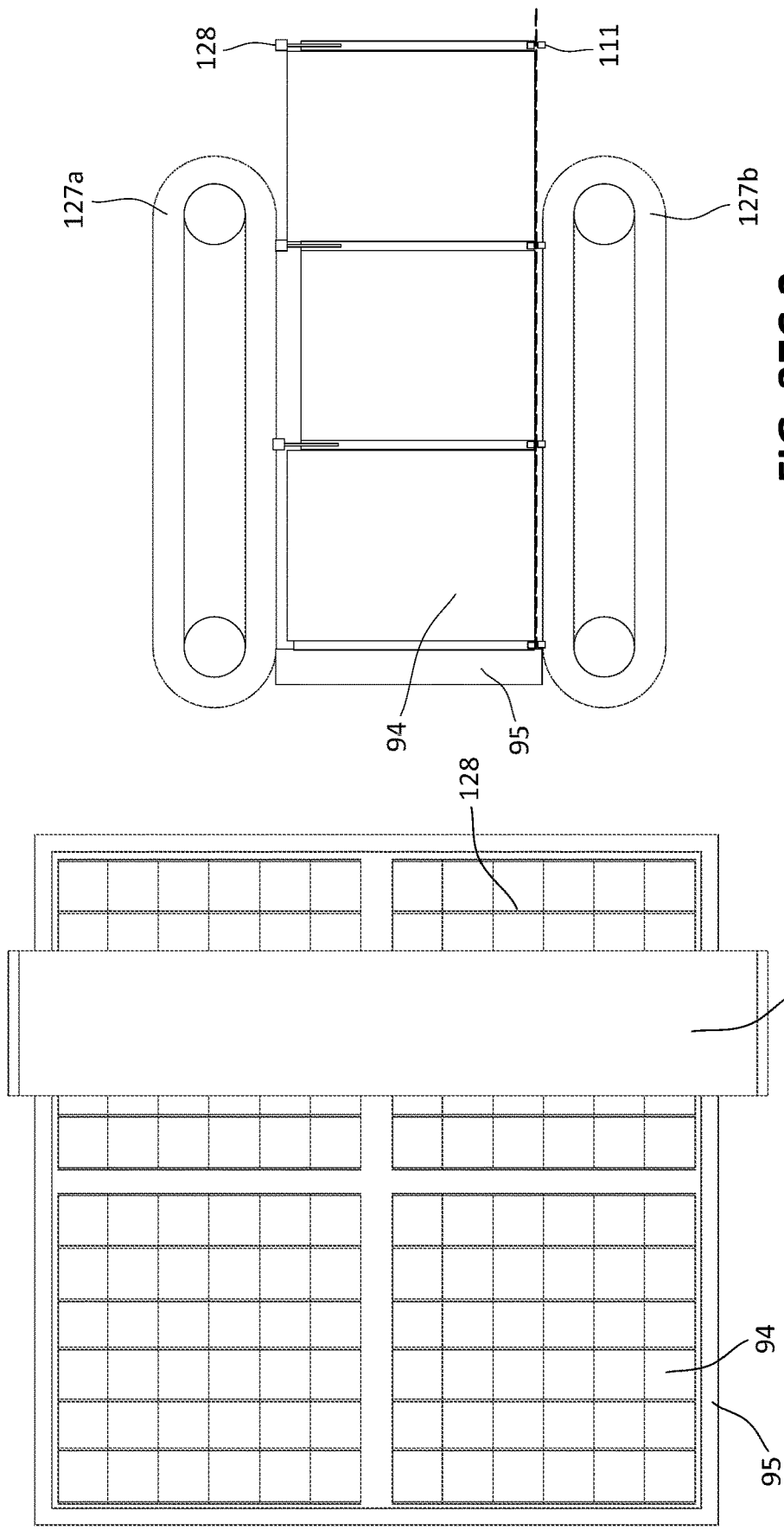

Some possible embodiments of a mechanism within the structure enclosing the panels that may be used to complete the seal in a continuously moving system are identified in FIGS. 37A-C. FIG. 37A illustrates an embodiment in which a sealing block [125] is in contact with at least one sealing strut [128]. The sealing block [125] is intended to prevent gas from moving from one array of adsorber units in the panel [94] to an adjacent array by creating a contact point between the sealing block [125] and the upper sealing strut [128] (an identical seal is created at the bottom of the panel between the sealing block [125] and the lower sealing strut [111]). This contact seal creates a partition between sets of adsorber unit arrays [94] such that a gas, such as air, may flow through one set of arrays without mixing with the gas flowing through another set of arrays. This sealing block [125] may be made of metal, polymer, or some other material that provides a smooth surface and enables contact with a length of sealing strut [128]. Light pressure may be applied in a direction perpendicular to the panel movement to improve contact and sealing between the upper sealing strut [128] or lower sealing strut [111] and the sealing block [125]. The sealing block [125] material may have a low coefficient of friction against the panel frame [95] and the sealing struts [128]. The width of the sealing block [125] may be at least wide enough that the sealing block [125] is in contact with at least two sealing struts [111] or [128] when the panel [50] is in a given position. This ensures that, as the panel moves, at least one sealing strut [111] or [128] may be in contact with the sealing block [125] at all times. For improved sealing, the sealing block [125] may be made large enough to make contact with two, three, four or more sealing struts [111] or [128] at a time. In some embodiments, the sealing block [125] may be static and the panels may move.

Figure 3:
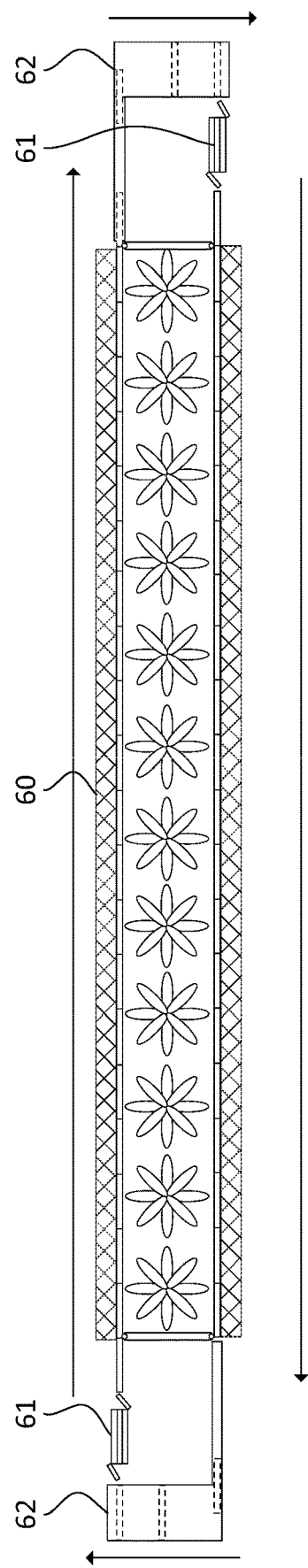
FIG. 3 is an exemplary diagram of an alternative design for the adsorption/desorption process.

FIGS. 37B-1-37B-3 illustrate an alternative embodiment where the static sealing block ([125] in FIG. 37A) is replaced with a set of one or more roller seals [126]. As seen in FIGS. 37B-2 and 37B-3, a plurality of roller seals may be grouped together and positioned such that they conform to the surface of the panel. For example, the plurality of roller seals [126] may contact the adsorber unit [90] surface of an adsorber unit array (e.g. [94b] in FIG. 36A) and then deform to account for the raised sealing strut [128]. Alternatively, the roller seals may be positioned so that they are touching the mesh support [103] and deforming to account for the lower support/sealing struts [111] or they may be positioned such that they only touch the sealing struts ([128] at the top and [111] at the bottom). Several rollers may be used such that at least one of them is in contact with the sealing strut in a given section of the panel enclosure. One possible advantage of using a rolling seal is that the rate of wear and the friction associated with forming the seal may be less than would be the case with a stationary sealing block (such as [125] in FIG. 37A).

FIGS. 37C-1 and 37C-2 illustrate another possible embodiment in which a seal is formed by a continuous belt [127]. The belt [127] may be long enough to cover at least two sealing struts [128], or it may cover three, four or more. As with the rollers illustrated in FIG. 37B-1-37B-3, the belt seal [127] may allow for reduced wear and friction. FIGS. 37C-1 and 37C-2 show one possible embodiment of the belt in both plan (FIG. 37C-1) and side (FIG. 37C-2) views. The upper belt [127a] may come into contact with three upper sealing struts [128] and the lower belt [127b] may come into contact with three lower support struts [111].

The discussion of FIG. 37 is applicable to systems in which the adsorber unit arrays [94] are arranged on horizontal panels. One can readily envision designs set up with horizontal panels supported on mesh (as illustrated in FIG. 36) or in other ways (such as those illustrated in FIGS. 30 and 32) or with the panel in a vertical orientation.

Figure 44A:
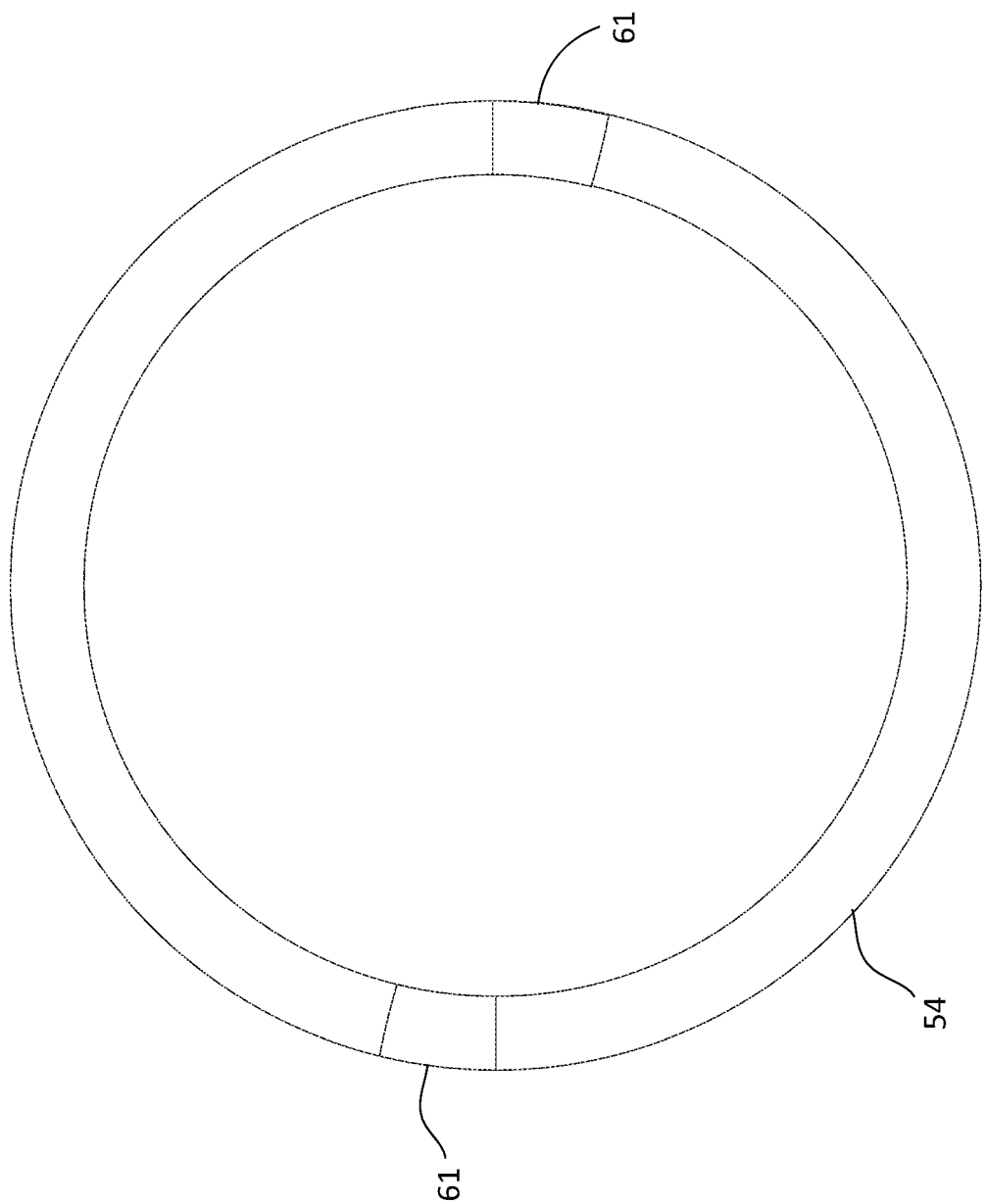
FIGS. 44A-44D illustrate an exemplary embodiment of a fully continuous, ring-shaped system and possible configurations for adsorption blocks.

In yet another embodiment, the horizontal panels may be arrayed in a circle, in the form of a large "disc," or "torus," as illustrated in FIG. 44A. In this embodiment, there are two adsorber trains [54] and two regeneration stations [61], though fewer (one of each) or more (3, 4, 5 or more) could be envisioned. In comparison to FIG. 21, one advantage of this configuration would be eliminating the need for transfer stations [62] at the end of linear adsorber tracks [54a], as each panel [50a] would move continuously in a circular manner, thereby not requiring different "tracks" [54a and 54b] or the need to transfer between tracks. In addition, the forces on the panels [50a, 50b and 50c] would remain continuous. Continuous motion has the advantage that it eliminates the forces that accelerate and decelerate the panel [50a] as it moves from track [50a] onto the lateral transfer station [62]; the forces that accelerate and decelerate the panel [50b] as it is moved to align with track [54b]; and the forces that accelerate the panel [50] out of the lateral transfer station [62] and into the adsorption track [54b]. This elimination of acceleration and deceleration forces in normal operation may reduce the power requirements of the system and may allow a lighter panel frame, with a lower thermal inertia, to be used.

Figure 44B:
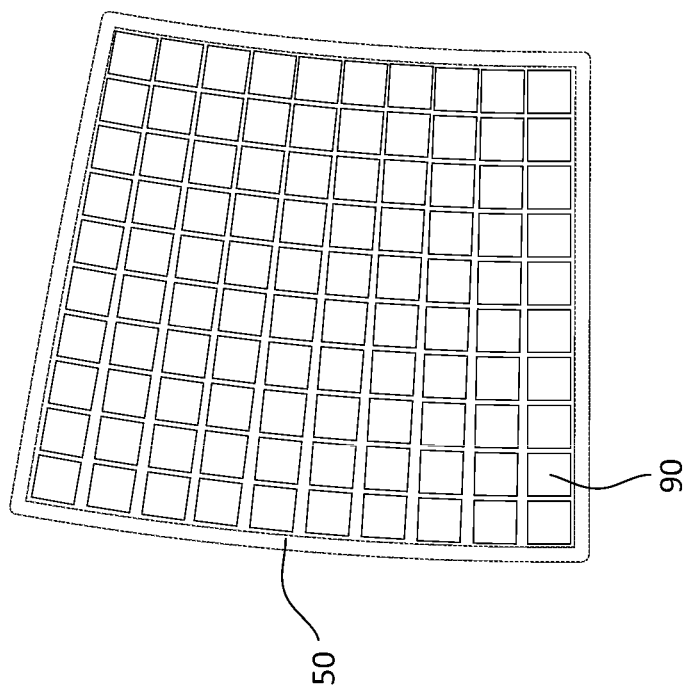

In the embodiment shown in FIG. 44B, each panel [50] may be in the shape of a "slice" of the disc/ring. In another embodiment depicted in FIG. 44C, because there is no longer any discontinuous movement, the concept of panels [50] could even be eliminated, such that a disc may be composed of one adsorber unit [90] wide segments with an upper sealing strut [128] and a lower sealing strut [111]. The disc may be made up of radial rows [133], or spokes, of adsorber units [90] with sealing surfaces separating adjacent rows (see FIG. 44D, rows [133a]-[133e]). Thus, instead of 120 panels each 12 adsorber units [90] wide, a circular system may have 1440 spokes that are each one adsorber unit [90] wide. Within the regeneration areas ([61] in FIG. 44A), the air purge, steam desorption, cooling and other possible zones may be configured of like shape to conform adequately to each segment in terms of sealing and the exchange of gases.

Figure 18:
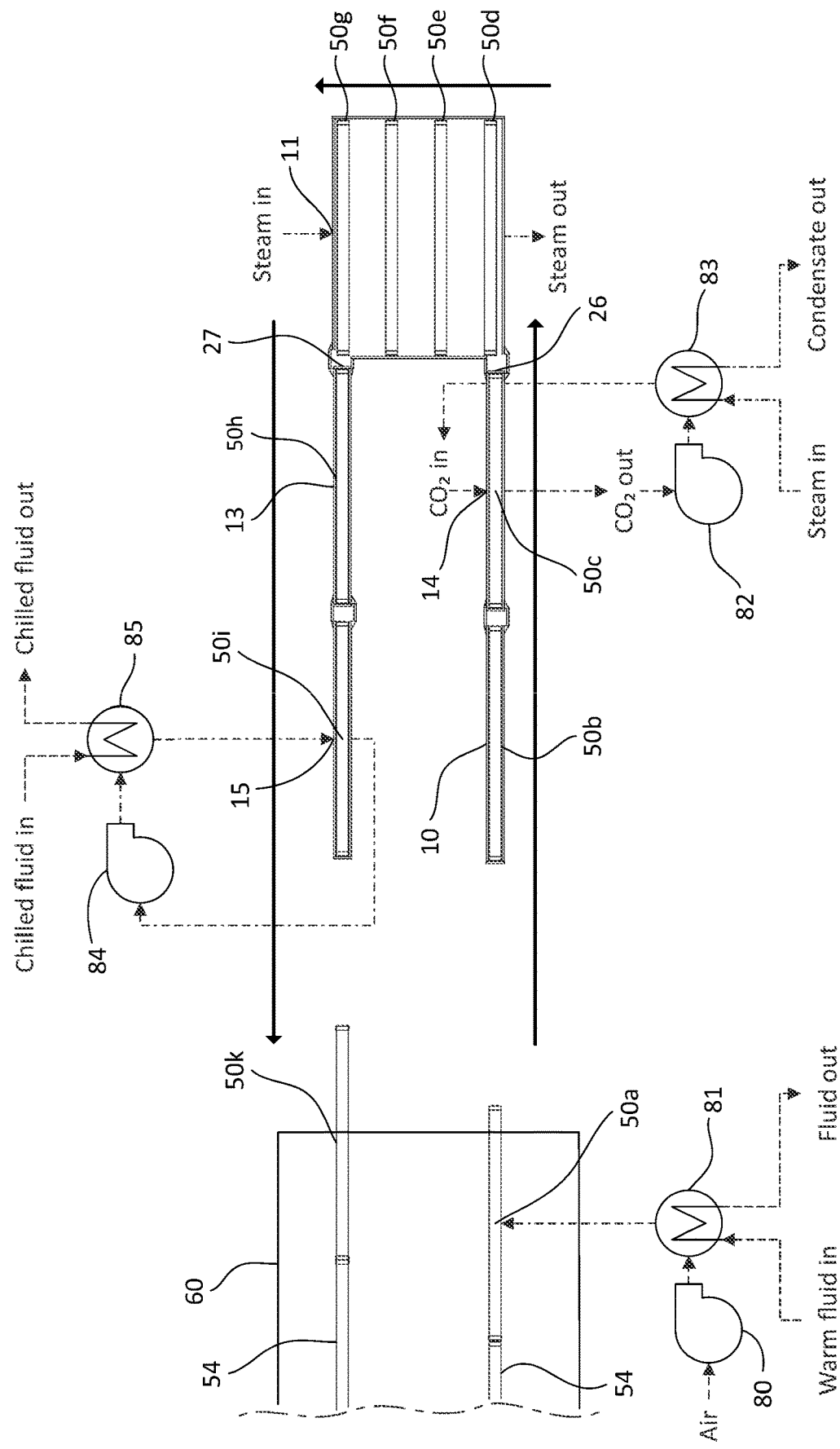
FIG. 18 illustrates options for panel preheating and drying/cooling.

Because the adsorption step uses ambient air, the temperature of that air supply may vary with time of day or season. This may introduce an uncontrolled disturbance into the system and may lead to greater heating requirements at some points (e.g., during nighttime in winter) as compared to others (e.g., midday in summer). One way to mitigate this variability is depicted in FIG. 18, which illustrates an embodiment that preheats some of the air that is used for adsorption. Because the air contains oxygen that may cause sorbent degradation, the extent to which the panel [50a] is preheated may be limited to, for example, less than 40° C., less than 30° C., or less than 20° C., or between about 20° C. and about 40° C., alternatively between about 20° C. and about 30° C., alternatively above 20° C., alternatively about 25° C., alternatively about 30° C. In the embodiment shown, the air delivered to the last panel [50a] in the panel track [54] by fan [80] may be preheated in heat exchanger [81] with warm water that is diverted from the cooling tower. Using this waste heat stream ensures that the air cannot be heated to a temperature that could damage the sorbent (the cooling tower return water may be <45° C. at all times) and also takes load off the cooling tower (saving energy). In warmer weather such as summer, this air preheating may not increase the panel temperature significantly, but in winter, it may preheat the panel from about 2° C. to about 25° C. or higher. The key advantage of this approach may be that the temperature of the panel entering regeneration [50b] may be more consistent year-round. There may also be a reduction in the amount of steam required to desorb the panel in chamber [11], reducing the amount of water that condenses into the panel on that step. This may be advantageous with respect to the rate of mass transfer to/from the panel in desorption [11], vacuum cooling [13], and in the subsequent adsorption in adsorber box [60]. In order to compensate for the pressure drop across the air preheater [81], FIG. 18 indicates a supplemental fan [80] may be required to keep the flow of air through the heated panel [50a] balanced with the other panels in the panel tracks [54].

Another possible and complementary embodiment of panel warming is also illustrated in FIG. 18. Once the majority of the oxygen has been eliminated from the panel and its surroundings in the air purge zone [10], the panel [50c] may be heated without causing excessive oxidation of the sorbent. In an optional step, a hot, inert gas (such as $CO_2$) can be used to preheat the panel in a preheating chamber [14]. The advantage of preheating the panel is that less steam may be required in the steaming zone [11], so less water may be condensed onto the surfaces of the panels [50d-50g] and mass transfer steps may continue unimpeded. In this exemplary embodiment, the $CO_2$ may be heated with steam in exchanger [83] and recirculated over the panel by fan [82] to minimize the overall use of hot gas and to allow the condensing steam to be recovered directly from the heat exchanger [83] (allowing hotter, uncontaminated water to be returned to the boiler). If the panel [50c] is not fully loaded when it leaves adsorption, some of the $CO_2$ used for preheating may adsorb onto the panel, providing additional heating—the $CO_2$ may desorb quickly in the subsequent steaming step [11]. The panel leaving this section may be preheated to about 50-95° C., alternatively about 60-85° C., or alternatively about 70-80° C.

Because residual water on the panel re-entering adsorption [50k] can limit mass transfer and because increased temperature may make the sorbent more prone to oxidation, an optional processing step for panel cooling may be employed. As seen in FIG. 18, an additional cooling chamber [15] may be used to enclose a panel [50i] that has been partially cooled in the vacuum cooling zone [13]. In this additional cooling chamber [15], a gas, such as nitrogen or air, is recirculated by fan [84] through heat exchanger [85] and cooled with a chilled fluid such as water or glycol. This cool gas may then flow over the warm panel [50i], causing both additional water evaporation (by lowering the vapor pressure of water over the panel surface) and direct cooling, thus lowering both the panel's temperature and the residual condensate. The water evaporated from panel [50i] may then be recondensed and recovered in the heat exchanger [85], where it may be returned to the boiler system. The benefit of this optional additional step is that the panel that is returned to the adsorption system [50k] will be both cooler (reducing sorbent oxidation) and have less liquid water in its internal pore structure (minimizing mass transfer limitations). The panel leaving this supplemental cooling station may be at about 10-40° C., alternatively about at 20-30° C., or alternatively at about 25° C.

Optionally, as also shown in FIG. 1, internal heat integration may be achieved by condensing water vapor and cooling other heat sources throughout the system to generate a warm fluid in one or more condensers [40]. The energy in this fluid may be upgraded via a series of compressors [44] so that it can give up its heat at a higher temperature, to form fresh steam in the boiler [43]. The recycling of heat that can be achieved through the use of the heat pump significantly reduces the overall energy use of this process. The condensing of the majority of the water vapor from the process streams also allows for water recycling from the condensers [40] to the boiler [43], significantly reducing the process water footprint.

One advantage of using a mixture of steam (or other easily condensed gas) and vacuum to perform the $CO_2$ recovery step is that it is conducive to heat recovery. A lot of energy can be recovered by condensing the vapor out of the $CO_2$ product gas and if this energy is transferred to a heat pump. For example, the steamy $CO_2$ leaving the zone [11] could be used to heat water up from 60° C. to 70° C., condensing the majority of the water vapor. The 70° C. water could then be used to boil butane liquid to form medium pressure butane gas. The butane gas could then be compressed using electrical power, to yield higher pressure butane vapor that could be condensed at 110° C. to high pressure butane liquid, which could be used to boil hot water at 105° C. into low pressure steam. The condensed high pressure butane liquid could then be flashed down to the medium pressure butane gas and continue the cycle. Similarly, the vacuum streams could be used to generate 40° C. water from 30° C. water by using heat exchangers to cool the $CO_2$ and condense out the majority of the water vapor. Removing this water vapor not only recovers energy, but it greatly reduces the load on the vacuum system. As before, the warm water can be cooled and recycled by boiling low pressure refrigerant (e.g., ammonia, propane or butane) to create vapors that can be compressed and then condensed at a higher temperature—in this system, for example, they could provide additional 70° C. water for the high-pressure loop.

The product of this process may be a mixture of $CO_2$, water, and other gases (e.g., inert gases). The concentration of inert gases may be controlled by the depth of vacuum on zone [10] and by the use of sweeping steam in zone [10]. The concentration of water in the $CO_2$ leaving the recovery condensers may be controlled by the temperature and pressure at which the gas is cooled. The concentration of product $CO_2$ may be about 90 wt % or greater $CO_2$ product, alternatively about 93 wt % or greater $CO_2$ product, alternatively about 95 wt % or greater $CO_2$ product, alternatively about 97 wt % or greater $CO_2$ product, or alternatively about 99.9 wt % or greater. The concentration of water vapor may be about 10 wt %, alternatively about 5 wt %, alternatively about 2 wt % or alternatively about 0.1 wt %. The concentration of inert gases may be about 5 wt %, alternatively about 2 wt %, alternatively about 0.5 wt %, or alternatively about 0.1 wt %.

General Plant Design Concept

Desorption can be carried out much more rapidly than adsorption, and as a result, the plant is designed to account for the desorption:adsorption time ratio via utilizing multiple adsorption panels [50] (typically 60-100, though they can be as few as 8 or less, or as great as 140 or more) to a single regeneration box—allowing for the adsorber panels [50] to continue their required adsorption time across multiple regeneration cycles of individual panels. This has the advantage of allowing the capital associated with the $CO_2$ recovery equipment to have a higher utilization factor, thereby reducing the capital costs per tonne of $CO_2$ produced.

Historical design approaches for these panel-based systems have required physically moving connected adsorber panels in a "train," in a discontinuous manner, in and out of an inline regeneration area. However, a series of connected panels have substantial mass, and therefore in a discontinuous process in particular the movement system may present certain mechanical challenges. In addition, panel-movement designs to date have required movement around an oval or round "track"—creating potential risks in terms of the reliability of such a system with that relatively high level of mass, in outdoor conditions with varying wind loads and other conditions, across multiple cycles, as well as challenges related to sealing (against air flow loss) of flat panels across curved tracks. An early-generation batch process is disclosed in U.S. Pat. No. 10,512,880 entitled "Rotating multi-monolith bed movement system for removing carbon dioxide from the atmosphere," which is hereby expressly incorporated by reference in its entirety for all purposes.

Figure 2A:
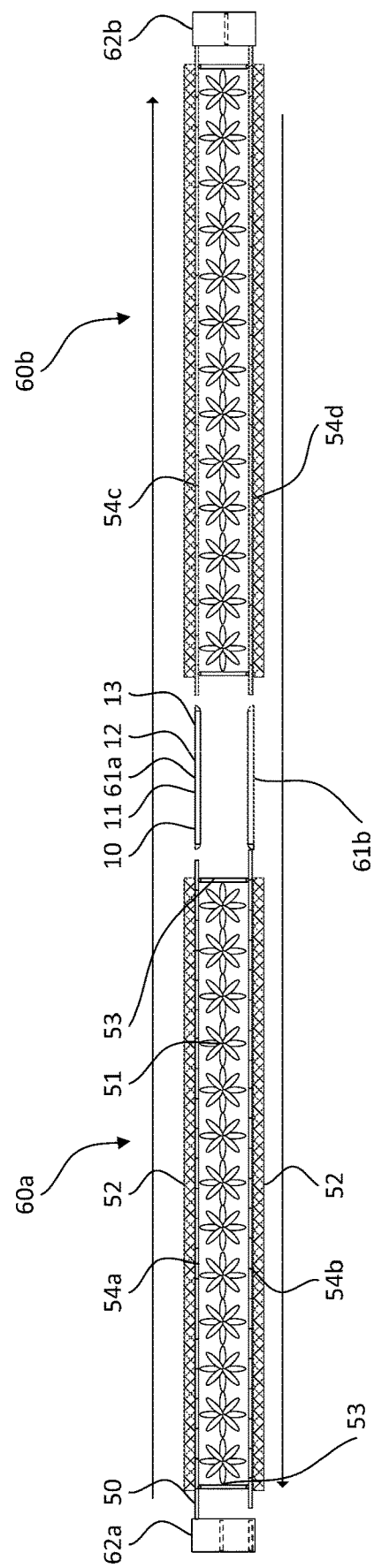
FIG. 2A illustrates an exemplary adsorption/desorption process unit.

FIG. 2A shows an exemplary configuration of the adsorption/desorption system, showing the adsorber box [60], the regeneration box [61] and the transfer station [62] within which the panels [50] move. The adsorber box may have two rows of adsorber panels [50] arranged side-by-side in a line, which form two long walls [54], as well as two short solid walls [53] arranged perpendicularly to the two long walls [54] that serve to prevent short-circuiting of air to the overhead fans [51]. In one embodiment, an air filter [52] may be used to minimize the impact of dust and other small particles on the system. An air filter [52] may be arranged parallel to and facing an outside surface of the long wall [54] of adsorber panels [50].

The panels [50] are configured to move continuously through at least a portion of the adsorber box [60]. For example, the panels [50] moving within the adsorber box [60] may move at a substantially constant velocity along a track within the adsorber box [60]. In an embodiment, the adsorber box [60] may include one or more continuously moving trains of panels [50] therein at a time.

The Horizontal Moving Panel design presented herein seeks to eliminate the potential issues created by indexing the panels through a start-stop motion by moving the adsorber panels [50] within the air flow individually (not connected), on a continuous basis, across a flat, horizontal dimension (or, alternatively, moving across additional dimensions). This confers a major advantage in terms of involving a movement of much less mass than a connected "train" of adsorber panels when regenerating the panel. In addition, the Horizontal Moving Panel design allows the adsorption panels [50] to move continuously, eliminating start/stop motion required in alternative designs. The sealing system for the regeneration vacuum is also highly reliable, utilizing a relatively narrow door that is only slightly wider than the shortest dimension of the panel. This flat door is closed with actuators (such actuators being electric, pneumatic, or hydraulic, among a range of alternatives) against a fixed flat plane, as compared to sealing systems involving rounded surfaces, or requiring a precise registration involving a very large movement of mass. In an alternative embodiment, the vacuum chambers/doors are eliminated, allowing the entire process to move on a continuous basis, which further simplifies movement throughout the system.

Another advantage to the greater simplicity of the Horizontal Moving Panel system is that it provides much greater flexibility to load a higher volume of substrate and sorbent resulting in significantly higher throughput. Overall, this provides the potential to deliver lower capital expenditures (and overall cost) per tonne of $CO_2$ produced.

In addition, compared to historical designs where a regeneration box only had a single zone for purposes of completing the full range of steps required for desorption, this design provides for multiple, individual zones—splitting the regeneration cycle into a series of specialized zones, whereby a single panel then moves from zone to zone to complete its desorption process. The range of steps, each of which may take place in a single zone, more than one zone, or combined with the next step in a given zone, include: (i) eliminating air (and oxygen, which may be harmful to the sorbent under high heat) from the adsorber panel via either pulling a vacuum or sweeping out the air via steam or an inert gas (such as nitrogen), (ii) breaking the vacuum (or moving out the nitrogen, or other inert gas) with steam, $CO_2$, or some alternative gas, (iii) heating the adsorber panel via steam (or other means such as indirect heat or hot $CO_2$), and (iv) cooling the adsorber panel—via some combination of vacuum, application of an inert gas (such as nitrogen) or a range of other direct or indirect cooling methods. Splitting the regeneration box into multiple zones also facilitates the introduction of additional processing steps, such as panel preheating [14] or panel chilling [15], as illustrated in FIG. 18.

It is contemplated that the use of multiple zones for the different steps of the regeneration process confers a number of benefits. Firstly, this allows for a given zone to be specifically designed to optimize a particular process (oxygen purge, steam application, cooldown, etc.), ensuring greater efficiency for that given process step. Secondly, splitting the regeneration process into separate zones/segments allows for a much greater continuity of gas flows— reducing/eliminating discontinuous flows that can create inefficiencies (and/or functional issues) in the operation of ancillary equipment such as heat pumps, vacuum pumps, compressors, etc. By regenerating multiple panels at one time, this boosts capacity as compared to a single panel, single zone regeneration box system. Further, having multiple panels in the hot/steaming section (zones 11 and 12) allows for a counter-current flow pattern that allows panels nearing the end of the steaming/desorption section to encounter a lower partial pressure of $CO_2$ (high steam flow), but then "reusing" that steam to apply toward heating and desorbing panels earlier in the regeneration cycle. This counter-current steam flow provides the advantage of utilizing high steam concentration to promote maximum desorption for the almost-$CO_2$-depleted panels toward the end of the steaming process, but then achieve efficiencies by reusing that steam for application toward earlier panels within the steaming section—in contrast with the greater cost/inefficiency of using that steam just once as would be experienced in a single-zone, batch regeneration.

These advantages will lead to lower energy needs, improved scalability, and lower operating and capital expense per unit of throughput.

Another advantage of the proposed embodiment is that it provides a design that is inherently scalable. A simplified movement system, due to its relatively low mechanical risk, lends itself readily to larger-scale units. Secondly, it is highly space efficient with the ability to not only deliver a substantial amount of $CO_2$ within a relatively modest footprint—but also the potential to stack units, providing an even greater potential to increase $CO_2$ capture relative to land area. Lastly, given the modularity of this design, there are clear opportunities to move toward larger-scale not only by scaling up, but also scaling out—taking advantage of components that are well-suited for high-volume production, which both accelerates the rate of scaling feasible and drives down cost/tonne over time.

Figure 2B:
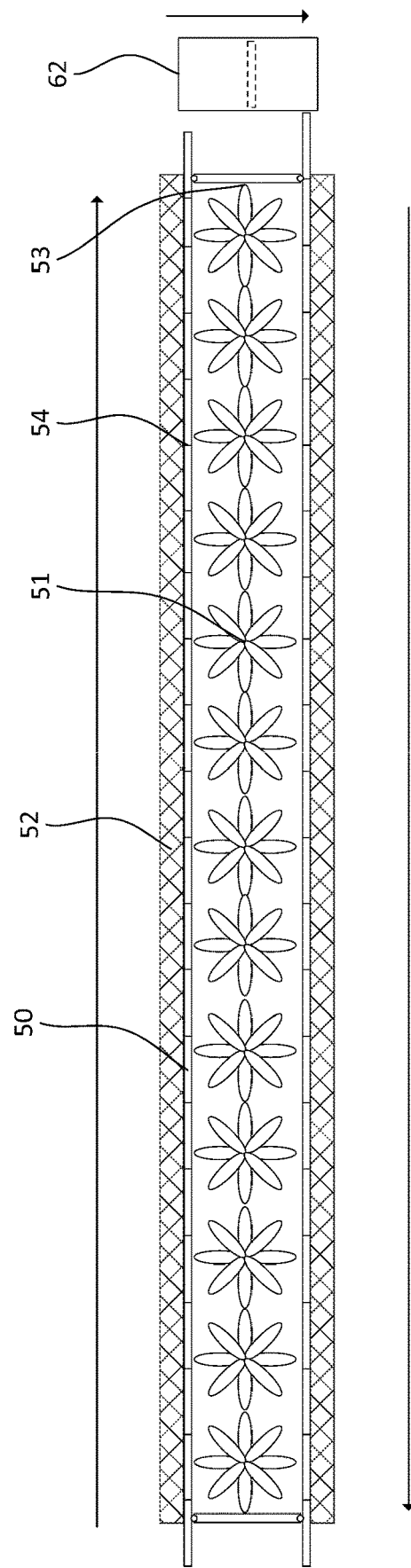
FIG. 2B provides a more detailed view of an exemplary adsorption system.

In one possible plant layout, the regeneration boxes [61] could be placed close to each other at the center of two sets of adsorber boxes [60a, b], as shown in FIG. 2A. The advantage of this layout is that larger, more expensive equipment, such as the heat pump and $CO_2$ compressors, could be located close to the regen boxes, minimizing the length of low pressure/vacuum ducting required. In order to achieve this, the adsorber panels [50] could travel along two flat "panel-walls" [54]—on one panel-wall the panels would travel away from the regen box, and on the other, they would return. The panels could switch from one side to the other on some form of lateral transfer station [62]. The approach shown in FIG. 2A is to have a conveying system that moves the panel at 90° to the direction of motion along the wall. The panel [50] leaving the adsorber/fan unit [60] would move into a waiting zone until completely disengaged from the air flow. It would then slide into a support frame that is supported on a movement trolly. The trolly and support, with the enclosed panel, would then move laterally to the other side of the adsorber/fan unit, and the panel would be unloaded into a waiting area before being collected by the movement system that carries it into the air flow. An enlarged view of the adsorber/fan unit is shown in FIG. 2B. Arrows indicate relative movement of the panels through the system.

In another embodiment, FIG. 3 shows a version of this process with a regeneration box [61] and a lateral transfer station [62] at each end of an adsorber/fan unit [60]. Arrows indicate relative movement of the panels through the system. One could also envision a system with a curved track for connecting from one side to the other, so that the panel always move along the same axis.

Figure 16:
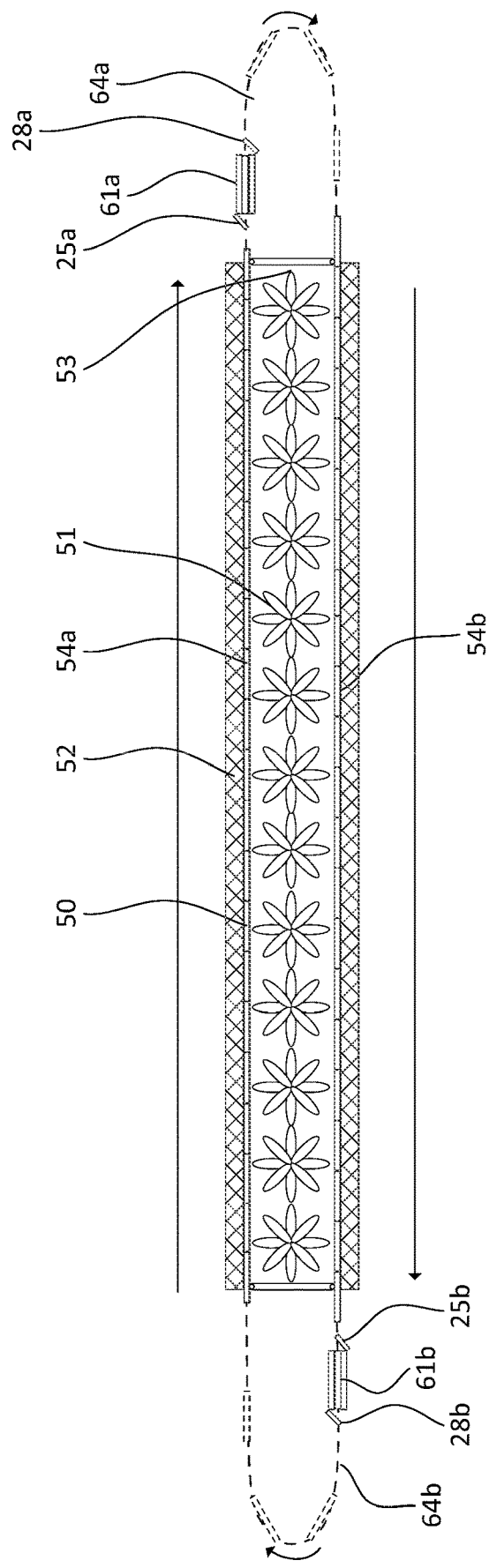
FIG. 16 illustrates an exemplary embodiment in which panels are moved around a curve when moving from one wall to another.

In another embodiment, FIG. 16, a curved track [64] may be used instead of a lateral transfer station. In this case, the panel [50] would move along the adsorber wall [54a] from left to right until reaching the end. It would then be transferred into one side of the regeneration station [60b] to complete the desorption cycle. The panel would then move onto the transfer rail [64a] to be conveyed to the entrance of adsorber wall [54b]. The panel may be supported by a rail or track at the bottom of the panel, or it may be hung from a rail at the top of the panel, or both.

Figure 15:
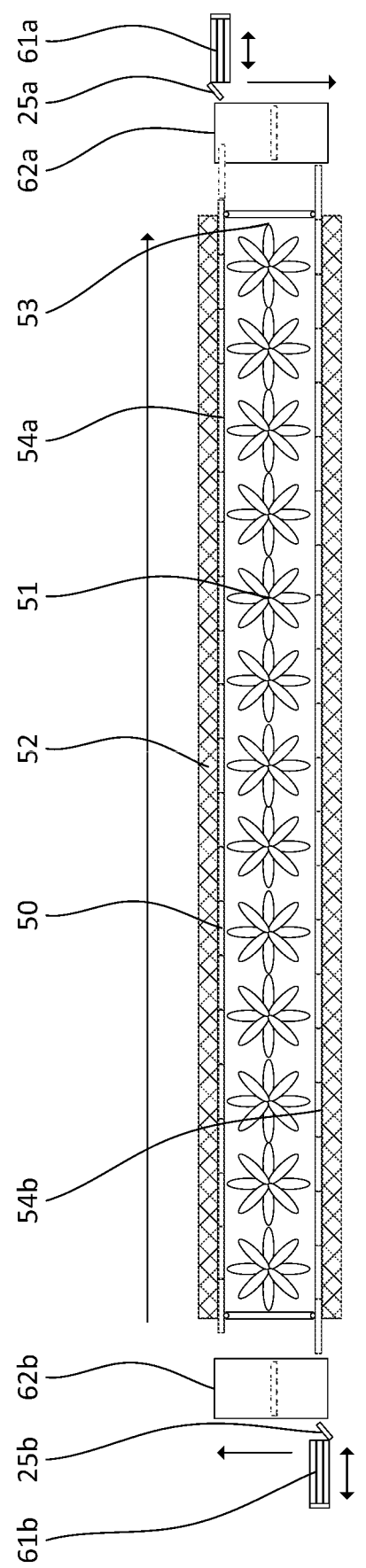
FIG. 15 illustrates an exemplary embodiment of a continuously moving adsorber wall with a batch regeneration system.

In an alternative embodiment, the linear movement wall could be combined with a single-chamber, batch regeneration box with two doors (as shown in FIG. 16) or with a single door (as shown in FIG. 15). In the single chamber, the inlet door may be opened, and the panel may be loaded into the chamber. The door may then be closed, and the air purged from the chamber, for example by the application of vacuum and/or the use of a sweep gas such as steam. The desorption steam may then be initiated, for example by relieving the vacuum with steam and allowing the chamber to heat up to a temperature at which $CO_2$ may be desorbed from the panel. The desorbing $CO_2$ may be removed from the chamber and recovered, for example by sweeping additional steam through the chamber. Once sufficient desorption is achieved, the panel may be cooled, for example by the application of vacuum or the use of an inert sweeping gas, such as nitrogen. Once the cooling step is complete and (if necessary) the vacuum is released, then the inlet door (in the case of a 1-door chamber) or the outlet door (in the case of a two-door chamber) may be opened and the panel removed, resetting the system for the next cycle. In the case of the two-door chamber, both doors may be opened at the same time, and the new panel loaded at the same time as the previous panel is removed.

In the embodiment shown in FIG. 15, the panels [50] may move along adsorber wall [54a] until reaching the end of the wall. The loaded panel [50] may be transferred across the lateral transfer unit [62a] and into regeneration box [61a]. The door [25a] to chamber [61a] may then close and the panel may pass through its regeneration cycle. Upon completion of regeneration, the panel [50] may exit the regeneration chamber [61a] and be loaded onto transfer station [62a], which may move the panel across to align with adsorber wall [54b]. The panel may then work its way along wall [54b] until repeating the regeneration cycle in regeneration box [61b]/transfer system [62b]. In the embodiment shown in FIG. 16, a 2-door regeneration box [61] is depicted. In this case, the panel [50] may move along adsorber wall [54a] until it reaches the end of the wall. At this point, the panel may be loaded into regeneration box 61a through a first door [25a], where it would be enclosed and complete the regeneration cycle. A second door [25b] may then be opened to allow the panel [50] to travel along the transfer rail [64a] to join adsorber wall [54b]. The panel [50] may then move along adsorber wall [54b] until it reaches the end of the wall. It may then be loaded into regeneration chamber [61b] through door [25b] for regeneration. It would then leave through door [28b] to be transported back to adsorber wall [54a] by transfer rail [64b].

Figure 19B:
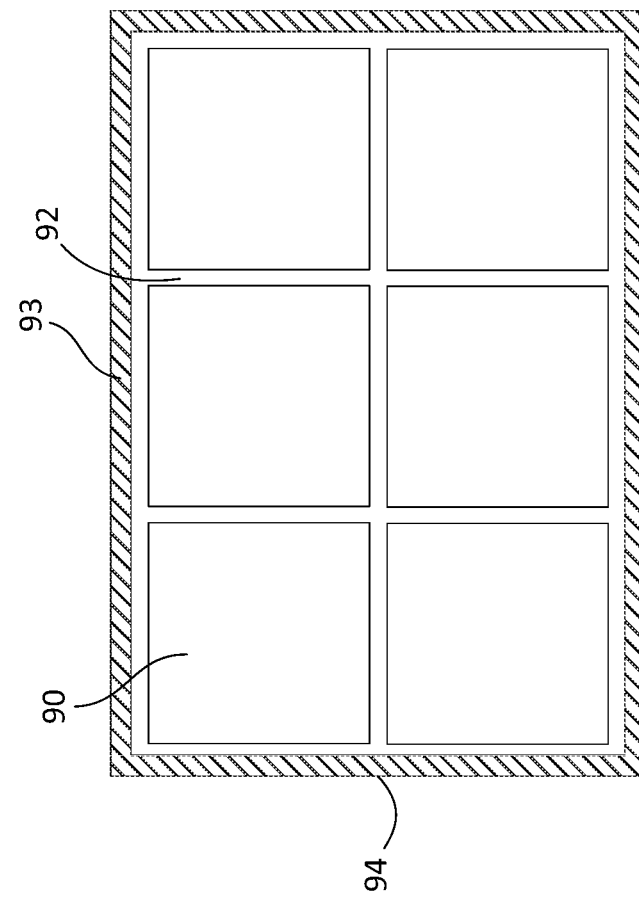
FIGS. 19A-19B illustrate the components from which a panel may be constructed.
Figure 19A:
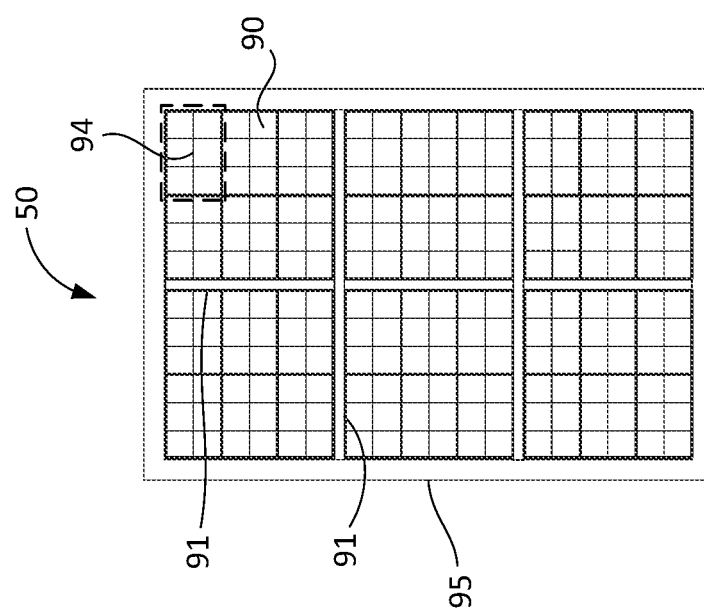

FIG. 19A illustrates a possible configuration of the panel [50] and identifies some possible components. The panel [50] is a larger, structurally integrated element that can be moved as a single unit. It comprises a large number of individual adsorber units, for example monolith bricks [90], each of which may comprise a high area-to-volume ratio, porous substrate which supports the $CO_2$ sorbent. A monolith brick is a substrate material that has been formed to have air flow channels running through it in one direction that are of moderate dimensions (mm scale) separated by porous walls. The pores in the walls are coated with a sorbent that temporarily binds $CO_2$. An array could include 1, 2, 3, 4, or 5 adsorber units in a row. In some embodiments, the arrays may be 2 adsorber units×2 adsorber units, 2 adsorber units×3 adsorber units or 2×4 adsorber units, the array may be 3×3 adsorber units. The pores may have a very small diameter such that the overall system has a high surface area relative to its overall volume. The substrate may be a ceramic material.

These individual adsorber units [90] may be assembled into arrays [94] to facilitate the assembly and operation of the panel [50]. In this embodiment, the panel [50] includes a set of adsorber arrays [94] that are either in contact with each other or separated by support shelves or support frame [91]. As depicted in FIG. 19A, panel [50] includes thirty-six monolith arrays [94] and each monolith array includes six adsorber units [90]. The support shelves [91] both provide structural rigidity to the panel frame [95] and prevent the weight of the upper monolith arrays from crushing the lower ones. FIG. 19B shows a magnification of a single monolith array [94]. In this embodiment, the highlighted monolith array contains six (6) adsorber units [90] that are separated by a sealant [92]. The sealant [92] evens out non-uniformity in the size of the individual adsorber units [90]; provides some relief for stresses caused by frame [95] and shelf [91] thermal expansion and movement; and glues the panels in position relative to each other. The monolith array [94] may be held in place and supported by an array frame [93] that may be made of a rigid material such as steel or aluminum; or of a more plastic material, such as silicone foam to absorb deformation of the steel frame [91] induced from thermal expansion or panel movement.

Alternative Orientation of the Panels: Horizontal (vs. Vertical)

Many of the embodiments described have utilized panels in a vertical orientation, so that a plane of the panel surfaces is perpendicular with respect to the ground and the gases flow through the panels in a horizontal path. In another embodiment, the panels are oriented horizontally such that a plane of the panel is parallel to the ground, and the gases flow through the panels in a vertical path.

One key advantage of having a horizontal panel (panel in a horizontal orientation) is that it has materially greater stability—the panel can be supported at multiple points and therefore, the risk of tipping is greatly reduced (compared to a vertical orientation). The weight of the panel is also more widely distributed, and the center of gravity is at a similar level to those support points.

In one configuration, the panels travel together continuously at different levels but in the same vertical plane, as illustrated in FIGS. 20A-20B (side views). In this configuration, the panels could be configured to have the air entering the system between the panels from the side (into the page) and leaving through the panels with both an upward and a downward direction (FIG. 20A) or through two or more panel layers (FIG. 20B). In both cases, panel [50a] would move along the track at one level before leaving the adsorber box [60] as panel [50b] and being lifted (FIG. 20 A) or lowered (FIG. 20B) before returning to the air flow on the other track (panel [50c]). For the embodiment shown in FIG. 20B, the freshest air would flow through the more loaded panels on the bottom first (maximizing the load on those panels), and then through the less loaded panels (to capture some of the remaining $CO_2$ in the air, to maximize potential $CO_2$ capture overall). The embodiments presented in FIGS. 20A-20B show tracks at just two levels, but alternative embodiments could have 3, 4, 5 or more layers. The air may be blown in through an opposite wall by fans that face each other so that the air may only escape up or down through the panels. Alternatively, the walls may be open and fans may suck air up through the panels. Alternatively, the air flow could change direction because the volume between or under the panels may have a higher pressure than the volume above (and below) the panels. Alternatively, vanes or other means may be used to redirect the flow of air from the incoming horizontal direction to vertical.

Figure 21:
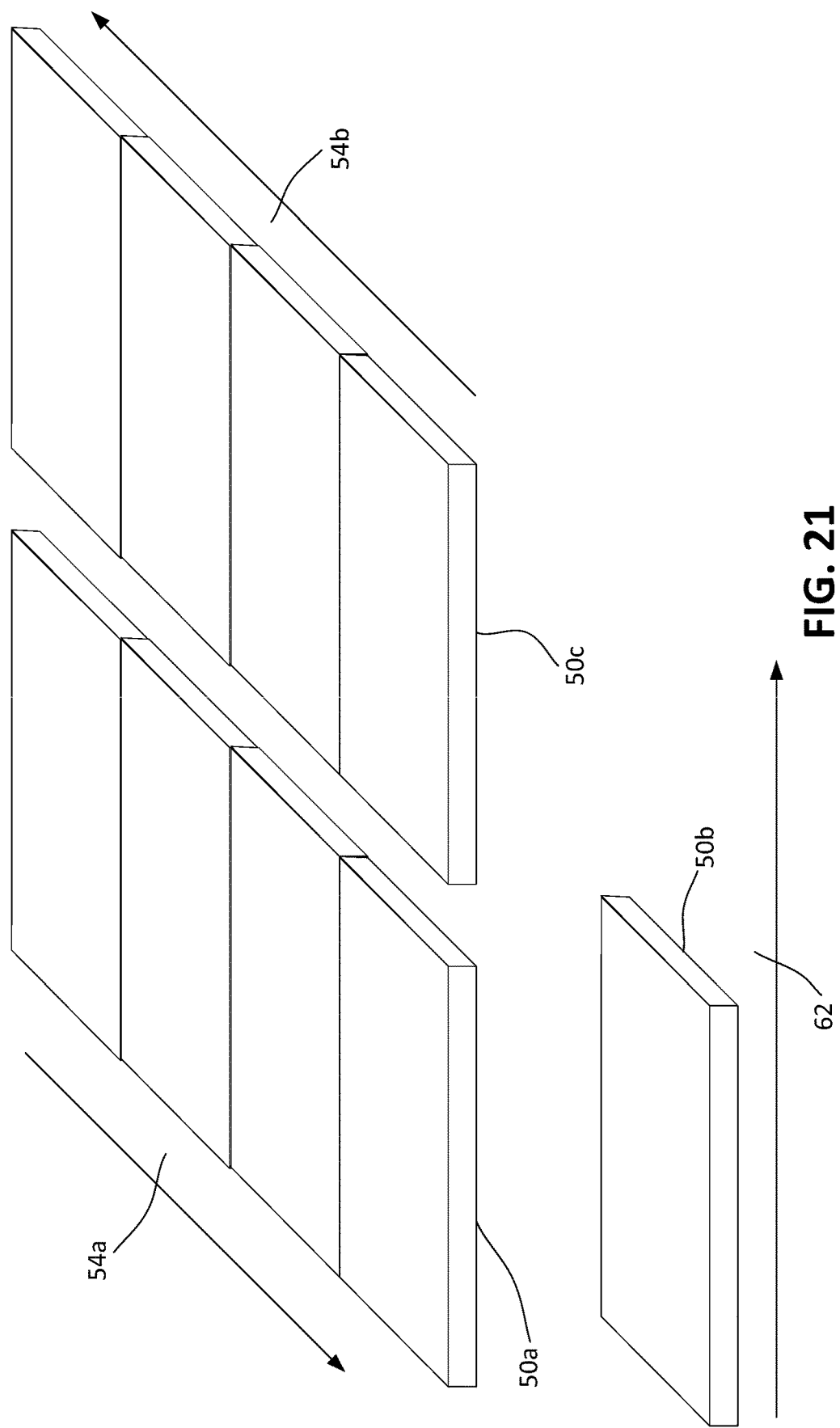
FIG. 21 illustrates a configuration of parallel horizontal panels at the same elevation.

FIG. 21 shows an alternative possible arrangement, where the panels [50] travel in parallel adsorption tracks [54] at the same elevation in opposite directions (see arrows). In this embodiment, panels move continuously along panel track [54a] in the adsorption area, with air blowing through them in a vertical direction. When a given panel [50a] reaches the end position in the adsorption track [54a], it is moved into the lateral transfer station [62] as seen with panel [50b]. This panel may move across from one track to the other at the same elevation and then return as panel [50c] to the starting position of the second track [54b]. This embodiment shows two tracks, but in alternative embodiments there may be just one track, or alternatively 3, 4, 5, or more tracks in parallel.

Figure 22:
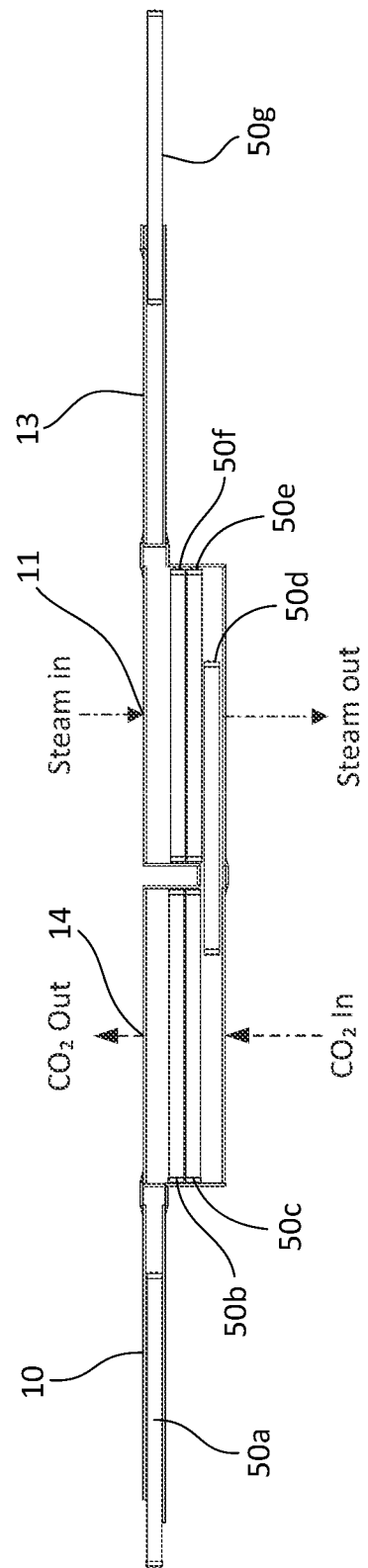
FIG. 22 illustrates a side view of a configuration for panel regeneration in the horizontal orientation.

FIG. 22 shows one possible embodiment for the regeneration system in a horizontally oriented system and illustrates a side view of the system. Panel [50a] may leave the adsorption system and enter the air purge zone [10] at the same elevation as the adsorption track. The panel may then leave the air purge zone [10] and enter a preheating zone [14] at the same elevation as the air purge zone. The panel [50b] may then be lowered through the heating gas, and more than one panel (see, e.g., [50c]) may be enclosed in this zone, allowing for counter-current heating to occur. The panel [50d] may then move from the preheating zone [14] to the steaming zone [11] at the reduced elevation, and then moved upwards through the downwards flow of steam. As seen in FIG. 22, the panels in the steaming zone [11] may move in the opposite direction of the steam flowing into the chamber. In one embodiment, more than one panel may be enclosed in the steaming zone [11] (such as panels [50e] and [50f] in this illustration) and rise until they reach the elevation of the adsorption system. The top panel [50f] may then be transferred from the steaming zone [11] to the cooling zone [13] at the elevation of the adsorption system. Upon completion of cooling, the panel [50g] may then be transferred from the cooling zone [13] to a panel return system that delivers the panel back to the adsorption track.

A key advantage of operating with more than one panel in the preheating box [14] is that the time that can be used for preheating an individual panel is increased in a system with a fixed cadence—if a new panel enters the heating system once per minute and there is only one panel in the heating system, then the maximum time available to heat that panel is 1 minute. If there are two panels with a 1-minute cadence, then the maximum heating time is 2 min and so on. Thus, with more panels in the heating zone and a fixed cadence, it should be possible to increase the amount of energy that can be transferred into a given panel. Also, running the gas in a counter current flow through the panels means that the cooler gas contacts the coolest panel and the gas leaving the heating chamber will remain cooler through the cycle, maximizing the driving force on the external air heater.

A further advantage of the horizontally oriented panels is also illustrated in FIG. 22—there is no need to match the length of the steaming zone [11] to the separation of the panel walls as there is in the vertical orientation. This allows for a smaller steaming chamber and makes it easier to have the panel frames close to or in contact with each other. This may make it easier to seal the gaps between the panels and thus minimize the hot gas/steam flow that bypasses the internals of the frame.

Figure 23B:
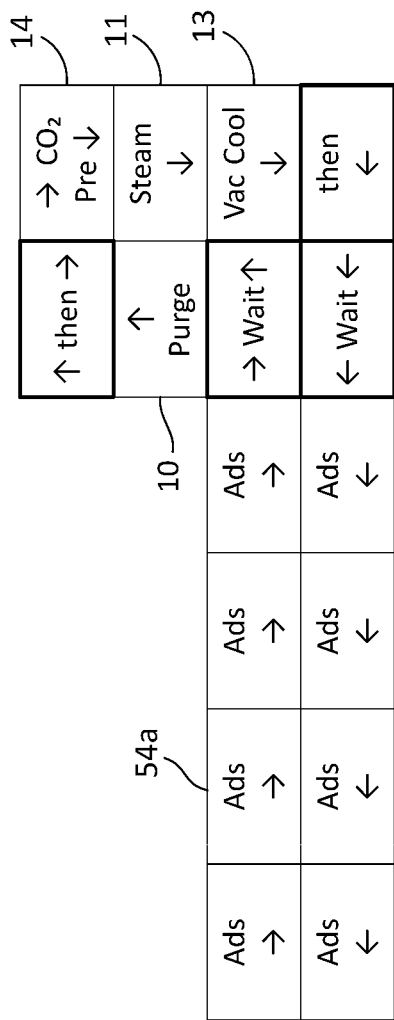
FIGS. 23A-23C illustrate exemplary layouts for single track horizontal panel adsorption systems and their possible interaction with the regeneration steps.
Figure 23C:
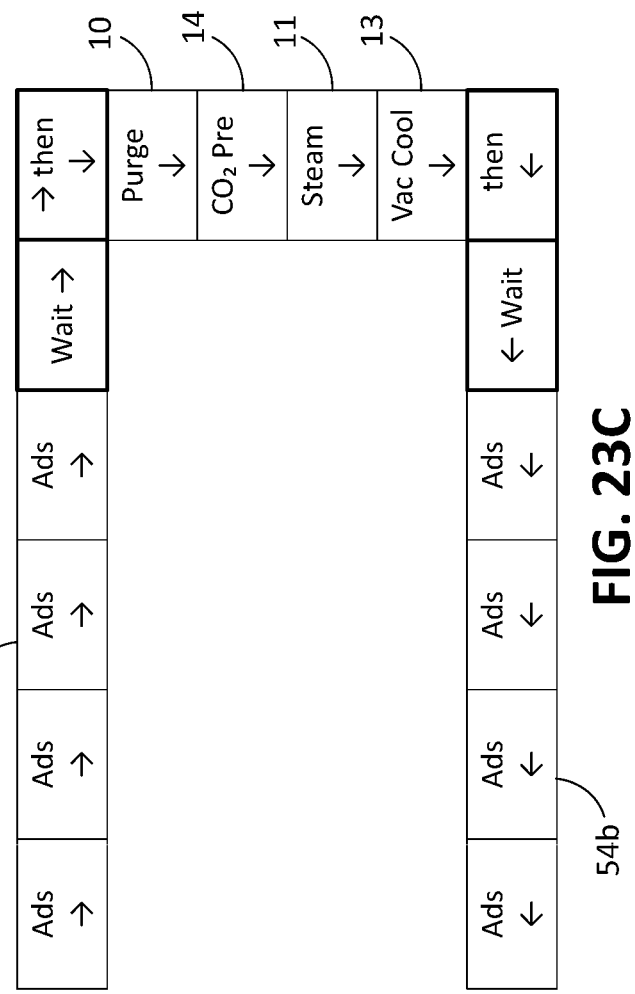
Figure 23A:
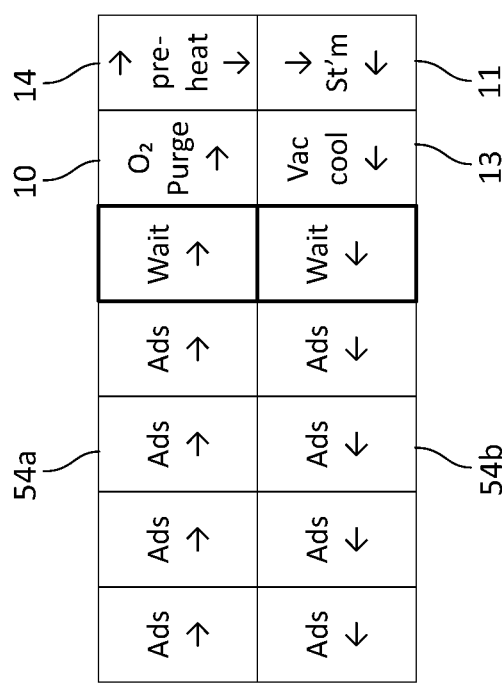

FIG. 22 shows just one possible embodiment of the regeneration system. In alternative embodiments, additional operating steps (such as additional panel cooling) may be applied, and/or where panel preheating occurs independently of the elevation change. In other embodiments, the steam chamber discharge level may be at a different elevation to the panel track and where there are additional devices to change the panels' elevation. FIG. 22 also shows a linear design, which may be particularly useful in a "2-adsorber" configuration similar to that illustrated in FIG. 2A. In other embodiments, a lateral transfer device may be used to have some of the regeneration steps take place in line with the second adsorption track. FIGS. 23A-C illustrate some possible embodiments of this approach, providing a top-down view of the approximate position of equipment.

In FIG. 23A, panels may move along panel track [54a] towards an unloading zone before moving into the air purge zone [10] and then into the preheating chamber [14]. In one embodiment, the panel may move downwards in the preheating chamber [14] and then exit on a track at a lower level and in a direction orthogonal to the direction in which it entered the chamber, moving into the steaming chamber [11]. The panel may then be elevated as it moves through the steaming chamber [11] before moving through a door into the cooling chamber [13]. In this embodiment, the direction of travel leaving the steaming chamber is orthogonal to the direction of entry in order to minimize the overall space required and travel distance of the panel. After cooling, the panel may move through a staging area before returning to the adsorption system on track [54b].

FIG. 23B shows an alternative arrangement in which the panels may move along the adsorption track [54a] on their long axis before exiting into a staging area that allows for a lateral move into the air purge chamber [10] with a move in the direction of it second axis. Upon exiting the purge chamber, the panel moves through a staging area where it makes another change in direction to enter the preheating chamber [14] at the same elevation as the adsorption tracks. The panel may then be lowered in the preheating chamber [14] and then moved into the steaming chamber [11], where it may be elevated. The panel may then be transferred into a cooling chamber [13] and, after completing the cooling step, it may enter a staging area and return to the outgoing adsorption track [54b].

FIG. 23C shows yet another possible embodiment in which the adsorption tracks [54a] and [54b] may be separated from each other by a greater distance. In this configuration, the panel may leave panel track [54a] and enter a staging area that may move the panel away from the panel track [54a] and then in an orthogonal direction into the purge zone [10]; from there, the panel may move through an upper level door into the preheating chamber [14] where it may be lowered and warmed up, before it may move through a door at a lower level into the steam zone [11]. The panel may then leave the steaming chamber [11] through a door at the upper level and enter the cooling chamber [13]. From the cooling chamber [13], the panel may move to a transfer area to effect an orthogonal change in direction, and it may be reloaded onto the outgoing adsorption track [54b].

Figure 24A:
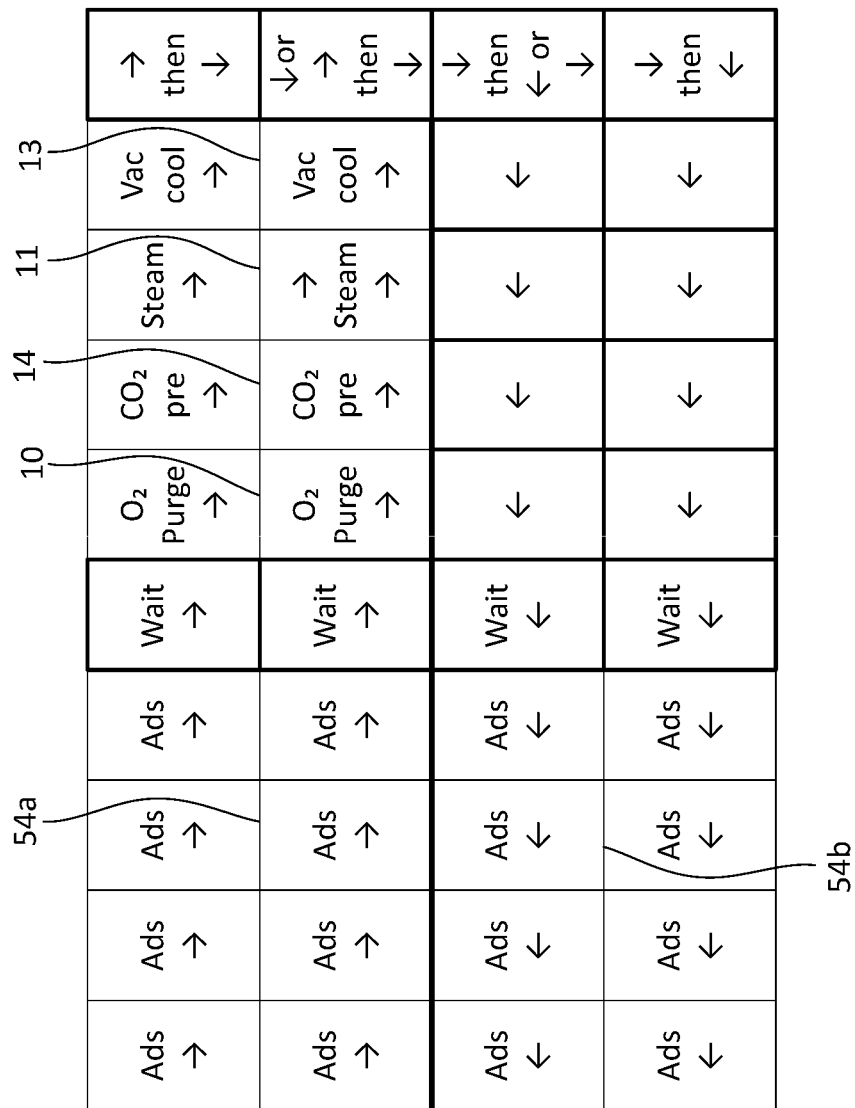
FIGS. 24A-24C illustrate exemplary configurations for dual track horizontal adsorption systems and their interaction with regeneration.
Figure 24B:
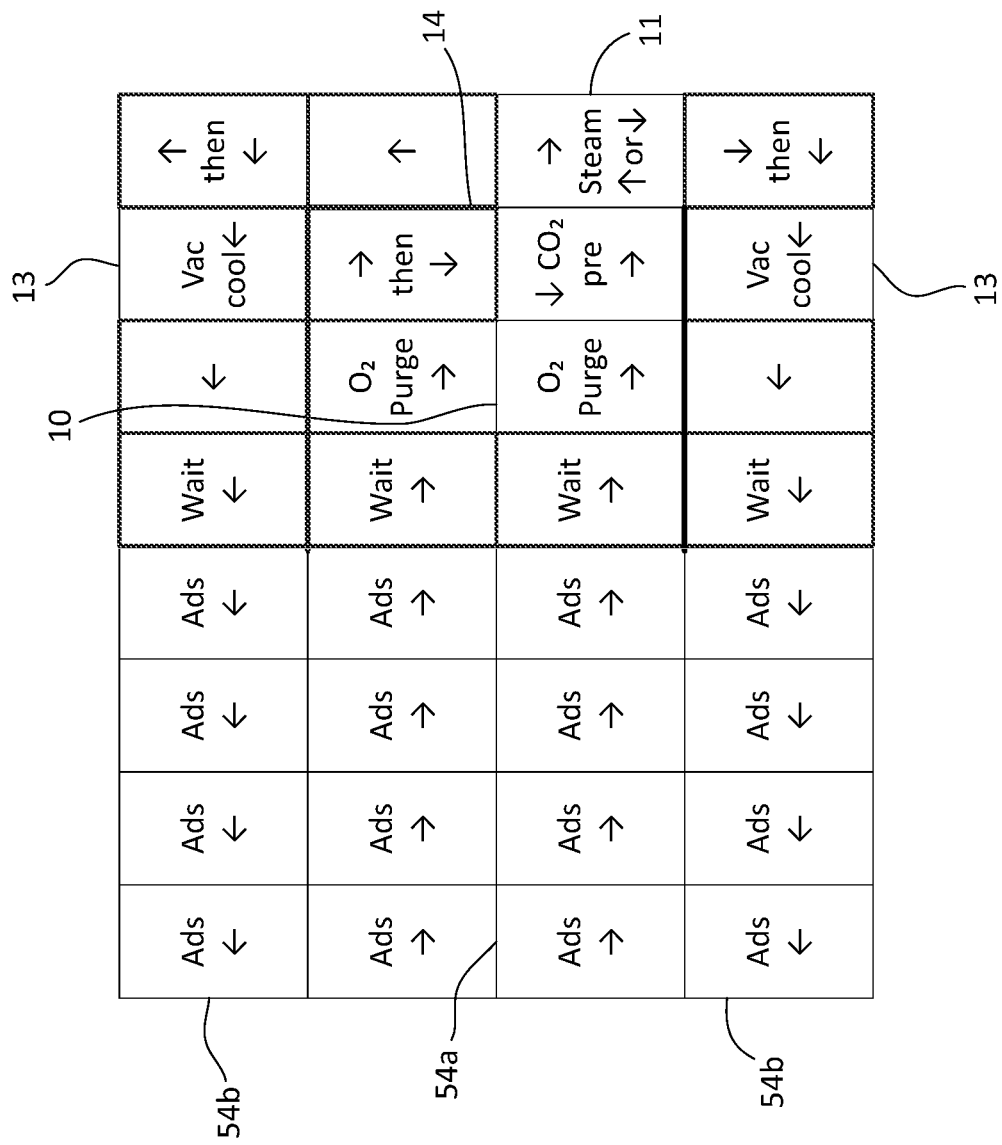
Figure 24C:
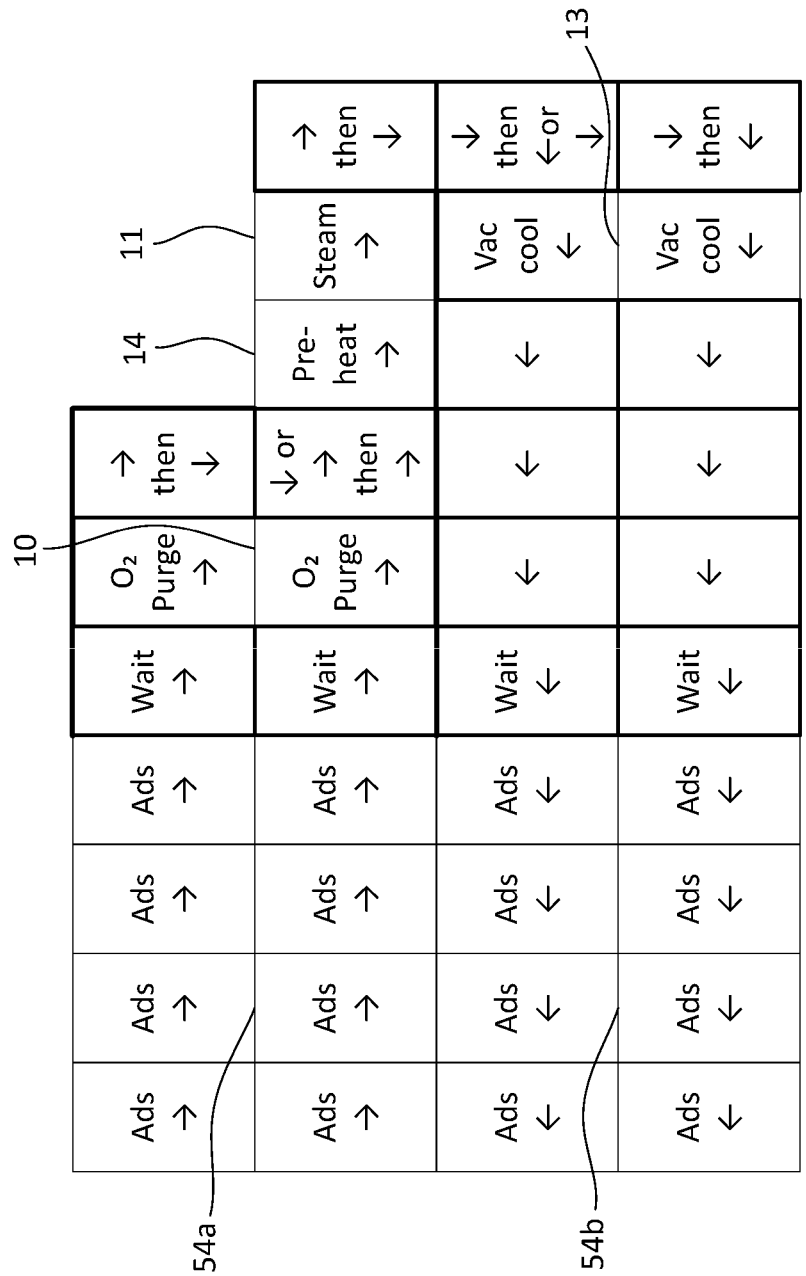

FIGS. 24A-24C shows some possible embodiments for a multi-track adsorption system. In the embodiment illustrated in FIG. 24A, there may be two parallel adsorption tracks [54a] that run side-by-side to parallel staging areas. The panels may then be loaded into two separate but parallel air purge zones [10] and on into independent preheating chambers [14]. Continuing to move in the same direction, the panels may subsequently enter the steam desorption chambers [11] before finally entering the cooling chambers [13]. The panels may then be collected in staging areas and returned to the outgoing parallel adsorption tracks [54b]. The advantage of this configuration is that the panels move through all of the regeneration steps and the segregation doors in the same direction, and the lateral movement is deferred to a single end station, though this approach may require more space, and may require additional travel distance/time to return to the panel track.

FIG. 24B illustrates an embodiment in which the center two tracks [54a] may perform the "return" trip, and may pass panels from the adsorption region through a staging area and into parallel purge zones [10]. The panels on these parallel tracks may be staggered in terms of their sequencing, such that they may enter and leave the air purge zones [10] at different times, so that they may be transferred into a common preheating zone [14] at different times. If the preheating zone lowers the panels, then subsequent panels may be "stacked" vertically whereby they may move in the same vertical plane but occupy different elevations at any given time. The panels may or may not be in physical contact with each other. The panels may then leave the preheating chamber [14] and enter the steam desorption zone [11], where they may rise up through a downward flow of hot gas (e.g., steam or a steam/$CO_2$ mixture). The panels may be withdrawn from the steaming zone [11] in alternating directions to be transferred to independent cooling chambers [13], and then subsequently may be transported back to the "outgoing" panel tracks [54b], which in this embodiment occupy the outer two tracks. One advantage of this configuration is that the size of the doors to the vacuum chambers [10] and [13] can be kept relatively small, while common preheating [14] and/or steaming chambers [11] may enclose more panels and achieve a closer approximation to continuous counter-current flow without increasing the overall residence time of an individual panel in the hot zone.

FIG. 24C illustrates an alternative configuration of the dual track adsorption [54]/air purge [10]/cooling [13] system with a common preheating [14] and desorption [12] system in which both the outgoing [54b] and return [54a] adsorption tracks may be next to each other. The layout of the stations is also configured to minimize the number of places in which the panel changes direction in the enclosed spaces.

Figure 25B:
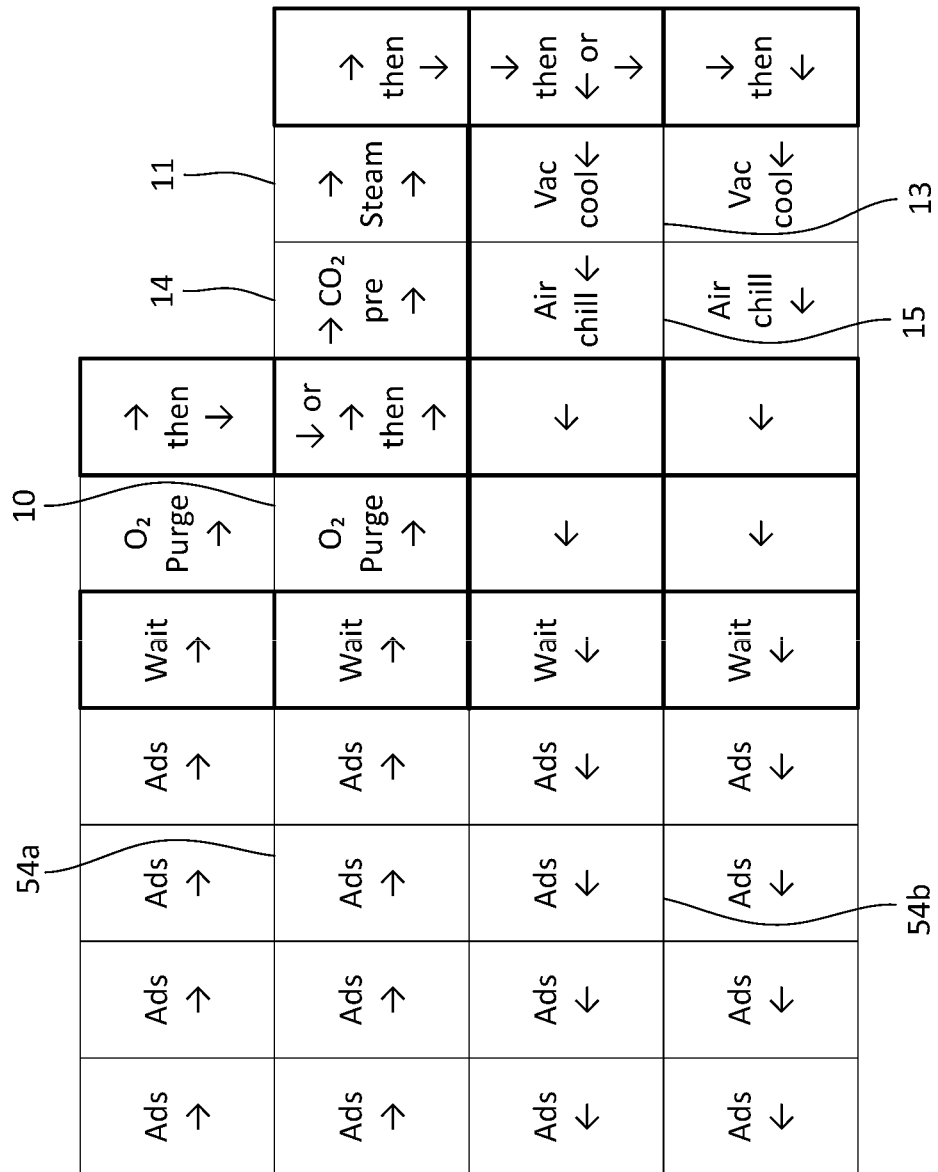
Figure 25C:
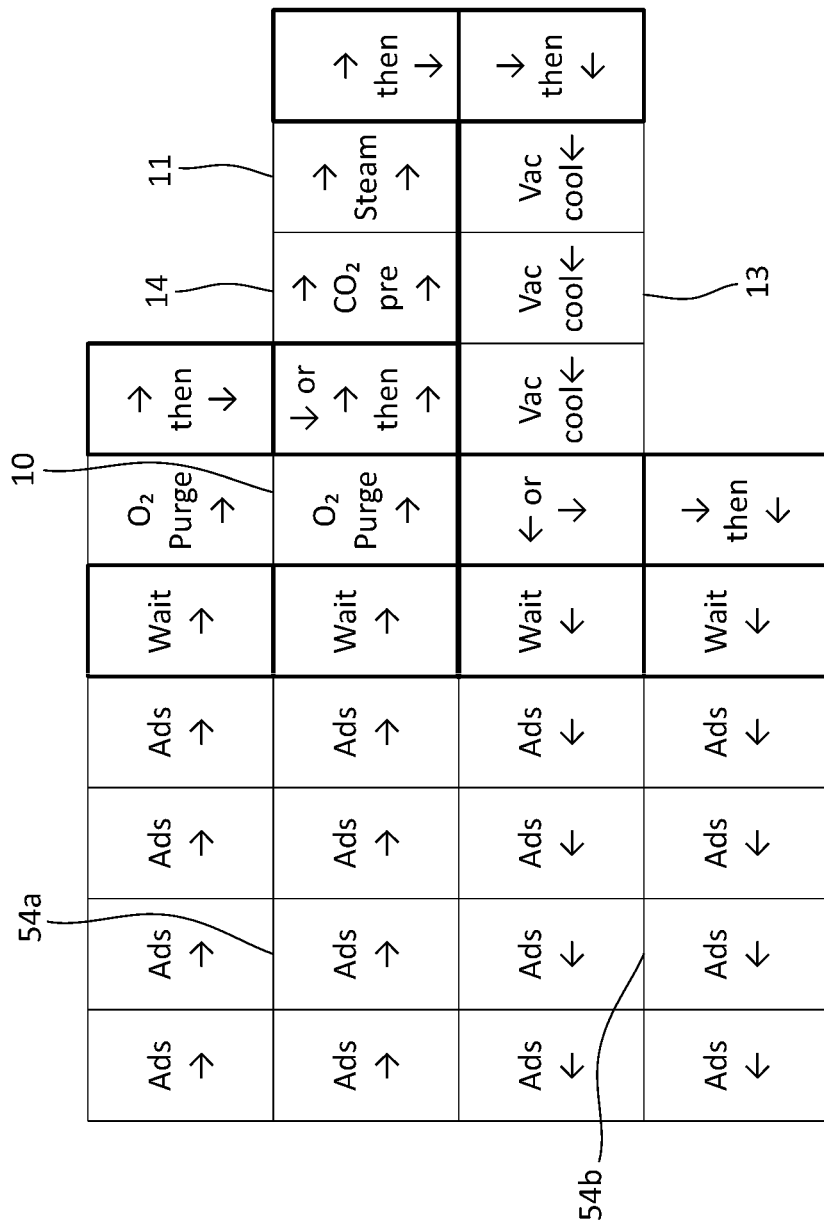

FIGS. 25A-25C illustrate some embodiments in which the dual track adsorption system is combined with separate vacuum zones ([10] and [13]) but common preheating [14] and steaming [11] systems. All of these embodiments are also configured so that the panel does not change direction in the horizontal plane while inside a processing step—all the lateral movements take place on tracks outside of the processing zones. In FIG. 25A, the adsorption track [54b] has been extended so that the long transfer zone illustrated in FIG. 24C may be used for additional $CO_2$ capture. In FIG. 25B, part of that space may be used to perform a secondary cooling [15], similar to that described in FIG. 18. In FIG. 25C, a multi-chamber cooling in zone [13] is depicted, similar to that described in FIG. 6B.

Figure 26:
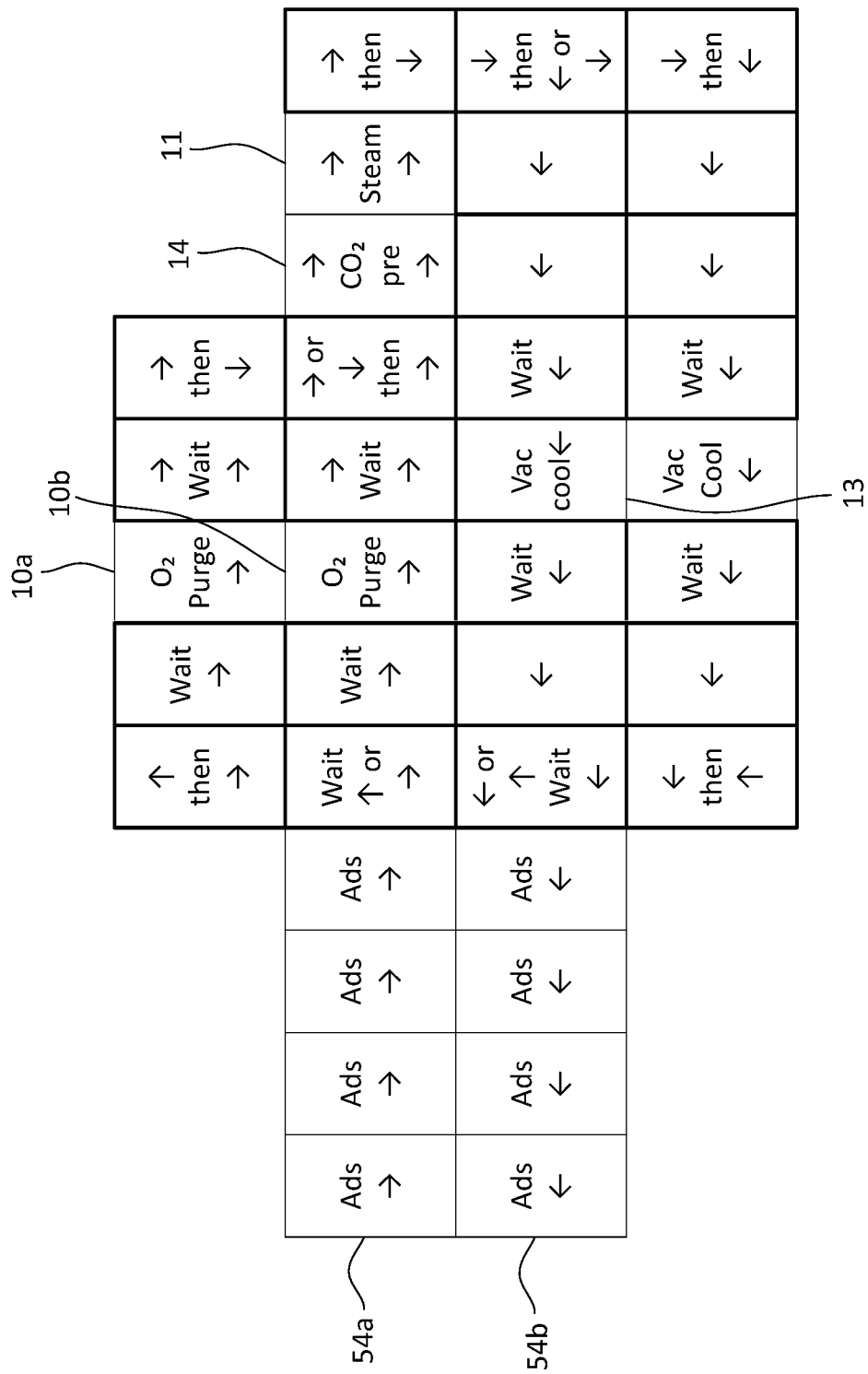
FIG. 26 illustrates an exemplary configuration for a single-track horizontal adsorption system interacting with double-chamber vacuum regeneration steps.

FIG. 26 shows yet another embodiment of the process that combines a single-track adsorption system with separated vacuum steps. The panels may move along the return adsorption track [54a] before entering a staging area where they may either move forward into one air purge zone [10b] or move laterally and then move into a different air purge zone [10a]. The operation of these air purge zones may be staggered in time to allow for continuous movement of the panels in the adsorption track [54a] and into the common preheating chamber [14]. Additional transfer station space may be used to allow panels time to move while maintaining a rapid cadence through the processing steps, thus allowing panels to have longer transfer distances (and thus transit times, for example travelling to air purge zone [10a] as opposed to [10b]) to remain synchronized with panels that have short transits. In this embodiment, the panels may move from air purge [10] to a common preheating [14] and steaming zone [11], where the panels from different air purges may be stacked to improve counter current flow performance. After the steam zone [11], the panels may once again be separated to run through independent cooling chambers [13], before being moved back onto the same outgoing panel track [54b].

Figure 38:
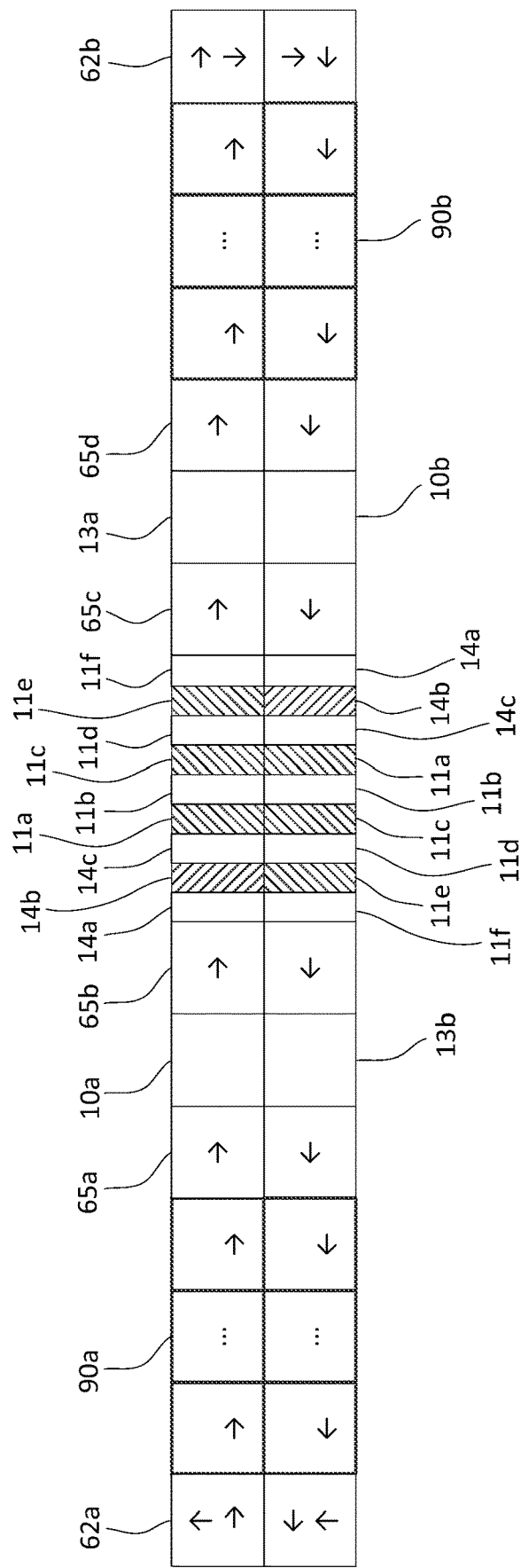
FIG. 38 illustrates an exemplary single-plane version of an adsorption and regeneration system in a horizontal orientation.

A plan view of another possible embodiment of the horizontally-oriented system is illustrated in FIG. 38. In this configuration, the $CO_2$ preheat [14a-c] and steaming [11a-f] zones are configured in a horizontal orientation, in order to avoid the change in elevation of the panel that is illustrated in FIG. 22. Rather, the gas flow in those zones may be set up to flow back and forth across different planes of the chamber, through the continuously moving panels (as illustrated in FIG. 6), though it is noted that the gas flow may also be ducted around the panel between passes, so that the flow of gas through the panel is always in the same direction.

In FIG. 38, the panels may move continuously throughout the adsorption train [90a] and the last panel in the train may gradually leave the air flow to fill a transition area [65a]. When the panel is fully out of the air flow, the panel may move quickly into the air purge chamber [10a], where oxygen may be removed by a combination of pulling vacuum, displacement with steam, $N_2$ or some other inert gas, and heating. The panel may move quickly out of the air purge chamber [10a] to another transition area [65b] after which the panel may be moved continuously into an (optional) $CO_2$ preheating zone [14a-c] where heated $CO_2$/steam may flow through subsections of the panel in order to achieve counter-current flow of the panel with respect to the hot gas (as detailed in FIG. 6). For example, the hot gas may move up through zone [14c], then down through zone [14b] and then up again through [14a]. Alternatively, the hot gas may flow up through [14c], be ducted around the train and flow up through [14b], be ducted around again and then flow up through [14a]. The preheated panel then may continue directly into the steaming zone [11a] (or directly from the air purge chamber into this zone, if the optional $CO_2$ preheating zone is not utilized), where again the steam may flow through the panels in a series of sub-chambers such that a counter-current flow pattern is achieved. For example, the panel may move from zone [11a] to [11f] while the steam flows into [11f] then to [11e], [11d], [11c], [11b] and [11a] in sequence. As the panel leaves the steaming zone [11f], it may enter a transition area [65c] and, once fully out of the steam, the panel may move rapidly into the cooling chamber [13a], where the panel may be cooled and dried with a combination of vacuum, nitrogen, air, or other gases such that water evaporates and the panel temperature reduces. Once the cooling cycle is complete, the panel may move into a transition zone [65d] where the panel may join the train of panels in the adsorption system [90b]. In the embodiment depicted in FIG. 38, there are two adsorption trains [90a and 90b] and two parallel desorption trains, but other configurations (such as where there is only one desorption train)—similar to those depicted in FIGS. 24-27—may readily be envisioned. Similarly, FIG. 38 illustrates a design in which there are three preheating sub-chambers and six steaming sub-chambers in each desorption train. One could readily envision embodiments with fewer (0-2) or more (4-10)

preheating sub-chambers and with fewer (1-5) or more (7-14) steaming sub-chambers.

Figure 41:
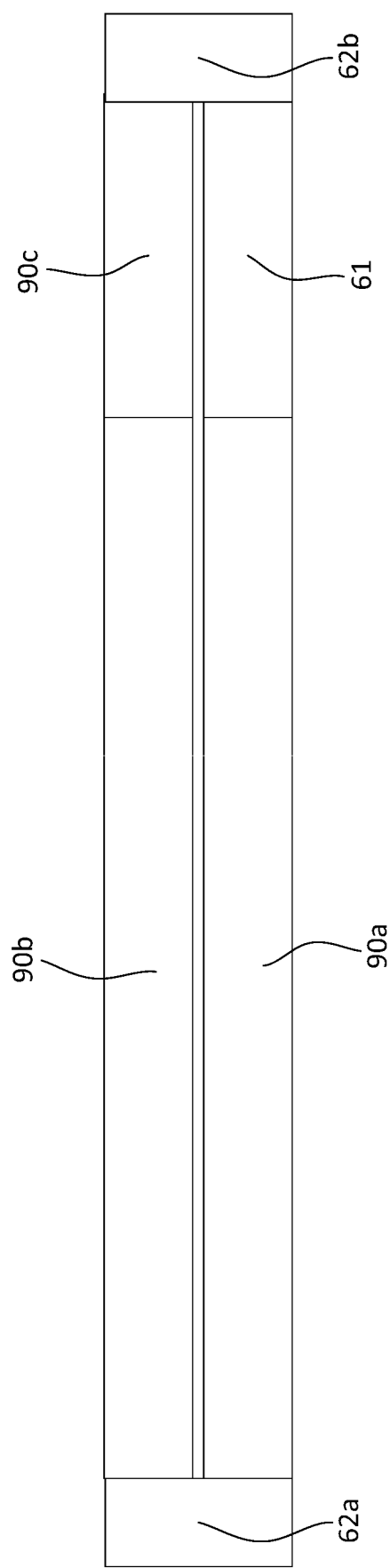
FIG. 41 illustrates an exemplary single-plane, continuous, horizontally-oriented system with a single regeneration area.

FIG. 41 illustrates an exemplary single-plane, continuous, horizontally-oriented system with a single regeneration area. As shown in FIG. 41, the system may include three adsorption train sections [90a-90c], two lateral transfer units [62a and 62b], and a single regeneration chamber [61]. The panels may move continuously from the first adsorption train [90a] through the first lateral transfer unit [62a], the second adsorption train [90b], the third adsorption train [90c], and the second lateral transfer unit [62b] before arriving at the regeneration chamber [61]. In other embodiments, the movement may be in the reverse direction. The illustrated layout, which includes a single regeneration chamber [61] along one of two parallel tracks in the DAC system, may be appropriate for smaller DAC operations, e.g., where the total adsorption track is relatively short.

Figure 39:
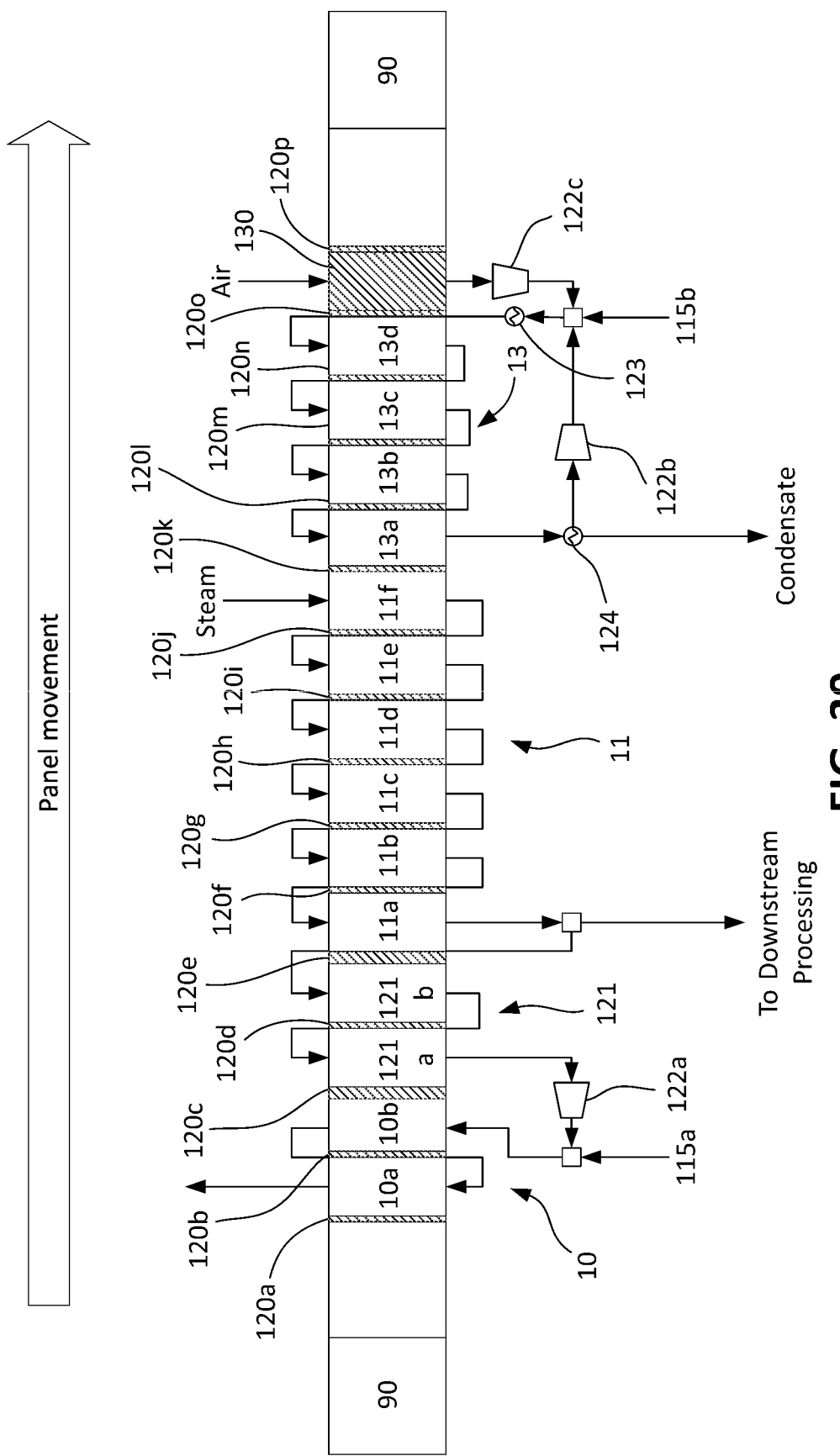
FIG. 39 illustrates an exemplary single-plane, continuous version of a horizontally-oriented system with parallel regeneration areas.

FIG. 39 illustrates another exemplary embodiment of the process in which the panels move continuously through the system and an inert gas [115], such as nitrogen, may be used in place of vacuum to (i) displace air in the purge step [10] and (ii) provide cooling in the cooldown step [13]. An advantage of a continuous regeneration system is that the panel does not need to be accelerated into and out of the vacuum chambers, and the overall cadence of panel movement may therefore be increased. In this embodiment, the panels may move continuously out of the adsorption region [90] and directly into a counter-current air displacement zone [10] where an inert gas such as nitrogen may be used to displace the air in the void space around and inside the panel. Because the individual adsorber units are made up of a series of narrow air flow channels, the displacement of air may be expected to be close to plug flow in nature—the air flow channels serving almost like a series of parallel drinking straws. In this embodiment, the air displacement chamber may be divided into two sub-chambers—an upstream [10a] and a downstream [10b] region—separated by a gas seal [120b]. The fresh inert gas [115a] may enter into the downstream sub-chamber [10b] and displace the gas in the panel void space. The flowrate of gas may be set such that a given volume of gas is introduced into the downstream sub-chamber [10b] in the time required for a point in the panel to move through that same sub-chamber. The volume of gas introduced may be between one and two times the void volume of the enclosed sub-chamber, such that all the incoming gas in the void space is displaced, although the volume of gas may also be between ½ and one times the void volume, or between two and three times the void volume—or more.

The gas introduced into the downstream sub-chamber [10b] of the air purge section may displace gas into the upstream sub-chamber [10a] and this in turn displaces the air in the panel out of the system. If the flowrates of gas are balanced carefully, the nitrogen in the downstream sub-chamber [10b] may displace the gas in the panel entering that sub-chamber, such that the gas flowing from the downstream to the upstream sub-chamber [10a] is mostly air with a small quantity of nitrogen. The gas flowing into the upstream sub-chamber [10a] may fully displace the incoming air, so that very little nitrogen escapes with the displaced air from the upstream sub-chamber [10a] and thus the loss of nitrogen may be reduced. Although FIG. 39 depicts two sub-chambers, more chambers could be included.

The panel moves from the air displacement chamber [10a, 10b] into the nitrogen recovery chamber [121] through a set of seals [120c] such as those described in FIGS. 37A-37C-2. Optionally, the nitrogen recovery chamber [121a, 121b] may be operated under a slight vacuum (0.5 bara, alternatively 0.25-0.75 bara, alternatively 0.05-0.95 bara), to facilitate nitrogen recovery and removal. This reduced pressure may be achieved with fan or vacuum pump [122a], so that the recovered nitrogen partially displaces the need for fresh $N_2$.

The displacement of nitrogen may be achieved with steam, $CO_2$ or a mixture of steam and $CO_2$, as may be recovered from the steaming chamber [11]. The steaming chamber [11] may have multiple sub-chambers [11a]-[11f]. This displacement is similar to that described for the air displacement in chamber [10]—the displacing gas mixture enters the downstream sub-chamber [121b] at a rate sufficient to displace between 1 and 2 void volumes per panel transition time (or, in alternative processes, less than 1 void volume, or 2-3 void volumes—or more). Thus, the panel void space leaving the chamber [121b] may comprise mostly steam while the gas leaving chamber [121b] and entering [121a] may comprise primarily displaced $N_2$. This $N_2$-rich mixture will then displace the $N_2$ gas entering the upstream sub-chamber [121a] with the panel coming from sub-chamber [10b].

Because the panel entering the $N_2$ recovery chamber [121] may be relatively cool and has been adsorbing ambient air, the $CO_2$ and steam mixture may interact with the panel—some of the $CO_2$ may adsorb and some of the steam may condense, heating up the panel. While the $N_2$ displacement may not be as straightforward as the displacement observed in the air displacement chamber [10], the same basic principles would apply—a "standing wave" would be set up with most of the $N_2$ being displaced and only a little $CO_2$ and water vapor escaping to the nitrogen recovery fan [122a].

The potential advantage of operating the $N_2$ recovery chamber [121] at a slight vacuum is that the temperature at which the steam can condense is more limited. For example, at 0.5 bara, the condensing temperature of pure water is 81° C., so that is the hottest the panel can get through the action of steam condensation. It may be advantageous to maintain the panel temperature at a level below which significant $CO_2$ desorption occurs.

Because short-circuiting and back mixing of the gas between sub-chambers may be detrimental to the overall performance of the system, sealing between the gas spaces of the sub-chambers may be required; as the differential pressure across the different sections increases, the flowrate through any gaps in the seals will increase. Thus, it may be beneficial to have larger, multi-contact point seals [120a] around the vacuum section.

From the $N_2$ recovery section [121], the panel moves through seal [120e] into the continuous steaming section [11], where steam flows from sub-chamber [11f] through sub-chambers [11e], [11d], [11c] and [11b] to sub chamber [11a], counter-current to the direction of movement of the panels (which flow from [11a] to [11f] though seals [120f] to [120j] in sequence) in order to effect efficient desorption of the $CO_2$ and minimize the residual level of $CO_2$ on the panel leaving the desorption zone. The flow of steam through the panel may be "serpentine" (across different sides) as illustrated in FIG. 6, or the gas may be ducted around the panel-containing chamber in a "corkscrew" fashion so that it always enters the panel from the same side (as illustrated here).

After steaming, the panel may move continuously into the cooling chamber [13a] and moves sequentially through [13b], [13c] and [13d] where once again it encounters a counter-current flow of inert gas [115b] that flows from [13d] to [13a]. In this illustration, four stages of cooling in four sub-chambers [13a]-[13d] are contemplated, though fewer or more stages may be incorporated. The intent of the cooling chamber [13] is to both cool and dry the panels by flowing a warm, dry, oxygen-free gas, such as nitrogen, through the hot, wet panels. As the panels move forward from [13a] to [13d], the gas moves in the opposite direction (from [13d] to [13a]). The incoming gas may be at low humidity, and may be warmed by a heater [123] to 20-30° C. or 15-40° C. or 10-50° C. Because the gas flowing into the cooling chamber [13d] has low humidity, water may evaporate from the surface of the panel, cooling both the panel and gas. As the gas flows into sub-chamber [13c], it may encounter a warmer panel section, so that the gas may warm up and further water may evaporate.

Optionally, the gas flowing into [13a], [13b] and [13c] may be reheated. This may increase the amount of evaporation and hence the moisture content and temperature of the gas entering condenser 124. It may also reduce the flowrate of gas required to achieve a given residual water loading on the panels leaving region 130 and re-entering the adsorption area 90.

The flow and incoming temperature of gas may be managed carefully so that the gas leaving the incoming panel sub-chamber [13a] may be warm (65-85° C. or 55-90° C. or 45-100° C.) and close to saturated while the panel leaving sub-chamber [13d] may be cool (20-30° C. or 15-40° C. or 10-50° C.) and with low moisture levels. The hot, wet gas leaving sub-chamber [13a] may be sent to a condenser [124] and cooled to a low temperature (5-10° C. or 0-25° C. or −5 to 45° C.) in order to condense out a portion of the water vapor and supply energy to the heat pump. The dried gas may then be recycled to the gas heater [123] through fan [122b].

Figure 40A:
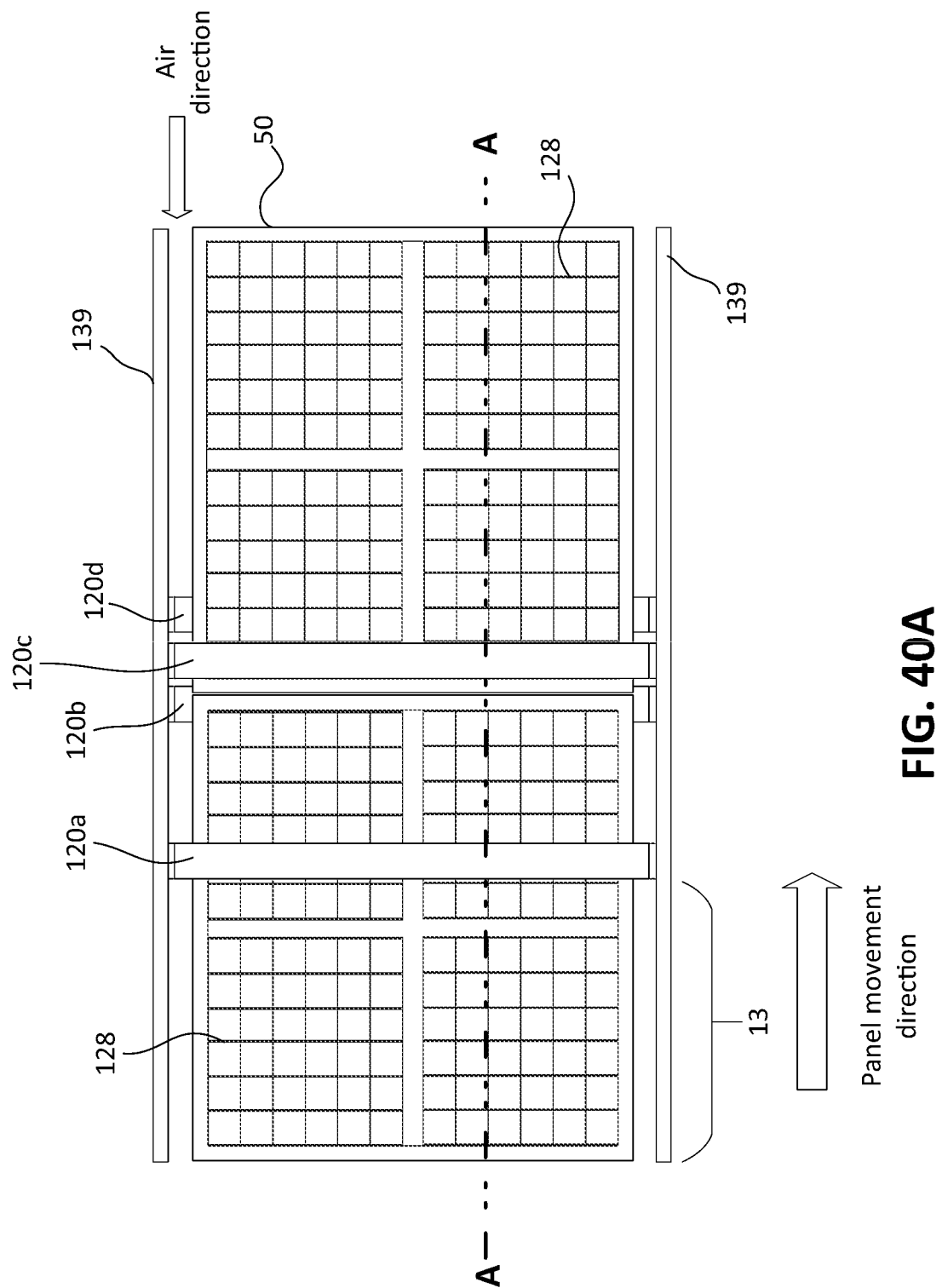
FIG. 40A illustrates a plan view of an exemplary portion of a post-cooling gas recovery system.
Figure 40B:
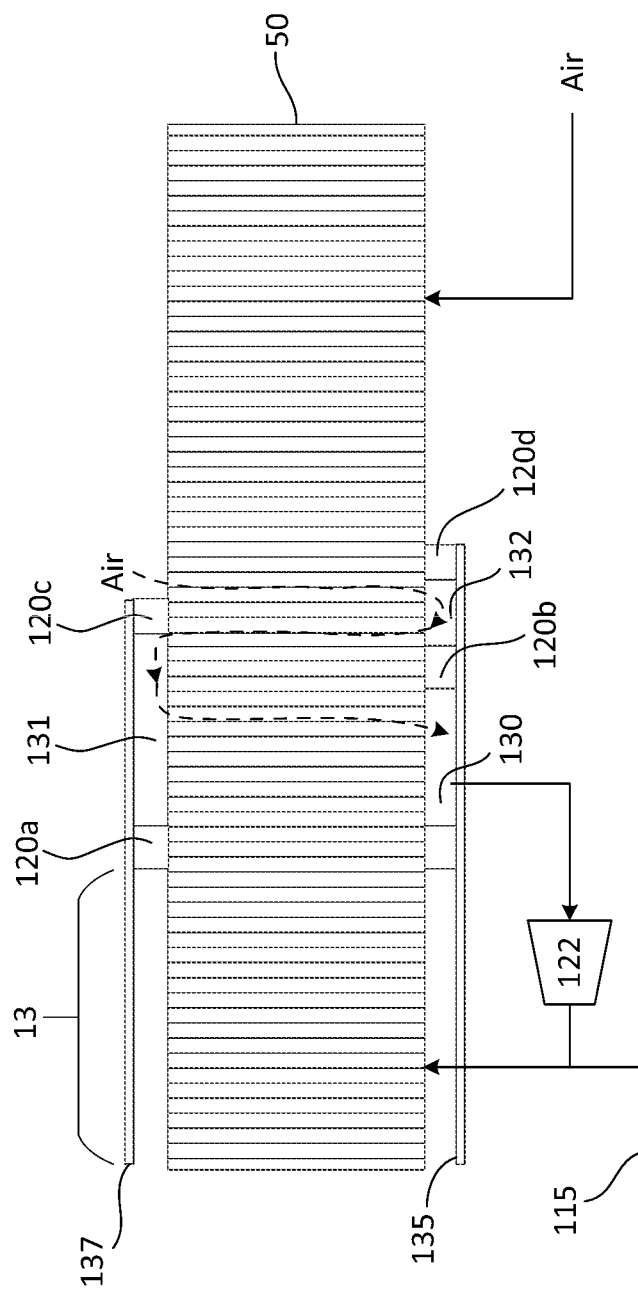
FIG. 40B is cross-sectional view along plane A-A of the exemplary portion of the post-cooling gas recovery system of FIG. 40A.

The void space in the panel leaving the last cooling sub-chamber [13d] may be filled with the gas injected into the cooling chamber [13]. This gas, for example $N_2$, may be partially recovered through a fan [122c] with a counter-current displacement with air, to minimize the overall losses of nitrogen. FIGS. 40A-40B illustrate one possible embodiment of the gas recovery system.

FIGS. 40A-40B illustrate an embodiment of a device that is intended to recover most of the inert cooling gas [115] from the void space entering with the panel [50] from the upstream cooling zone [13], while minimizing the contamination of that gas with the air used to displace that void space. This segregation is achieved by creating a tortuous path for the displacing air to follow, such that the flow of the displacing area is generally in the opposite direction from that of the panel, but is locally forced through the panel a number of times. The flow pattern thus created is therefore similar to that shown in FIG. 6A. This flow pattern is created by forming a set of seals on opposite sides of the panel, where those seals are offset from each other in the direction of panel movement by at least one air flow channel. The set of seals creates sub-chambers that are separated from each other in the direction of movement of the panel, but which are connected by the air flow channels that connect the opposite faces of the adsorber units within the panel [50]. The overall system is configured such that the rate of gas flow through the panel void space (the air flow channels) is approximately equal to the rate at which that void space is moved forward by the movement of the panels.

FIGS. 40A-40B illustrate plan and cross-sectional views of an embodiment in which the panel moves continuously from the cooling zone [13] past a seal set [120a-120d] that isolates the largely air-free cooling zone [13] from the final gas recovery zone. The seals set [120a-120d] assist in directing the flow of the air in opposing perpendicular directions through the panels 50. The seals set [120a-120d] includes a plurality of seals. As seen in FIG. 40B, the plurality of seals may include a full seal [120a], which includes a sealing member on both faces of the panel, and multiple half-seals [120b-120d], which only have a sealing member on a single face of the panel. As seen in FIGS. 40A-40B, half-seals [120b, 120b] are located on a lower face of the panel [50] and half-seal [120c] is located on a top face of the panel [50]. The seals set [120a-120d], along with the side walls [139], chamber floor [135] and chamber ceiling or roof [137] create a plurality of sub-chambers (130, 131, 132) through which air may flow after it passes through the panel. For example, as seen in FIG. 40B, sub-chamber [130] is bounded by the chamber floor [135], the bottom face of the panel [50], seal [120a], seal [120b], and surrounding walls [139] (not shown in FIG. 40B).

In some embodiments, half-seals may be in contact with only a single face of the panel [50]. In an embodiment with two or more half-seals, a first half-seal may be in contact with a first face of the panel [50] and the second half-seal may be in contact with a second face (opposite of the first face) of the panel [50], such that incoming gas is forced to displace the gas in the panel void space. In an embodiment with three or more half-seals, one half-seal may be in contact with a first face and the second and third half-seals may be in contact with a second face (opposite of the first face) of the panel, such that the gas is forced to flow first through the panel in a first direction orthogonal to a plane defined by the panel [50], and then across the face of the panel [50], such that the overall panels and gas flow in opposite directions. The rate of flow of gas in one direction may approximately match the movement of panel void space in the opposite direction such that a standing wave may be set up and most of the gas in the panel void space entering the zone is recovered with minimal mixing of the displacing gas.

The panel 50 continues moving through the recovery zone past seal [120b], here illustrated as being on the bottom of the panel only. Half seal [120b] prevents gas flowing from sub-chamber [132] to sub-chamber [130], while allowing gas to flow up through the panel [50] from sub-chamber [132] to sub-chamber [131]. Because there is not a seal on the top face of the panel opposite [120b], gas can flow freely into sub-chamber [131]. The panel [50] may then move past half-seal [120c] on the top face of the panel, and finally past half seal [120d] on the lower face of the panel.

In FIGS. 40A-40B, the air is moving from right to left as the panel moves from left to right. As seen in the cross-sectional view in FIG. 40B, the system may be arranged such that air may enter the panel air flow channels between the seal [120c] and [120d] and flow down through the panel in a direction that is orthogonal or perpendicular to a plane defined by the panel [50], displacing the gas in those channels. The system may be operated such that air pushes the gas within the panel void space through the panel [50] into sub-chamber [132], after which the air is pushed through a different section of the panel in a direction that is orthogonal or perpendicular to the plane defined by the panel [50], but in an opposite direction from the air stream entering sub-chamber [132], into sub-chamber [131]. From sub-chamber [131], the air is pushed through yet another portion of the panel's void space in a direction that is orthogonal or perpendicular to the plane defined by the panel [50], but in an opposite direction from the air stream entering sub-chamber [131], into sub-chamber [130]. With the appropriate flowrate, the composition of the gas may increase in concentration of the inert purge gas [115] as the gas moves from sub-chamber [132] to [131] and on to [130], such that the sub-chamber [130] may be filled primarily with the inert cooling gas [115].

Air flows into gas flow channels in the adsorber units contained in the panel [50] in the space before half-seal [120c] and flows through the panel [50] in an orthogonal direction. This air displaces the gas in the panel's void space in the gas flow channels into sub-chamber [132]. From sub-chamber [132], the gas may flow up through the panel flow channels, displacing the gas in those channels into a further sub-chamber [131]. Finally, after sub-chamber [131], the air may displace the gas through the gas flow channels into sub-chamber [130]. From sub-chamber [130], vacuum pump [122] may pull the gas from sub-chamber [130] and at least a portion of the recovered gas may be directed back into cooling zone [13].

The gas displaced into sub-chamber [131] may also comprises gas [115], which is fed through the gas flow channels of the panel [50] towards sub-volume [130], as seen in FIG. 40B. The gas [115] may be an inert gas, such as $N_2$. In some embodiments, the void space or gas flow channels in the panel moving past seal [120a] may be filled with $N_2$ and the sub-chamber [130] may also be filled with $N_2$. The gas in sub-chamber [130], therefore, may include $N_2$, which may be recycled to the cooling zone [13], to reduce the use of fresh $N_2$ [115]. In some embodiments, the gas in sub-chamber [130] may be essentially pure $N_2$. If half-seal [120c] leaks slightly or if there is some back-mixing of the gas displaced into sub-chamber [131] from sub-chamber [132], then the gas in sub-chamber [131] may include gases other than $N_2$, but overall the risk of those gases getting back into the cooling zone [13] may be minimized. Similarly, the gas in sub-chamber [132] should be $N_2$ and it should be displacing gas largely comprising the same gas as in sub-chamber [131] back into sub-chamber [131]. If half-seal [120d] leaks, if the flow of air into the channels above sub-chamber [132], or if there is excessive mixing of gas within the panel flow channels, then the gas in sub-chamber [132] may become slightly contaminated. Any impurities, however, are likely to be within the moving panel and, if the gas flows are controlled appropriately, may move forward with the panel before they can flow into sub-chamber [131].

In the embodiment depicted in FIGS. 40A-40B, the sub-chambers [130-132] are depicted as being of different sized for illustration purposes; they could of course be the same size or have different relative sizes to those depicted. The system is illustrated as having three sub-chambers, but similar systems could be imagined with one, two, for, five or more partitions. The seals [120a-d] are depicted as being large enough to seal against only one sealing strut [128], but as described elsewhere, they could be larger.

Figure 44C:
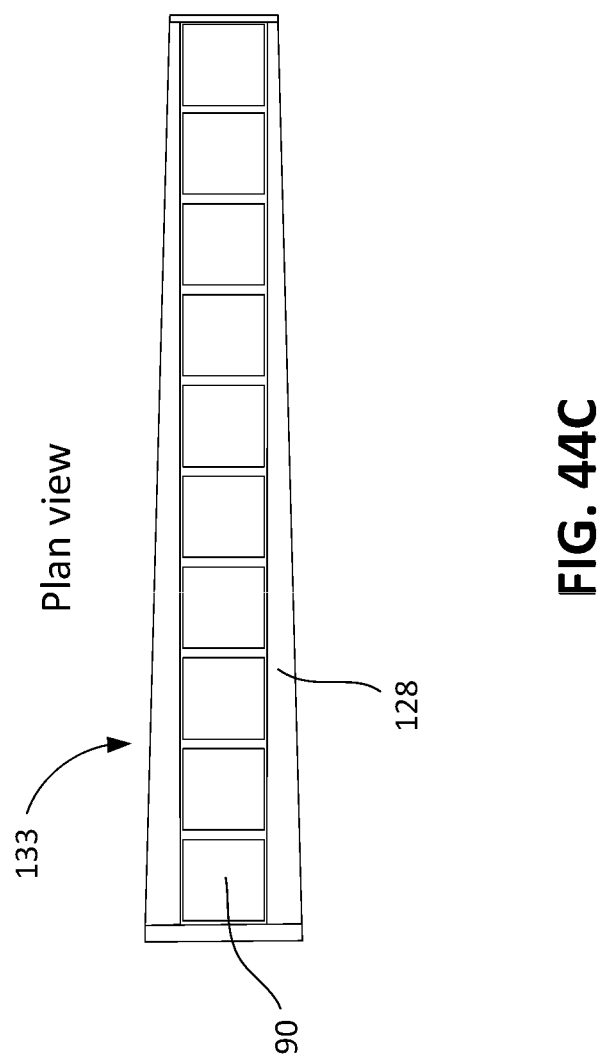
Figure 44D:
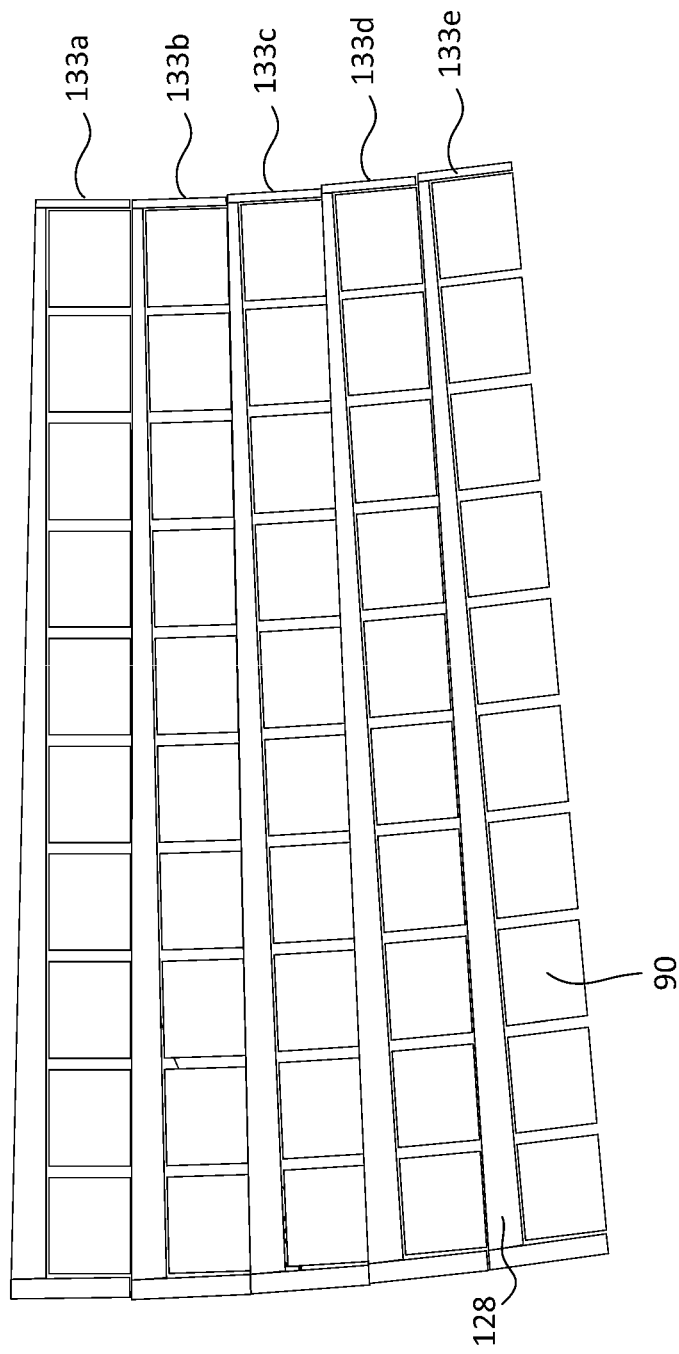

In yet another embodiment of a fully continuous process, the horizontal panels may be arrayed in a circle (as indicated in FIGS. 44A-44C), eliminating the need for transfer stations at the end of linear arrays, and allowing a constant force to be applied throughout.

Figure 27A:
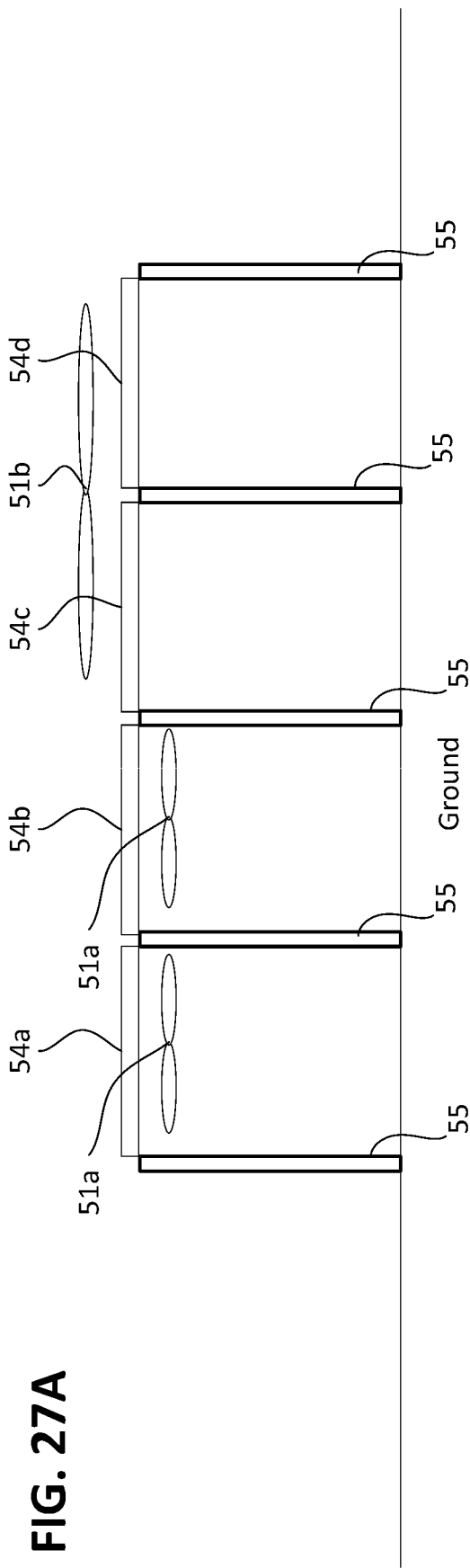
FIGS. 27A-27B illustrate exemplary placements for fans in a horizontal adsorption system.
Figure 27B:
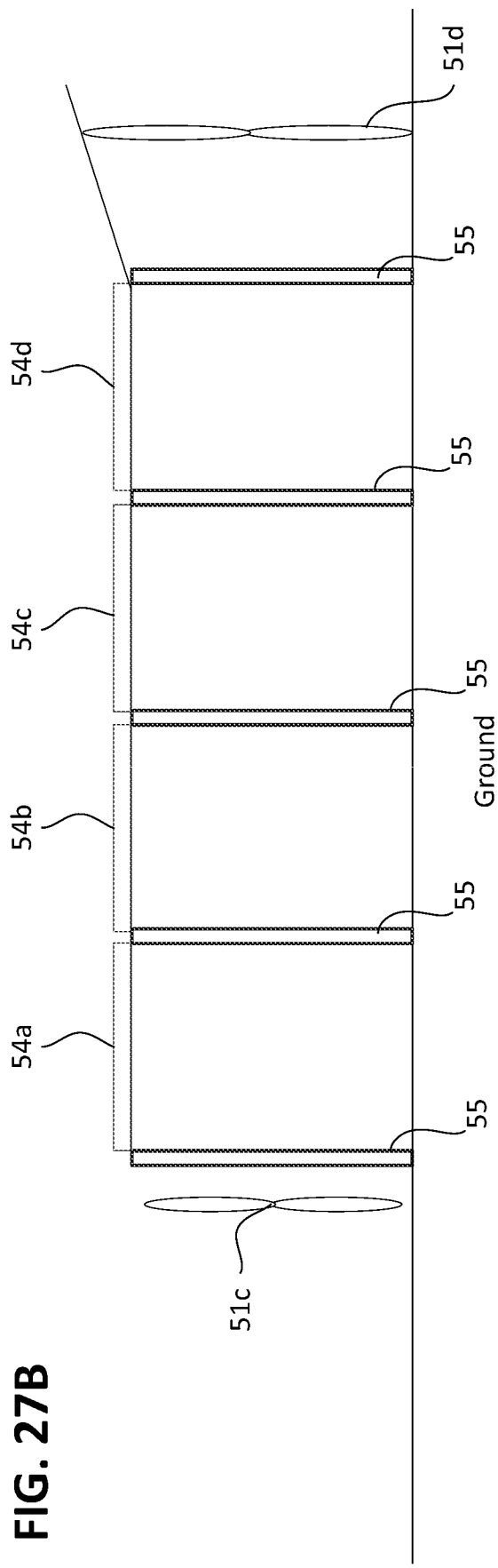

In different embodiments of the design, it is possible to have the fans oriented so that the blades rotate in the vertical or horizontal plane (or indeed at some other angle). Some possible embodiments of fan placement for operating the panels in the horizontal plane are shown in FIGS. 27A-27B, which show four elevated panel tracks [54a-54b] supported by a set of structural support elements [55]. The panel tracks are depicted end on, so they flow into or out of the page in this illustration. In FIG. 27A, the fans [51a] may be installed horizontally underneath the panel track [54a and 54b] in a forced draft mode, pushing air up through the panel tracks [54a and 54b]. This may offer the advantage of having the fan motor mass close to the ground and may allow the stresses associated with rotating equipment to be decoupled from the mechanical support of the panels. FIG. 27A also shows an alternative embodiment, where the fans [51b] may be installed above the panels in panel tracks [54c and 54d] on the horizontal plane in induced draft mode, pulling air through the panels. This may offer an area for fan installation roughly equivalent to the area of the panels, and this design may accommodate larger fan diameters. One possible advantage of induced draft fans is that they may minimize the turbulence in the air flowing through the panels and may allow a higher discharge air velocity from the system without further equipment. A higher vertical discharge velocity may be advantageous in terms of air flow patterns for the system and may reduce the amount of spent air recirculating to the adsorber inlet.

In yet another embodiment, shown in FIG. 27B, the fans [51c] may be installed in a vertical orientation in the walls of the buildings operating in a forced draft mode. This may keep the mass of the fans and their rotating equipment closer to the ground. The fans in this embodiment may be further from the panel tracks [54a and 54b] and may be upstream of rain screens and filters [not shown], so the turbulence of the fans' wake may be dissipated before the air encounters the panels. In yet another embodiment, shown in FIG. 27B, a larger diameter fan [51d] may be installed in the vertical orientation but at a distance from the edge of the panel track [54d] with a transition section of building to reorient the air flow.

Figure 28A:
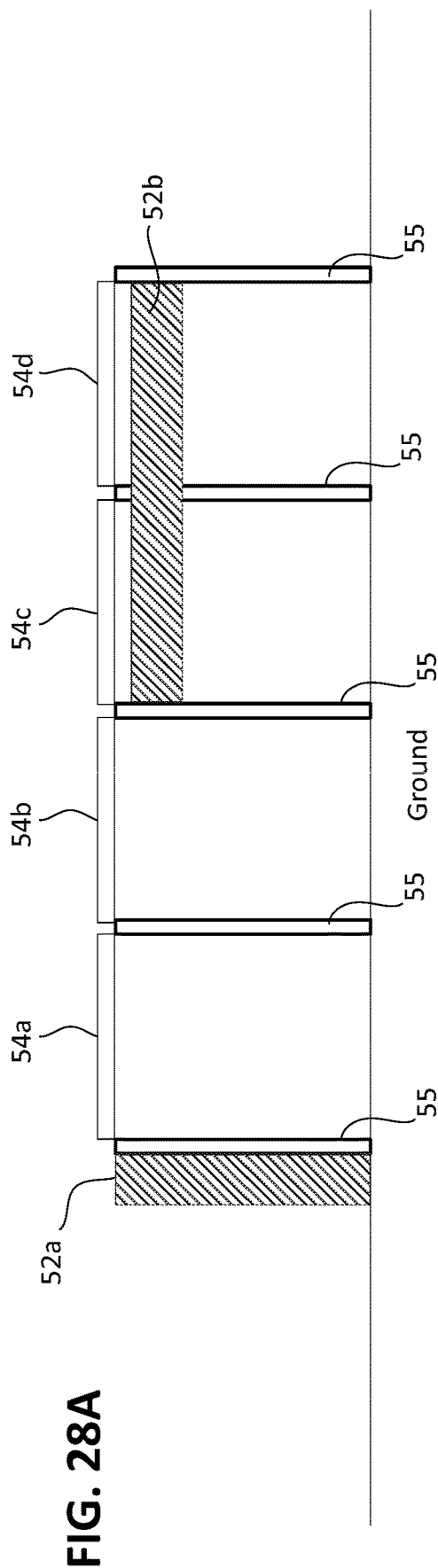
FIGS. 28A-28B illustrate exemplary placements for filters in a horizontal adsorption system.
Figure 28B:
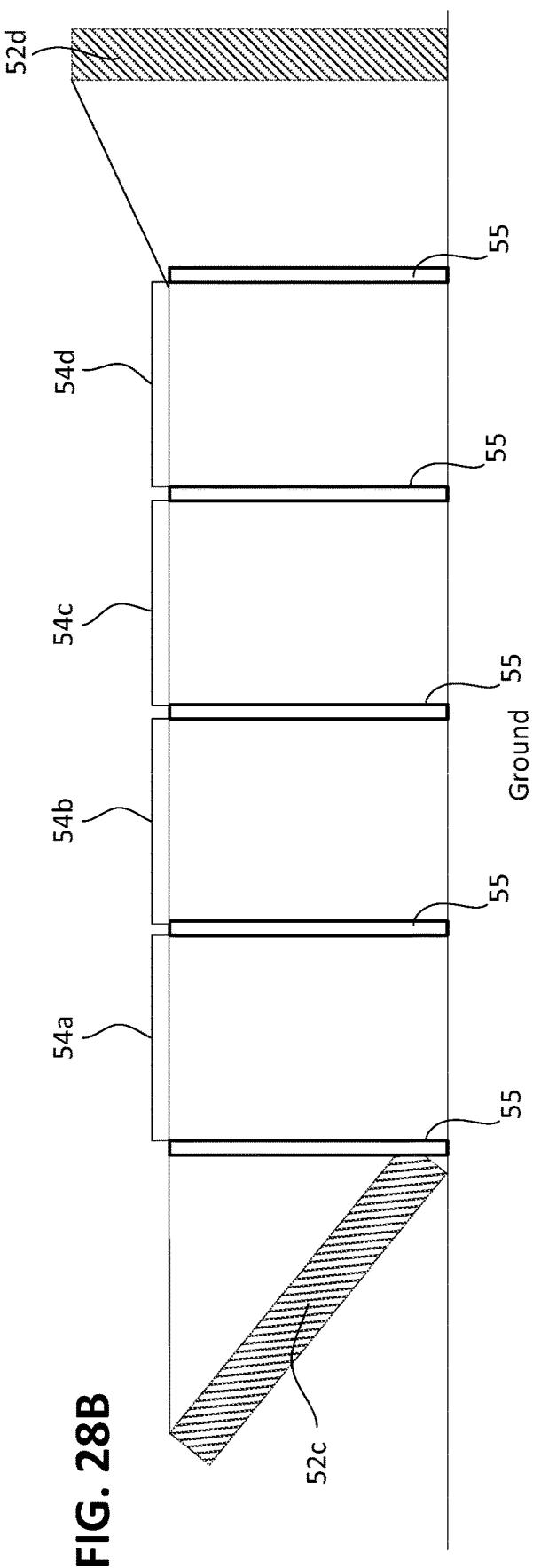

FIGS. 28A-28B show several possible embodiments for the placement of air filters. Four panel tracks [54a-54d] are illustrated in a side view from the end of the track. The panel tracks [54a-54d] in this embodiment are elevated and supported by structural elements [55]. In FIG. 28A, the filters [52a] may be placed in vertical orientation in the walls of the building or the filter [52b] may be placed in a horizontal orientation underneath the panel tracks [54c and 54d]. Placing the filters [52a] in the walls may allow them to be relatively far from the panel tracks [54a] and they may be downstream of the fan [not shown], and so the filter [52a] may help to dissipate the wake from the fan. Placing the filters [52b] under the panels may allow for more available area for the filters, so the pressure drop incurred for air filtration may be mitigated.

FIG. 28B illustrates two possible embodiments to allow for larger filtration area while keeping some separation of the filter [52] from the panel tracks [54]. Filter [52c] may be set at an angle while filter [52d] may be vertically oriented but set back from the edge of the panel track [54d]. The fan may be installed upstream of the filter, between the filter and the fan, or downstream of both the filter and the fan, so multiple permutations of the fan and filter options may readily be imagined.

With the panels in a horizontal orientation, there is an increased potential for precipitation to impact the air transfer surface, so some form of rain protection may be required. FIGS. 29A-29C show several possible embodiments of that rain protection. In FIG. 29A, a set of chevrons [96] may be used to catch precipitation and guide it into a rain collection chevron/trough [98]. In this embodiment, the chevrons may be placed between the panel track [54] and the exhaust fan [51] in order to maintain as high a vertical velocity on the fan discharge as possible, but one may readily conceive of a system with the fan under the chevrons or with the use of chevrons in combination with a vertical or horizontal induced draft fan underneath the panels. One advantage of having the chevrons [96] and [98] between the fan [51] and the panel track [54] may be that any lubricants from the fan or any small components dropped during maintenance may avoid hitting the panel track [54]. In the embodiments where the fan is below the chevrons or in induced draft mode, the chevrons may also act as the roof of the building. In some embodiments, the system may replace the upward facing chevrons [96] with a flat roof with the fan [51] operating in a cutout of the roof. The downward facing chevrons [98] may be widened to have a width greater than the fan diameter, in order to catch droplets of water. In some embodiments, the downward facing chevrons [98] may run the width of the building. In some embodiments, the trough may have the shape of a circular dish or inverted cone to cover a diameter somewhat greater than the projected diameter swept by the fan, with a drain to remove any water that accumulates in a storm. In some embodiments, a cross section of the trough may be generally chevron-shaped (as shown), or may be generally V-shaped, generally L-shaped, generally U-shaped, generally straight line shaped, or irregular shaped. In some embodiments, the cross section of the trough may include a shallow concave dish shape along its upward facing surface. In some embodiments, the trough(s) and/or chevron(s) may be angled with respect to vertical, spaced from each other, and/or overlapping with each other in a vertical direction in a way that allows air to flow therethrough while preventing rain from flowing therethrough. The chevrons or troughs may run across the building (perpendicular to the direction of movement of the panels) or along the building (parallel to the direction of movement of the panels). The troughs/chevrons may have different lengths, for example to approximate the circular fan opening (with longer troughs aligned with the center of the opening and shorter troughs near the sides of the opening. Still other shapes and arrangements than those shown and discussed herein may be used for the trough(s) without departing from the scope of the present disclosure.

FIG. 29B shows two alternative arrangements in which a chimney or thimble [97a, 97b] is used. Rain tends to fall at an angle and the fan exhaust will tend to create some swirl, so precipitation may hit the walls of the chimney [97] and flow down to be collected in a trough [98] at the bottom of the chimney. Two possible embodiments of the chimney are shown—[97a] is illustrated operating with an induced draft fan (though it may also operate with forced draft). The top of the chimney may be tapered inward to reduce the discharge area, thereby increasing the air velocity leaving the system. This increased velocity (and elevated discharge point) may help to minimize air recirculation (i.e., minimize $CO_2$-depleted air leaving the system from being drawn back to the inlet air stream.) Chimney [97b] is illustrated with an induced draft fan [51] and no discharge tapering. The walls of the rain collection trough [98] may be positioned at a low enough elevation so that any rain that penetrated beyond the fan would likely impact the side wall of the chimney [97b] and flow into the trough [98].

FIG. 29B shows an alternative arrangement that could be coupled with a separated panel track (for example, as illustrated in FIG. 23C). The chimney [97] is relatively narrow and collects air from the two separated adsorption tracks [54a and b] in a relatively large open space. Rain that does drop through the chimney may be caught in the rain collection trough [98]. As illustrated, a forced draft fan is imagined, but it would be possible to mount induced draft fan above the panels or in the narrower part of the chimney [97].

Figure 43A:
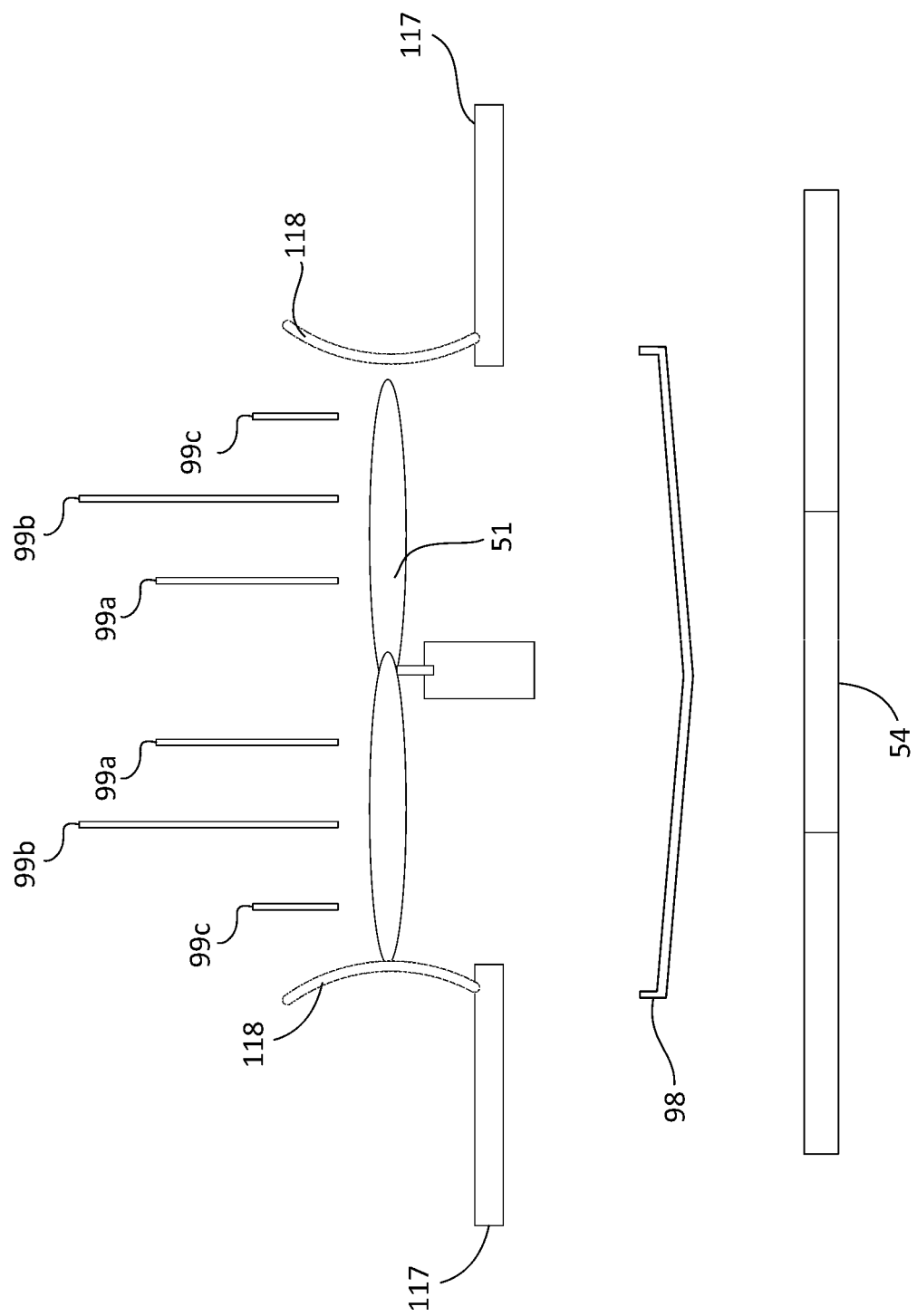
FIG. 43A is a cross-sectional view of an exemplary rain mitigation embodiment that includes rain deflection rings.
Figure 43B:
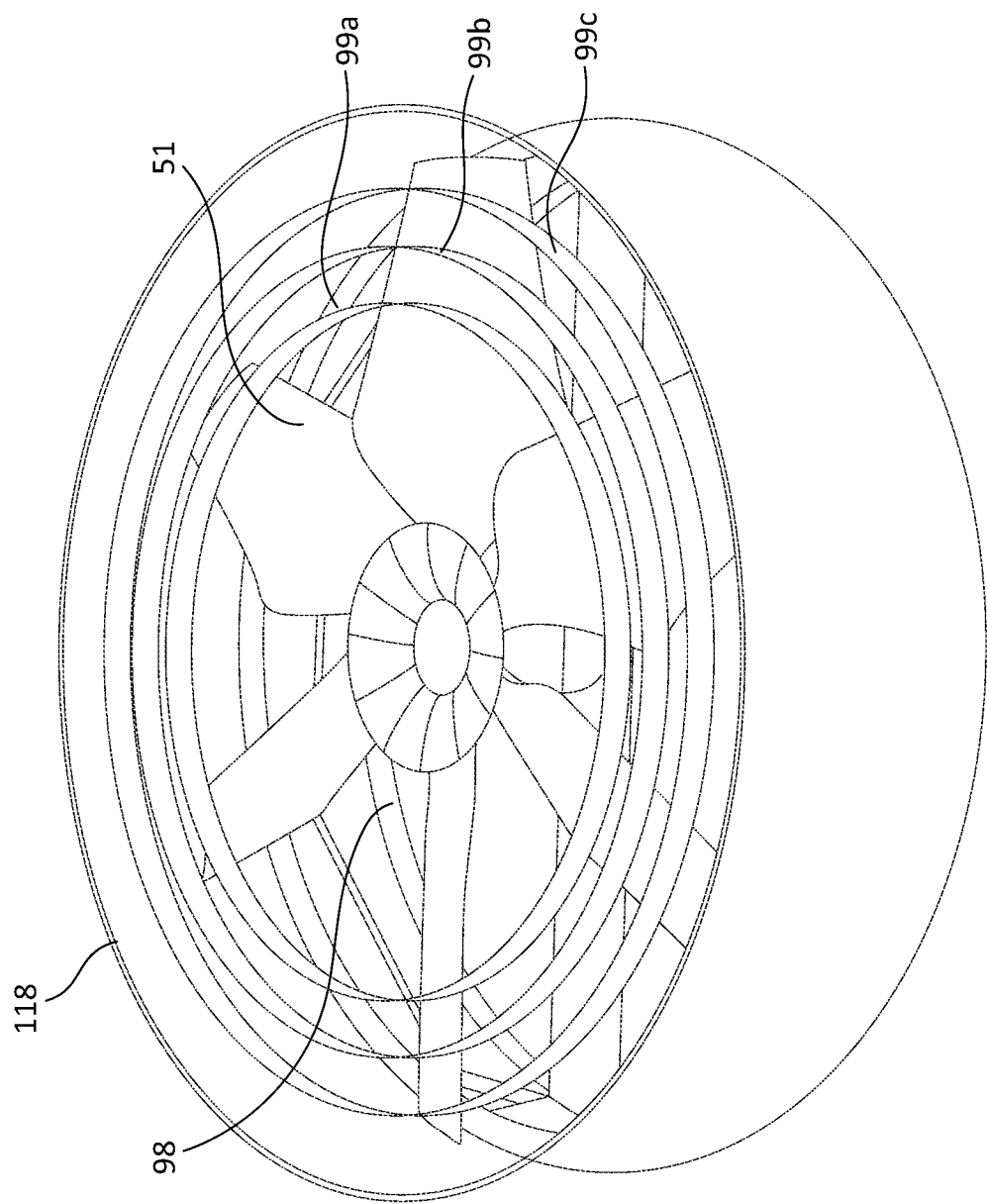
FIG. 43B is a perspective view of the exemplary rain mitigation embodiment of FIG. 43A.

FIGS. 43A-43B show an alternative embodiment of the rain mitigation system with a wide rain collection funnel [98] beneath the fan [51]. The rain collection funnel [98] may be circular or rectangular when viewed from above and may have a diameter/width equal to or greater than the fan's [51] diameter. Further rain protection may be provided by the building roof [117] and by a cowling [118] around the fan [51], said cowling [118] also improving pattern of air flowing through the fan [51]. In the event of precipitation falling at an angle, further protection may be afforded by including a plurality of rain deflection rings [99a-99c] that may collect raindrops falling at an angle and cause them to drop directly down into the rain collection funnel [98]. The plurality of rain deflection rings [99a-99c] may be located above or below the fan [51]. The profile of these rain deflection rings in the direction of air flow may be quite narrow such that they provide minimal resistance to the flow of air. FIGS. 43A-43B illustrate three rain mitigation rings [99a-99c], but more or fewer rings may be included. The rings may have the same or different heights (as seen in FIG. 43A) to minimize the potential of rain ingress to the panel train [54]. In some embodiments, the rings may be concentric. The rain mitigation rings are illustrated above the fan, but the rings may also be located below the fan [51], but above the collection funnel [98].

In reference to FIG. 19A, the forces acting on the adsorber units [90] in the panel [50] will be different if the panel is in a horizontal vs. vertical orientation. In particular, in a horizontal orientation, the impact of gravity may cause the adsorber units [50] to be pulled downwards and out of the plane of the face of the panel [50]. A number of different approaches may be applied to address this issue. In FIG. 19A, the support shelves [91] may be used in conjunction with a bonding agent that acts as the array frame [93] in FIG. 19B, effectively gluing the arrays [94] in place; as a further measure, the glue may be supplemented with a physical support.

Figure 30C:
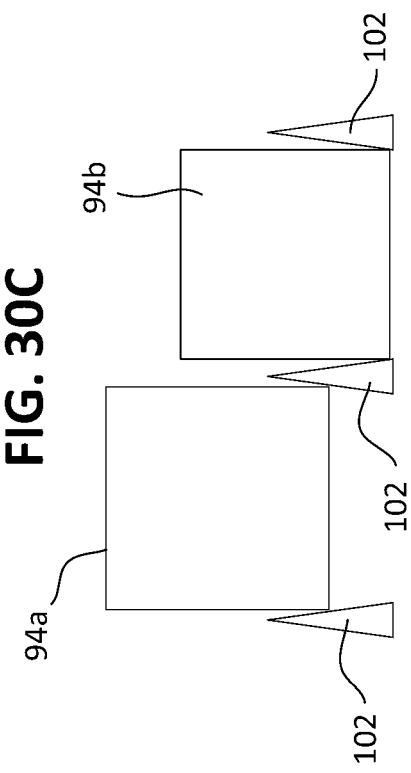
FIGS. 30A-30D illustrate exemplary ways by which adsorber arrays may be supported in a horizontally oriented frame with edge supports.
Figure 30D:
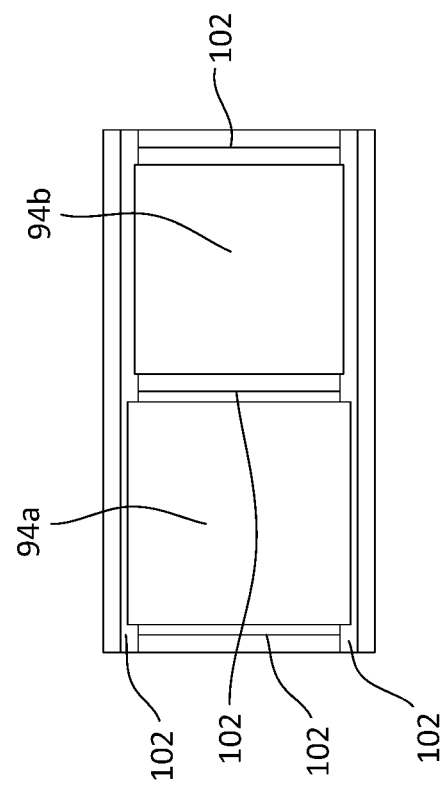
Figure 30A:
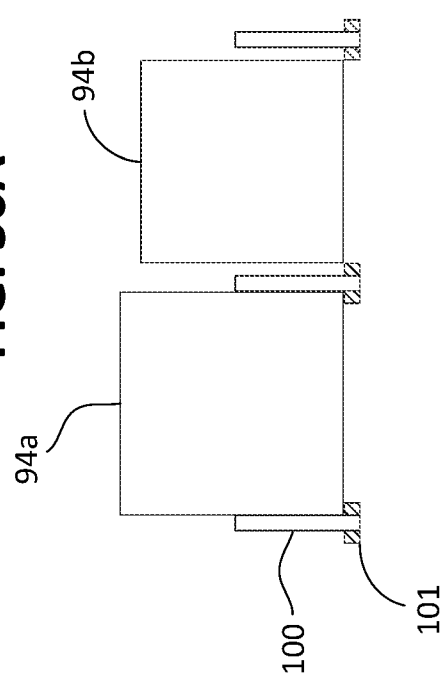

FIGS. 30A-30D illustrate several possible embodiments of a physical support structure. Arrays [94a] and [94b] may comprise a single adsorber unit or several adsorber units bonded together, for example in a group of 2×1, 2×2 or 2×3 adsorber units. To the extent these arrays may be of slightly different sizes, the support system would be designed to accommodate this variability. FIG. 30A illustrates a side view of an embodiment in which the monolith array [94a] or [94b] is supported from underneath by the combination of a vertical support [100] and an edge support [101]. In this example, the size of the edge support may be large enough to accommodate both the larger [94a] and smaller array [94b]. The edge support [101] may be connected directly to the vertical support [101] or it may be connected by a spring-loaded clip that conforms to the variation in the size of the adsorber array [94a or 94b]. The support may be a two-part structure having a vertical component 100 and a horizontal component 101.

Figure 30B:
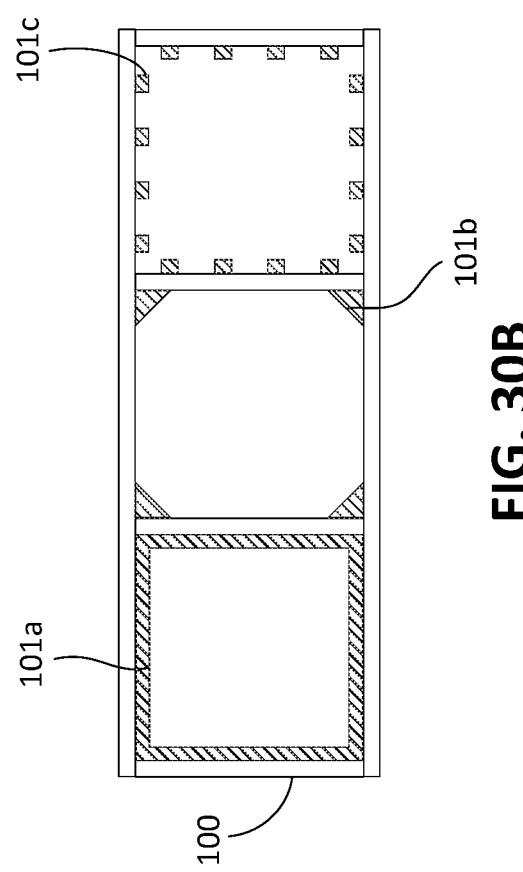

FIG. 30B shows a plan view of three different possible embodiments of an edge support. Support [101a] embodies a shelf that supports the whole length of the array on all four sides. Additional variants of this system where only 1, 2, or 3 were supported may also be considered (see, e.g., FIGS. 35A-35C). Support [101b] shows an embodiment where only the corners of the array (not shown) may by supported, and support [101c] embodies an example where the edge support does not run the full length of the array's edge. FIGS. 35A-35C show additional variants where 1, 2, or 3 corners may only be supported, and where 1, 2, or 3 sides may only be supported. The advantage of covering less of the array's lower surface area is that more of the surface is open to air flow and thus may contribute to the $CO_2$ adsorption. The advantage to having a larger support area is that the array [94] is more securely held in place.

FIG. 30C shows a side view of an alternative embodiment in which a tapered support [102] is used. In this embodiment a larger array [94a] could sit at a slight elevation to a smaller array [94b]. The advantage of this approach is that the air flow surface is not occluded. FIG. 30D shows a plan view of this arrangement. While FIG. 30C shows a continuous taper, one could imagine a stepped profile.

FIG. 34 shows an alternative embodiment for supporting the panels. Spring clips [108], which may be attached to a vertical support at a first end and form a supporting ledge with a second end, may be used to support a bottom of an array [94].

An alternative embodiment for supporting panels from below is illustrated in FIGS. 31A and 31B. In FIG. 31A, a mesh [103] of fine elements may be formed and supported between vertical supports [100] that provide rigidity to the mechanism and maintain sufficient tension in the mesh [103] to minimize sagging. The mesh could be partially removed near the center of the array [94] with a cut-out [104] in order to minimize the interaction between the mesh [103] and the array. In some embodiments, the array [94] may sit above the cut-out. In this embodiment, the mesh [103] runs parallel and perpendicular to the supports [100]; in an alternative embodiment, the mesh would run diagonally so that each strand is supported by the frame [100]. One could also conceive of additional vertical supports [100] running perpendicular to those shown or a mesh [103] that omits the strands running parallel to the supports [100].

FIG. 31B shows another embodiment of this concept, where support wires [105] are more widely spaced and run at an angle to the supports [100]. The advantage of using fewer support wires [105] is that less of the array's [94] surface is occluded; the advantage of using more support wires [105] is that the individual strands hold less weight and so may be thinner.

Figure 32:
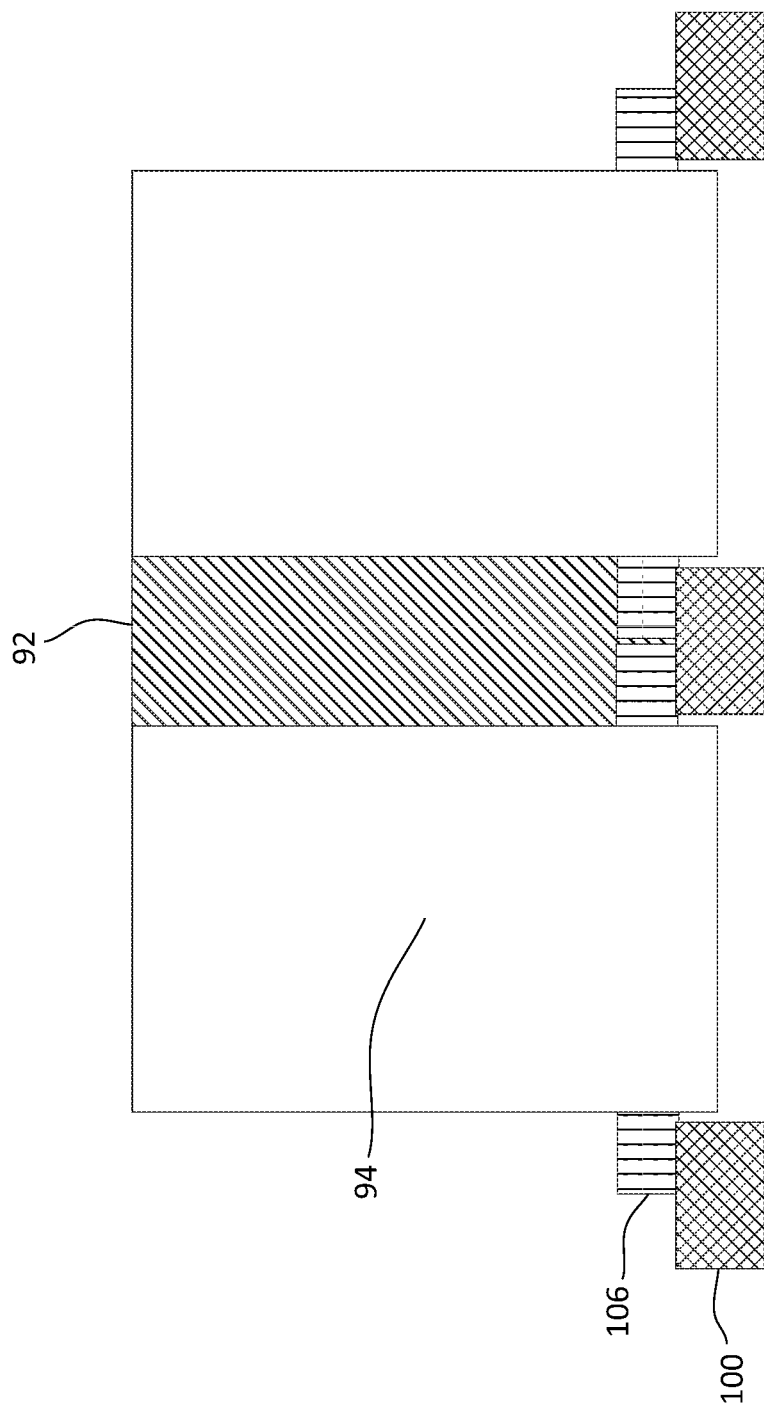
FIG. 32 illustrates an exemplary approach by which adsorber arrays may be supported in a horizontally oriented frame with collars.

Another approach to supporting the arrays [94] is illustrated in FIG. 32. A collar [106], which is coupled to or resting on the supports, may be connected to the array [94], for example by tension fitting or with a glue. The collar [106] may be sitting on the support [100] or the collar [106] may be glued to the support, or the support could slot into the collar, or the support could have a spring clip (one embodiment of which may resemble the device shown in FIG. 34) to hold it in place and compensate for size variation. The height of the collar may be a fraction of the height of the array (as shown), but it may be a larger fraction of the overall height or even greater than the array height. The width of the collar [106] may be sufficient to account for the variation in the array [94] width, so that the lower surface of the collar may rest in the upper surface of the support [100] or the variation may be taken up by an elastic or springy connection (e.g. the spring clip shown in FIG. 34). FIG. 32 also shows an element that can readily be envisioned for the other embodiments described here—a sealant [92] may be used to provide cushioning between arrays [94] and to prevent gases bypassing the internal gas channels of the array [94].

Figure 33:
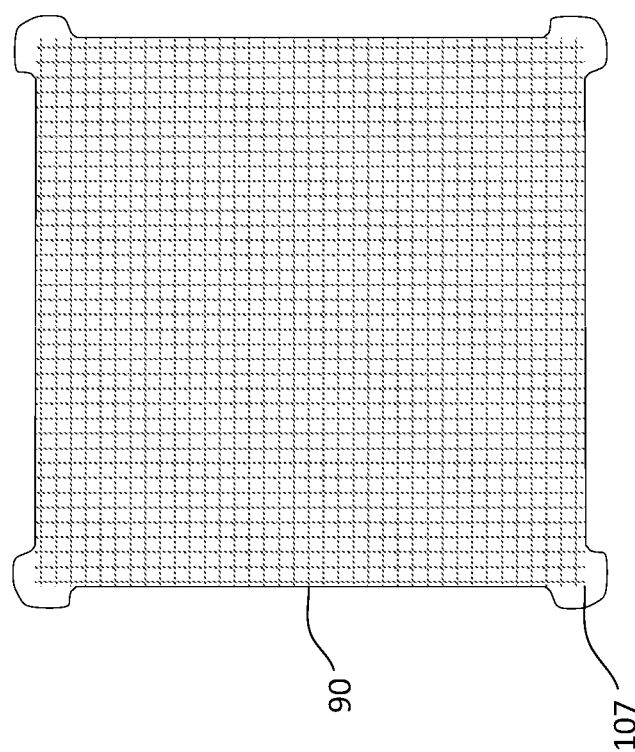
FIG. 33 illustrates the potential for modifying the edge shape of an adsorber unit to facilitate support in a horizontally oriented frame.

FIG. 33 illustrates another embodiment of a modification to support the adsorber unit [90]. In this embodiment, the manufacturing process may be adapted to include a support surface [107] into the edge of the adsorber unit [90]. In this embodiment, the corners may be enlarged in order to engage with edge supports [101b] such as those shown in FIG. 30B.

Figure 42A:
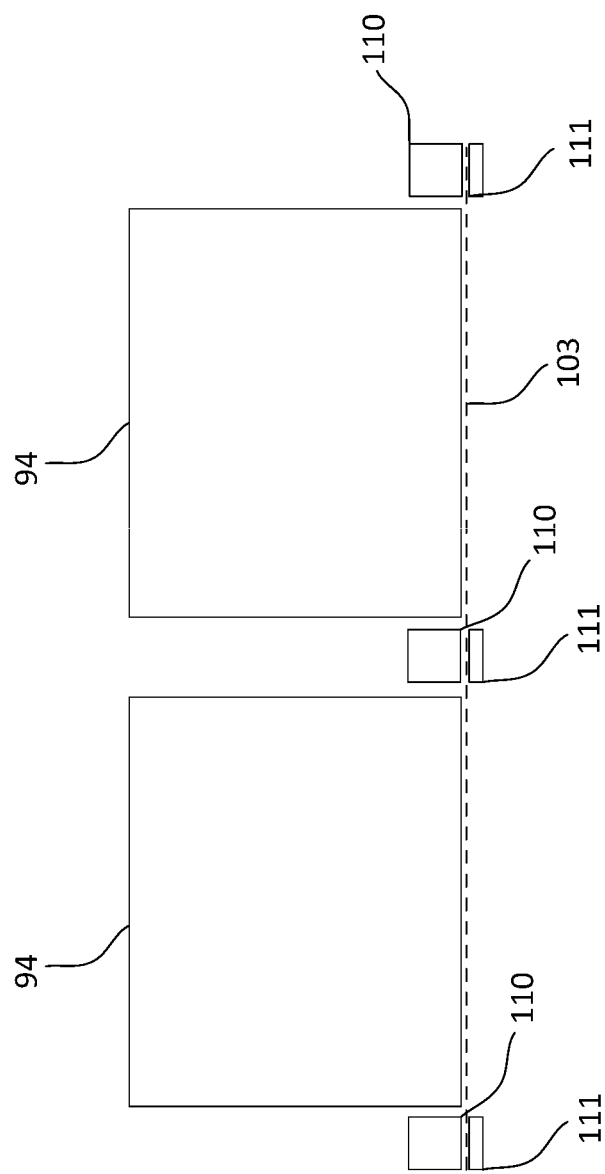

Several possible embodiments for the connection between the mesh [103] and support struts [110] are illustrated in FIGS. 42A-42E. In FIG. 42A, the mesh [103] may be pinched between a supporting strut [110] and a lower strut [111] that may sit below the mesh. In this embodiment, the supporting strut [110] may sit above the mesh [103] and may be connected to the panel frame ([95] in FIG. 36), though this strut [110] could sit below the mesh. The lower support strut [111] is illustrated as being free-floating and attached to the upper support strut [110], but it may be the primary support and may also act as a lower sealing surface for the seals illustrated in FIG. 37. The advantage of the design illustrated in FIG. 42A is that the mesh remains flat and the volume of space below the mesh [103] and the lower face of the lower support strut [111] is minimized.

FIGS. 42B-42D show three other possible configurations for the interaction between the upper [110] and lower [111] support struts. In the embodiment illustrated in FIG. 42B, the lower support strut [111a] has a triangular shape that can be set into an appropriately shaped opening in the upper support strut [110a]. This arrangement has the advantage that it reduces void space underneath the mesh, but with the potential disadvantage of requiring the support mesh [103] to be deformed. FIG. 42C shows an alternative arrangement with a lower support strut [111b] taking the profile of a truncated oval. FIG. 42D shows another possible configuration in which the larger support strut [111c] is level with the lower face of the adsorber units [94] with the mesh [103] deformed around the lower strut. One advantage of this configuration is that, if the lower strut [111c] is attached to the panel frame ([95] in FIG. 36), then the upper strut [110c] may not be required to bear any load and may primarily serve to prevent the mesh from moving. It may be possible, therefore, to omit the upper strut [110c], and reduce the overall weight of the panel.

Figure 42E:
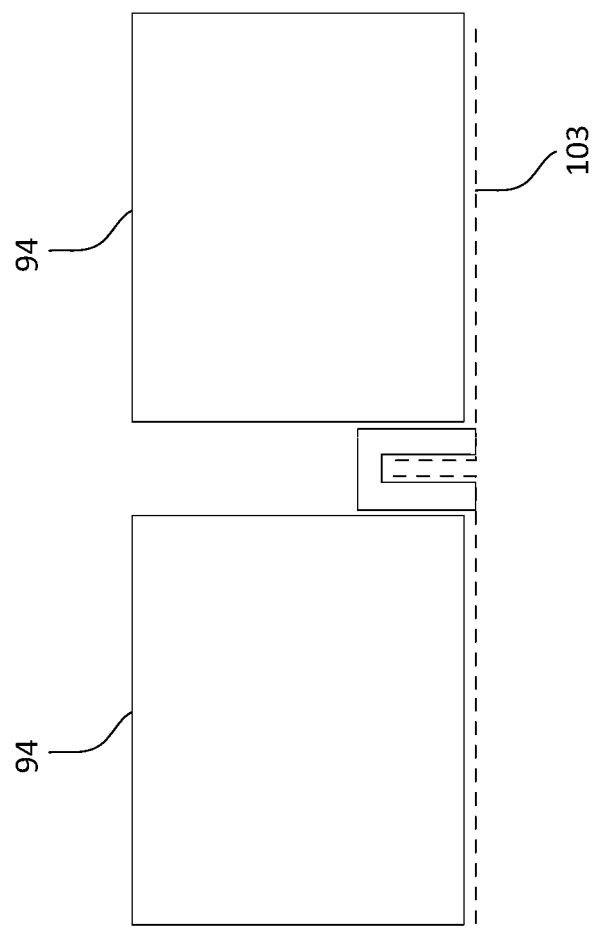

FIG. 42E shows yet another embodiment of the mesh support system in which the support strut [110] take the form of an "n" shaped component that crimps the edges of two sections of mesh [103].

Horizontal Moving Panel DAC System

In many embodiments, a direct air capture system is described that moves individual adsorber panels within the air flow continuously, in a linear fashion, and then moves each panel out of the air flow into a regeneration box with multiple zones for the required desorption phase to occur.

In many embodiments, as seen in FIG. 2A, each adsorber panel [50] of the system may move along a given wall, track or row [54a] of panels, then enter a multi-zone regeneration box [61a], then enter an adjacent wall, track or row [54c] of panels, upon exit transport via a transverse movement in lateral transfer station [62b] to the opposite/adjacent wall, track or row [54d], return along that entire face, and then enter a second, multi-zone regeneration box [61b], and then enter an adjacent wall, row or row [54b] of panels, exit via transverse movement in lateral transfer station [62a], and the repeat the entire process. In some embodiments, as seen in FIG. 2A, panels [50] may be arrayed end-to-end to each other, serviced by fans [51] above (or alternatively, at opposite ends). One advantage of this design is that parallel units in this configuration lend themselves more readily to a rectangular enclosure of relatively standard form. Another significant advantage is that given the significant length of a run of adsorber panels (as much as 250 feet, or more), having fans above the panels (or at opposite ends) greatly facilitates air movement through the entire length of the adsorber panels. The fans suck air up, causing fresh air to flow in through the filters and then the panels in the adsorber box. The air flow turns from horizontal (through the filter/panel) to vertical (through the fan) in the adsorber box.

FIG. 2A shows one possible configuration for the combination of multiple fans [51] and multiple sets of moving adsorber panels [50]/Multi-Zone Regen Boxes [61a,b], that will form two operating units. For example, as seen in FIG. 2A, the adsorber box [60a] may be a rectangle with a width of 10 to 100 feet, and a height of 10 feet, alternatively about 20 feet, alternatively about 30 feet, alternatively about 40 feet, alternatively about 50 feet, alternatively about 60 feet, alternatively about 70 feet, alternatively with widths between about 70 and about 320 feet, alternatively between about 120 and about 640 feet, alternatively between about 240 and 1280 feet. In one embodiment, the adsorber wall (FIG. 2B) may be about 240 feet wide×19 feet high, 180 feet wide×25' high, or alternatively between 40-640 feet wide and 5-50 feet high. Alternatively, an adsorber wall may be 240-12800 feet wide, and 25-100 feet high. Alternative configurations may aggregate adsorber walls as well in other configurations. The number of fans [51] may be between 5 and 20, or alternatively between 1 and 6, or alternatively between 15 and 60—or more.

Alternative embodiments may include regeneration boxes [61] at either end of the adsorber box [60], as per FIG. 3. Alternative embodiments (FIG. 4) could have additional adsorber boxes [60a-f] in parallel, allowing the adsorber boxes [60a-60f] and regeneration boxes [61a, 61b] to share common and centralized downstream equipment (vacuum pumps, heat pumps, compressors). Other alternative embodiments could have a larger number of regeneration boxes (3 or more). In some embodiments, multiple adsorber walls (54) may be vertically stacked in any of these configurations with multiple fans. In other embodiments, multiple adsorber boxes in parallel (FIG. 13A) or in non-parallel patterns, like the star configuration shown in FIG. 13B.

Yet other embodiments may include operating with the panel tracks oriented horizontally as shown in FIG. 21 (or, alternatively, with the horizontal panels arrayed across a circular track, as shown in FIGS. 44A-44C, with the fans shown in FIGS. 27A and 27B oriented horizontally above [51b] or below the panels [51a], or with the fan oriented vertically [51c or 51d] beneath the panel tracks [54a-54d].

Figure 4:
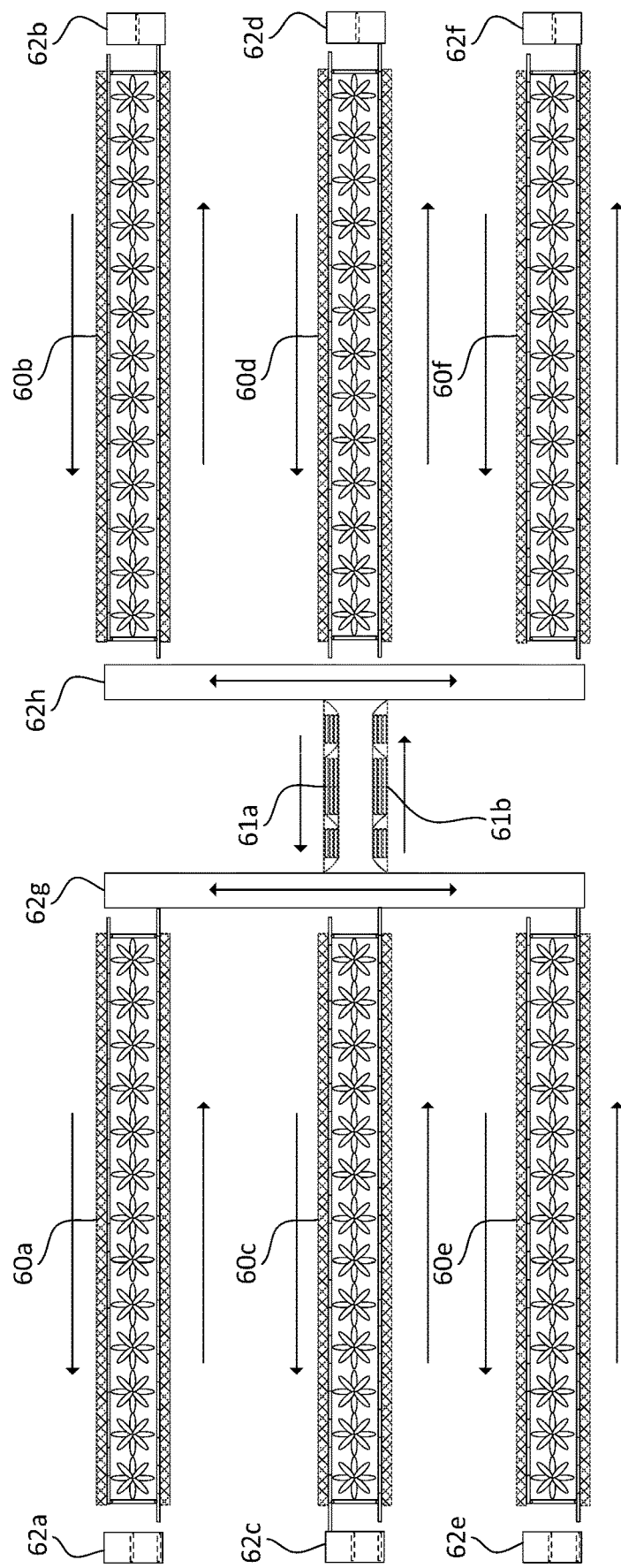
FIG. 4 is an exemplary diagram of a larger scale design, consisting of several integrated, adsorption/desorption process units.

In the embodiment shown in FIG. 4, the regeneration boxes [61a, b] are shown servicing six separate adsorber boxes [60a-60f], in parallel—the panels from each of the adsorber boxes [60a-60f] being regenerated simultaneously and oriented so that the faces of the panels in the adsorber boxes [60a-60f] are in a parallel configuration. Arrows indicate relative movement of the panels through the system. In an alternative embodiment, these adsorber boxes [60a-60f] could be oriented end-to-end in a longer, thinner regen box.

The number of panels [50] in the adsorption mode will typically be significantly greater than the number of panels in the desorption or regeneration mode. The ratio of panels in adsorption mode:desorption or regeneration mode may be as small as 2:1, alternatively between 2:1 and 12:1, alternatively between 12:1 and 36:1, alternatively between 36:1 and 144:1, or greater. Utilizing a larger number of panels in adsorption mode allows for each panel to spend additional time in adsorption prior to desorption, which results in additional $CO_2$ being desorbed in each regeneration cycle. This may have benefits in terms of capital efficiency, as well as energy efficiency due to a larger amount of $CO_2$ being produced per unit of regeneration energy. The design also allows for efficient heat recovery and transfer throughout the system.

Having multiple panels in regeneration simultaneously also confers benefits in terms of both capital and energy efficiency. In terms of capital efficiency, having a single regeneration box with multiple zones containing a larger number of adsorber panels can substantially boost throughput, driving down capital cost per unit of output. In addition, by applying steam to a specific zone, and then having that same steam applied to other panels in other zones, creates substantial heat energy efficiency compared to requiring fresh steam for each panel.

FIG. 2A shows how multiple sets of panels [50] and regeneration boxes [61a, b] may be arrayed next to each other. In some embodiments, multiple levels of panels may be serviced by overhead fans [51] [(or, alternatively, by fans at each end of the building)]. In alternative embodiments, there may be 3, 4, 5 or more layers of panels; there may also be different configurations of fans. There may be multiple fans in the horizontal direction (and/or multiple more fans in a horizontal direction). The ratio of panels to fans may be varied in order to optimize air flow, panel loading, pressure drop and/or fan efficiency.

The adsorber box [60] may include a series of fans [51] to move air through the adsorber panels.

Regeneration Chamber

In some instances, the regeneration process may be a simple batch operation, where the panel is loaded, and then a series of regeneration steps are performed (as shown in FIG. 15 and FIG. 16). These steps may comprise air removal, panel heating, $CO_2$ desorption, and panel cooling. The panel [50] may be enclosed in a chamber to perform these steps by encasing it between a set of moving wall elements (e.g., a clamshell) or by putting it into a fixed vessel and closing a door to isolate it from its surroundings.

In one embodiment, as seen in FIG. 5A, multiple panels [50a-50d] may be enclosed in a fixed structure. The panels [50a-50d] slot in from the narrow end, minimizing the size of the door [25] and the required sealing area. The regeneration box [61] may comprise multiple chambers (or zones). In this embodiment, the regeneration box [61] includes an initial purge zone [10], two steaming zones [11] and [12], and a final cooling zone [13]. A possible cycle in zone [10] may comprise opening a door [25] and sliding in a freshly loaded panel [50] while door [26] to steaming zone [11] is closed. The chamber in the initial purge zone [10] may then be evacuated of air by pulling a vacuum. Optionally, steam could be allowed to enter the chamber while the vacuum is applied, to sweep out the remaining air. The vacuum valve may then be closed and the chamber [10] may be repressurized with $CO_2$, fresh steam, or by connecting zone [10] to a discharge port from zone [11]. Once the chamber in zone [10] is re-pressurized, door [26] may be opened and the panel [50] may be moved forward into zone [11], with the fresh steam port being opened to back-fill the void space created by removing the panel. Door [26] could then be closed and zone [10] would be ready to receive the next panel. Optionally, while loading that next panel, a port could be opened to the heat recovery system so that the steam in the void space of the chamber in zone [10] could be recovered as the new panel enters. Alternatively, prior to loading the fresh panel [50], air could be swept through the chamber in zone [10] to remove steam (and optionally recover it), followed by loading of a next panel.

In an alternative embodiment, the initial purge segment may be split into two, three, or more zones, to separate out the purge step into different components—vacuum, followed by initial steam-break, etc. This can provide several benefits including (i) reducing any loss of steam or $CO_2$ to the atmosphere, (ii) reducing risk of air infiltration onto the hot panels in the subsequent zones, and (iii) increasing the speed of panel movement per zone, to better align timing from this step with required timing for multiple panels in the steaming (and other) steps.

In FIG. 5B, the two steaming zones [11] and [12] are shown enlarged. In other embodiments, different numbers of steam zones could be used. Steam may be distributed into a plenum [21] separated from the panel by a perforated wall, for example made of sintered metal or woven materials, that acts to help distribute the flow of steam evenly. In this embodiment, steam enters into the second steam zone [12] and the steam is forced to flow though the adsorber panel [50] to a plenum [22] on the far side by a baffle [24] that separates zone [11] from zone [12] on one side of the regen box. The steam then flows through plenum [22] to zone [11], passes through the panels [50] contained in that chamber, and then exits through the plenum [23].

In other configurations, the steaming section may be longer (for example 3, 4, 5, or 6-10 zones long, or longer); additional baffles within the plenums could be installed to encourage the steam to move through the individual panels more than once (for example flowing in one direction through the front half of the panel and back through the other half; or the flow could divide the panel into thirds, quarters, fifths or so on). In yet another configuration, some of the steaming chambers could be left empty, allowing the panels to move continuously (as exemplified in FIG. 6). FIG. 6 shows an embodiment where there is a single steaming region [11] that encloses three panels in a chamber that is approximately 4 panels long. The steam could be supplied to the middle two panels and pass through each of those panels eight times—each pass of steam would flow through a width approximately a quarter of a panel long. Three panels [50a, 50b, 50c] are loaded into the region, and they move gradually through the steam over the course of an overall step. The five rows in FIG. 6 show the position of the panels at different times (t1-t5) in the steaming process, with the last row showing the steamed panel [50a] leaving and a fresh panel [50d] entering from the left. By moving the panels through a continuous steam flow in this manner, all parts of the panels may see the same (or similar) steam profile in terms of time, temperature and $CO_2$ loading. In alternative embodiments, a different number of panels and zones could be utilized for this continuous panel movement through the steam, from as few as one panel and two zones, or alternatively between two and five panels and between three and six zones, or alternatively between six and ten panels (or more) and between seven and eleven zones (or more).

In some embodiments, the steam zones may be designed to accept higher pressures, to as high as 2 or 3 bara, or more, to allow for the steam to be utilized at a higher value of heat. In those instances, additional bracing and related mechanisms may be required for both the walls of the regeneration box, and the doors between zones, to provide sufficient resistance (and sealing) for purposes of dealing with those higher positive pressures.

In FIGS. 5A-5B, the steamed panel [50] leaving zone [12] enters the vacuum cooling zone [13] through door [27]. The valves that connect zone [13] to a vacuum source are then opened to evacuate the chamber, causing a drop in pressure. The reduced pressure causes some of the hot condensate in the panel [50] to evaporate, such that the panel [50] is both cooled and dried. In order to reduce the load on the vacuum pump, the resultant water vapor may be condensed in the heat exchanger so that only the non-condensable load flows through the vacuum pump. And because the majority of the non-condensable load from zone [13] will be rich in $CO_2$, the vacuum pump discharge may be recovered as product. Once the panel in zone [13] reaches a temperature of less than 60° C. or better less than 40° C., or less than 30° C., the port to ambient air may be opened, breaking the vacuum. The final door [28] may then be opened and the cool, depleted panel [50] removed. Door [28] is then closed ready for the next cycle.

In an alternative embodiment, the cooling segment may be split into two, three, or more zones, to separate out the cooling of the panel into different components—initial vacuum cooling, continued vacuum cooling, and vacuum break with air. This may provide several benefits including (i) reducing any risk of loss of $CO_2$ to the atmosphere, (ii) reducing risk of air infiltration onto the hot panels in the subsequent zones, and (iii) increasing the speed of panel movement per zone, to better align timing from this step with required timing for multiple panels in the steaming (and other) steps.

As seen in FIG. 5A, both of the vacuum chambers in zone [10] and zone [13] have two doors, as opposed to a single door. Vacuum chambers with two doors allow a "flow-through" of panels—one panel can enter the zone at the same time as a second panel moves out. The rate of production of the overall process is constrained by how quickly $CO_2$ can be removed from the panels, so minimizing the time required for moving panels maximizes the time available for $CO_2$ removal. With a single door, one panel would have to be unloaded before the next one could be loaded; and it would require the void space within the vacuum chamber [10] or [13] being filled with a gas (typically air). By having 2 doors and a "flow-through" design, it is possible to move one panel in while the previous panel is being moved out, reducing the overall cycle time and minimizing the filling of the void space with unwanted gas.

There are further benefits to combining this 2-door design with a multi-zone regen box. These benefits include the opportunity to minimize the void space around the panel, which is particularly beneficial for the inlet and outlet zones [10] and [13], where air ingress can have serious deleterious effects. It is also possible to keep the hot, steam zones warm at all times (minimizing the stress and expense of thermal cycling) and to allow a more generous steam distribution plenum in the steam zone without adding void space to the vacuum zones (as would be required in a single-zone design). Further, by having more than one panel in the steaming zone, it is possible to operate in a mode such that the steam and panels flow in opposite directions. The closer the system can come to true counter-current operation, the more efficient the use of steam and the higher the concentration of $CO_2$ that can be delivered to the downstream process.

In some embodiments of the system, as seen in FIG. 5A, doors [26], [27] and [28] may all be opened at the same time, allowing the panels in zones [10], [11], and [12] to move into zones [11], [12] and [13] at the same time, with the panel in zone [13] leaving the system at the same time. In other embodiments, the panel [50] in zone [13] may be moved out with door [27] closed, filling the void space with air. Door [28] may then be closed and the air purged either by pulling vacuum and repressurized with steam or some other inert gas; or the air could simply be displaced by flushing the void space with steam. In other embodiments, the panels in zones [11] and [12] may be moved while door [26] is still closed, so that the movement out of zone [10] happens later. In yet another embodiment, all four doors could be opened at the same time, and a panel could be loaded into zone [10] at the same time as the panels move from [10] to [11], from [11] to [12], from [12] to [13], and from [13] out of the regeneration box.

In other embodiments, the regeneration box may be sized to allow more panels in either the direction of movement or in parallel through the movement. For example, the regeneration box may remain roughly four panels long, but accommodate 2, 3, 4, or more panels wide, with each panel loaded face-to-face with each other. In yet another embodiment, the regeneration box may have a longer length so that multiple panels sit end to end in each zone, and then at each step each of those panels advance together. For example, each zone could accommodate two panels, alternatively between three and five panels, or alternatively between five and ten panels (or more), and in each case the entire number of panels in each zone may move from one zone to the next.

System Overview

The DAC system employs a chemisorption process to remove carbon dioxide from the ambient air, provided to the process with an air handling system integrated within the system's package envelope. The chemisorption process is a reversible reaction that is regenerated by employing steam distribution and recovery.

As seen in FIGS. 2A and 2B, a series of adsorber panels [50] move continuously within the air flow, in a linear plane or row forming a "wall" of panels [54a, 54b] (or alternatively, additional planes). At the end of the adsorber box [60a], each of the panels [50] exit the air flow generated by the fans [51] in the adsorber box [60], and enters a multi-zone regeneration box [61a]. After the panel [50] exits regeneration box [61a], the panel [50] re-enters an adjacent adsorber box [60b] and joins a "wall" of panels [54c]. At the end of the adsorber box [60b], the panel [50] exits the air flow, moves via a transverse movement system [62b] to the opposite side of the adsorber box [60b] and joins another "wall" of panels [54d], and reenters the air flow in adsorber box [60b]. Upon exit of the air flow in adsorber box [60b], the panel [50] enters the next regeneration box [61b].

Figure 7A:
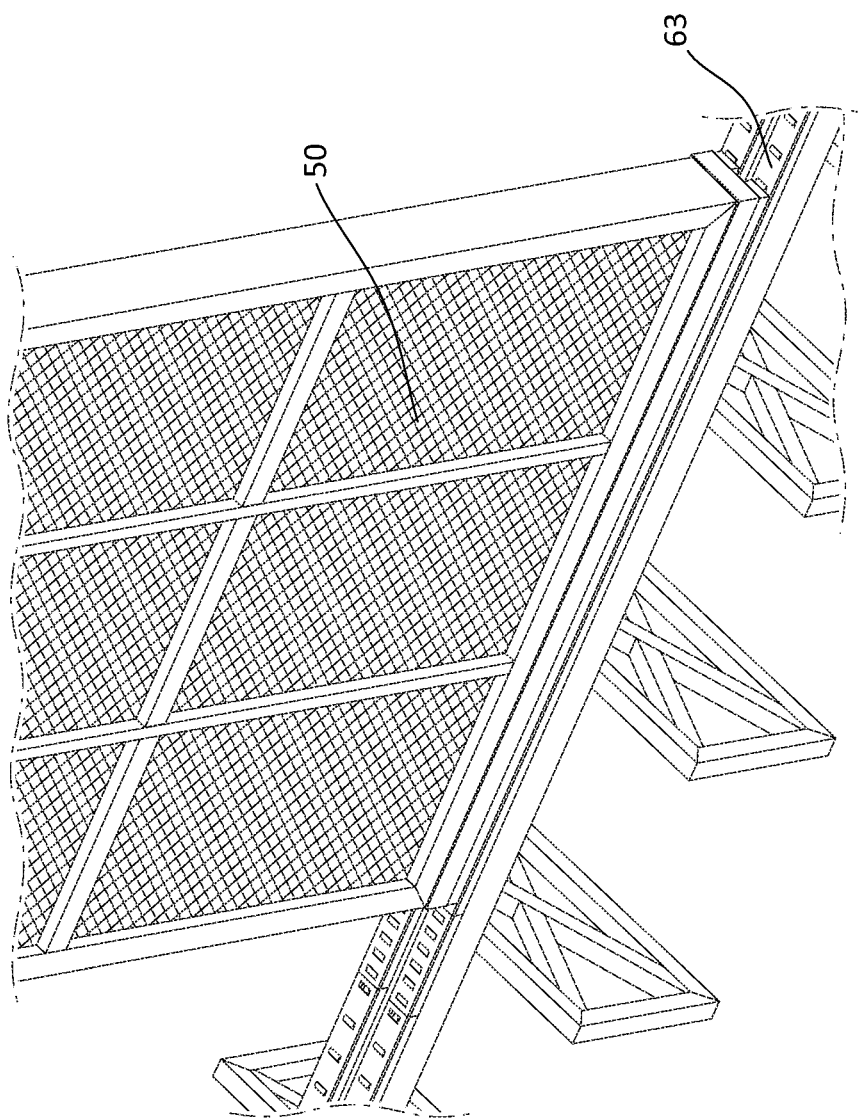
FIGS. 7A-7B illustrate exemplary panel movement systems.

FIG. 7A is an exemplary embodiment of a panel movement system. While in the air flow in an adsorber box [60], the panels [50] may each move continuously across a track [63]. Such movement may be achieved using a stepper motor, or alternatively hydraulic, pneumatic, electric or other drive mechanisms, and may include a chain or alternative drive mechanism to facilitate such movement across the full length of the track.

Figure 7B:
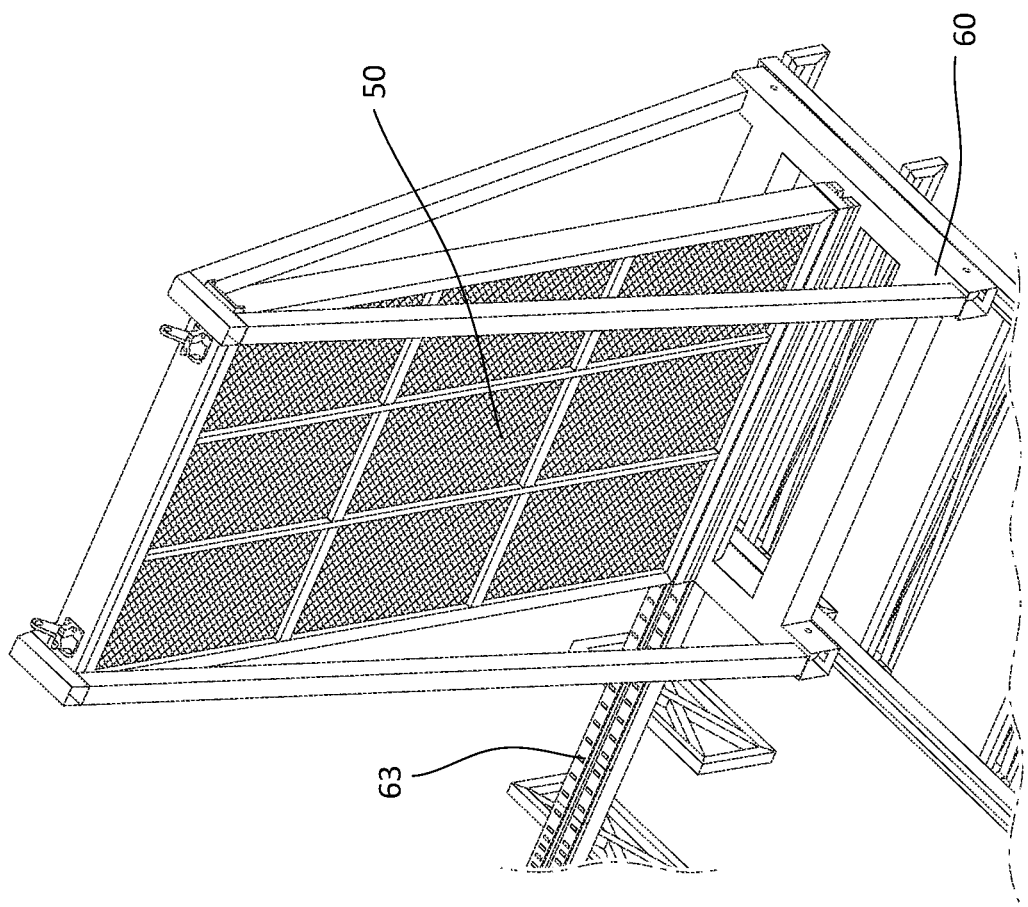

At the far ends of each adsorber box [60], after exiting the air flow, each panel [50] may enter a transverse lateral movement unit [62] to move the panel [50] to the opposite wall [54] of adsorber panels. FIG. 7B shows an exemplary embodiment of a lateral transfer station or transverse unit [62]. Such transverse unit [62] may include an A-frame and other mechanisms to secure the panel [50] for purposes of such transverse movement. The panels [50] may remain open to ambient conditions during the adsorption phase but may be sealed from any ambient conditions during the regeneration phase, which allows for an optimal environment to facilitate the subsequent desorption of the captured atmospheric $CO_2$.

Figure 7C:
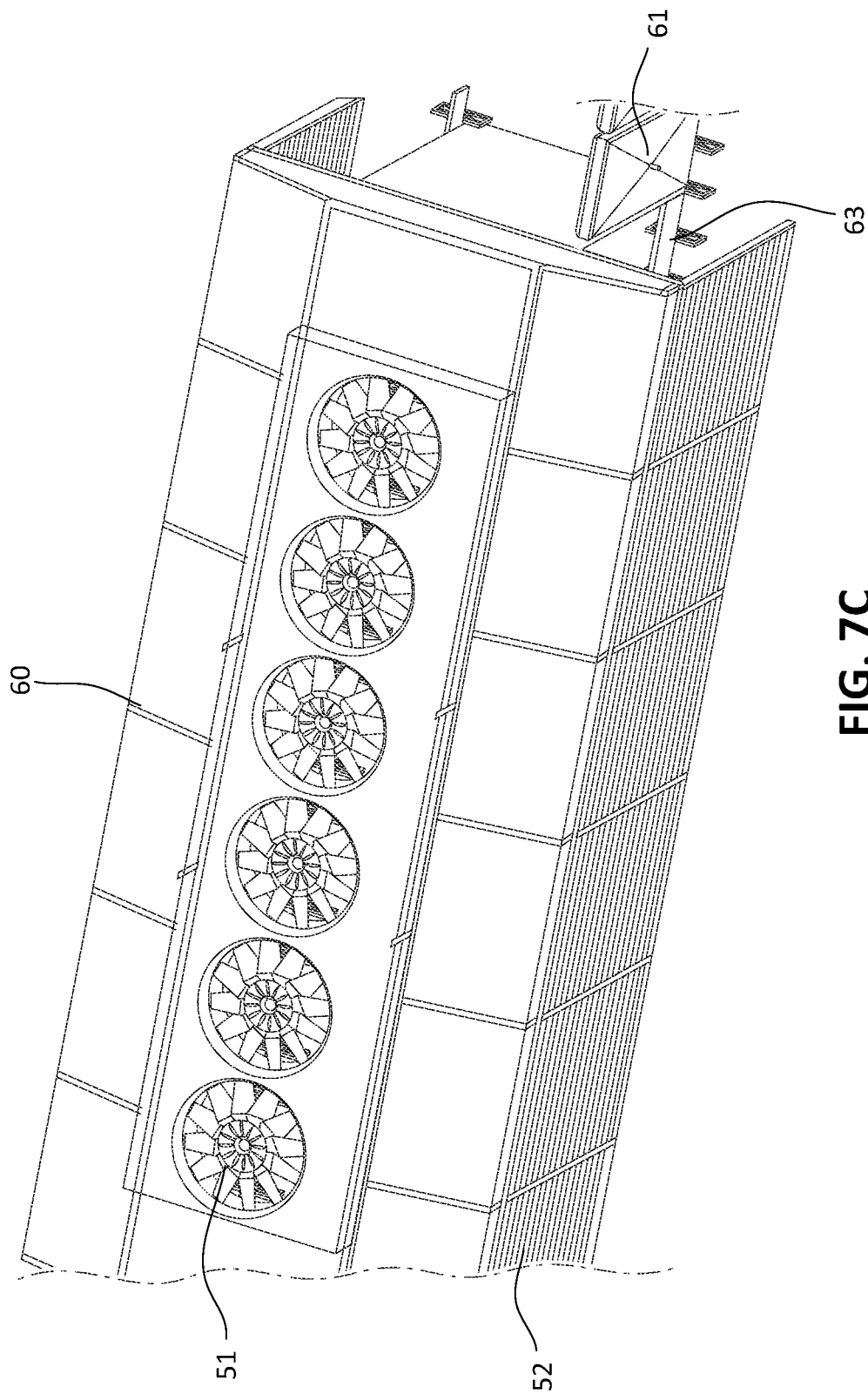
FIG. 7C illustrates an exemplary adsorption/desorption process unit in 3-D.

FIG. 7C shows an exemplary embodiment of an adsorption box [60]. Air flow may be provided to the panels [50] from a single or multiple fans [51], which may typically be of an induced draft design, but alternatively may be forced draft. Fans may be as small as 10' in diameter, or alternatively 10'-30' in diameter, alternatively 30'-50' in diameter, or alternatively 50'-70' in diameter (or larger). The fans may be oriented horizontally or vertically. Fans may be arrayed one atop another, or side-by-side, or in combinations of both side-by-side and atop each other. In some embodiments, fans may be arrayed 3 or 4 (or more) atop each other, in others 3 or 4 (or more) side-by-side, and in others in configurations of 2×2 fans, 3×3 fans or 4×4 fans (or greater). Fans may also be arrayed in different number regarding height vs. width, such as 3 high over 2 wide (3×2), 4×2, 4×3, 5×3, 6×3, 5×4, or any other combination with the number of fans high ranging from 1 to 6 (or higher), and the number of fans wide ranging from 1 to 6 (or higher).

Once the air flow/$CO_2$ adsorption cycle for a panel is completed (for example in FIG. 1), the panel moves along a track into the regeneration box, the door is then closed and sealed from the ambient air, preparing the panel to initiate the $CO_2$ regeneration and removal steps. As noted, this may be accomplished by the utilization of vacuum pumps to remove air, followed by the application of steam or an inert gas to remove any remaining oxygen, and then followed by the application of steam to break the vacuum. After that panel moves into the steaming zone [11] next, further steam is applied, and that panel subsequently moves to one or more additional zones for continuation of the steam application process. Following the steam step, the panel moves to a final zone (or zones [13]) where a vacuum may be pulled to facilitate any remaining removal of $CO_2$, as well as cooldown of the panels. Subsequently, a valve may introduce air to break the vacuum, at which point the panel may exit the regeneration box along the track, moving into position to re-enter the air flow in the next panel wall in an adsorber box to re-initiate the adsorption cycle.

At the re-entry point to the air flow and panel wall, care may be taken to ensure the panel was prepared to re-enter the flow immediately behind the next moving panel, to avoid any gaps that could negatively impact the air flow. Similarly, roller seals (or alternative types of seals) may be utilized at the point of entry (and exit) of the panels, to minimize risk of leakage of air flow.

The regeneration box may complete the entire desorption process via only a single zone, or alternatively multiple separate zones, whereby a single panel [50] moves from zone to zone to complete its desorption process. The range of steps include: (i) eliminating air (and oxygen, which may be harmful to the sorbent under high heat) from the panel [50] via either pulling a vacuum or sweeping out the air via steam or an inert gas (such as nitrogen), (ii) breaking the vacuum with steam, $CO_2$, or some alternative gas, (iii) heating the panel [50] via steam or $CO_2$ (or other means such as indirect heat), and (iv) cooling the panel [50]—via some combination of vacuum, application of an inert gas (such as nitrogen) or a range of other direct or indirect cooling methods. As seen in FIG. 5A, the regeneration box [61] includes three sections: (i) a preliminary vacuum section (zone [10]) in which the air surrounding the panel [50] is removed via vacuum (or other means), and the vacuum is then broken with steam, (ii) a central steaming section (zones [11] and [12]) in which steam is applied to two (or fewer or more) adsorber panels, and (iii) a cooling section (zone [13]) in which the panel [50] is subjected to vacuum (or alternative means) for purposes of cooldown prior to being exposed again to ambient conditions. In alternative embodiments, a range of alternative measures may be used for removing air, applying heat, and/or cooling down the panels [50]. Alternative embodiments may include differing numbers of panels in each of the sections, or additional zones in each of the sections, or both. In addition, in certain embodiments there may be less need to remove air, or to cool down the panels [50], in which case the number and nature of the sections and/or zones, and number of panels in each sections and/or zone, may well vary.

The doors [25], [26], [27], and [28] of the regeneration box [61] may be driven by either electric, hydraulic, or pneumatic means, with actuators located outside the regeneration box [61] itself. Seals for the doors may be either single seals or double seals, and in the instance of a double seal, may include the ability to fill the space between seals with steam.

Gases may be delivered to (or removed from) the regeneration box [61] via a series of pipes (or ducts) and valves.

The entire regeneration process may take as little as 1 minute or as much as 4 minutes (or more), and each panel [50] may move from section to section or zone to zone within that overall time limit, with the time for each section representing as little as 10-15 seconds, or as much as 45-60 seconds, or alternatively a time period in between, 15-30 seconds or 30-45 seconds.

In some embodiments, an additional step may be required to further isolate the hot adsorber panel [50] from exposure to air as the final panel [50] exits; in which case, an additional step may be added to remove air from the cooling section (zone [13]) (via either vacuum or steam sweep, or both) prior to advancing the hot panel to zone [13]. In that instance, this could be accomplished either via additional time to allow the zone [13] to be cleared of air prior to advancing the hot panel [50], or alternatively adding yet another zone to the regeneration box to facilitate that additional buffer from exposure to incoming air.

The panels [50] can be of any dimension in a rectangular format, with dimensions on a given side from as small as 2' to as great as 60' or more. Alternative shapes for the panels and regeneration plates may also be used in embodiments, including polygons of varying sizes, or alternatively, round or oval shapes. In one alternative embodiment, panels are shown in the shape of a "slice" of a disc or ring (FIG. 44B), to accommodate continuous movement along a circular track (FIG. 44A).

Entire DAC process units (adsorber boxes [60] and regeneration boxes [61]) may also be placed alongside each other, allowing the DAC process units to share downstream processing equipment such as heat pumps and compressors.

In all instances where DAC units are adjacent to each other—either stacked atop one another, or side-by-side—care must be taken to ensure $CO_2$-depleted air discharged from one unit is not drawn into an adjacent unit. In some embodiments, ducting (guide vanes or other air flow deflection devices) may be introduced to ensure the adequate exhaust of $CO_2$-depleted air away from adjacent units.

The scale of a single unit may be approximately 40,000-50,000 tonnes/year of $CO_2$ captured, alternatively as small as 1,000-5,000 tonnes/year, alternatively 5,000-40,000 tonnes/year, or alternatively as 50,000-100,000 tonnes/year, alternatively 100,000-300,000 tonnes/year (or larger). Multiple units may be arrayed next to each other—or stacked—to achieve an overall volume of 1 million tonnes/year, or as high as 10 million tonnes/year, or higher. Higher volumes have the potential to drive further cost reductions through (i) spreading the cost of the shared process equipment (whose costs do not increase linearly with scale) over higher volume, and (ii) a movement toward an increasingly "continuous" process from a process flow standpoint (due to the greater number of Subunits), leading to more efficient process equipment operation and related lower energy costs.

The system may also include accumulators to allow for some of the process flows to operate in a more continuous manner. The system may also include a mechanism to prevent foreign materials from fouling the operation of the panels. For example, the system may include a screen to prevent insects from entering the system. The system may also include a filter to reduce accumulation of dirt, dust, and particulate matter. The system may also require a periodic cleaning of the adsorber panels.

The system is designed to ensure that the entire regeneration cycle can be accomplished efficiently, without excessive time allocation, excessive steam breakthrough, or other elements that would negatively impact throughput and/or operating cost.

The primary fluid inputs include air, steam, and in certain embodiments, one or more of inert gases, such as, without limitation, $CO_2$ or $N_2$, as well as makeup water. Exiting the plant are $CO_2$ clean air containing water vapor and product $CO_2$ (along with a possible $N_2$/air mixture containing water vapor).

The preferred embodiment uses steam to provide the heat for desorption, the reduction partial pressure of $CO_2$, and the motive force to convey the $CO_2$ out of the regeneration chamber. Alternative embodiments may readily be envisioned. For example, the heat could be supplied by embedding heating elements within the adsorber panels. These heating elements could be electrically heated wires or tubes containing a hot fluid. Alternatively, the steam could be replaced with another hot gas that could be easily condensed and separated from the $CO_2$ in the downstream process. Examples of such fluid could include "natural refrigerants" such as butane, pentane, hexane, or other similar hydrocarbons; synthetic refrigerants, such as fluorinated hydrocarbons; ammonia; or other similar gases. The reduced $CO_2$ partial pressure could be achieved by applying vacuum during the heating cycle. It is clear that by creating an isolated regeneration space for the panel that can withstand vacuum, elevated temperature and elevated pressure, the necessary steps for desorption could be achieved in a number of different ways.

Fan

An air flow velocity of about 3 m/s, alternatively between about 1 to about 5 m/s, alternatively between about 0.2 to about 10 m/s, or alternatively in excess of 12 m/s may be needed in the approach to the adsorber panels. The individual adsorber units within the panel may include a large number of small channels, similar to a honeycomb, where the air may need to squeeze into these channels. Therefore, the velocity of air as it travels through the panel may increase, resulting in air flow velocity through the panels of between 0.2 and 20 m/s; alternatively, between 3 and 15 m/s; or alternatively between 4 and 10 m/s.

In some embodiments, air circulation may be provided with a single, large fan, or a series of fans, that approximately matches the length of adsorber box [60]. For example, for an adsorber box that is approx. 18 feet wide and 260 feet long, a series of 15 fans, each ~16' in diameter, may be arrayed overhead.

Sorbent

The adsorbent sets the productivity levels and regeneration requirements. Sorbents specifically designed for DAC may be used with this system. Sorbents for use with DAC are described in US 2019/0291077, titled "PCSTRUCTURES INCLUDING SUPPORTED POLYAMINES AND METHODS OF MAKING THE SUPPORTED POLYAMINES," which is herein expressly incorporated by reference in its entirety for all purposes. The sorbent material may have a low molecular weight, highly branched polyethyleneimine (PEI) that is incorporated within the panel substrate. This would allow for high volumetric amine loadings (i.e., amine sites/adsorbent volume). Solid amine adsorbents interact with $CO_2$ via a chemical adsorptive mechanism, resulting in high $CO_2$ adsorption capacities at very low $CO_2$ partial pressures and high selectivity to $CO_2$ over other components of air, such as water in the form of humidity. A polyethyleneimine (PEI) sorbent may have a limited lifetime estimated at 0.5-3 years (primarily due to oxidation and polymer leaching), at which point the sorbent on the substrate would be replaced. Extensive prior research has been conducted to establish lifetime targets.

In other embodiments, other sorbents may be utilized, including alternative forms of PEI, alternative forms of amine-based sorbents, zeolites, Metal Organic Frameworks (MOF's), as well as other materials that effectively and selectively capture $CO_2$.

Embodiments may also use other forms of substrates with sorbents, including fibers impregnated with sorbent, flat surfaces of fabric, metal, or other materials impregnated with sorbent, or alternative constructions and materials that are designed to optimize the adsorption of $CO_2$ while limiting pressure drop.

Downstream Process

Figure 8A:
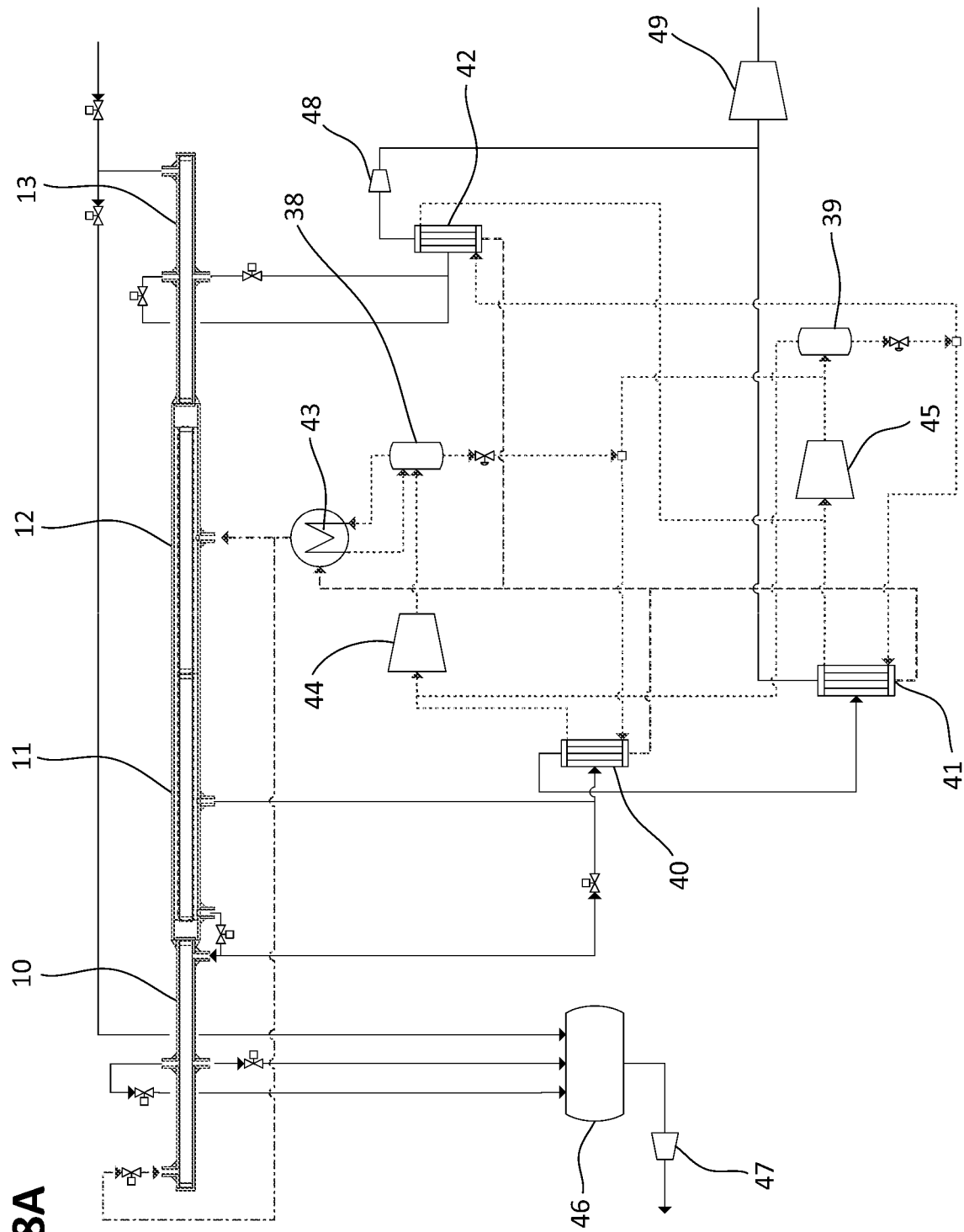
FIGS. 8A-8B. illustrates exemplary process flow diagrams, including downstream processes for $CO_2$ and heat recovery.
Figure 8B:
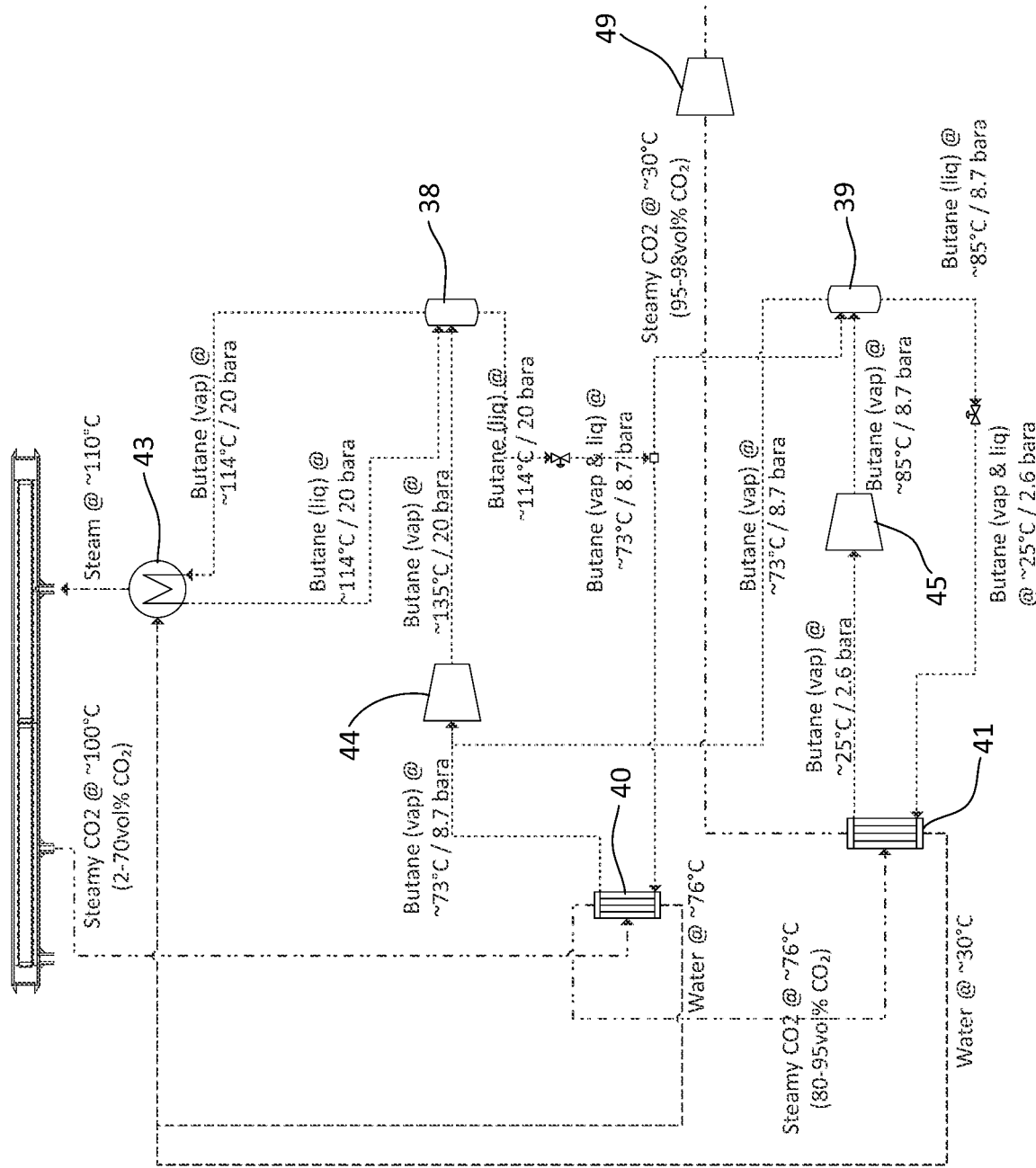

FIGS. 8A-8B show exemplary embodiments of the downstream processing for the regeneration box. A large vacuum chamber [46] enables air to be quickly expelled from zone [10] or zone [13] while allowing the vacuum pump [47] to operate at a relatively consistent load. Hot vapors from zone [11], which may comprise $CO_2$ and water, are directed to condenser [40], where they may be condensed against a boiling refrigerant, such as butane—or an alternative gas. The liquid water condensate from [40] may be reused to generate more steam while the remaining uncondensed gases may be directed to a second condenser [41] operating at a lower temperature. This condenser may be cooled by boiling refrigerant at a lower pressure. Again, water from condenser [41] may be returned to the boiler [43] while the remaining gas, now mostly $CO_2$, may be sent to the product compressor [49].

Low pressure refrigerant from condenser [41] may be sent to a low stage heat pump compressor [45], which may feed an accumulator vessel [39]. Vapors from a mid-pressure accumulator [39] may combine with the mid-pressure refrigerant vapor from condenser [40] to feed the high stage compressor [44]. The hot, high-pressure vapors from compressor [44] are collected in accumulator [38] and the vapors condensed in boiler [43] to make steam for the process.

Wet, $CO_2$-rich vapors from zone [13] may be sent to condenser [42], where the majority of the water vapor is removed as liquid and returned to the boiler, while the remaining vapors (mostly $CO_2$) may be sent to the vacuum pump [48], which may discharge into the feed of the product compressor [49].

In previous designs, the steam for desorption was generated by burning fuel to make hot gases that in turn boiled water. The fuel was typically fossil in nature or at best from a renewable source (such as biomass or anaerobic digestion). Thus, such systems contributed to the atmospheric $CO_2$ that the DAC systems described herein are designed to capture. The steam and $CO_2$ generated by the desorption process were typically separated by condensing the water vapor out of the $CO_2$ gas in a condenser that was cooled by cooling water. The heat transferred to the cooling water was then dumped to atmosphere by evaporating some of the water in a cooling tower.

The process described herein may allow the steamy $CO_2$ leaving the desorption process to be condensed in two steps—a first step at relatively high temperature (e.g., above 50° C., alternatively above 60° C., alternatively between about 50° C. and about 80° C., alternatively about 70° C., alternatively about 75° C., alternatively about 77° C., alternatively about 78° C.) and a second step at a lower temperature (e.g., between about 25° C. and about 40° C., alternatively about 25° C., alternatively about 30° C.).

A possible embodiment of this design is shown in FIG. 8B. The first condenser [40] may recover the majority of the energy in the steamy $CO_2$ at a higher temperature than would be typical. This higher temperature means that the energy can be efficiently upgraded in a steam-generating heat pump ([38], [40], [43] and [44]). This heat pump uses electrical power in a refrigerant compressor [44] to raise the pressure (and thus condensing temperature) of the refrigerant, creating the conditions that allow the refrigerant to condense at a high enough temperature to boil water and make low pressure steam [43]. The key advantages of using the heat pump are that the amount of electrical power to run the compressor [44] is significantly lower than the amount of energy than can delivered to generate steam [43]—typically the energy going into steam is 1-part electrical compression energy and 2-5 parts heat energy recovered in the process condenser [40]. Further, in certain embodiments, the electricity to operate this heat pump can be generated without releasing $CO_2$ directly (e.g., hydro, wind, solar), so that the heat supply to the overall process is "decarbonized". As an additional benefit, the heat recovered into the heat pump may be directly re-used in the process, rather than being dumped to the cooling tower—thus the water use in the cooling tower may be substantially reduced.

While the use of electricity derived from processes that do not directly release CO2 may be preferred, the present invention is not so limited, and the improvements set forth herein may also be applied to systems powered by fossil fuels, fuels from renewable sources such as biomass and anaerobic digestion, and the like, and such systems would also fall within the scope and spirit of the present invention as disclosed herein.

In some embodiments, to further improve the overall process efficiency, and with that high-temperature heat pump in place, a second-stage heat pump may economically be added to the system and operate at a lower temperature/ pressure range. The second-stage heat pump ([39], [41] and [45] and (where integrated) [38]) can collect energy at lower temperatures—from the product stream (exchanger [41]), but also other low-grade heat sources such as the dryer/cooler vapors (in unit 42) from the drying/cooling section [13], and other places (e.g., $CO_2$ compressor discharge; refrigeration plant discharge). While it is less efficient to raise the temperature all the way from the lower temperature of the second condenser [41] (e.g., nominal 30° C.) to make steam, the heat can be used to boil more butane at the intermediate pressure (in accumulator [38]). By using this two-stage heat pump, the electrical power required to upgrade the low temperature energy is still less than the energy recovered into steam by a healthy margin (for example 1 part power to 1.5-3 recovered heat), though it is less efficient than the high stage heat pump on its own (more energy recovered but at a lower efficiency). In such a system, the cooling tower water use savings are substantial.

The embodiment described above and in FIG. 8B outlines just one possible configuration of the process. For example, the temperature at which the heat exchangers [40] and [41] collect heat could be increased (allowing more efficient heat recovery, but reducing the amount of energy collected) or decreased; the size of heat exchangers [40], [41] and [43] could be increased (allowing the temperature difference between hot and cold sides to reduce, but requiring more capital) or reduced; and the efficiency or cooling of the refrigerant compressors ([44] and [45]) could be altered. The steam in this embodiment is shown as being generated at 110° C., but the discharge pressure of the compressor [44] could be reduced or increased to allow that steam temperature to vary, for example it could be as low at 90° C. or as high as 140° C.

The refrigerant shown in FIG. 8B is butane, but a number of other refrigerant or refrigerant blends may be used. Possible refrigerants include, but are not limited to, propane, isobutane, pentane, or similar "natural" refrigerants or "synthetic" refrigerants such as R1336MZZ. FIGS. 8A-8B shows the refrigerant directly coupled to the process streams, but a heat transfer fluid, such as water, may be used to keep the process and refrigerant isolated. In other embodiments, additional stages to the heat pump may be added—for example collecting heat at 80° C., 50° C. and 20° C. in a 3-stage heat pump. In yet other embodiments, different refrigerants could be used to different stages—for example, ammonia could be used for the lower stage (increasing from 20-40° C. or from 0-45° C. or from −30-50° C. to 70-80 or 65-85 or 60-90° C.) and water vapor could be used for the high stage (increasing from 70-80 or 60-85 or 55-90° C. to 105-110 or 102-120 or 100-140° C.). Conventional refrigerants may also be used, and such systems would fall within the scope and spirit of the present invention.

In alternative embodiments, the steam may be supplied by a conventional boiler or by waste heat from another process. The cooling may be supplied by a conventional cooling tower or by integrating with another process. In another alternative embodiment, the condensers [40], [41] and [42] may be water cooled, with the water giving up its heat to the heat pump.

Adsorption Process

The adsorption process combines contactors with very high surface area to volume ratios, sorbents with high selectivity for $CO_2$, and low pressure drop, all designed to facilitate the movement of large volumes of air to maximize carbon capture. Because $CO_2$ adsorption is a function of an uptake curve, whereby the rate of $CO_2$ adsorbed onto the adsorber decreases as the sorbent becomes fuller, optimizing the adsorption cycle time relative to the desorption time can have a significant impact on overall $CO_2$ capacity and cost per tonne.

Adsorption capacity is a function not only of adsorption time, but also the dimensions of the panel (height, width, and length), the porosity of the adsorber panel, the type of sorbent with its attendant selectivity for $CO_2$, the loading of the sorbent able to adsorb $CO_2$ in the adsorber panel matrix, and the partial pressure of $CO_2$ in contact with the adsorber panel (in turn a function of the flowrate of air and the concentration of $CO_2$ within that air). In addition, since the incremental adsorption capacity is a function of the amount of $CO_2$ adsorbed on that adsorber panel, successful desorption has a significant impact on the adsorption phase as well. This embodiment has been designed to optimize the above characteristics in a manner to maximize the throughput of $CO_2$ in the system, thereby increasing capacity, and driving down cost per tonne of $CO_2$ captured.

Regeneration Process

The steps of the regeneration process that occur in the regeneration box (an example of which is shown in FIG. 5) are described in more detail below.

The sorbent embedded within the panel [50] is at risk of deactivation if exposed to oxygen at elevated temperatures well in excess of ambient temperatures, meaning in excess of 35-60° C. Thus, prior to the application of steam during regeneration, a partial or deep vacuum may be pulled via a pump-down step. The vacuum may be between about 0.20 and 0.50 bar, alternatively between about 0.10 and 0.20 bar, alternatively between about 0.025 to about 0.20 bar, alternatively between about 0.05 bar and 0.1 bar.

To further improve oxygen displacement, in an optional additional step, a sweep gas may be applied to purge any oxygen (to minimize risk of sorbent deactivation, as mentioned above). In certain embodiments, the sweep gas may be steam. In such instances, steam may be applied at a temperature, or velocity, or duration, or while the regeneration chamber is still under vacuum, to minimize heating of the sorbent (which would otherwise be at risk of deactivating the sorbent).

The sweep gas may also be nitrogen, which may be produced from a nitrogen generator, at a concentration of between about 96% to about 99.9999%. The nitrogen may be subsequently recovered via a separate process, and available to be recycled again through the system.

In an alternative embodiment, the sweep gas may be flue gas from a gas-fired boiler, though this would require minimizing the NOx and SOx in the emissions which could otherwise negatively impact the adsorber media.

Alternatively, carbon dioxide itself may be used as the sweep gas, allowing for the economic reuse and recovery of carbon dioxide through multiple cycles.

In some embodiments, the system may allow for different sweep gases to be applied such that process adjustments can be made based on performance/analysis. After the sweep gas is delivered to the panel, the sweep gas may then be moved through a recovery system to allow for reuse.

To the extent inert gases are used for the initial purge, steam may be applied as a secondary purge of non-condensable nitrogen and oxygen from any void space. This step is important because high levels of non-condensable nitrogen and oxygen carried into purification with the raw $CO_2$ product may make it harder to condense and recover the $CO_2$ efficiently. This application of steam could be combined with the application of a vacuum that both displaces most of the inert gas and would prevent the steam from condensing at a temperature high enough to accelerate oxidation or desorb $CO_2$.

In addition to the above, certain next-generation sorbents may be available whereby there would be a substantial elimination of risk of sorbent deactivation in the presence of oxygen and high heat. The use of such a sorbent would reduce the need for the vacuum, sweep gas, and cool-down steps, substantially increasing the speed and efficiency of the process, as well as materially lowering the costs of the system.

After the $O_2$ concentration around the sorbent has been reduced, heat is applied to the panel for purposes of desorbing the $CO_2$. This may be accomplished by the application of steam, delivered via steam pipes/ducts attached to the regeneration boxes. In each instance, gases are delivered/removed via a series of pipes and valves. The steam may be applied to the panel at a temperature between about 80° C. and about 90° C., alternatively between about 90° C. and about 100° C., alternatively between about 100° C. and about 125° C., alternatively between about 120° C. and about 150° C.

In some embodiments, it is advantageous to use the steam to break the vacuum in the initial zone/chamber in the regeneration box. During this step, steam would flow into the chamber and condense against the cooler internal surfaces. This would both draw in additional steam and warm up the panels, and this may lead to sufficient heating for the $CO_2$ release to start. Once the internal volume of the regeneration chamber reaches an appropriate pressure, for example atmospheric pressure, then the panel could move to the next zone/chamber. Further steam may condense, providing the temperature driving force to desorb further $CO_2$, and the excess steam would displace the $CO_2$ gas from the volume, maintaining a low partial pressure and thus an attractive desorption driving force.

In other embodiments a preheating step may be used, whereby a hot gas (of between about 50° C. and about 100° C.) is recirculated through the chamber and reheated with an external heat exchanger. The recirculating hot gas may be $CO_2$ or a mixture of $CO_2$ and water vapor. Preheating the panel with a hot gas may reduce the amount of steam that condenses onto the panel in subsequent steps and so may reduce the amount of liquid condensate in the pores of the panel.

After the application of steam and the harvesting of the $CO_2$, the adsorber panels would move on to the next zone/chamber, where they may be subjected to a cool-down step via the evaporation of condensed water on the surface of the panel. This cool-down step may be accomplished by pulling an even deeper vacuum—down to between about 0.20 and 0.30 bar, alternatively down to between 0.10 and 0.20 bar, or alternatively down to between 0.01 and 0.1 bar. This vacuum serves to help empty any remaining gases from the system and reduce the amount of water remaining in the adsorber, as well as cool the adsorber panel to a level that would help minimize potential oxidation of the sorbent. In some embodiments, the adsorber panels may need to be cooled to less than about 60° C., alternatively about 40° C., alternatively about 25° C.

Additionally, or in the alternative, nitrogen may be applied to promote cool-down and remove residual water from the panel. The nitrogen may again be moved through a recovery system to allow for reuse. Alternatively, a gas such as air or nitrogen may be used after an initial vacuum cooling step, and the gas may be recirculated through a chiller/condenser.

The duration of the cool-down step may vary depending on (i) the targeted level of temperature and % water remaining to be achieved, and (ii) the size of the vacuum pump and/or blower used to facilitate the cool-down step.

The $CO_2$ leaving the system will be mixed with water vapor (or, in other embodiments another easily condensable gas) as well as inert, largely incondensable gases (such as $N_2$ or $O_2$). This water vapor (or other easily condensable gas) may be condensed by cooling and/or pressurizing the product stream, allowing the condensable gases to be recovered as a liquid stream. The heat released by condensing the vapor will be recovered into a process fluid that may be used to supply a heat pump. In all instances, water condensate from the product stream may be reclaimed and reused (as well as excess nitrogen, to the extent nitrogen were used as part of the cool-down step). The product stream leaving this cooling/compressing phase may be 80-99 wt % $CO_2$ and may be recovered directly as a product. It may also be further cooled to further increase the $CO_2$ concentration to 95-99.9 wt %.

The regenerated and recovered $CO_2$ may next enter a liquefaction/purification step, whereby the $CO_2$ enters a series of compression and chilling steps to both increase the concentration of $CO_2$ and liquefy it. The compressed $CO_2$ may have a purity of between about 95 wt % and about 99.99 wt %. The harvested $CO_2$ may be utilized immediately for utilization in a product (such as chemicals, plastics, materials used in concrete, carbon fiber, food and beverages, etc.), or alternatively sequestered underground. Alternatively, the harvested $CO_2$ may be stored in high pressure, low temperature tanks, ready for periodic shipment to locations to utilize the $CO_2$ in products, or alternatively sequestered underground.

Once the panels are below the temperature at which rapid sorbent deactivation in the presence of oxygen may occur, and the water level remaining in the pore space is reduced to less than a threshold amount, the panel may be released from the regeneration box and begin to move along its track again to allow for the resumption of air movement and the adsorption phase.

Heat Pump, Heat Recovery, and Other Downstream Processes

A conventional way to operate a DAC system may involve burning fuel to raise steam to power the process and to send the waste heat to a cooling tower. This is relatively inefficient in terms of energy use and can affect the carbon-reduction impact of a DAC plant.

In some embodiments, the system described herein may use a heat pump, rather than a fuel-burning boiler and cooling tower. A heat pump is a device that captures the low-grade heat leaving the process and upgrades it for reuse by using an electrical motor to power a compressor. In certain embodiments, the electrical motor may be powered with renewable electricity, reducing the operating carbon footprint of the overall process. The heat pump also eliminates load on the cooling tower, reducing the water footprint.

While the use of electricity derived from processes that do not directly release CO2 to operate a heat pump may be preferred, the present invention is not so limited, and the improvements set forth herein may also be applied to systems powered by fossil fuels, fuels from renewable sources such as biomass and anaerobic digestion, and the like, and such systems would also fall within the scope and spirit of the present invention as disclosed herein.

This process design is set up to capture waste heat at two temperature levels to improve the efficiency of the energy upgrading. Integrating the heat pump with a lower-than-conventional cooling step in the regeneration system improves the water recovery (less water lost to atmosphere/made up to the steam system) and allows for a cooler panel that transfers from regen to adsorption (less adsorber degradation for high temperature/$O_2$).

Optionally, the process is designed to allow for optimizing heat recovery to reduce energy requirements. A heat pump could be utilized to deliver most of the heat required in the process, recovering and reapplying heat throughout the system. This may be accomplished utilizing a heat pump having a combined medium and high temperature unit based on an appropriate refrigerant, such as butane, or alternatively isobutane, propane, pentane or hexane or similar hydrocarbons; or perfluoro-hydrocarbons such as R1336mzz. Water tanks may be utilized to facilitate heat transfer between the various components of the heat pump and to temporarily store heat, facilitating the interaction of a batch $CO_2$ adsorption/desorption process and a continuous heat pump.

By recovering heat energy throughout the system (including from steam recovery, hot gas from the drying/cooling cycle, and excess heat energy from the liquefaction/purification step), and then upgrading this heat energy to in excess of 100° C., the heat pump may be able to generate virtually all of the heat energy necessary to generate the steam required—eliminating the need for a gas-fired boiler (and avoiding the emissions resultant from gas-based $CO_2$ generation).

To the extent that a given embodiment fails to deliver continuous gas flows, equipment may be oversized to account for the turning up/down of the equipment, or alternatively accumulators may be added to smooth out the flows. Accumulators, when needed, may either serve to accumulate gases. Alternatively, in the case of the vacuum pump, a vacuum accumulator may allow for a more continuous operation of that pump, as well as the continuous availability of that vacuum, and the benefit of reducing the amount of time required to achieve a certain level of vacuum in the system. Accumulators may be coupled to the heat pump such that a discontinuous supply of heat from panel regeneration may be coupled to a continuously operating heat pump.

Regarding the heat pump system, an effective accumulator may be achieved via water tanks tied to such a system. The heat recovery also allows for water recovery in the form of condensate that can be returned to the boiler. Thus, as well as recovering the energy, the system also reduces the water footprint.

Operational Details

Not only will this invention significantly advance the state of the art of DAC technology, but it will also significantly reduce the cost per ton of carbon dioxide captured and, optionally, being capable of sequestration.

The embodiments described herein include a system, apparatus and methods of capturing carbon dioxide from ambient air as well as mixtures of gases, some of which include but are not limited to ambient air. In one embodiment of the present invention disclosed herein, carbon dioxide is captured from the atmosphere using a continuously moving-panel system, coupled with a multi-zone-regeneration-box system, described here throughout. In another embodiment, individual units may be dedicated to capturing carbon dioxide from the air, while others are dedicated (with adsorber panels specifically optimized) to capture carbon dioxide from a gas stream of combined air and flue gas, including possibly the effluent from an energy source for the direct air capture units. In yet another embodiment, adsorber panels in all individual units may be dedicated to capture carbon dioxide via a gas stream of combined air and flue gas.

Various aspects of the present subject matter are set forth below, in review of, and/or in supplementation to, the embodiments described thus far, with the emphasis here being on the interrelation and interchangeability of the following embodiments. In other words, an emphasis is on the fact that each feature of the embodiments can be combined with each and every other feature unless explicitly stated otherwise or logically implausible. The embodiments described herein are restated and expanded upon in the following paragraphs without explicit reference to the figures.

In many embodiments, a system for removing carbon dioxide from ambient air includes a plurality of adsorber panels, wherein each panel of the plurality of adsorber panels comprises a face and a substrate configured to capture $CO_2$ from an atmosphere, and wherein each panel of the plurality of adsorber panels are configured to move independently; at least one adsorber structure comprising at least one fan configured to circulate air through a portion of panels of the plurality of adsorber panels; and at least one regeneration unit comprising at least one oxygen purging section, at least one $CO_2$ desorption section, and at least one drying/cooling section.

In some embodiments, the plurality of adsorber panels are configured to move continuously through at least a portion of the at least one adsorber structure and through at least a portion of the at least one regeneration unit. In some embodiments, the plurality of adsorber panels are configured to move continuously through all portions of the at least one adsorber structure and through all portions of the at least one regeneration unit.

In some embodiments, the plurality of adsorber panels is configured to move through a plurality of sections of the at least one regeneration unit, and wherein one or more sections of the at least one regeneration unit are configured to provide a counter-current flow of one or more gases with respect to a direction of travel of the plurality of adsorber panels within the section.

In some embodiments, the at least one oxygen purging section comprises a sealable chamber and a first outlet, wherein the at least one $CO_2$ desorption section comprises a desorption chamber, a gas inlet, and a gas outlet, and wherein the at least one drying/cooling section comprises a drying/cooling chamber, a first drying/cooling inlet, and a first drying/cooling outlet.

In some embodiments, the plurality of adsorber panels is configured to move through the desorption chamber and a gas is configured to flow from the gas inlet to the gas outlet such that the gas first contacts adsorber panels that are more desorbed before contacting adsorber panels that are less desorbed.

In some embodiments, the plurality of adsorber panels is configured to move through a plurality of sections of the at least one regeneration unit in a first direction from the at least one oxygen purging section toward the at least one drying/cooling section, and wherein, in each section of the plurality of sections of the at least one regeneration unit, the section is configured to facilitate one or more gases flowing through the section in a second direction opposite the first direction.

In some embodiments, the plurality of adsorber panels is configured to move continuously through each chamber of a plurality of chambers in the $CO_2$ desorption section.

In some embodiments, the plurality of adsorber panels is configured to move continuously through the sealable chamber of the $CO_2$ desorption section.

In some embodiments, the plurality of adsorber panels is configured to move through a plurality of sections of the at least one regeneration unit in a first direction from the at least one oxygen purging section toward the at least one drying/cooling section, and wherein one or more gases are configured to flow through each section in the plurality of sections of the at least one regeneration unit in a second direction opposite the first direction.

In some embodiments, the plurality of adsorber panels is configured to move through the drying/cooling chamber and a gas is configured to flow from the first drying/cooling inlet to the first drying/cooling outlet such that the gas first contacts adsorber panels that are more cooled before contacting adsorber panels that are less cooled.

In some embodiments, the at least one oxygen purging section further includes a first inlet and a first outlet, wherein the plurality of adsorber panels is configured to move through the sealable chamber and a gas is configured to flow from the first inlet to the first outlet such that the gas first contacts adsorber panels that are more purged of oxygen before contacting adsorber panels that are less purged of oxygen.

In some embodiments, the at least one regeneration unit further includes at least one gas recovery section, wherein the plurality of adsorber panels is configured to move from the oxygen purging section through the gas recovery section to the CO$_2$ desorption section, and wherein a gas is configured to flow from a gas recovery inlet of the gas recovery section at a location closer to the CO$_2$ desorption section toward a gas recovery outlet of the gas recovery section closer to the oxygen purging section.

In some embodiments, the plurality of adsorber panels is configured to move through the desorption chamber and a gas is configured to flow from the gas inlet to the gas outlet such that the gas first contacts adsorber panels that are more desorbed before contacting adsorber panels that are less desorbed.

In some embodiments, the system further includes first, second, third, and fourth doors, wherein the first door is located at a first end of the at least one oxygen purging section, the second door is located between the at least one oxygen purging section and the at least one CO$_2$ desorption section, and the third door is located between the at least one CO$_2$ desorption section and the at least one drying/cooling section, and the fourth door is located at an end of the at least one drying/cooling section.

In some embodiments, the plurality of adsorber panels are configured to move continuously through the at least one oxygen purging section, the at least one CO$_2$ desorption section, and the at least one drying/cooling section, wherein each panel of the plurality of adsorber panels comprises a plurality of arrays held together and a plurality of sealing struts, wherein a pair of sealing struts of the plurality of sealing struts provides a continuous flat sealing surface for engaging one or more seals to prevent gas from moving between adjacent arrays.

In some embodiments, the first outlet of the at least one oxygen purging section is connected to a vacuum source.

In some embodiments, the plurality of adsorber panels are configured to move periodically through at least a portion of the at least one adsorber structure and/or through at least a portion of the at least one regeneration unit.

In some embodiments, the at least one oxygen purging section further comprises a second inlet connected to a source of a sweep gas. In some embodiments, the sweep gas is steam, nitrogen, CO$_2$, or a combination thereof.

In some embodiments, the inlet gas is steam.

In some embodiments, the first drying/cooling outlet of the at least one drying/cooling section is connected to a vacuum source.

In some embodiments, the first drying/cooling inlet of the at least one drying/cooling section is connected to a source of a sweep gas. In some embodiments, the sweep gas is steam, nitrogen, or a combination thereof.

In some embodiments, the system further includes a plurality of tracks configured to transport the plurality of adsorber panels into, through, and out of the at least one adsorber structure and the at least one regeneration unit.

In some embodiments, the system further includes a plurality of tracks configured to transport the plurality of adsorber panels into, through, and out of the at least one regeneration unit. In some embodiments, the plurality of tracks are configured in a circle with each track of the plurality of tracks forming a section of the circle. In some embodiments, a panel of the plurality of adsorber panels comprises two arcs on opposite sides of the panel and two straight edges on opposite sides of the panel. In some embodiments, the system includes a plurality of adsorber units arranged in a plurality of rows, each row extending radially. In some embodiments, multiple ones of the plurality of rows are arranged as spokes of a wheel.

In some embodiments, the at least one CO$_2$ desorption section further comprises an additional desorption chamber and a plenum between the desorption chamber and the additional desorption chamber, wherein the plenum is configured to allow steam from the additional desorption chamber to flow into the desorption chamber.

In some embodiments, the first drying/cooling inlet of the at least one drying/cooling section is in communication with a source of an inert gas.

In some embodiments, the plurality of tracks in the at least one adsorber structure comprises first and second tracks that each run in a longitudinal direction into, through, and out of the at least one adsorber structure. In some embodiments, the system further includes at least one lateral transfer unit that is configured to move at least one panel from the first track to the second track. In some embodiments, the first track is substantially parallel to the second track.

In some embodiments, the system further includes at least one waiting zone between the at least one adsorber structure and the at least one lateral transfer unit.

In some embodiments, the at least one lateral transfer unit is configured to contain at least two panels of the plurality of adsorber panels.

In some embodiments, the at least one CO2 desorption section is configured to move multiple panels at a time laterally from the at least one oxygen purging section to the at least one drying/cooling section, wherein the at least one oxygen purging section and the at least one drying/cooling section are each configured to contain two panels of the plurality of adsorber panels, and wherein the at least one CO$_2$ desorption section is configured to contain an odd number of panels of the plurality of panels.

In some embodiments, the sealable chamber of the at least one oxygen purging section is configured to contain at least two panels of the plurality of adsorber panels.

In some embodiments, the desorption chamber is configured to contain at least two panels of the plurality of adsorber panels.

In some embodiments, the desorption chamber is configured to contain between about 2 and about 10 panels of the plurality of adsorber panels.

In some embodiments, the drying/cooling chamber is configured to contain at least two panels of the plurality of adsorber panels.

In some embodiments, the desorption chamber is configured to contain between 3 and 20 panels of the plurality of adsorber panels.

In some embodiments, the sealable chamber is configured to contain a number of panels, and wherein the desorption chamber is configured to contain a number of panels that is not an integer multiple of the number of panels in the sealable chamber. In some embodiments, the sealable chamber is configured to contain 7 panels, and wherein the desorption chamber is configured to contain 2 panels.

In some embodiments, the at least one fan is configured to move air through at least of the portion of panels of the plurality of adsorber panels at a velocity of between about 0.2 m/s to about 15 m/s.

In some embodiments, the system includes two adsorber structures and two regeneration units, wherein the two regeneration units are situated in between the two adsorber structures.

In some embodiments, the at least one regeneration unit is located at a first end of the at least one adsorber structure and the at least one lateral transfer section is located at a second end of the at least one adsorber structure.

In some embodiments, the at least one CO$_2$ desorption section further comprises a first plenum associated with a first wall of the desorption chamber and a second plenum associated with a second wall of the desorption chamber, wherein the first wall of the desorption chamber is opposite the second wall of the desorption chamber, wherein the first plenum is connected to a steam source. In some embodiments, the second plenum is configured to release steam from the desorption chamber to a recovery system. In some embodiments, the at least one $CO_2$ desorption section further comprises a first at least one baffle placed in the first plenum and a second at least one baffle placed in the second plenum.

In some embodiments, the at least one $CO_2$ desorption section further comprises a first plurality of plenums associated with a first wall of the desorption chamber and a second plurality of plenums associated with a second wall of the desorption chamber, wherein the first wall of the desorption chamber is opposite the second wall of the desorption chamber. In some embodiments, each plenum of the second plurality of plenums is connected to an adjacent plenum in the second plurality of plenums. In some embodiments, the first plurality of plenums comprises a first plenum, a last plenum, and at least one plenum therebetween, and wherein the first plenum of the first plurality of plenums is connected to the gas inlet and the last plenum of the first plurality of plenums is connected to the gas outlet.

In some embodiments, the gas inlet is connected to a steam source.

In some embodiments, the second plurality of plenums comprises a first plenum, a last plenum, and at least one plenum therebetween. In some embodiments, the first plenum of the second plurality of plenums is configured to receive a gas from the first plenum of the first plurality of plenums and to transfer the received gas to the at least one plenum therebetween of the second plurality of plenums. In some embodiments, the at least one plenum therebetween of the second plurality of plenums is configured to transfer the received gas to the at least one plenum therebetween of the first plurality of plenums. In some embodiments, the at least one plenum therebetween of the first plurality of plenums is configured to transfer the received gas to the last plenum of the second plurality of plenums. In some embodiments, the last plenum of the second plurality of plenums is configured to transfer the received gas to the last plenum of the first plurality of plenums.

In some embodiments, the at least one plenum therebetween of the second plurality of plenums comprises at least 2 plenums. In some embodiments, the at least one plenum therebetween of the second plurality of plenums comprises 6 plenums. In some embodiments, the at least one plenum therebetween of the first plurality of plenums comprises at least 2 plenums. In some embodiments, the at least one plenum therebetween of the first plurality of plenums comprises 6 plenums.

In some embodiments, the steaming chamber further includes a third wall, and wherein the at least adsorber structure and the at least one regeneration unit are connected to the steaming chamber along the third wall.

In some embodiments, the steaming chamber further includes a third wall and a fourth wall, and wherein the at least adsorber structure is connected to the steaming chamber along the third wall and the at least one regeneration unit is connected to the steaming chamber along the fourth wall.

In some embodiments, the system further includes at least one waiting zone between the at least one adsorber structure and the at least one regeneration unit.

In some embodiments, the at least one regeneration unit comprises a first end and a second end, and wherein a first adsorber structure is coupled to the first end of the at least one regeneration unit and a second adsorber structure is coupled to the second end of the at least one regeneration unit.

In some embodiments, the system further includes first and second lateral transfer units, and wherein the first lateral transfer unit is coupled to an end of the first adsorber structure and the second lateral transfer unit is coupled to an end of the second adsorber structure.

In some embodiments, the at least one regeneration unit is located at an end of the at least one adsorber structure and the at least one lateral transfer section is located on an opposite side of the at least one regeneration unit from the at least one adsorber structure.

In some embodiments, the adsorber structure further comprises a preheater configured to heat the air before the air is circulated by the at least one fan through the portion of panels.

In some embodiments, the regeneration unit further comprises a preheating section comprising a preheating inlet connected to a source of heated gas. In some embodiments, the preheating section further includes a preheater outlet, wherein the plurality of adsorber panels is configured to move through the preheating section and a gas is configured to flow from the preheating inlet to the preheater outlet such that the gas first contacts adsorber panels that are more heated before contacting adsorber panels that are less heated. In some embodiments, the heated gas comprises $CO_2$, nitrogen, or a combination thereof, at a temperature of at least 40° C. In some embodiments, the heated gas comprises $CO_2$, nitrogen, or a combination thereof, at a temperature of at least 100° C. or above. In some embodiments, the preheating section is configured to hold two or more adsorber panels.

In some embodiments, the at least one drying/cooling section of the at least one regeneration unit comprises first and second drying/cooling sections. In some embodiments, the first drying/cooling section is a vacuum drying/cooling section, and the second drying/cooling section comprises a drying/cooling inlet connected to a source of cooled gas.

In some embodiments, the plurality of adsorber panels are oriented vertically in the at least one regeneration unit. In some embodiments, the system further includes a plurality of tracks configured to transport the plurality of adsorber panels into, through, and out of the at least one adsorber structure and the at least one regeneration unit, and wherein each adsorber panel of the plurality of adsorber panels oriented vertically is transported on a single track.

In some embodiments, the plurality of adsorber panels are oriented horizontally in the at least one regeneration unit. In some embodiments, the system further includes a plurality of tracks configured to transport the plurality of adsorber panels into, through, and out of the at least one adsorber structure and the at least one regeneration unit, and wherein each adsorber panel of the plurality of adsorber panels oriented horizontally is transported on a track comprising at least two rails.

In some embodiments, the plurality of tracks comprises a first section at a first elevation and a second section at a second elevation. In some embodiments, the at least one fan of the at least one adsorber structure is located above a top face of the at least one panel of the plurality of adsorber panels. In some embodiments, the at least one fan of the at least one adsorber structure is located below a bottom face of the at least one panel of the plurality of adsorber panels. In some embodiments, the at least one fan of the at least one adsorber structure is located in a vertical orientation at an end of the at least one adsorber structure. In some embodiments, the at least one adsorber structure further comprises a filter located below a bottom face of at least one panel of the plurality of adsorber panels. In some embodiments, the at least one adsorber structure further comprises a filter oriented vertically. In some embodiments, the at least one adsorber structure further comprises a filter oriented at an angle between 0 and 90 degrees with respect to the ground.

In some embodiments, the at least one adsorber structure further comprises a chimney located above the plurality of adsorber panels.

In some embodiments, the at least one adsorber structure further comprises a plurality of troughs located below the plurality of adsorber panels.

In some embodiments, each panel of the plurality of adsorber panels comprises a plurality of monolith arrays held together by a support structure. In some embodiments, the system further includes a deformable sealant located between the plurality of monolith arrays and the support structure. In some embodiments, the sealant is located between individual monolith arrays of the plurality of monolith arrays.

In some embodiments, the support structure comprises a frame and at least one sealing strut, and wherein the frame and the sealing strut have a surface in a common plane that can form a moving gas-seal with surface in the enclosure.

In some embodiments, the system further comprises a plurality of sealing struts, wherein a sealing strut of the plurality of sealing struts is located between adjacent monolith arrays in the plurality of monolith arrays.

In some embodiments, the system further includes a sealing surface, wherein the sealing surface is coupled to the support structure, wherein the sealing surface is configured to be in contact with at least one sealing strut of the plurality of sealing struts.

In some embodiments, the sealing surface is static block, and the plurality of monolith arrays are configured to move relative to the sealing block.

In some embodiments, the sealing surface is configured to move along a length of the support structure. In some embodiments, the sealing surface comprises a plurality of rollers. In some embodiments, the sealing surface comprises a belt. In some embodiments, the sealing surface is configured to be in contact with at least two sealing struts of the plurality of sealing struts.

In some embodiments, the sealing surface includes a first opening at a first end and a second opening at a second end, wherein the openings are configured to allow a gas to flow over or through a portion of the plurality of monolith arrays contained within a space defined by the sealing surface and the at least one sealing strut in contact with the sealing block.

In some embodiments, the support structure includes a vertical component and a horizontal component, wherein the vertical component is configured to sit between adjacent arrays of the plurality of monolith arrays, and wherein the horizontal component is configured to sit beneath a bottom surface of an array of the plurality of monolith arrays.

In some embodiments, the sealing surface includes first and second portions, wherein the first portion is in contact with at least one sealing strut of the plurality of sealing struts on a first face of a panel of the plurality of adsorber panels, and wherein the second portion is in contact with at least one sealing strut of the plurality of sealing struts on a second face of the panel of the plurality of adsorber panels.

In some embodiments, the sealing surface comprises a plurality of seals, wherein each of the plurality of seals is in contact with a single face of a panel of the plurality of adsorber panels. In some embodiments, the plurality of seals comprises at least two seals, and wherein at least one of the at least two seals is in contact with a first face of the panel of the plurality of adsorber panels and the other of the at least two seals are in contact with a second face of the panel of the plurality of adsorber panels, wherein the second face is opposite of the first face.

In some embodiments, the horizontal component is a spring clip. In some embodiments, the vertical component and horizontal component are in a single structure.

In some embodiments, the support structure comprises 4 sides and wherein each side of the 4 sides is configured to support a side of an array of the plurality of monolith arrays.

In some embodiments, the support structure comprises at least one support located at at least one corner of a quadrilateral configuration, wherein each of the at least one support is configured to support a corner of an array of the plurality of monolith arrays.

In some embodiments, the support structure comprises a plurality of spaced apart ledges located along a perimeter of a quadrilateral configuration, wherein each of the ledges of the plurality of spaced apart ledges are configured to support an edge of an array of the plurality of monolith arrays.

In some embodiments, the support structure comprises a plurality of tapered supports having a base width, first and second side surfaces, and a top edge, wherein the first and second side surfaces are configured to support a bottom edge of an array of the plurality of monolith arrays. In some embodiments, the first and second sides of the tapered supports have a stepped configuration, and wherein a step of the stepped configuration is configured to support a bottom edge of the array of the plurality of monolith arrays.

In some embodiments, the support structure comprises first and second vertical supports and a mesh coupled to the first and second vertical supports, wherein a plane of the mesh is perpendicular to a plane of the first or second vertical supports, wherein the mesh further comprises an opening configured the receive an array of the plurality of monolith arrays.

In some embodiments, the support structure comprises a plurality of sets of upper and lower supporting struts and a mesh coupled to the plurality of upper and lower supporting struts. In some embodiments, the mesh is pinched between each set of the plurality of sets of upper and lower supporting struts. In some embodiments, upper supporting struts of the plurality of sets of upper and lower supporting struts comprise a female interface and lower supporting struts of the plurality of sets of upper and lower supporting struts comprise a male interface, wherein the female interface of the upper supporting struts is configured to receive the male interface of the lower supporting struts.

In some embodiments, the male interface of the lower supporting struts is triangular shaped. In some embodiments, the male interface of the lower supporting struts is concave. In some embodiments, the female interface of the upper supporting struts is U-shaped.

In some embodiments, a top side of a lower supporting strut of the plurality of sets of upper and lower supporting struts is at a same level as a bottom face of a lowest row of the plurality of monolith arrays.

In some embodiments, the at least one adsorber structure further includes a funnel beneath the at least one fan.

In some embodiments, the system further includes a cowling around the at least one fan.

In some embodiments, the system further includes at least one ring attached to the cowling above the at least one fan. In some embodiments, the system further includes at least one ring attached to the cowling below the at least one fan.

In some embodiments, the system further comprises a trough beneath the at least one fan. In some embodiments, the at least one ring is a plurality of rings, and wherein the plurality of rings comprise at least two rings having different diameters. In some embodiments, the at least two rings have different lengths. In some embodiments, the at least two rings have different heights.

In some embodiments, the support structure includes first and second vertical supports and a plurality of support wires coupled to the first and second vertical supports, wherein the plurality of support wires comprise at least one pair of intersecting support wires, wherein an intersection of the intersecting support wires is configured to be located adjacent a surface of an array of the plurality of monolith arrays.

In some embodiments, the support structure includes a collar coupled to a plurality of vertical supports, wherein the collar is configured to surround a perimeter of an array of the plurality of arrays.

In some embodiments, the support structure is incorporated into an array of the plurality of arrays, and wherein the support structure comprises enlarged corners that extend beyond an outer surface of an array of the plurality of monolith arrays.

In many embodiments, a method of direct air capture includes the steps of: circulating air through a plurality of adsorber panels with at least one fan, wherein each panel of the plurality of adsorber panels is configured to move independently; enclosing at least one panel of the plurality of adsorber panels in a first chamber of at least one purge section of at least one regeneration unit; reducing a concentration of oxygen contained in the first chamber of the at least one purge section of at the least one regeneration unit; enclosing the at least one panel into a second chamber of at least one $CO_2$ desorption section of the at least one regeneration unit; harvesting $CO_2$ from the at least one panel enclosed in the second chamber; enclosing the at least one panel in a third chamber of at least one drying/cooling section of the at least one regeneration unit; and drying and/or cooling the at least one panel enclosed in the third chamber.

In some embodiments, the at least one panel enclosed in the $CO_2$ desorption section comprises at least a first panel and a second panel, wherein the first panel enters the desorption section before the second panel, and wherein a desorbing gas is made to flow through the desorption section such that it first contacts the first panel and then contacts the second panel.

In some embodiments, the concentration of oxygen contained in the first chamber is reduced by evacuating the first chamber with a vacuum source. In some embodiments, the concentration of oxygen contained in the first chamber is further reduced by adding steam to the first chamber while the first chamber is evacuated with the vacuum source.

In some embodiments, the $CO_2$ is harvested from the second chamber by applying steam to the at least one panel in the second chamber. In some embodiments, the at least one panel has a first face and a second face, and wherein a current of the applied steam flows transversely through the at least one panel from the first face to the second face and back in a serpentine fashion or in a corkscrew fashion one or more times. In some embodiments, the at least one panel has a first face and a second face, and wherein one or more currents of one or more gases flow transversely through the at least one panel from the first face to the second face and back in a serpentine fashion or in a corkscrew fashion one or more times while the at least one panel moves through the first chamber, the second chamber, and/or the third chamber.

In some embodiments, the at least one panel has a first face and a second face, and wherein a current of the applied steam flows through the at least one panel in a first direction entering the first face and exiting the second face in the second chamber. In some embodiments, the current of the applied steam further flows in a second direction entering the second face and exiting the first face of the at least one panel in the second chamber.

In some embodiments, the at least one panel has a first face and a second face, and wherein a current of the applied steam flows back and forth through the first face and the second face of the at least one panel at least one time while the at least one panel is in the second chamber.

In some embodiments, the at least one panel has a first face and a second face, and wherein a current of the applied steam at least flows through a first portion of the first face, followed by a first portion of the second face, followed by a second portion of the first face.

In some embodiments, the at least one panel comprises a first portion, a second portion, and a third portion, and wherein a current of the applied steam flows through the first portion in a first direction, then flows through the second portion in a second direction, and then flows through the third portion in a third direction, wherein the second direction is substantially opposite to the first and third directions. In some embodiments, the at least one panel further comprises a fourth portion, and wherein the current of applied steam flows through the fourth portion in a fourth direction, wherein the fourth direction is substantially opposite to the first and third directions.

In some embodiments, the method further includes the steps of: enclosing the at least one panel into at least one additional chamber of the at least one $CO_2$ desorption section of the at least one regeneration unit; and harvesting $CO_2$ from the at least one panel enclosed in the at least one additional chamber.

In some embodiments, the $CO_2$ is harvested from the at least one additional chamber by applying steam to the at least one panel in the at least one additional chamber. In some embodiments, the steam applied to the at least one panel in the at least one additional chamber flows through a plenum between the second and at least one additional chamber and is applied to the at least one panel in the second chamber to harvest the $CO_2$.

In some embodiments, the at least one panel is dried and/or cooled by evacuating the fourth chamber with a vacuum source.

In some embodiments, the at least one panel is moved from the first chamber to the second chamber on a track that runs through the at least one regeneration unit.

In some embodiments, the air is circulated across the faces of the plurality of adsorber panels with the at least one fan in an adsorber structure. In some embodiments, the plurality of adsorber panels move along a plurality of tracks in the adsorber structure. In some embodiments, the plurality of tracks comprises a first and a second track, and wherein the first track is parallel to the second track. In some embodiments, the plurality of adsorber panels move from the first track to the second track via a lateral transfer section.

In some embodiments, the method further includes the step of rotating the at least one panel by about 90° before enclosing the at least one panel in the second chamber of the at least one $CO_2$ desorption section.

In some embodiments, each panel of the plurality of panels in the circulating step comprises a plurality of sub-units configured in a first configuration, the method further includes the step of rearranging the at least one panel of the plurality of panels from the first configuration to a second configuration before enclosing the at least one panel in the first chamber of the at least one purge section. In some embodiments, the second configuration has a lower aspect ratio than the first configuration.

In some embodiments, the at least one panel enclosed into a second chamber of at least one $CO_2$ desorption section of the at least one regeneration unit is two panels, and wherein $CO_2$ is harvested from the two panels enclosed in the second chamber.

In some embodiments, the method further includes the step of, after circulating air around the plurality of adsorber panels, moving the at least one panel of the plurality of adsorber panels along a track into the first chamber of the at least one purge section.

In some embodiments, the method further includes the step of, after reducing the concentration of oxygen in the first chamber of the at least one purge section, moving the at least one panel of the plurality of adsorber panels along the track into the second chamber of the at least one $CO_2$ desorption section.

In some embodiments, the method further includes the step of, after harvesting $CO_2$ from the at least one panel enclosed in the second chamber, moving the at least one panel of the plurality of adsorber panels along the track into the third chamber.

In some embodiments, the method further includes the step of heating air before the air is circulated through the plurality of adsorber panels.

In some embodiments, the method further includes the step of circulating a heated gas through the plurality of adsorber panels in an additional chamber of the at least one regeneration unit before enclosing the at least one panel in the second chamber. In some embodiments, the heated gas comprises $CO_2$, nitrogen, or a combination thereof, at a temperature of at least 40° C. In some embodiments, the heated gas comprises $CO_2$, nitrogen, or a combination thereof, at a temperature of at least 100° C.

In some embodiments, the method further includes the steps of: enclosing the at least one panel in a fourth chamber of the at least one regeneration unit; and cooling and drying the at least one panel in the fourth chamber. In some embodiments, the step of cooling and drying the at least one panel in the fourth chamber comprises circulating a cooled gas through the at least one panel in the fourth chamber. In some embodiments, the step of cooling and/or drying the at least one panel in the third chamber comprises circulating the gas exiting the fourth chamber into the third chamber. In some embodiments, the method further includes heating the gas exiting the fourth chamber and circulating the heated gas into the third chamber.

In some embodiments, the plurality of adsorber panels are oriented vertically in the at least one regeneration unit. In some embodiments, the plurality of adsorber panels are oriented horizontally in the at least one regeneration unit.

In some embodiments, each panel of the plurality of adsorber panels comprises a plurality of monolith arrays held together by a support structure.

In some embodiments, the support structure comprises a vertical component and a horizontal component, wherein the vertical component is configured to sit between adjacent arrays of the plurality of monolith arrays, and wherein the horizontal component is configured to sit beneath a bottom surface of an array of the plurality of monolith arrays. In some embodiments, the horizontal component is a spring clip. In some embodiments, the vertical component and horizontal component are in a single structure.

In some embodiments, the support structure comprises a quadrilateral shape and wherein each side of the quadrilateral shape is configured to support a side of an array of the plurality of monolith arrays.

In some embodiments, the support structure comprises at least one support located at at least one corner of a quadrilateral configuration, wherein each of the at least one support is configured to support a corner of an array of the plurality of monolith arrays.

In some embodiments, the support structure comprises a plurality of spaced apart ledges located along a perimeter of a quadrilateral configuration, wherein each of the ledges of the plurality of spaced apart ledges are configured to support an edge of an array of the plurality of monolith arrays.

In some embodiments, the support structure comprises a plurality of tapered supports having a base width, first and second side surfaces, and a top edge, wherein the first and second side surfaces are configured to support a bottom edge of an array of the plurality of monolith arrays. In some embodiments, the first and second sides of the tapered supports have a stepped configuration, and wherein a step of the stepped configuration is configured to support a bottom edge of the array of the plurality of monolith arrays.

In some embodiments, the support structure comprises first and second vertical supports and a mesh coupled to the first and second vertical supports, wherein a plane of the mesh is perpendicular to a plane of the first or second vertical supports, wherein the mesh further comprises an opening configured to support an array of the plurality of monolith arrays.

In some embodiments, the support structure comprises first and second vertical supports and a plurality of support wires coupled to the first and second vertical supports, wherein the plurality of support wires comprise at least one pair of intersecting support wires, wherein an intersection of the intersecting support wires is configured to be located adjacent a surface of an array of the plurality of monolith arrays.

In some embodiments, the support structure comprises a collar coupled to a plurality of vertical supports, wherein the collar is configured to surround a perimeter of an array of the plurality of arrays.

In some embodiments, the support structure is incorporated into an array of the plurality of arrays, and wherein the support structure comprises enlarged corners that extend beyond an outer surface of an array of the plurality of monolith arrays.

In many embodiments, an adsorber structure includes: a plurality of adsorber panels, wherein each panel of the plurality of adsorber panels comprises a face and a substrate configured to capture $CO_2$ from an atmosphere, and wherein each panel of the plurality of adsorber panels are configured to move independently; a plurality of fans configured to circulate air around the plurality of adsorber panels; at least one track configured to transport the plurality of adsorber panels in a vicinity of the plurality of fans; and first and second air filters located on opposite sides of the at least one track.

In some embodiments, the at least one track comprises first and second tracks that each run in a longitudinal direction under the plurality of fans.

In some embodiments, the at least one track comprises first and second tracks that each run in a longitudinal direction over the plurality of fans. In some embodiments, the first track is substantially parallel to the second track. In some embodiments, the system further comprises at least one lateral transfer unit that is configured to move a panel from the first track to the second track.

In many embodiments, a regeneration unit includes: at least one oxygen purging section comprising a sealable chamber and a first outlet; at least one $CO_2$ desorption section comprising a desorption chamber, a steam inlet, and a gas outlet; and at least one drying/cooling section comprising a drying/cooling chamber and a first drying/cooling outlet.

In some embodiments, the first outlet of the at least one oxygen purging section is connected to a vacuum source.

In some embodiments, the at least one oxygen purging section further comprises an inlet connected to a source of a sweep gas. In some embodiments, the sweep gas is steam, nitrogen, or a combination thereof.

In some embodiments, the first drying/cooling outlet of the at least one drying/cooling section is connected to a vacuum source.

In some embodiments, a first drying/cooling inlet of the at least one drying/cooling section is connected to a source of a sweep gas. In some embodiments, the sweep gas is steam, nitrogen, or a combination thereof.

In some embodiments, the at least one $CO_2$ desorption section further comprises an additional desorption chamber and a plenum between the desorption chamber and the additional desorption chamber, wherein the plenum is configured to allow steam from the additional steaming chamber to flow into the steaming chamber.

In many embodiments, a system for removing carbon dioxide from ambient air includes: a plurality of adsorber panels, wherein each panel of the plurality of adsorber panels comprises a substrate configured to capture $CO_2$ from an atmosphere, and wherein each panel of the plurality of adsorber panels are configured to move independently; at least one adsorber structure comprising at least one fan configured to move air through a first portion of panels of the plurality of adsorber panels; at least one regeneration unit comprising at least one chamber configured to purge air from a second portion of panels of the plurality of panels, desorb $CO_2$ from the second portion of panels of the plurality of panels, and dry and/or cool the second portion of panels of the plurality of panels; and at least one transfer unit configured to move the second portion of the plurality of panels from the at least one adsorber structure to the at least one regeneration unit.

In some embodiments, the air is purged from the at least one chamber by application of a vacuum to the at least one chamber.

In some embodiments, the $CO_2$ is desorbed from the second portion of panels of the plurality of panels by flowing steam into the at least one chamber, wherein the at least one chamber is heated to at least 65° C.

In some embodiments, the at least one transfer unit comprises a first transfer unit and a second transfer unit configured to move the second portion of the plurality of panels from the at least one regeneration unit to the at least one adsorber structure.

In some embodiments, the second portion of panels is a single panel.

In some embodiments, the first portion of panels contains a different number of panels than the second portion of panels.

In some embodiments, the first portion of panels contains more panels than the second portion of panels.

In some embodiments, the at least one chamber of the at least one regeneration unit comprises first, second, and third chambers, wherein the first chamber is configured to purge air from the second portion of panels of the plurality of panels, wherein the second chamber is configured to desorb $CO_2$ from the second portion of panels of the plurality of panels, and wherein the third chamber is configured to dry and/or cool the second portion of panels of the plurality of panels.

In many embodiments, a regeneration unit for desorbing $CO_2$ includes: at least one chamber comprising a first wall and a second wall; a gas inlet located on the first wall; a gas outlet located on the second wall; at least one track configured to move at least one panel in a first direction from the second wall to the first wall, wherein the at least one chamber is configured to flow a current of gas from the gas inlet to the gas outlet in a flow path in a second direction, wherein the second direction is opposite of the first direction.

In some embodiments, the unit comprises at least two tracks.

In some embodiments, the at least one panel has a face that defines a plane, and wherein the plane of the face is perpendicular to the current of gas flowing from the gas inlet to the gas outlet.

In some embodiments, the gas is steam.

In some embodiments, the system further includes an outlet connected to a vacuum source.

In many embodiments, a method of desorbing $CO_2$ from a plurality of panels comprising a substrate configured to capture $CO_2$ from an atmosphere, wherein the plurality of panels comprises a first portion of panels and a second portion of panels adjacent the first portion, the method including the steps of: flowing a stream of a gas from a gas inlet through the first portion of panels and the second portion of panels of the plurality of panels in a first direction in a first chamber, wherein the first portion of panels is closer to the gas inlet than the second portion of panels; removing the first portion of panels from the first chamber; moving the plurality of panels in the first chamber in a second direction toward the gas inlet such that the second portion of panels is in front of the gas inlet, wherein the second direction is different than the first direction; and flowing a stream of a gas through the second portion of panels of the plurality of panels in the first direction in the first chamber.

In some embodiments, the gas is steam.

In some embodiments, the first direction is opposite the second direction.

In some embodiments, the first portion of panels and the second portion of panels each comprise a single panel.

In some embodiments, the first portion of panels and the second portion of panels each comprise at least two panels.

In some embodiments, the plurality of panels comprises at least 2 panels.

In some embodiments, the method further includes the step of purging oxygen from the plurality of panels before flowing the stream of gas through the second portion of panels of the plurality of panels.

In some embodiments, the step of purging oxygen is performed in a second chamber.

In some embodiments, the method further includes the step of drying and/or cooling the plurality of panels in a third chamber after flowing the stream of a gas through the first portion of panels of the plurality of panels.

In some embodiments, the plurality of panels further comprises a third portion of panels adjacent the second portion of panels, wherein the method further comprises the steps of: flowing the stream of a gas from the gas inlet through the first portion of panels, the second portion of panels, and the third portion of panels of the plurality of panels in the first direction in the first chamber; removing the second portion of panels from the first chamber; moving the plurality of panels in the first chamber in the second direction toward the gas inlet such that the third portion of panels is in front of the gas inlet; and flowing a stream of a gas through the third portion of panels of the plurality of panels in the first direction in the first chamber.

In many embodiments, a regeneration unit for desorbing $CO_2$ includes: at least one chamber comprising first and second walls; at least one panel comprising a substrate configured to capture $CO_2$ from an atmosphere; a gas inlet located on the first wall; at least one plenum located on the second wall, wherein the second wall is opposite the first wall; a gas outlet; at least one track oriented substantially parallel to the first wall configured for moving at least one panel in a first direction, wherein the at least one chamber is configured to flow a current of gas from the gas inlet through a face of the at least one panel to the at least one plenum located on the second wall in a first flow path, wherein the at least one chamber is configured to flow the current of gas from the at least one plenum located on the second wall through the face of the panel again or through an opposite face of the at least one panel in a second flow path, the first and second flow paths forming a serpentine shaped flow path or a corkscrew shaped flow path.

In some embodiments, the gas flows from the gas inlet to the gas outlet in a direction substantially opposite to the first direction such that the gas first contacts a panel that is more desorbed before contacting a panel that is less desorbed.

In some embodiments, the unit further comprises at least one plenum located on the first wall or on the second wall, wherein the at least one plenum located on the first wall or on the second wall is configured to receive the current of gas from the second flow path and to flow the current of gas through the face of the at least one panel in a third flow path to the at least one plenum on the second wall.

In some embodiments, the first direction of the at least one track is perpendicular to a direction of the first flow path.

In some embodiments, the at least one plenum located on the second wall comprises four plenums.

In some embodiments, the at least one plenum located on the second wall comprises eight plenums. In some embodiments, the at least one plenum located on the first wall comprises four plenums. In some embodiments, the at least one plenum located on the first wall comprises eight plenums.

In many embodiments, a method of desorbing $CO_2$ from a plurality of panels comprising a substrate configured to capture $CO_2$ from an atmosphere, the method includes the steps of: flowing a stream of a gas from a gas inlet through a face of at least one panel of the plurality of panels in a first flow path; flowing the stream of the gas through an opposite face of the at least one panel of the plurality of panels in a second flow path; flowing the stream of gas through the face of the at least one panel of the plurality of panels in a third flow path; and flowing the stream of the gas through the opposite face of the at least one panel of the plurality of panels in a fourth flow path, wherein the first flow path and the third flow path are in a first direction, wherein the second flow path and the fourth flow path are in a second direction, and wherein the first direction is opposite from the second direction.

In many embodiments, a method of desorbing $CO_2$ from a plurality of panels comprising a substrate configured to capture $CO_2$ from an atmosphere, the method includes the steps of: flowing a stream of a gas from a gas inlet through a face of at least one panel of the plurality of panels in a first flow path; flowing the stream of the gas through an opposite face of the at least one panel of the plurality of panels in a second flow path; flowing the stream of gas through the face of the at least one panel of the plurality of panels in a third flow path; and flowing the stream of the gas through the opposite face of the at least one panel of the plurality of panels in a fourth flow path, wherein the first flow path and the third flow path are in a first direction, wherein the second flow path and the fourth flow path are in a second direction, and wherein the first direction is the same as the second direction.

In some embodiments, the first flow path flows from a gas inlet to a first plenum. In some embodiments, the stream of gas flows from the first plenum to a second plenum, and wherein the second flow path flows from the second plenum to a third plenum. In some embodiments, the stream of gas flows from the third plenum to a fourth plenum, wherein the third flow path flows from the fourth plenum to a fifth plenum. In some embodiments, the stream of gas flows from the fifth plenum to a sixth plenum, wherein the fourth flow path flows from the sixth plenum to a seventh plenum. In some embodiments, the first plenum, the second plenum, the fifth plenum, and the sixth plenum are located in a second wall of a chamber, and wherein the third plenum, the fourth plenum, and the seventh plenum are located in a first wall of a chamber, wherein the second wall is opposite the first wall.

In some embodiments, first flow path flows through a first portion of the at least one panel, the second flow path flows through a second portion of the at least one panel, the third flow path flows through a third portion of the at least one panel, and the fourth flow path flows through a fourth portion of the at least one panel.

In some embodiments, the method further includes the steps of: flowing the stream of the gas through a face of an additional at least one panel of the plurality of panels in a fifth flow path; flowing the stream of the gas through an opposite face of the additional at least one panel of the plurality of panels in a sixth flow path; flowing the stream of gas through the face of the additional at least one panel of the plurality of panels in a seventh flow path; and flowing the stream of the gas through the opposite face of the additional at least one panel of the plurality of panels in an eighth flow path, wherein the fifth flow path and the seventh flow path are in the first direction, and wherein the sixth flow path and the eighth flow path are in the second direction.

In some embodiments, the stream of gas flows from a seventh plenum to an eighth plenum, wherein the fifth flow path flows from the eighth plenum to a ninth plenum.

In some embodiments, the stream of gas flows from the ninth plenum to a tenth plenum, wherein the sixth flow path flows from the tenth plenum to an eleventh plenum. In some embodiments, the stream of gas flows from the eleventh plenum to a twelfth plenum, wherein the seventh flow path flows from the twelfth plenum to a thirteenth plenum. In some embodiments, the stream of gas flows from the thirteenth plenum to a fourteenth plenum, wherein the eighth flow path flows from the fourteenth plenum to a fifteenth plenum. In some embodiments, the ninth plenum, the tenth plenum, the thirteenth plenum, and the fourteenth plenum are located in a second wall of a chamber, and wherein the eighth plenum, the eleventh plenum, the twelfth plenum, and the fifteenth plenum are located in a first wall of a chamber, wherein the second wall is opposite the first wall.

In some embodiments, the fifth flow path flows through a first portion of the additional at least one panel, the sixth flow path flows through a second portion of the additional at least one panel, the seventh flow path flows through a third portion of the additional at least one panel, and the eighth flow path flows through a fourth portion of the additional at least one panel.

In many embodiments, a method of desorbing $CO_2$ from a plurality of panels comprising a substrate configured to capture $CO_2$ from an atmosphere, the method includes the steps of: flowing a stream of a gas through the plurality of panels in a chamber from a gas inlet to a gas outlet; removing a first portion of panels of the plurality of panels closest to the gas inlet from the chamber, leaving a remaining portion of panels in the chamber; moving the remaining portion of panels in the chamber toward the gas inlet; and adding a second portion of panels to the remaining portion of panels at a location of the chamber closest to the gas outlet.

In some embodiments, the remaining portion of panels moves continuously through the chamber.

In some embodiments, the remaining portion of panels moves periodically through the chamber.

In some embodiments, the gas inlet is on a first wall of the chamber and the gas outlet is on a second wall of the chamber, wherein the second wall is opposite the first wall, and wherein the remaining portion of panels moves step-wise from the second wall to the first wall. In some embodiments, the step-wise movement comprises between about 2 and about 30 steps. In some embodiments, the step-wise movement comprises moving two panels of the remaining portion of panels together in the step-wise movement.

In some embodiments, the stream of gas continues to flow during the step of moving the remaining portion of panels in the chamber, during the step of removing the first portion of panels, and during the step of adding the second portion of panels.

In some embodiments, the stream of gas continues to flow during the step of removing the first portion of panels.

In some embodiments, the stream of gas continues to flow during the step of adding the second portion of panels.

In some embodiments, the first portion of panels comprises between about 1 and about 5 panels.

In some embodiments, the second portion of panels comprises between about 1 and about 5 panels.

In some embodiments, the remaining portion of panels comprises between about 1 and about 40 panels.

In some embodiments, each panel of the plurality of panels comprises a face, and wherein the stream of gas flows through each face of the plurality of panels in the chamber.

In some embodiments, the plurality of panels in the chamber comprises a first end panel, a last end panel, and at least one panel therebetween, the first end panel is closer to the gas inlet than the at least one panel therebetween, the last end panel is closer to the gas outlet than the at least one panel therebetween, and the stream of gas flows through the first end panel, before flowing through the at least one panel therebetween. In some embodiments, the stream of gas flows through the at least one panel therebetween before flowing through the last end panel.

In some embodiments, the first portion of panels is removed in a direction orthogonal to a direction from the gas inlet to the gas outlet.

In some embodiments, the second portion of panels is moved in a direction orthogonal to a direction from the gas inlet to the gas outlet to add the second portion of panels to the remaining portion of panels.

In many embodiments, a system for removing carbon dioxide from ambient air includes: a plurality of adsorber panels, wherein each panel of the plurality of adsorber panels comprises a substrate configured to capture $CO_2$ from an atmosphere; at least one regeneration unit comprising at least one chamber comprising a gas inlet and a gas outlet, wherein the at least one regeneration unit is configured to desorb $CO_2$ from the plurality of adsorber panels, wherein the plurality of adsorber panels is configured to move continuously through the at least one $CO_2$ desorption chamber; and a heat pump coupled between the gas outlet and the gas inlet of the at least one chamber of the at least one regeneration unit.

In some embodiments, the heat pump includes: a first condenser coupled to the gas outlet of the at least one chamber and configured to receive gas vapor comprising steam and $CO_2$ from the at least one chamber of the at least one regeneration unit and to condense the gas vapor; a boiler coupled to the first condenser and configured to receive liquid water from the first condenser, wherein the boiler is coupled to the gas inlet and configured to output steam to the at least one chamber of the at least one regeneration unit; and a first compressor and a first accumulator coupled between the first condenser and the boiler for cycling refrigerant through the heat pump.

In some embodiments, the first condenser is configured to condense the gas vapor received from the gas outlet, wherein heat from the first condenser is transferred into a refrigerant to deliver a vapor form of that refrigerant to the first compressor at a first refrigerant pressure; the first compressor is configured to compress the vapor form of the refrigerant; the first accumulator is configured to receive the compressed vapor form of the refrigerant and to separate a vapor form of the refrigerant and a liquid form of the refrigerant; and the boiler is configured to receive the vapor form of the refrigerant from the first accumulator, to boil the liquid water to produce the steam output to the at least one chamber and condense the refrigerant, and to output a liquid form of the refrigerant to the first accumulator.

In some embodiments, the first condenser is configured to condense the gas vapor against the boiling refrigerant.

In some embodiments, the system further includes an evaporator, wherein the first condenser is configured to condense the gas vapor against a transfer fluid to heat the transfer fluid, and wherein the evaporator is configured to receive the heated transfer fluid and the refrigerant, boil the refrigerant, and cool the transfer fluid for reuse.

In some embodiments, the system further includes another accumulator and a second compressor, wherein the first condenser is configured to condense the gas vapor against a transfer fluid to heat the transfer fluid, and wherein the other accumulator is configured to receive the heated transfer fluid, reduce its pressure and allow at least a portion of the transfer fluid to boil, and wherein the vapor form of the transfer fluid is compressed by the second compressor, and the remaining transfer fluid is cooled for reuse.

In some embodiments, the first condenser is configured to condense the gas vapor against a transfer fluid, wherein the transfer fluid is used to transfer heat to the refrigerant in the first condenser.

In some embodiments, the heat pump further comprises a second condenser coupled to the first condenser, wherein the first condenser is configured to output gas vapor that was not condensed to liquid water to the second condenser, and wherein the second condenser is configured to condense the gas vapor that was not condensed to liquid water in the first condenser and to output liquid water to the boiler.

In some embodiments, the heat pump further comprises a third condenser coupled to a drying/cooling section of the at least one regeneration unit, wherein output gas vapor flows from the drying/cooling section to the third condenser, and wherein the third condenser is configured to condense a portion of the gas vapor to output liquid water to the boiler, to transfer heat to the refrigerant at a second refrigerant pressure lower than the first refrigerant pressure.

In some embodiments, the second condenser is configured to transfer heat to the refrigerant at a second refrigerant pressure lower than the first refrigerant pressure and to output a vapor form of the refrigerant.

In some embodiments, the liquid water from the second condenser is output at a lower temperature than a temperature of the liquid water outputted from the first condenser.

In some embodiments, other process streams are cooled by transferring heat into the refrigerant at the second pressure to output the vapor form of the refrigerant.

In some embodiments, the system includes: at least one regeneration unit comprising at least one chamber comprising a gas inlet and a gas outlet, wherein the at least one regeneration unit is configured to desorb $CO_2$ from at least one panel comprising a substrate configured to capture $CO_2$ from an atmosphere; a first condenser configured to condense gas vapor against a refrigerant at a first pressure, wherein the first condenser is connected to the gas outlet of the at least one chamber and configured to receive gas vapor comprising steam and $CO_2$ from the at least one chamber, wherein the first condenser is configured to output liquid water and a vapor form of the refrigerant at a first refrigerant pressure; a first compressor configured to compress the vapor form of the refrigerant, wherein the first compressor is configured to receive the vapor form of the refrigerant at the first refrigerant pressure, and configured to output a compressed vapor form of the refrigerant at a third refrigerant pressure, and wherein the third refrigerant pressure is higher than the first refrigerant pressure; a first accumulator configured to separate a vapor form of the refrigerant and a liquid form of the refrigerant, wherein the first accumulator is configured to receive the compressed vapor form of the refrigerant at the third refrigerant pressure, and is configured to output a vapor form of the refrigerant at the third refrigerant pressure and a liquid form of the refrigerant; and a boiler configured to boil water to produce steam and condense the refrigerant, wherein the boiler is configured to receive the liquid water from the first condenser and the vapor form of the refrigerant at the third refrigerant pressure from the first accumulator, and wherein the boiler is configured to output steam to the at least one chamber of the at least one regeneration unit, and to output a liquid form of the refrigerant to the first accumulator.

In some embodiments, the first condenser is further configured to output gas vapor that was not condensed to liquid water in the first condenser, the system further comprises, further comprising: a second condenser configured to condense the gas vapor that was not condensed to liquid water in the first condenser against the refrigerant at a second pressure, wherein the second pressure is lower than the first pressure of the first condenser, wherein the second condenser is configured to receive the gas vapor that was not condensed to liquid water in the first condenser from the first condenser and to receive refrigerant in a vapor form and a liquid form, wherein the second condenser is configured to output liquid water to the boiler, and a vapor form of the refrigerant.

In some embodiments, the liquid water from second condenser is output at a lower temperature than a temperature of the liquid water outputted from the first condenser.

In some embodiments, the system further includes: a second compressor configured to compress the vapor form of the refrigerant from the second condenser, wherein the second compressor is configured to receive the vapor form of the refrigerant from the second condenser, and configured to output a compressed form of the vapor form of the refrigerant from the second condenser at a higher pressure than a pressure of the vapor form of the refrigerant from the second condenser.

In some embodiments, the system further includes: a second accumulator configured to separate a vapor form of the refrigerant and a liquid form of the refrigerant, wherein the second accumulator is configured to receive the compressed form of the vapor form of the refrigerant at the higher pressure from the second compressor and configured to output a vapor form of the refrigerant to the first compressor and a liquid form of the refrigerant to the second condenser.

In some embodiments, the refrigerant is butane.

In many embodiments, a unit for desorbing $CO_2$ from adsorber panels includes a desorption chamber through which a plurality of adsorber panels are moved and through which a desorbing gas is flowed such that the desorbing gas first contacts one of the plurality of adsorber panels that is more desorbed before contacting another one of the plurality of adsorber panels that is less desorbed.

In many embodiments, a system for removing carbon dioxide from ambient air includes: a plurality of adsorber panels, wherein each panel of the plurality of adsorber panels comprises a face and a substrate configured to capture $CO_2$ from an atmosphere, and wherein each of the plurality of adsorber panels is oriented horizontally with its face aligned with a horizontal plane; at least one adsorber structure through which the plurality of panels are configured to move; and at least one regeneration unit comprising at least one $CO_2$ desorption chamber; wherein the plurality of adsorber panels is configured to move continuously through the at least one $CO_2$ desorption chamber.

In some embodiments, the plurality of adsorber panels comprises a first adsorber panel and a second adsorber panel, wherein the first and second adsorber panels are configured to move continuously through the $CO_2$ desorption chamber at the same time while at least a portion of the first adsorber panel or a portion of the second adsorber panel is outside of the $CO_2$ desorption chamber.

In some embodiments, each panel of the plurality of adsorber panels comprises a plurality of arrays held together and a plurality of sealing struts, wherein a sealing strut of the plurality of sealing struts is located between adjacent arrays in the plurality of arrays, and wherein the sealing strut of the plurality of sealing struts provides a continuous flat sealing surface for engaging one or more seals to prevent gas from moving between the adjacent arrays.

What is claimed:

1. A system for removing carbon dioxide from ambient air, the system comprising:
   a plurality of adsorber panels, wherein each panel of the plurality of adsorber panels comprises a substrate configured to capture $CO_2$ from an atmosphere;
   at least one regeneration unit comprising at least one chamber comprising a gas inlet and a gas outlet, wherein the at least one regeneration unit is configured to desorb $CO_2$ from the plurality of adsorber panels, wherein the plurality of adsorber panels is configured to move continuously through the at least one chamber; and
   a heat pump coupled between the gas outlet and the gas inlet of the at least one chamber of the at least one regeneration unit.

2. The system of claim 1, wherein the heat pump comprises:
a first condenser coupled to the gas outlet of the at least one chamber and configured to receive gas vapor comprising steam and $CO_2$ from the at least one chamber of the at least one regeneration unit and to condense the gas vapor;
a boiler coupled to the first condenser and configured to receive liquid water from the first condenser, wherein the boiler is coupled to the gas inlet and configured to output steam to the at least one chamber of the at least one regeneration unit; and
a first compressor and a first accumulator coupled between the first condenser and the boiler for cycling refrigerant through the heat pump.

3. The system of claim 2, wherein:
the first condenser is configured to condense the gas vapor received from the gas outlet, wherein heat from the first condenser is transferred into a refrigerant to deliver a vapor form of that refrigerant to the first compressor at a first refrigerant pressure;
the first compressor is configured to compress the vapor form of the refrigerant;
the first accumulator is configured to receive the compressed vapor form of the refrigerant and to separate a vapor form of the refrigerant and a liquid form of the refrigerant; and
the boiler is configured to receive the vapor form of the refrigerant from the first accumulator, to boil the liquid water to produce the steam output to the at least one chamber and condense the refrigerant, and to output a liquid form of the refrigerant to the first accumulator.

4. The system of claim 3, wherein the heat pump further comprises a second condenser coupled to a drying/cooling section of the at least one regeneration unit, wherein output gas vapor flows from the drying/cooling section to the second condenser, and wherein the second condenser is configured to condense a portion of the gas vapor to output liquid water to the boiler, to transfer heat to the refrigerant at a second refrigerant pressure lower than the first refrigerant pressure, and to output a vapor form of the refrigerant.

5. The system of claim 2, wherein:
the first condenser is configured to condense the gas vapor received from the gas outlet, wherein heat from the first condenser is transferred into a refrigerant to deliver a vapor form of that refrigerant to the first compressor at a first refrigerant pressure;
the first compressor is configured to compress the vapor form of the refrigerant;
the boiler is configured to receive the vapor form of the refrigerant from the first compressor, to boil the liquid water to produce the steam output to the at least one chamber and condense the refrigerant, and to output a liquid form of the refrigerant to the first accumulator; and
the first accumulator is configured to receive a liquid form of the refrigerant from the boiler and deliver the refrigerant to the first condenser through a valve at the first refrigerant pressure.

6. The system of claim 5, wherein the heat pump further comprises a second condenser coupled to a drying/cooling section of the at least one regeneration unit, wherein output gas vapor flows from the drying/cooling section to the second condenser, and wherein the second condenser is configured to condense a portion of the gas vapor to output liquid water to the boiler, to transfer heat to the refrigerant at a second refrigerant pressure lower than the first refrigerant pressure, and to output a vapor form of the refrigerant; and
the vapor form of the refrigerant is sent to a second compressor that increases the pressure vapor form of the refrigerant from the second to the first refrigerant pressure.

7. The system of claim 2, further comprising an evaporator, wherein the first condenser is configured to condense the gas vapor against a transfer fluid to heat the transfer fluid, and wherein the evaporator is configured to receive the heated transfer fluid and the refrigerant, boil the refrigerant, and cool the transfer fluid for reuse.

8. The system of claim 7, wherein the first condenser is configured to condense the gas vapor against the boiling refrigerant.

9. The system of claim 2, further comprising a second accumulator and a third compressor, wherein the first condenser is configured to condense the gas vapor against a transfer fluid to heat the transfer fluid, and wherein the second accumulator is configured to receive the heated transfer fluid, reduce its pressure and allow at least a portion of the transfer fluid to boil, and wherein the vapor form of the transfer fluid is compressed by the third compressor, and the remaining transfer fluid is cooled for reuse.

10. The system of claim 2, wherein the first condenser is configured to condense the gas vapor against a transfer fluid, wherein the transfer fluid is used to transfer heat to the refrigerant in the first condenser.

11. The system of claim 2, wherein the heat pump further comprises a third condenser coupled to the first condenser, wherein the first condenser is configured to output gas vapor that was not condensed to liquid water to the third condenser, and wherein the third condenser is configured to condense the gas vapor that was not condensed to liquid water in the first condenser and to output liquid water to the boiler.

12. The system of claim 11, wherein the third condenser is configured to transfer heat to the refrigerant at a third refrigerant pressure lower than the first refrigerant pressure and to output a vapor form of the refrigerant.

13. The system of claim 11, wherein the liquid water from the third condenser is output at a lower temperature than a temperature of the liquid water outputted from the first condenser.

14. A system for removing carbon dioxide from ambient air, the system comprising:
a plurality of adsorber panels, wherein each panel of the plurality of adsorber panels comprises a substrate configured to capture $CO_2$ from an atmosphere;
at least one regeneration unit comprising at least one chamber comprising a gas inlet and a gas outlet, wherein the at least one regeneration unit is configured to desorb $CO_2$ from the plurality of adsorber panels, wherein the plurality of adsorber panels is configured to move continuously through the at least one chamber; and
a heat pump coupled between the gas outlet and the gas inlet of the at least one chamber of the at least one regeneration unit, wherein the heat pump comprises:
a first condenser coupled to the gas outlet of the at least one chamber and configured to receive gas vapor comprising steam and $CO_2$ from the at least one chamber of the at least one regeneration unit and to condense the gas vapor;
a boiler coupled to the first condenser and configured to receive liquid water from the first condenser, wherein the boiler is coupled to the gas inlet and configured to output steam to the at least one chamber of the at least one regeneration unit; and a first compressor and a first accumulator coupled between the first condenser and the boiler for cycling refrigerant through the heat pump.

15. The system of claim 14, wherein:

the first condenser is configured to condense the gas vapor received from the gas outlet, wherein heat from the first condenser is transferred into a refrigerant to deliver a vapor form of that refrigerant to the first compressor at a first refrigerant pressure;

the first compressor is configured to compress the vapor form of the refrigerant;

the first accumulator is configured to receive the compressed vapor form of the refrigerant and to separate a vapor form of the refrigerant and a liquid form of the refrigerant; and the boiler is configured to receive the vapor form of the refrigerant from the first accumulator, to boil the liquid water to produce the steam output to the at least one chamber and condense the refrigerant, and to output a liquid form of the refrigerant to the first accumulator.

16. The system of claim 15, wherein the heat pump further comprises a second condenser coupled to a drying/cooling section of the at least one regeneration unit, wherein output gas vapor flows from the drying/cooling section to the second condenser, and wherein the second condenser is configured to condense a portion of the gas vapor to output liquid water to the boiler, to transfer heat to the refrigerant at a second refrigerant pressure lower than the first refrigerant pressure, and to output a vapor form of the refrigerant.

17. The system of claim 14, wherein:

the first condenser is configured to condense the gas vapor received from the gas outlet, wherein heat from the first condenser is transferred into a refrigerant to deliver a vapor form of that refrigerant to the first compressor at a first refrigerant pressure;

the first compressor is configured to compress the vapor form of the refrigerant;

the boiler is configured to receive the vapor form of the refrigerant from the first compressor, to boil the liquid water to produce the steam output to the at least one chamber and condense the refrigerant, and to output a liquid form of the refrigerant to the first accumulator; and the first accumulator is configured to receive a liquid form of the refrigerant from the boiler and deliver the refrigerant to the first condenser through a valve at the first refrigerant pressure.

18. The system of claim 17, wherein the heat pump further comprises a second condenser coupled to a drying/cooling section of the at least one regeneration unit, wherein output gas vapor flows from the drying/cooling section to the second condenser, and wherein the second condenser is configured to condense a portion of the gas vapor to output liquid water to the boiler, to transfer heat to the refrigerant at a second refrigerant pressure lower than the first refrigerant pressure, and to output a vapor form of the refrigerant; and the vapor form of the refrigerant is sent to a second compressor that increases the pressure vapor form of the refrigerant from the second to the first refrigerant pressure.

19. The system of claim 14, further comprising an evaporator, wherein the first condenser is configured to condense the gas vapor against a transfer fluid to heat the transfer fluid, and wherein the evaporator is configured to receive the heated transfer fluid and the refrigerant, boil the refrigerant, and cool the transfer fluid for reuse.

20. The system of claim 14, further comprising a second accumulator and a third compressor, wherein the first condenser is configured to condense the gas vapor against a transfer fluid to heat the transfer fluid, and wherein the second accumulator is configured to receive the heated transfer fluid, reduce its pressure and allow at least a portion of the transfer fluid to boil, and wherein the vapor form of the transfer fluid is compressed by the third compressor, and the remaining transfer fluid is cooled for reuse.

21. The system of claim 14, wherein the first condenser is configured to condense the gas vapor against a transfer fluid, wherein the transfer fluid is used to transfer heat to the refrigerant in the first condenser.

22. The system of claim 14, wherein the heat pump further comprises a third condenser coupled to the first condenser, wherein the first condenser is configured to output gas vapor that was not condensed to liquid water to the third condenser, and wherein the third condenser is configured to condense the gas vapor that was not condensed to liquid water in the first condenser and to output liquid water to the boiler.

23. The system of claim 22, wherein the third condenser is configured to transfer heat to the refrigerant at a third refrigerant pressure lower than the first refrigerant pressure and to output a vapor form of the refrigerant.

* * * * *